US011797113B2

(12) United States Patent
de Vries et al.

(10) Patent No.: US 11,797,113 B2
(45) Date of Patent: Oct. 24, 2023

(54) DEVICES, METHODS, AND GRAPHICAL USER INTERFACES FOR INTERACTION WITH A CONTROL

(71) Applicant: Apple Inc., Cupertino, CA (US)

(72) Inventors: Nathan de Vries, San Francisco, CA (US); Chanaka G. Karunamuni, San Jose, CA (US); Marcos Alonso Ruiz, San Francisco, CA (US); William M. Tyler, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/583,126

(22) Filed: Sep. 25, 2019

(65) Prior Publication Data
US 2020/0379593 A1 Dec. 3, 2020

Related U.S. Application Data

(60) Provisional application No. 62/855,982, filed on Jun. 1, 2019.

(51) Int. Cl.
*G06F 3/041* (2006.01)
*G06F 3/01* (2006.01)
*G06F 3/04842* (2022.01)

(52) U.S. Cl.
CPC ............ G06F 3/0412 (2013.01); G06F 3/016 (2013.01); G06F 3/04842 (2013.01)

(58) Field of Classification Search
CPC .......... G06F 3/0412; G06F 3/016; G06F 3/02; G06F 3/0213; G06F 3/0219;
(Continued)

(56) References Cited

U.S. PATENT DOCUMENTS 9,082,269 B2   7/2015 Olsson et al.
9,916,073 B1*  3/2018 Szeto ................. G06F 3/041
(Continued)

FOREIGN PATENT DOCUMENTS

EP       2 317 426 A2     5/2011
WO   WO 2007/103631 A2   9/2007
(Continued)

OTHER PUBLICATIONS

Pediredla, "Understanding 3D Touch From A Development Perspective", http://blog.hedgehoglab.com/understanding-3d-touch-develepment, Feb. 8, 2016, 10 pages.
(Continued)

*Primary Examiner* — Sahlu Okebato
(74) *Attorney, Agent, or Firm* — Morgan, Lewis & Bockius LLP

(57) ABSTRACT

In response to a first press input, a device displays a control corresponding to a control function with a first size and with a value indicator representing that a current value of the control function. After displaying the control with the first size and the value indicator, if a subsequent press input has not been detected within a threshold time, the device ceases to display the control; and if a second press input is detected on the same input region within the threshold time: the device adjusts the current value of the control function in accordance with the second press input; the device adjusts a size of the first control from the first size to a second size; and the device changes an appearance of the value indicator to represent that the current value of the control function is the second value.

66 Claims, 96 Drawing Sheets

(58) Field of Classification Search
CPC .. G06F 3/0338; G06F 3/0354; G06F 3/03548; G06F 3/0362; G06F 3/0393; G06F 3/04842

See application file for complete search history.

(56) References Cited

U.S. PATENT DOCUMENTS

| | | | |
|---|---|---|---|
| 10,156,921 | B1 | 12/2018 | Smith |
| 2004/0164973 | A1 | 8/2004 | Nakano et al. |
| 2009/0284468 | A1 | 11/2009 | Takaki et al. |
| 2010/0156818 | A1 | 6/2010 | Burrough et al. |
| 2012/0023524 | A1 | 1/2012 | Suk et al. |
| 2023/0012223 | A1 | 1/2013 | Gleeson et al. |
| 2013/0201136 | A1 | 8/2013 | Baard et al. |
| 2014/0049521 | A1 | 2/2014 | Gil et al. |
| 2014/0055251 | A1* | 2/2014 | Son ............... G06F 3/04883 340/12.54 |
| 2015/0020109 | A1 | 1/2015 | Higa et al. |
| 2015/0058723 | A1 | 2/2015 | Cieplinski et al. |
| 2015/0062052 | A1 | 3/2015 | Bernstein et al. |
| 2015/0067495 | A1 | 3/2015 | Bernstein et al. |
| 2015/0067496 | A1* | 3/2015 | Missig ............... G06F 3/016 715/702 |
| 2015/0067497 | A1 | 3/2015 | Cieplinski et al. |
| 2015/0067513 | A1 | 3/2015 | Zambetti et al. |
| 2015/0067519 | A1 | 3/2015 | Missig et al. |
| 2015/0067559 | A1 | 3/2015 | Missig et al. |
| 2015/0067560 | A1 | 3/2015 | Cieplinski et al. |
| 2015/0067563 | A1 | 3/2015 | Bernstein et al. |
| 2015/0067596 | A1 | 3/2015 | Brown et al. |
| 2015/0067601 | A1 | 3/2015 | Bernstein et al. |
| 2015/0067602 | A1 | 3/2015 | Bernstein et al. |
| 2015/0067605 | A1 | 3/2015 | Zambetti et al. |
| 2015/0135109 | A1 | 5/2015 | Zambetti et al. |
| 2015/0138126 | A1 | 5/2015 | Westerman |
| 2015/0138155 | A1 | 5/2015 | Bernstein et al. |
| 2015/0143238 | A1 | 5/2015 | Jung et al. |
| 2015/0143273 | A1 | 5/2015 | Bernstein et al. |
| 2015/0149899 | A1 | 5/2015 | Bernstein et al. |
| 2015/0149964 | A1 | 5/2015 | Bernstein et al. |
| 2015/0149967 | A1 | 5/2015 | Bernstein et al. |
| 2015/0153929 | A1 | 6/2015 | Bernstein et al. |
| 2015/0268752 | A1* | 9/2015 | Ku ............... G06F 1/1626 345/173 |
| 2015/0277564 | A1* | 10/2015 | Saito ............... G06F 3/0485 715/702 |
| 2015/0348510 | A1 | 12/2015 | Zhang et al. |
| 2015/0378519 | A1 | 12/2015 | Brown et al. |
| 2016/0004427 | A1 | 1/2016 | Zambetti et al. |
| 2016/0004428 | A1 | 1/2016 | Bernstein et al. |
| 2016/0004429 | A1 | 1/2016 | Bernstein et al. |
| 2016/0004430 | A1 | 1/2016 | Missig et al. |
| 2016/0004431 | A1 | 1/2016 | Bernstein et al. |
| 2016/0004432 | A1 | 1/2016 | Bernstein et al. |
| 2016/0011771 | A1 | 1/2016 | Cieplinski |
| 2016/0041750 | A1 | 2/2016 | Cieplinski et al. |
| 2016/0210025 | A1 | 7/2016 | Bernstein et al. |
| 2016/0225568 | A1 | 8/2016 | Chen et al. |
| 2016/0259413 | A1 | 9/2016 | Anzures et al. |
| 2016/0259497 | A1 | 9/2016 | Foss et al. |
| 2016/0259498 | A1 | 9/2016 | Foss et al. |
| 2016/0259499 | A1 | 9/2016 | Kocienda et al. |
| 2016/0259517 | A1 | 9/2016 | Butcher et al. |
| 2016/0259518 | A1 | 9/2016 | King et al. |
| 2016/0259519 | A1 | 9/2016 | Foss et al. |
| 2016/0259527 | A1 | 9/2016 | Kocienda et al. |
| 2016/0259528 | A1 | 9/2016 | Foss et al. |
| 2016/0259536 | A1 | 9/2016 | Kudurshian et al. |
| 2016/0291770 | A1 | 10/2016 | Kocienda et al. |
| 2016/0306524 | A1* | 10/2016 | Park ............... G06F 3/0485 |
| 2017/0011624 | A1* | 1/2017 | Guihot ............... G06F 3/041 |
| 2017/0046024 | A1 | 2/2017 | Dascola et al. |
| 2017/0046025 | A1 | 2/2017 | Dascola et al. |
| 2017/0075520 | A1 | 3/2017 | Bauer et al. |
| 2017/0075562 | A1 | 3/2017 | Bauer et al. |
| 2017/0075563 | A1 | 3/2017 | Bauer et al. |
| 2017/0212673 | A1 | 7/2017 | Bernstein et al. |
| 2017/0357317 | A1 | 12/2017 | Chaudhri et al. |
| 2017/0357319 | A1 | 12/2017 | Chaudhri et al. |
| 2017/0357320 | A1 | 12/2017 | Chaudhri et al. |
| 2017/0357358 | A1 | 12/2017 | Teutschler et al. |
| 2018/0024681 | A1 | 1/2018 | Bernstein et al. |
| 2018/0039368 | A1 | 2/2018 | Choi et al. |
| 2018/0046341 | A1 | 2/2018 | Lee et al. |
| 2018/0059809 | A1 | 3/2018 | McClendon et al. |
| 2018/0067554 | A1 | 3/2018 | Chaudhri et al. |
| 2018/0067555 | A1 | 3/2018 | Chaudhri et al. |
| 2018/0067622 | A1 | 3/2018 | Chaudhri et al. |
| 2018/0074637 | A1 | 3/2018 | Rosenberg et al. |
| 2018/0188920 | A1 | 7/2018 | Bernstein et al. |
| 2018/0217717 | A1* | 8/2018 | Yasuda ............... B60K 35/00 |
| 2018/0224963 | A1 | 8/2018 | Lee et al. |
| 2018/0275862 | A1 | 9/2018 | Khoe et al. |
| 2018/0364883 | A1 | 12/2018 | Khoe et al. |
| 2018/0364904 | A1 | 12/2018 | Bernstein et al. |
| 2019/0018562 | A1 | 1/2019 | Bernstein et al. |
| 2019/0042075 | A1 | 2/2019 | Bernstein et al. |
| 2019/0042078 | A1 | 2/2019 | Bernstein et al. |
| 2019/0050055 | A1 | 2/2019 | Chaudhri et al. |
| 2019/0065043 | A1 | 2/2019 | Zambetti et al. |
| 2019/0065240 | A1 | 2/2019 | Kong et al. |
| 2019/0073003 | A1 | 3/2019 | Xu et al. |
| 2019/0138189 | A1 | 5/2019 | Missig |
| 2019/0146643 | A1 | 5/2019 | Foss et al. |
| 2019/0163358 | A1 | 5/2019 | Dascola et al. |
| 2019/0171354 | A1 | 6/2019 | Dascola et al. |
| 2019/0339804 | A1 | 11/2019 | Gleeson et al. |
| 2021/0165520 | A1 | 6/2021 | Gleeson et al. |

FOREIGN PATENT DOCUMENTS

| | | |
|---|---|---|
| WO | WO 2013/169870 A1 | 11/2013 |
| WO | WO 2016/144975 A2 | 9/2016 |

OTHER PUBLICATIONS

Office Action, dated Apr. 16, 2020, received in U.S. Appl. No. 16/403,329, 29 pages.

Final Office Action, dated Sep. 22, 2020, received in U.S. Appl. No. 16/403,329, 31 pages.

Notice of Allowance, dated Nov. 27, 2020, received in U.S. Appl. No. 16/403,329, 5 pages.

Invitation to Pay Additional Fees, dated Oct. 7, 2019, received in International Patent Application No. PCT/US2019/031078, which corresponds with U.S. Appl. No. 16/403,329, 30 pages.

International Search Report and Written Opinion, dated Dec. 2, 2019, received in International Patent Application No. PCT/US2019/031078, which corresponds with U.S. Appl. No. 16/403,329, 32 pages.

Office Action, dated Feb. 1, 2022, received in U.S. Appl. No. 17/172,027, 24 pages.

Hannon, "Sound Support—Add, Remove or Rearrange Items On Your Mac's Dock", https://soundsupport.biz/2017/02/19/add-remove-or-rearrange-items-on-your-macs-dock/, 6 pages.

Office Action, dated Dec. 6, 2022, received in European Patent Application No. 19727184.4, which corresponds with U.S. Appl. No. 16/403,329, 17 pages.

Notice of Allowance, dated Jun. 30, 2022, received in U.S. Appl. No. 17/172,027, 9 pages.

Office Action, dated May 24, 2023, received in U.S. Appl. No. 17/947,037, 23 pages.

* cited by examiner

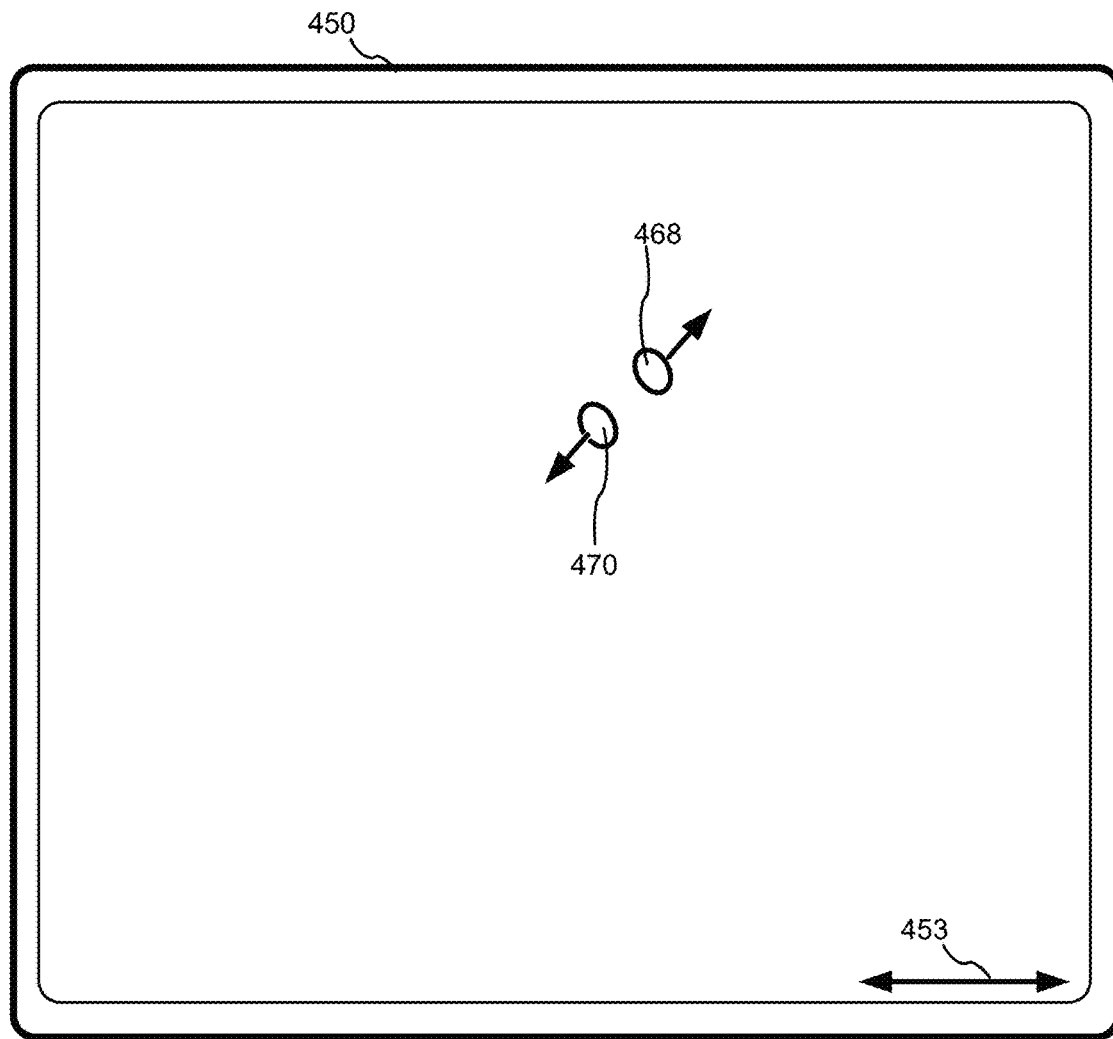
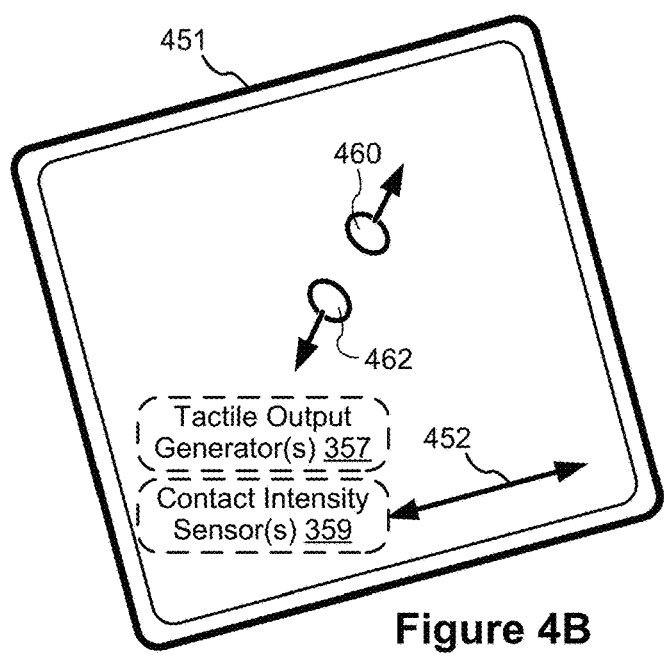
Figure 4B

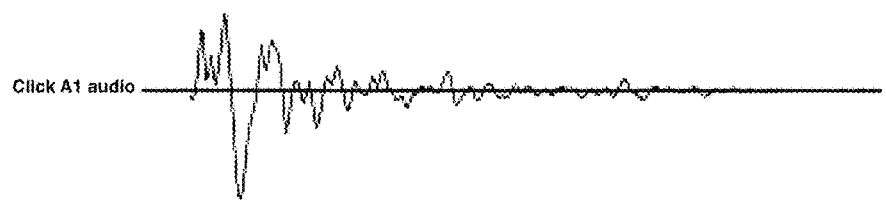
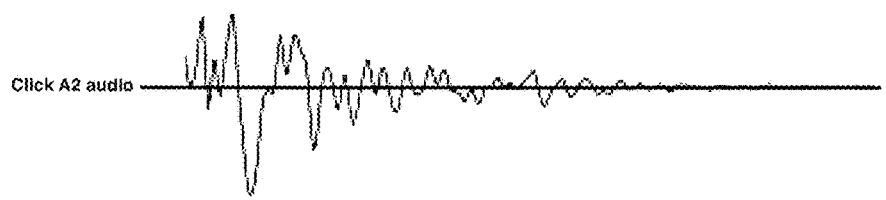
Figure 4H
Figure 4I
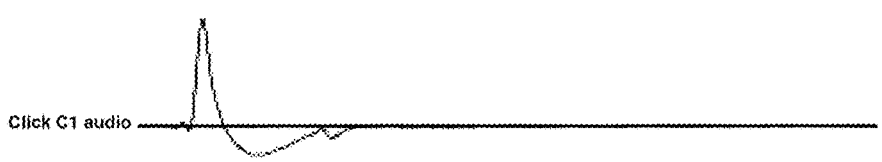
Figure 4J

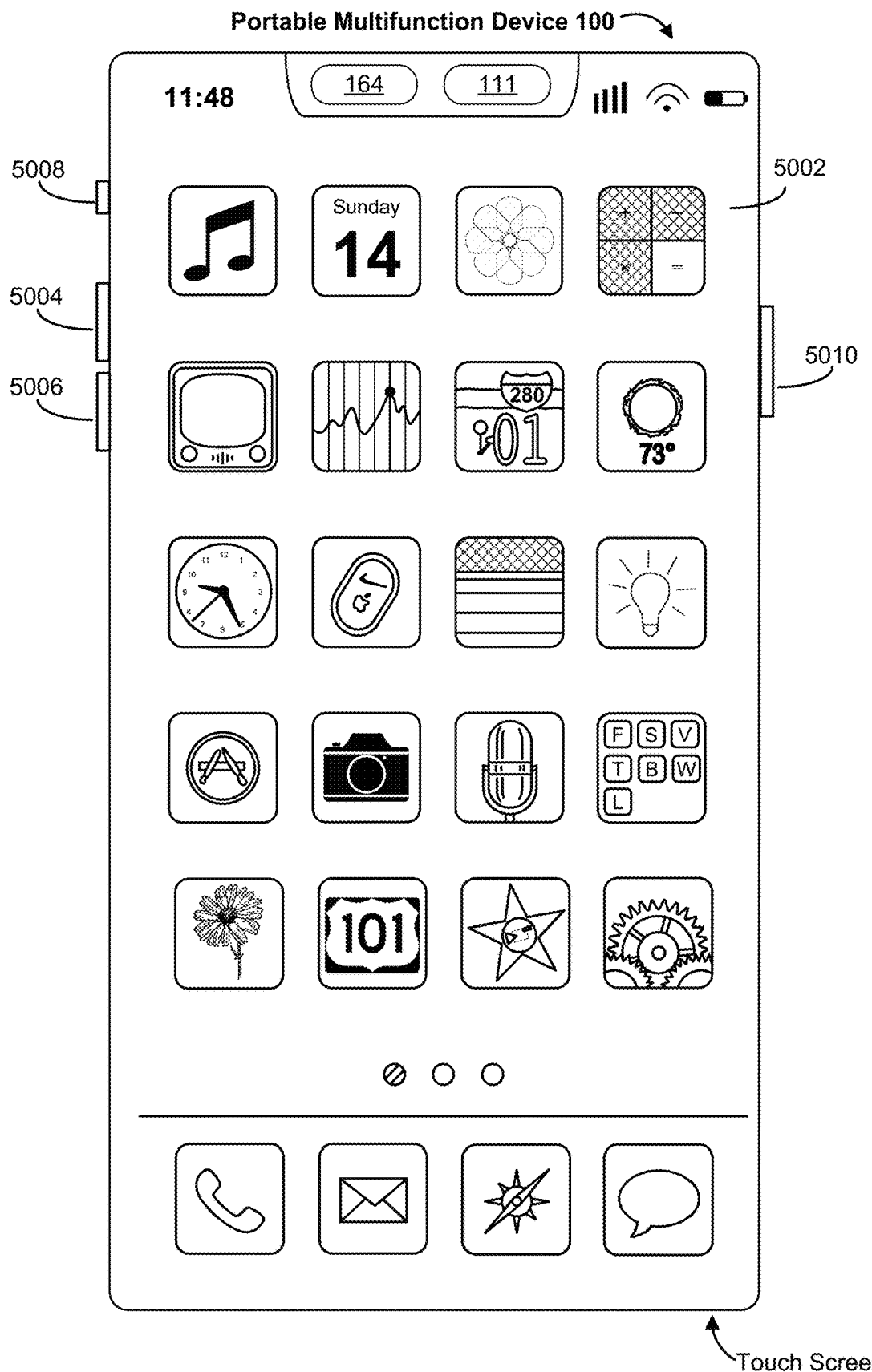
Figure 5A1

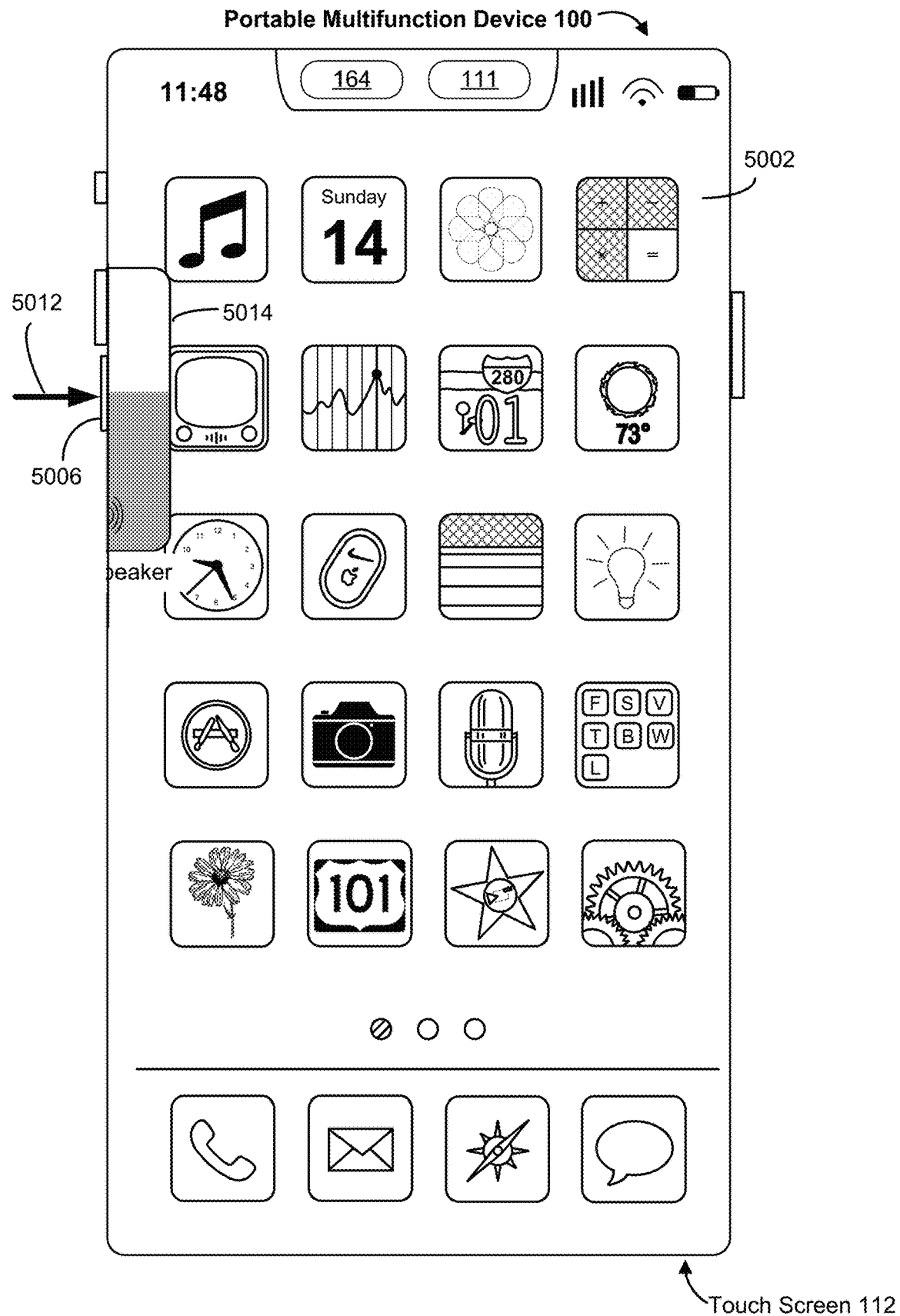
Figure 5A2

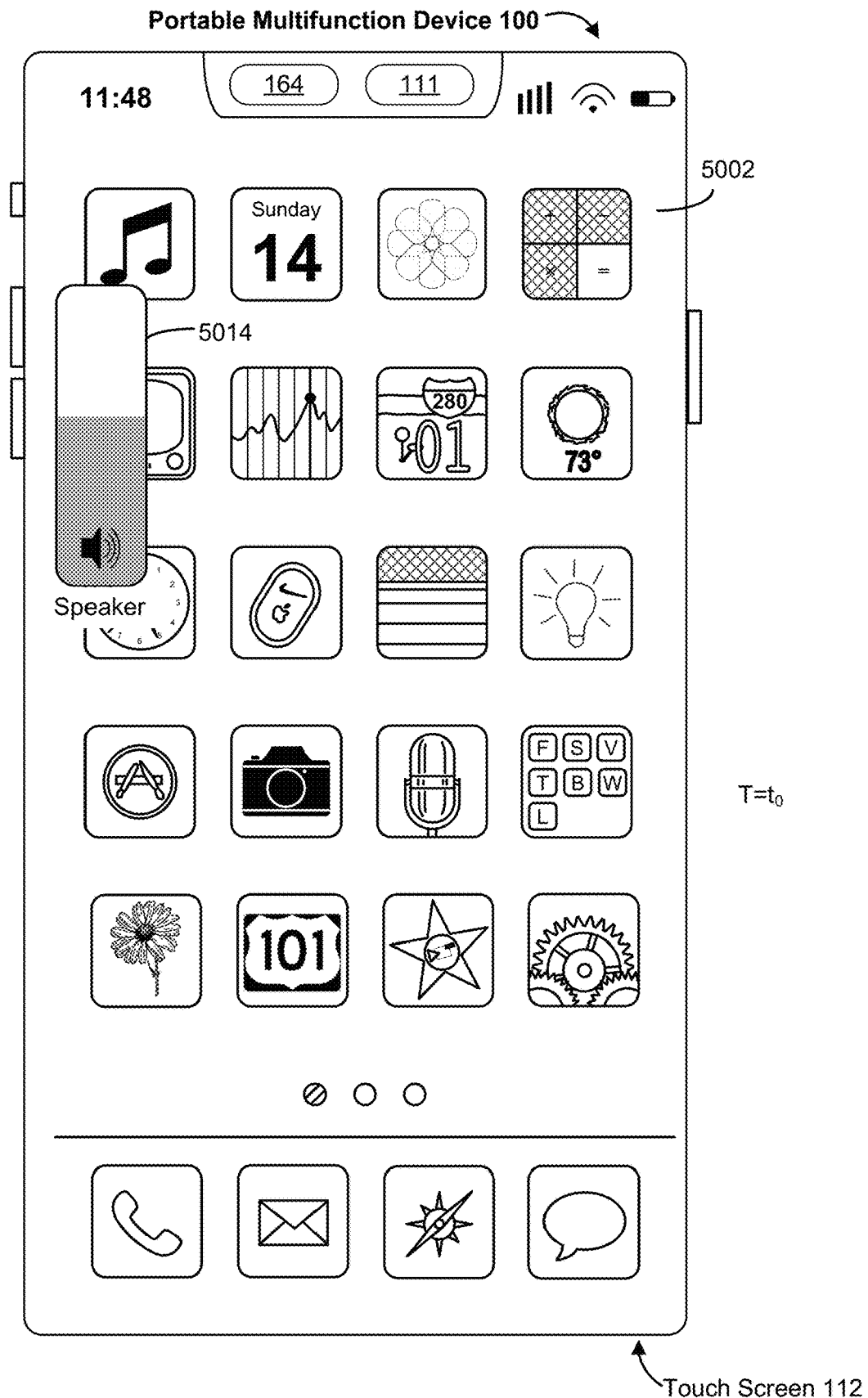
Figure 5A3

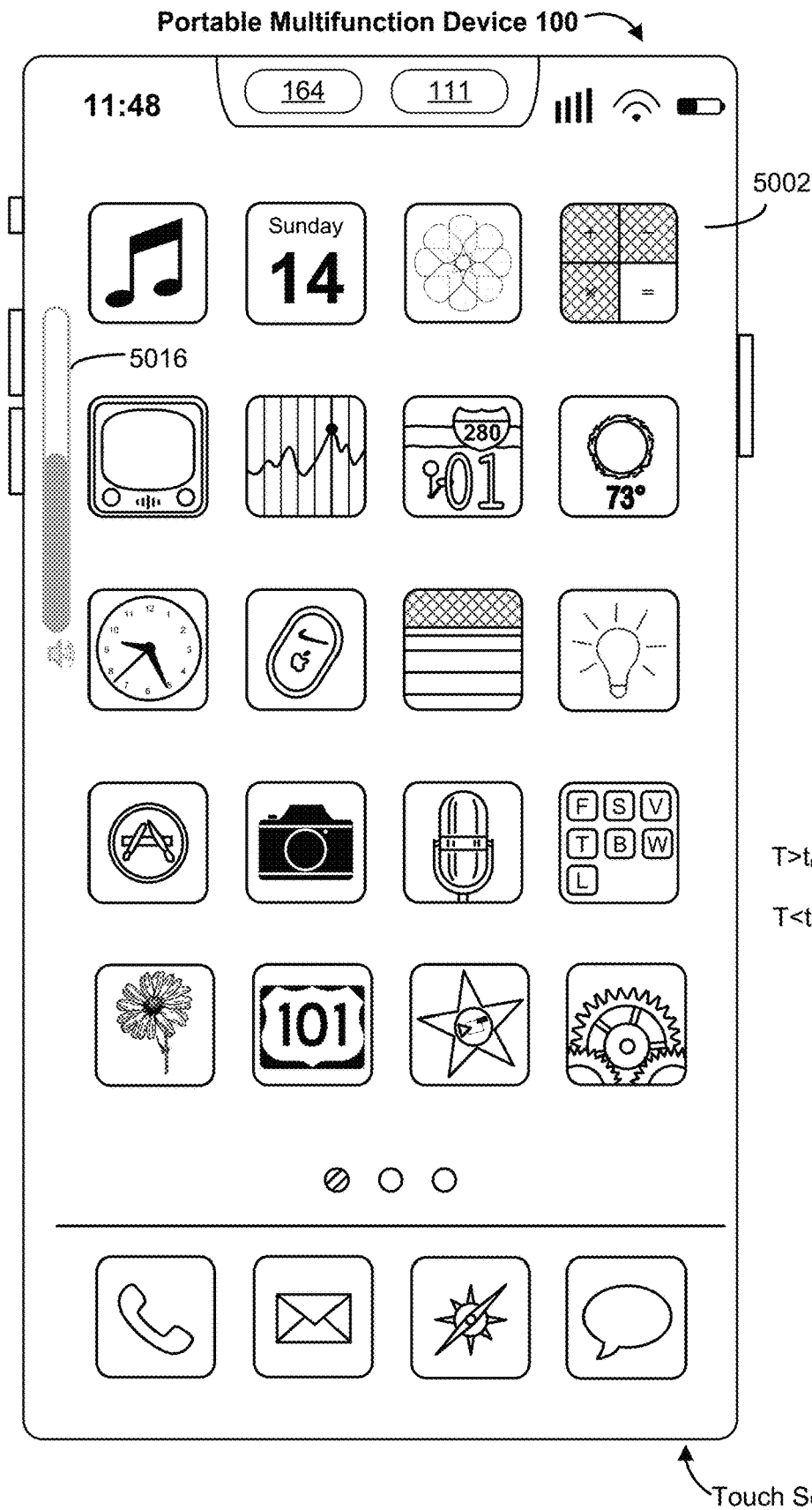
Figure 5A4

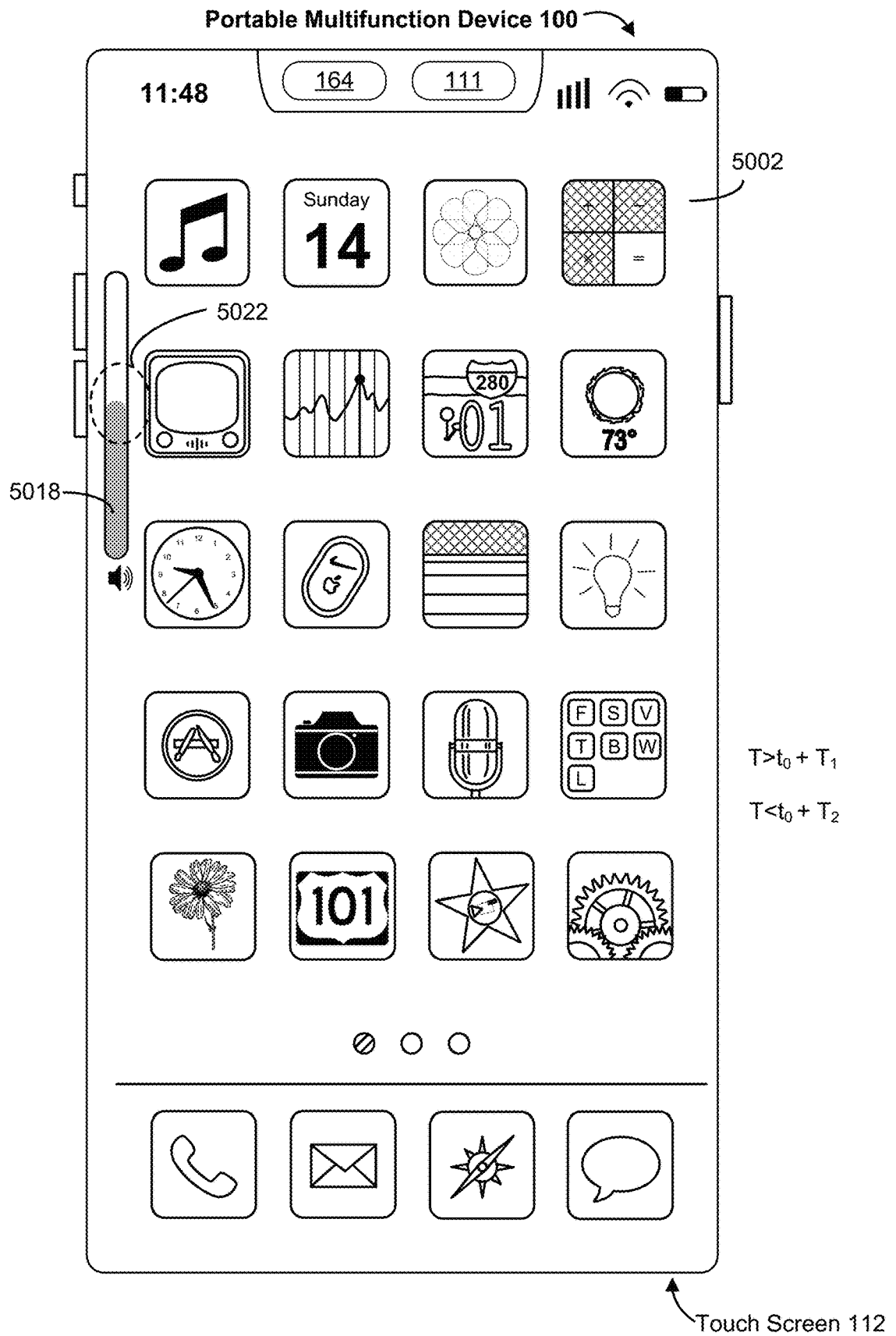
Figure 5A5

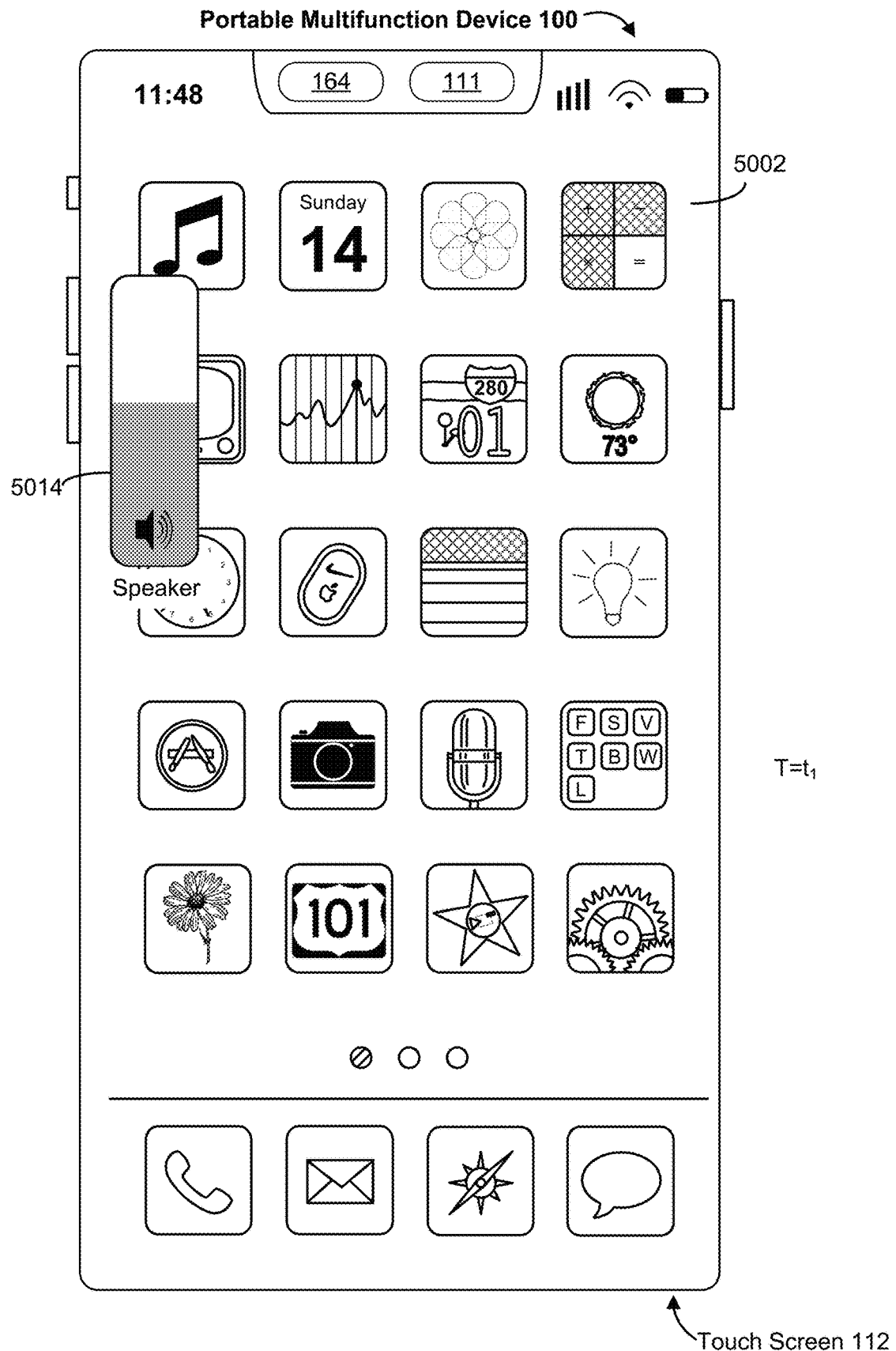
Figure 5A6

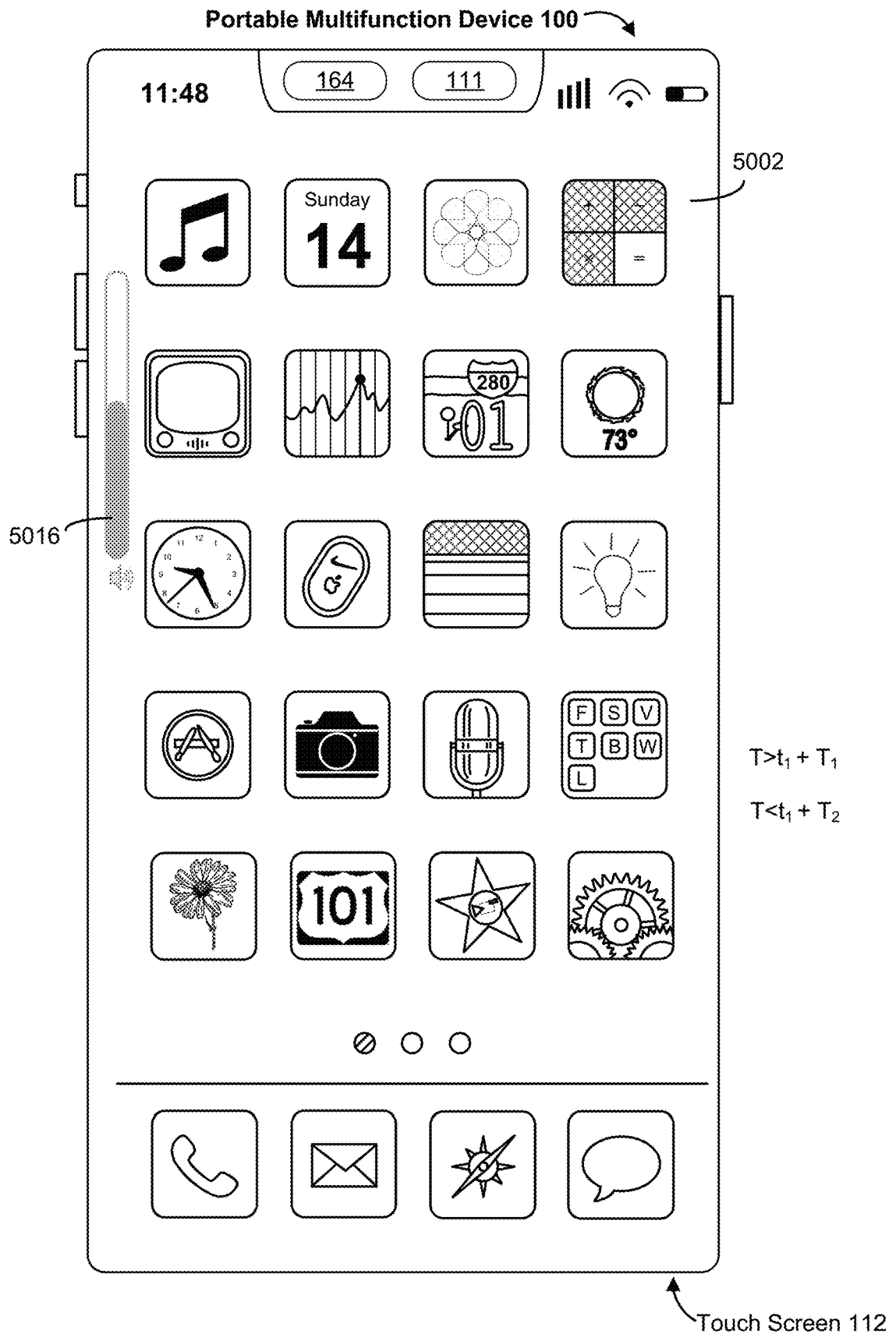
Figure 5A7

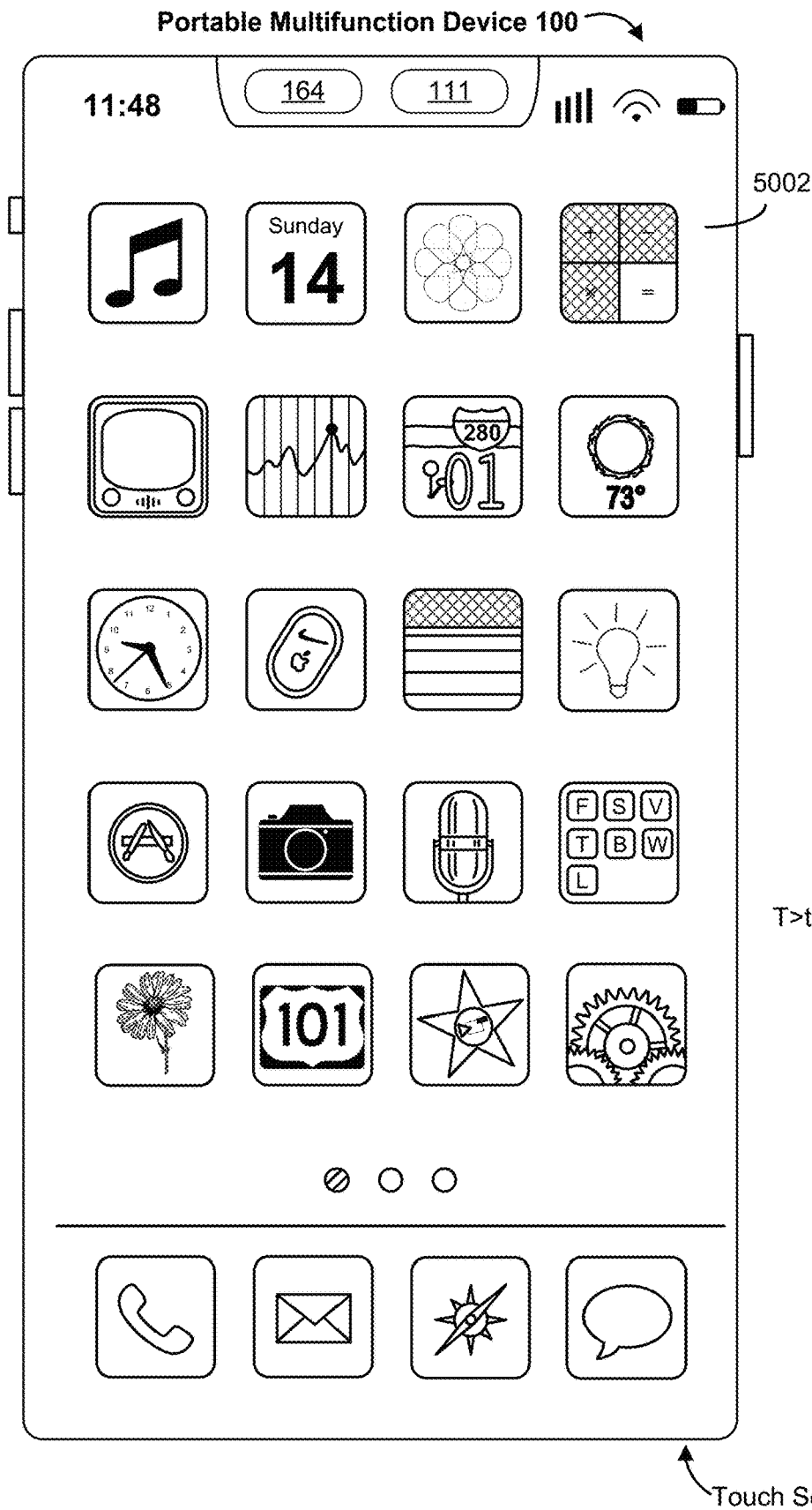
Figure 5A8

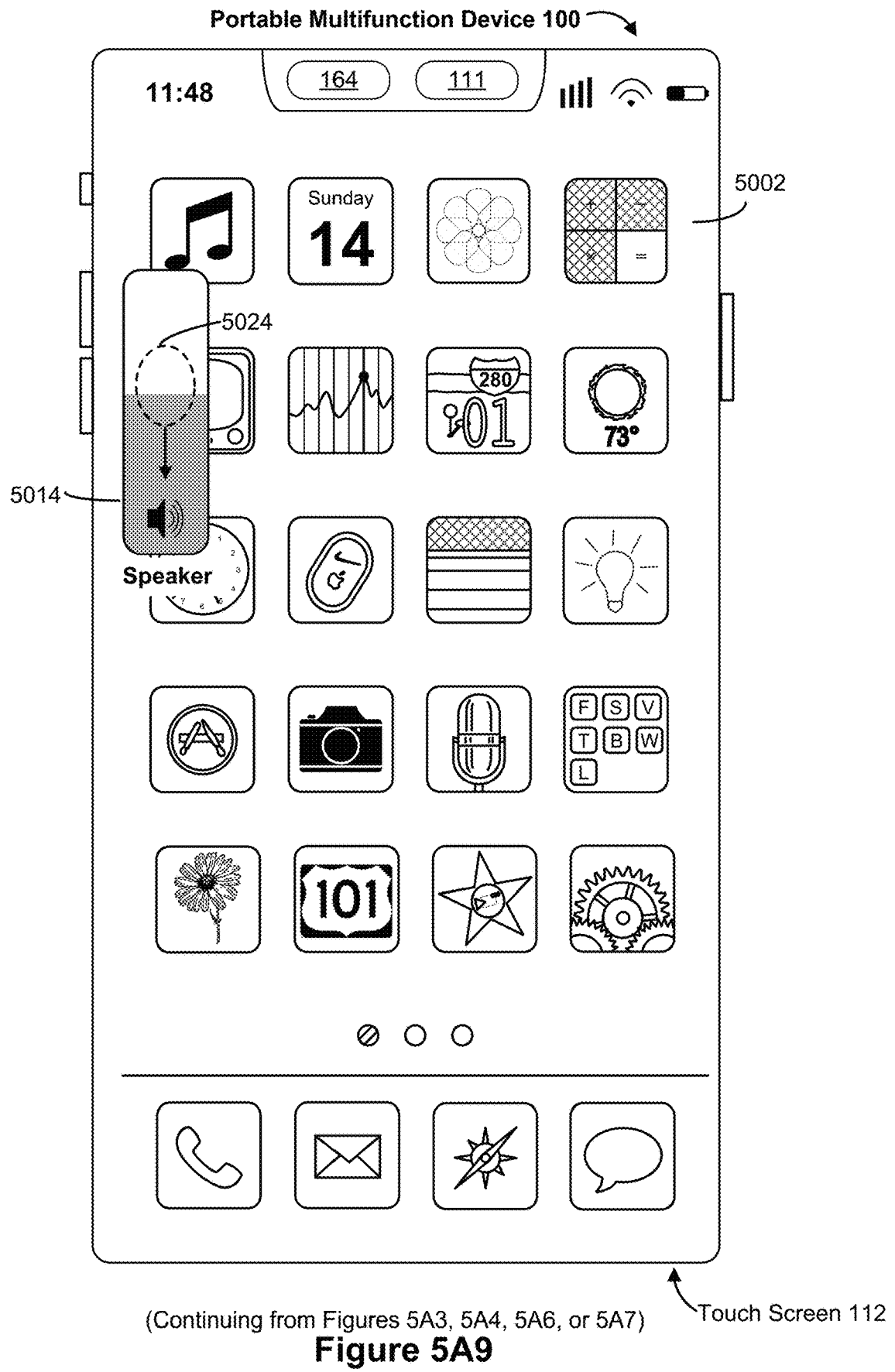
(Continuing from Figures 5A3, 5A4, 5A6, or 5A7)
Figure 5A9

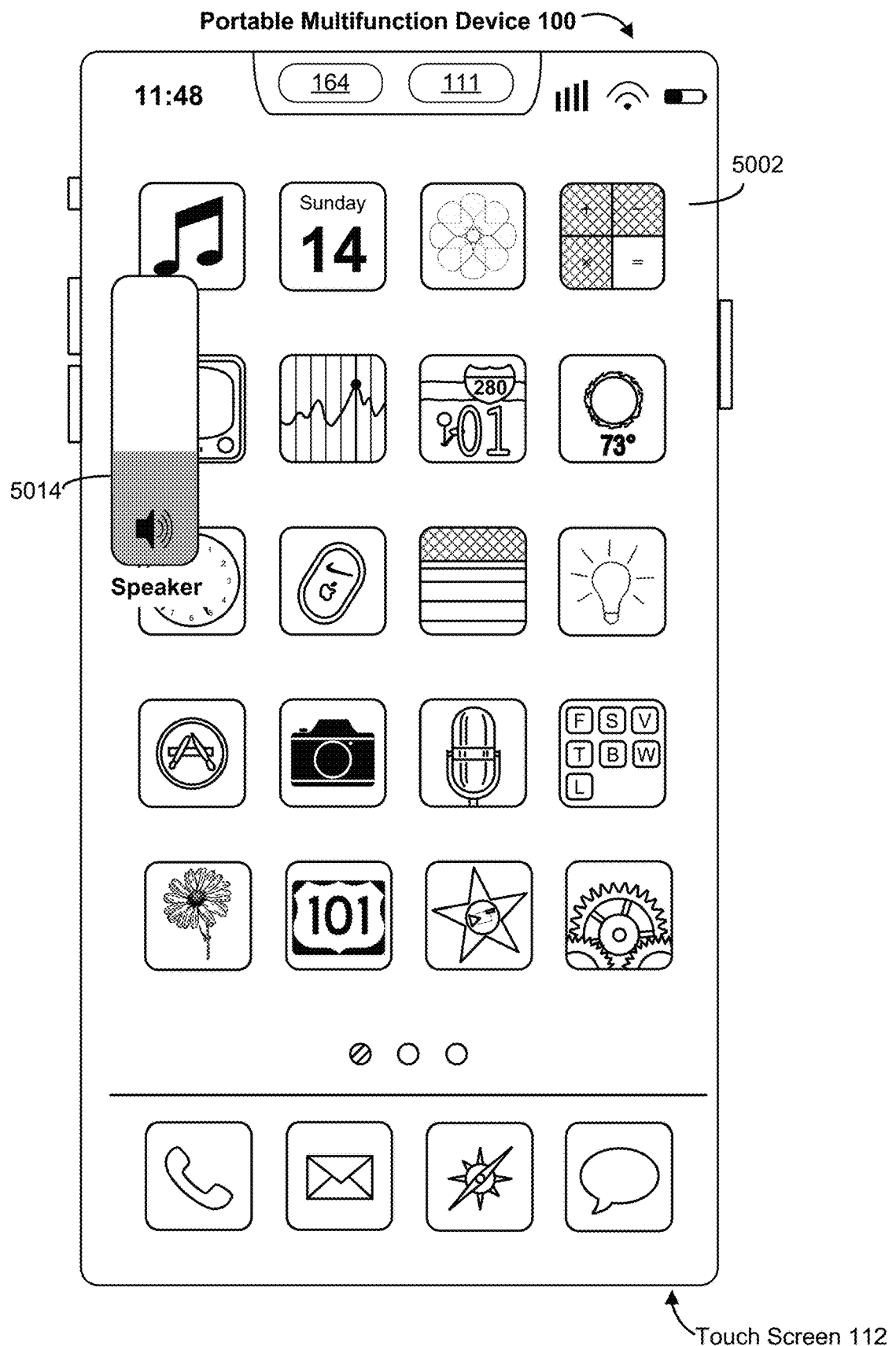
Figure 5A10

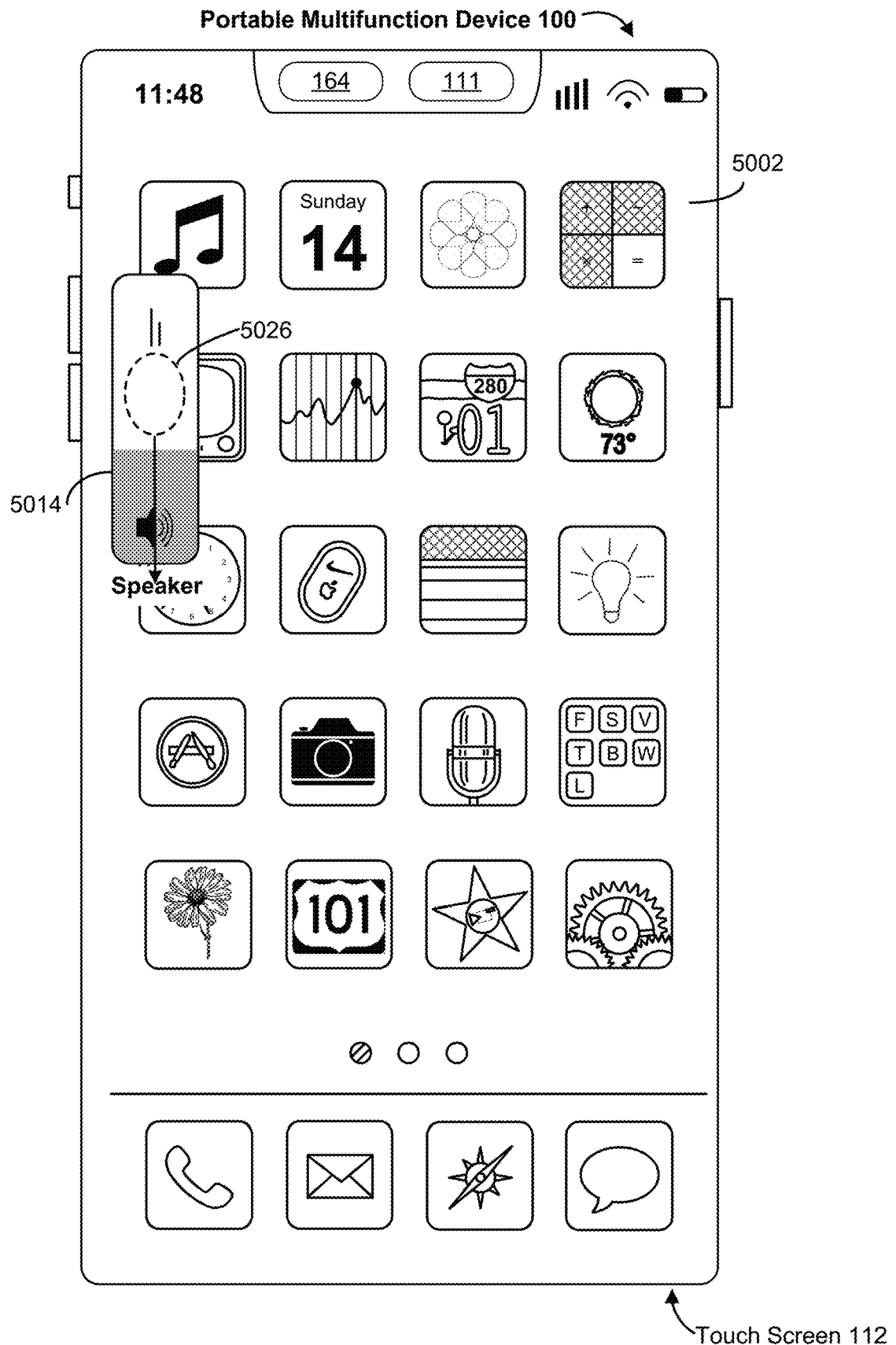
Figure 5A11

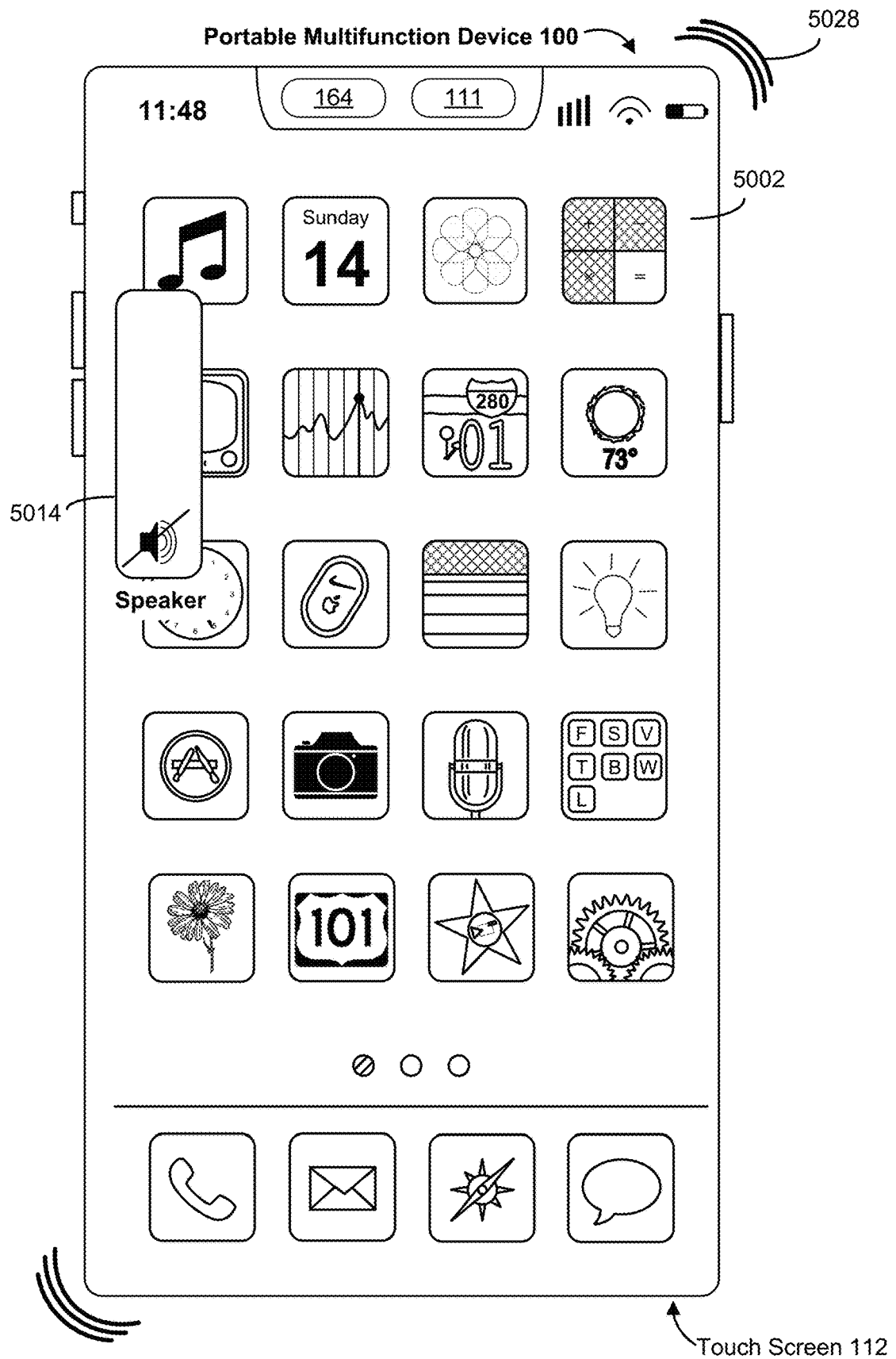
Figure 5A12

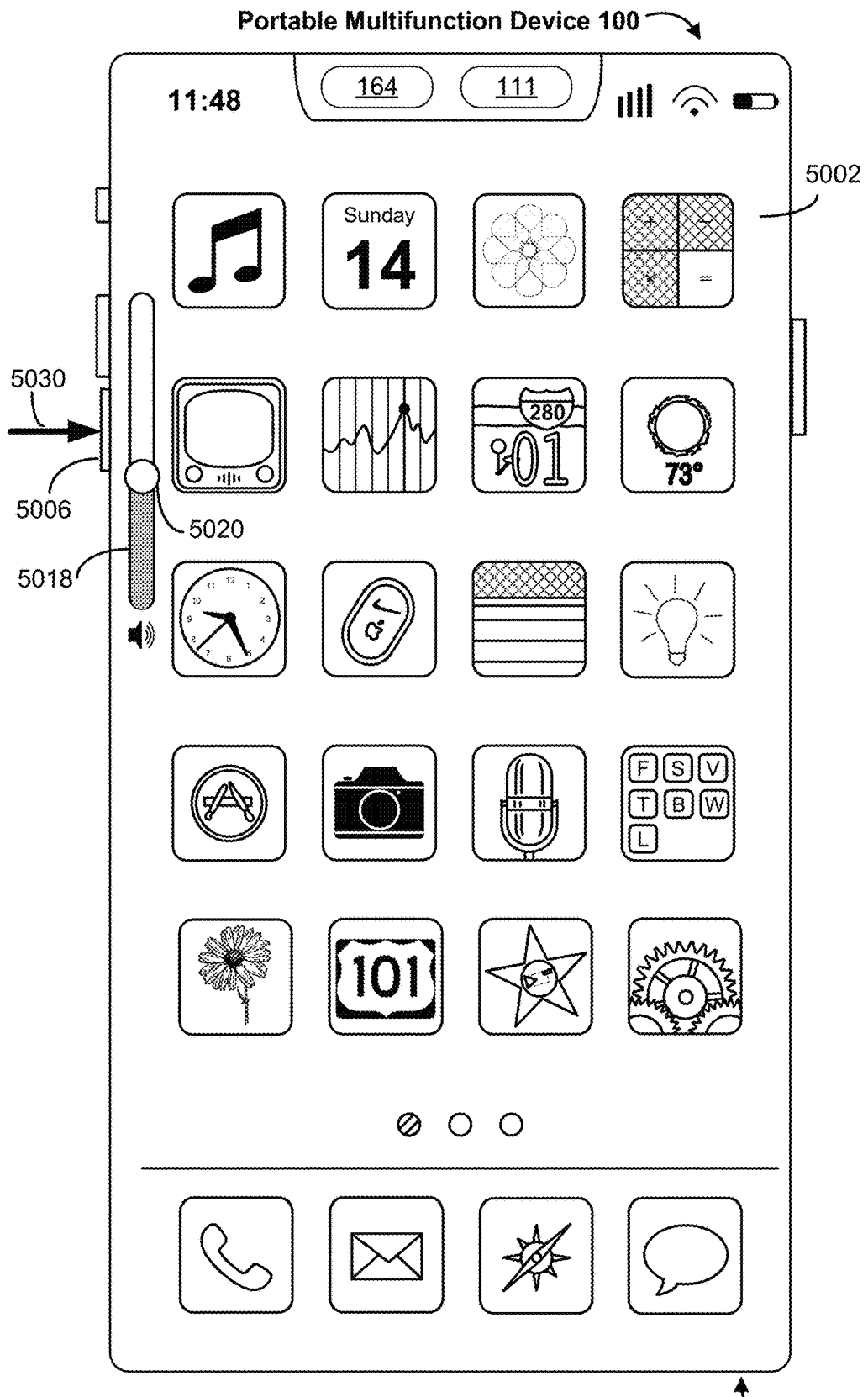
Figure 5A13

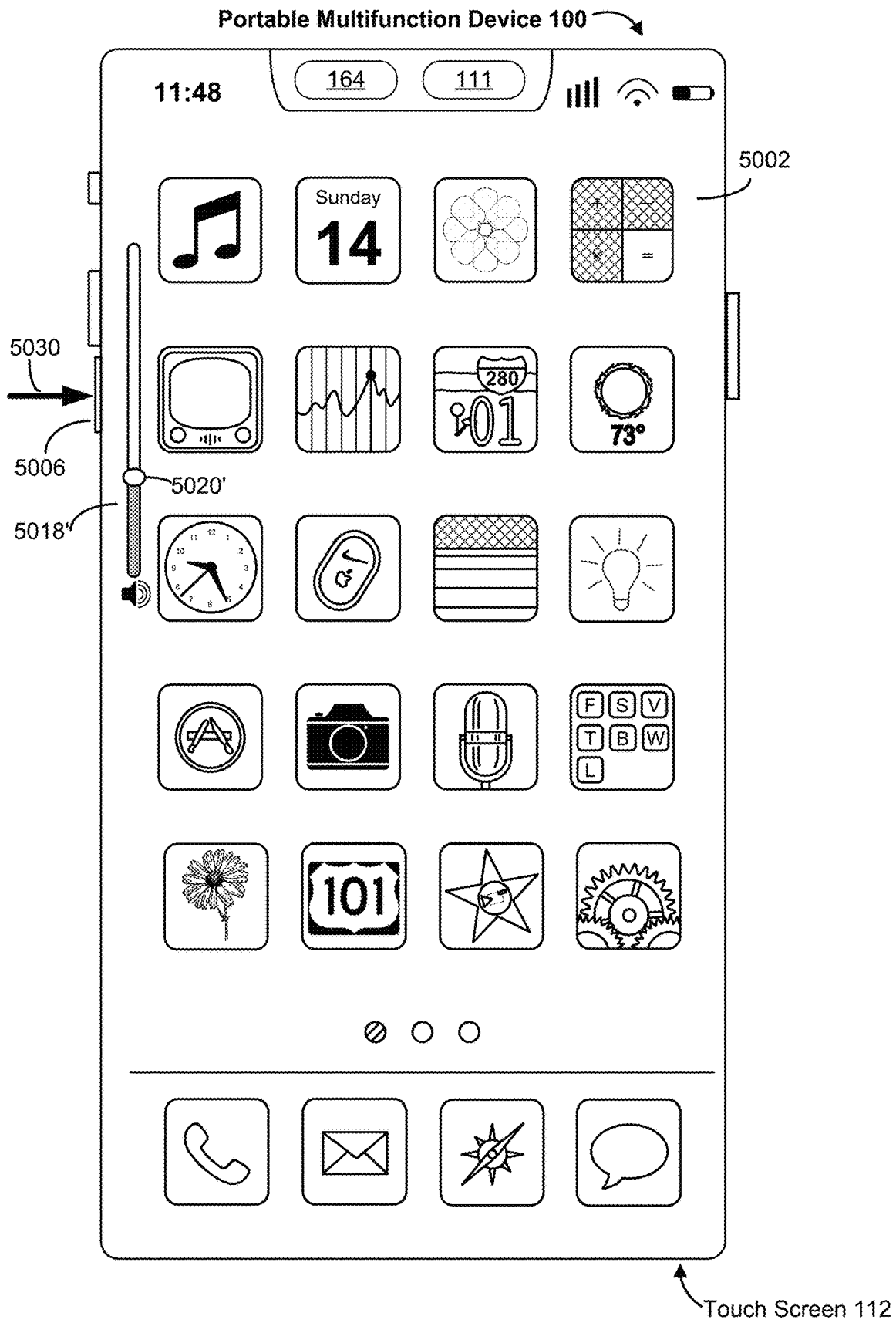
Figure 5A14

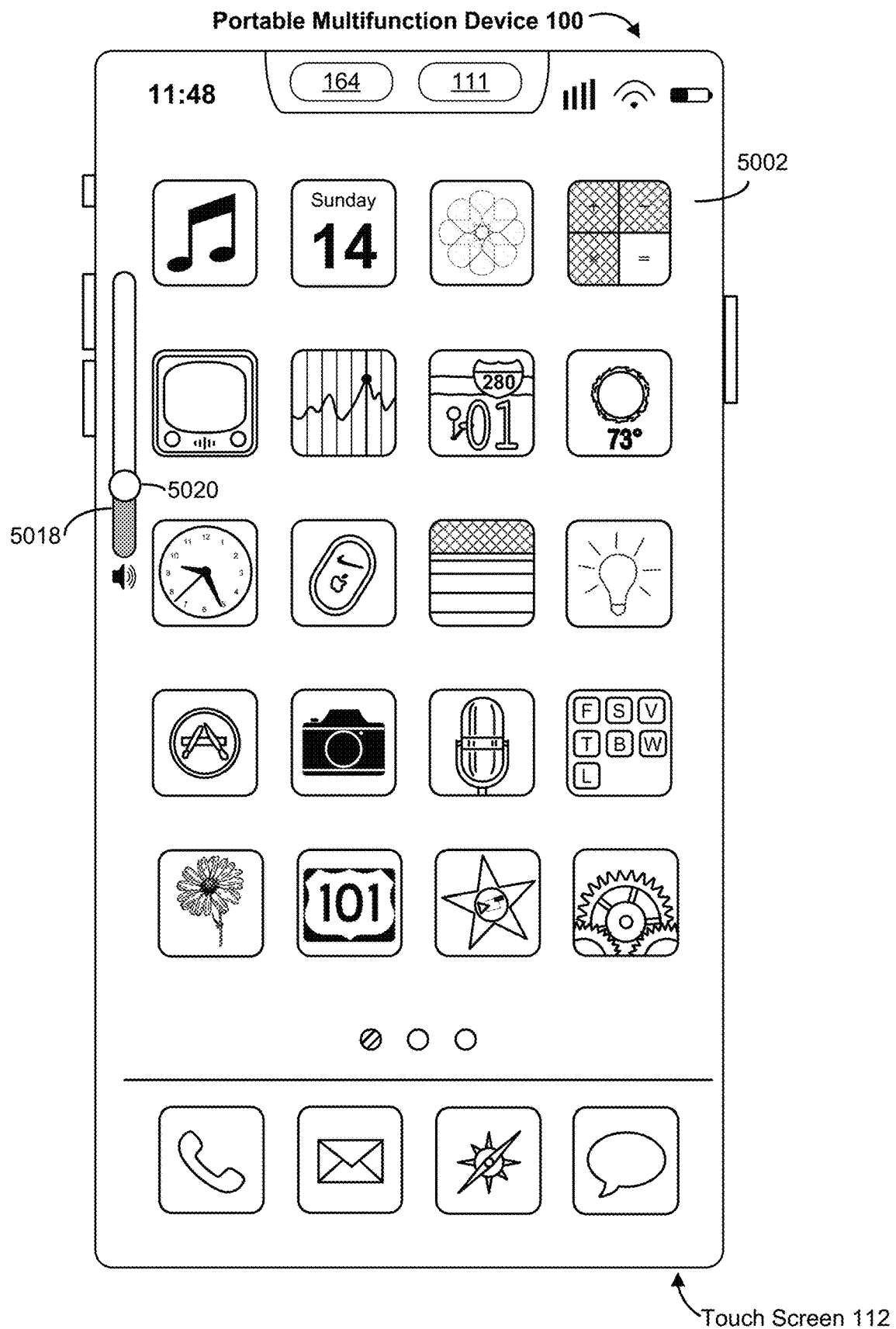
Figure 5A15

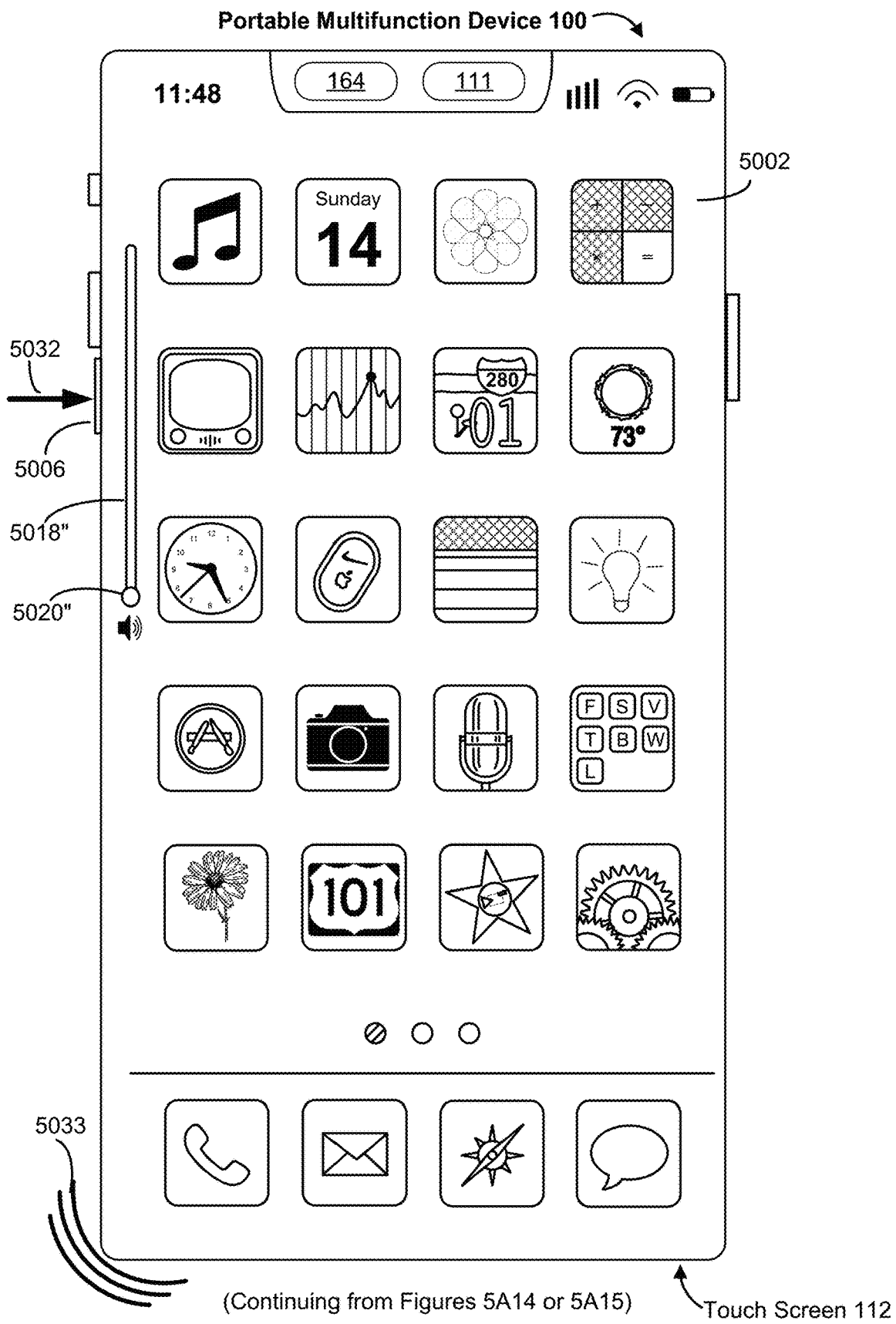
Figure 5A16
(Continuing from Figures 5A14 or 5A15)

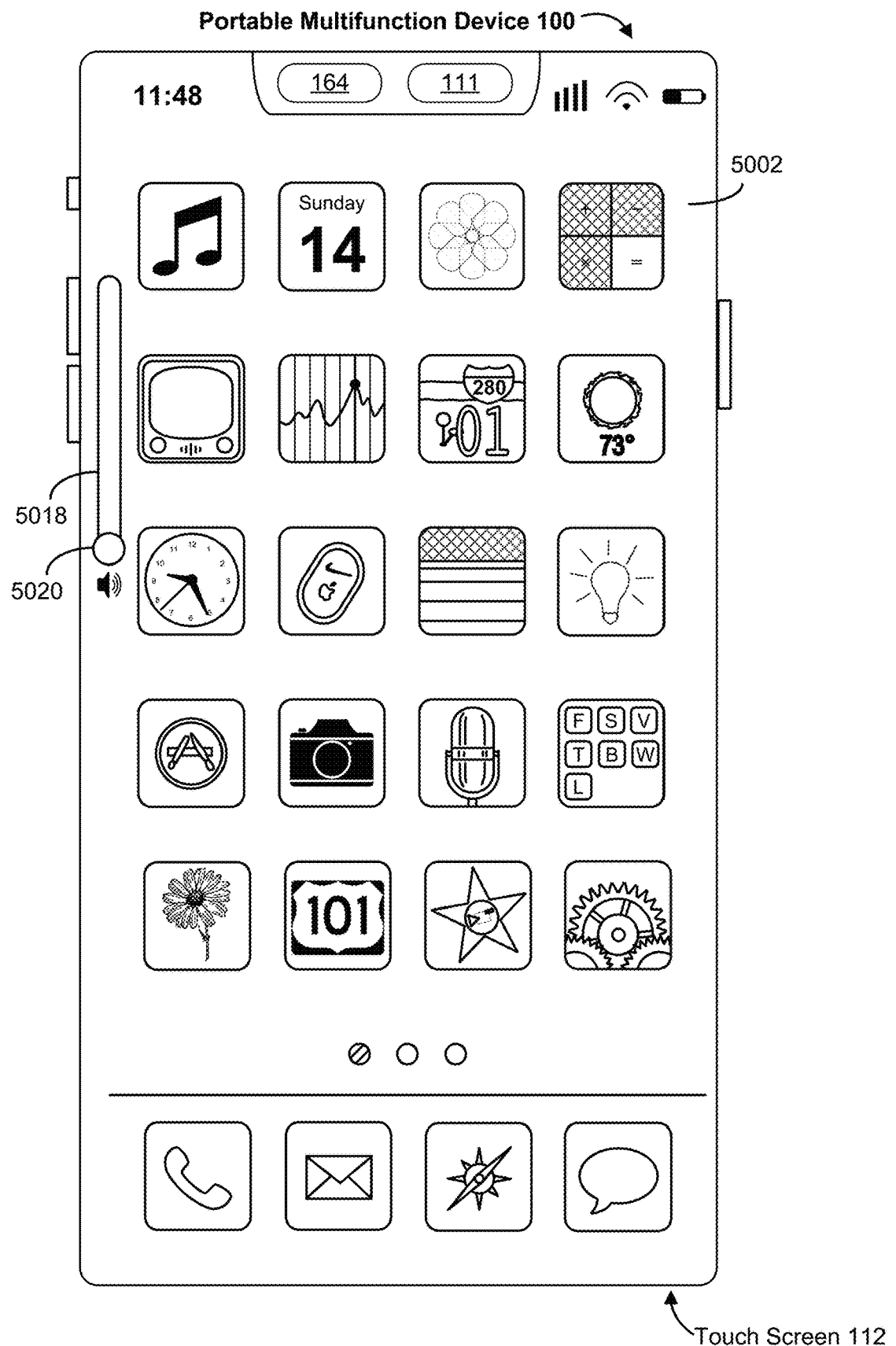
Figure 5A17

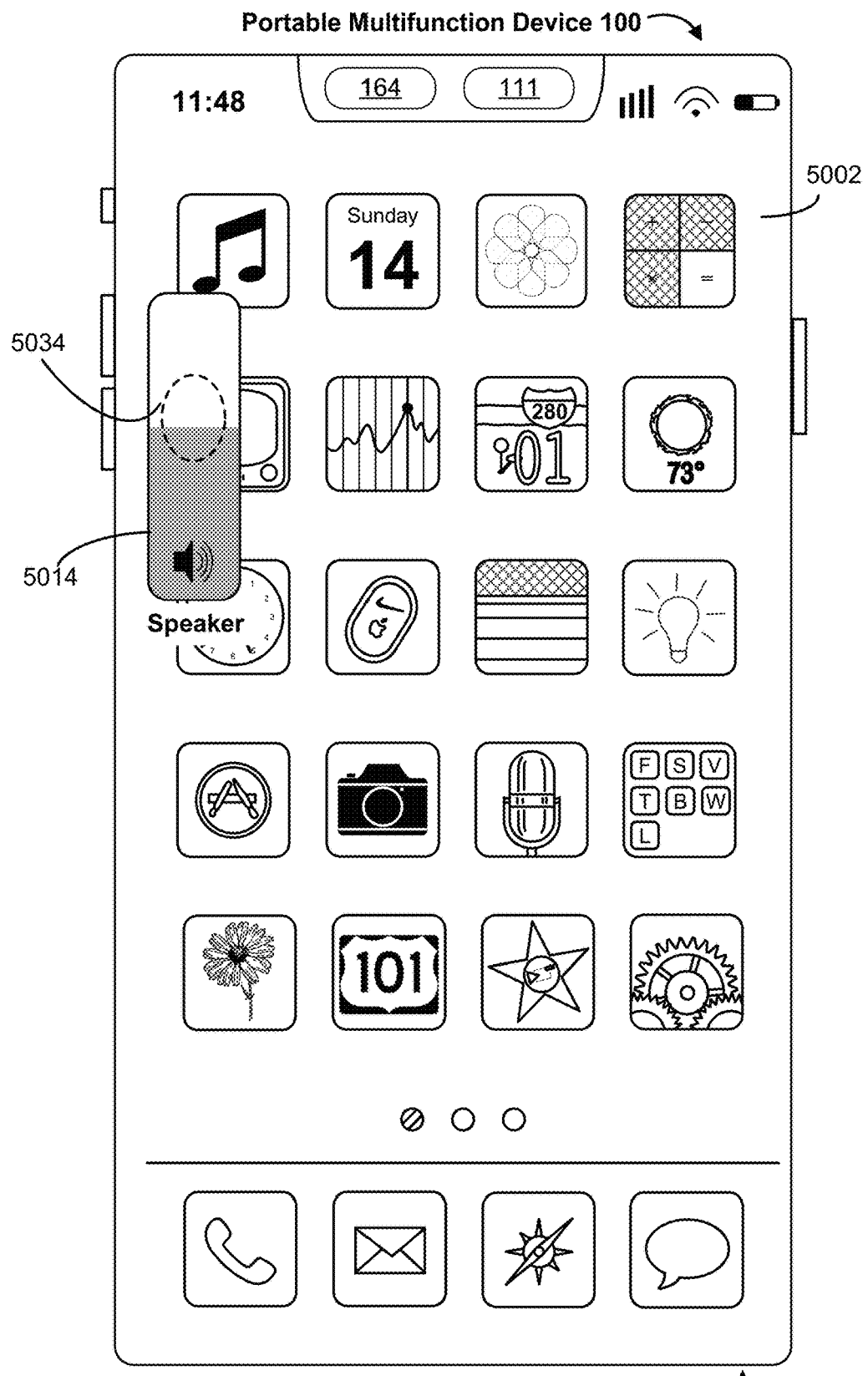
Continuing from Figures 5A3 or 5A4
Figure 5A18

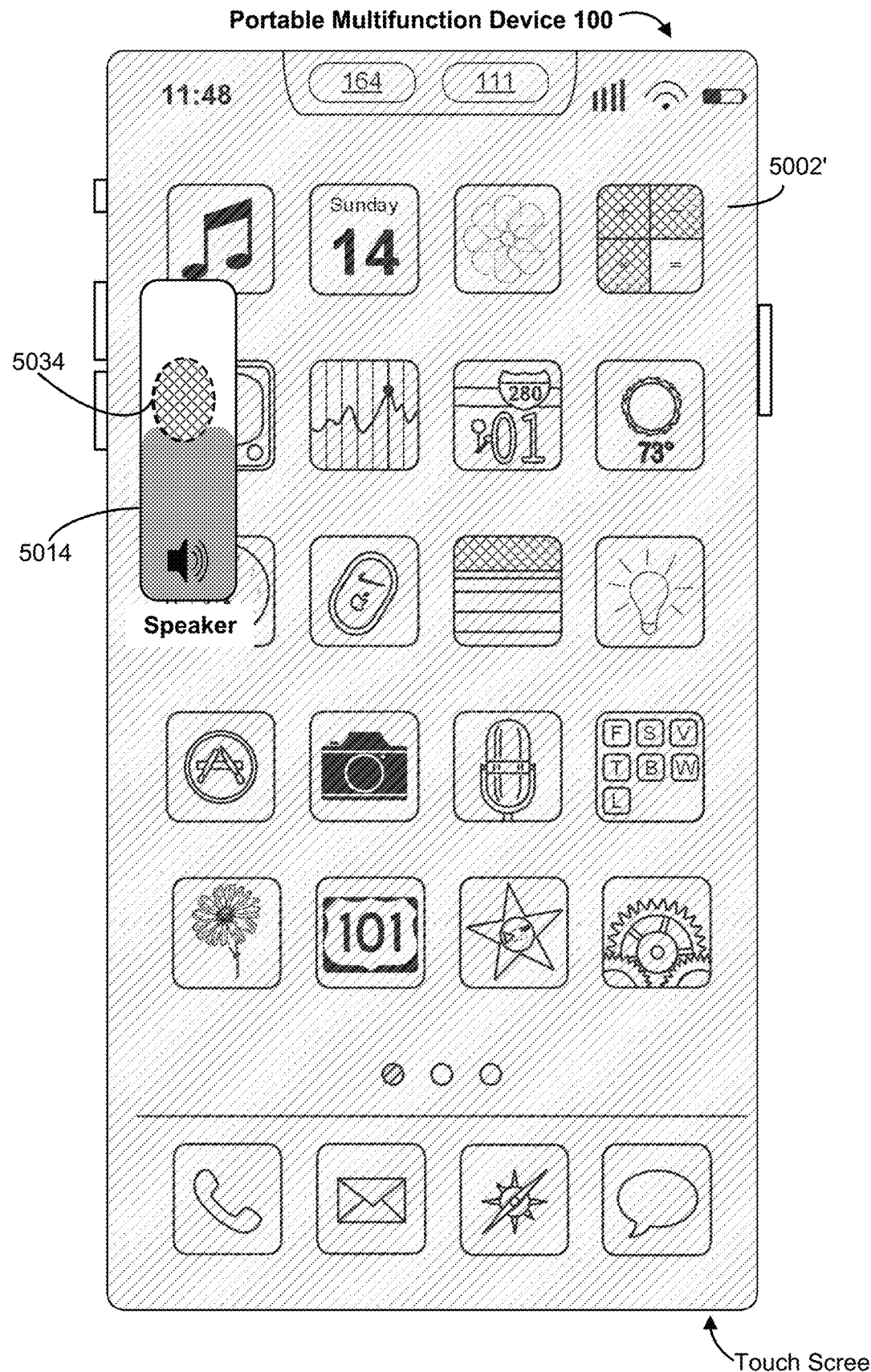
Figure 5A19

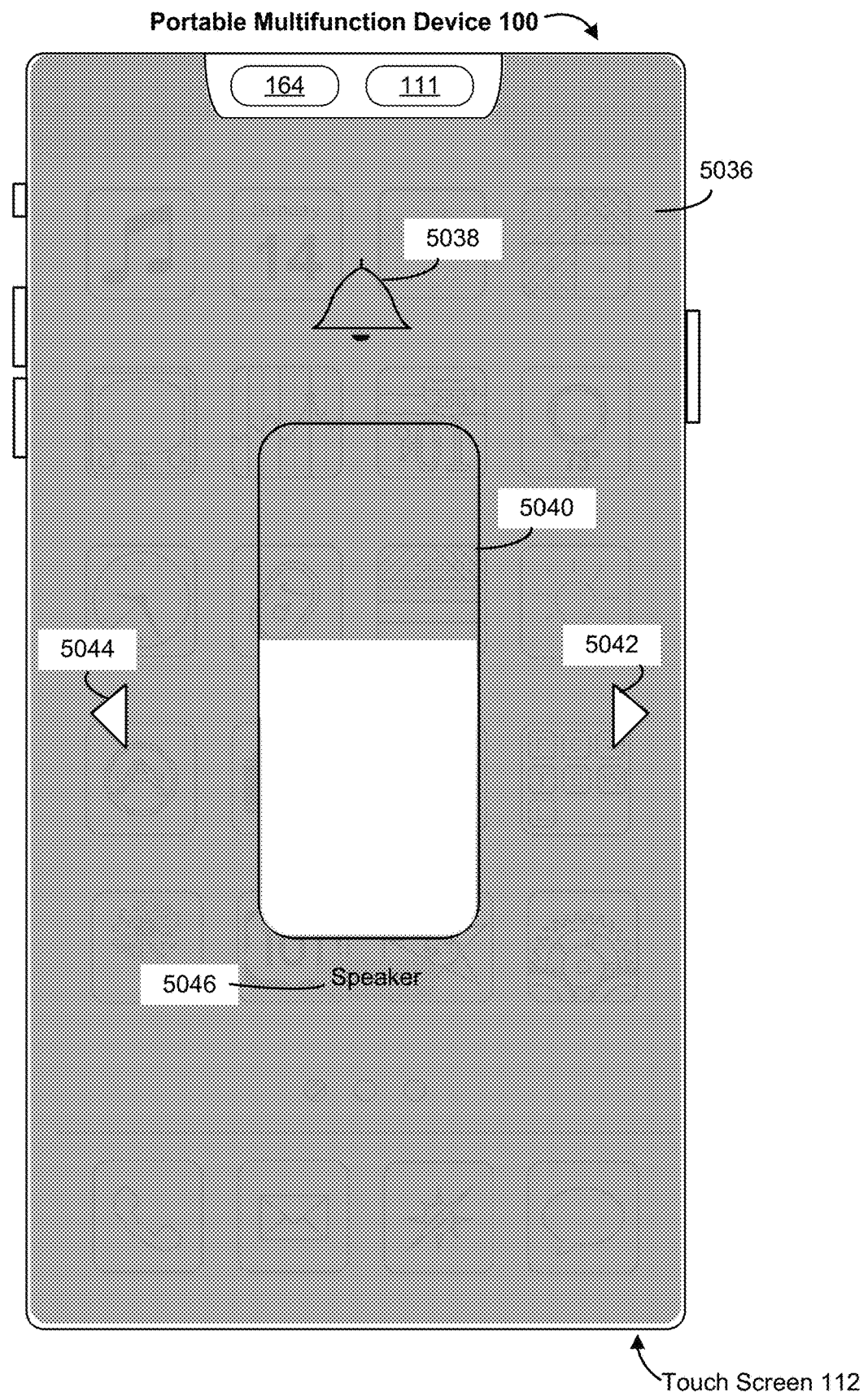
Figure 5A20

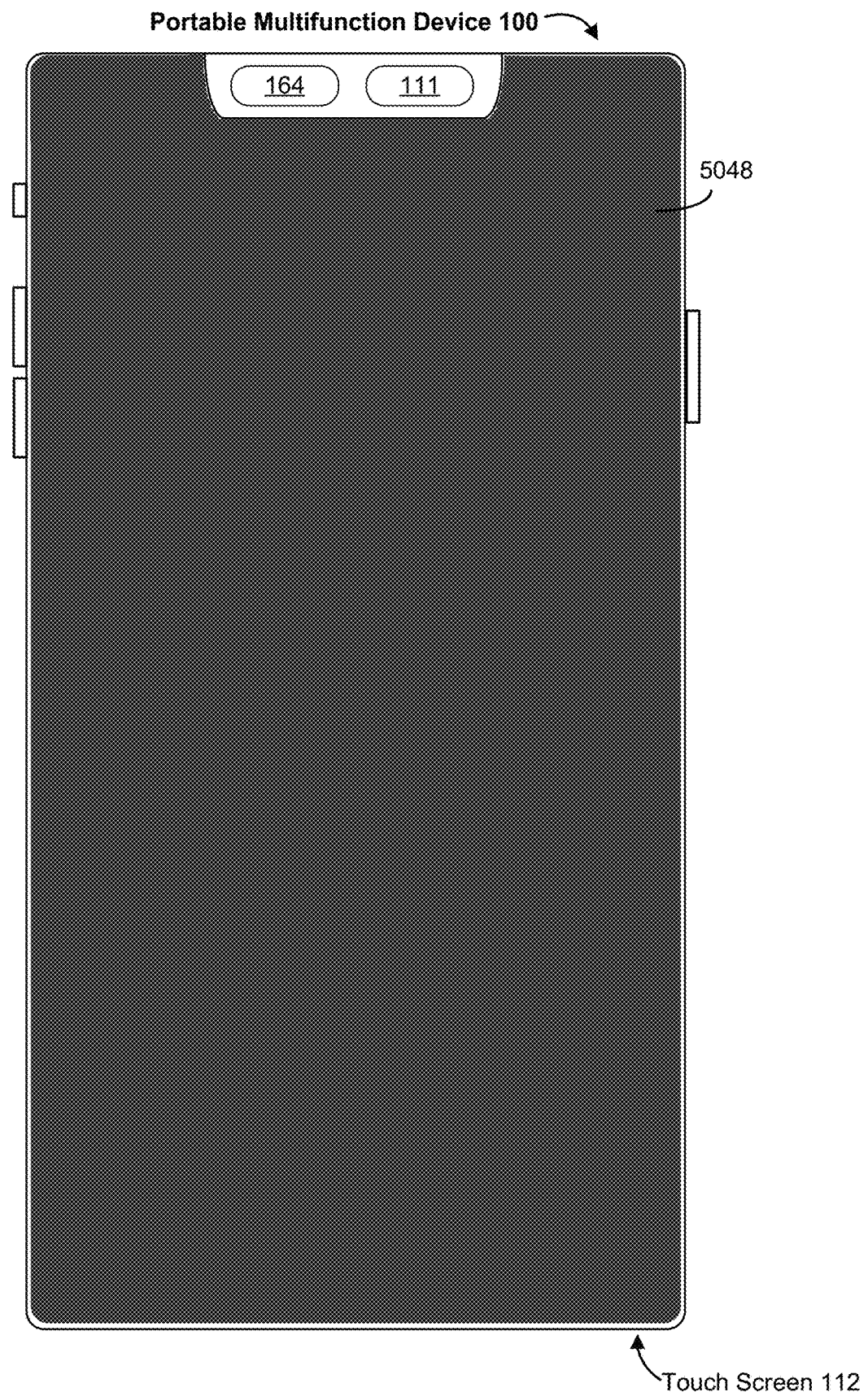
Figure 5A21

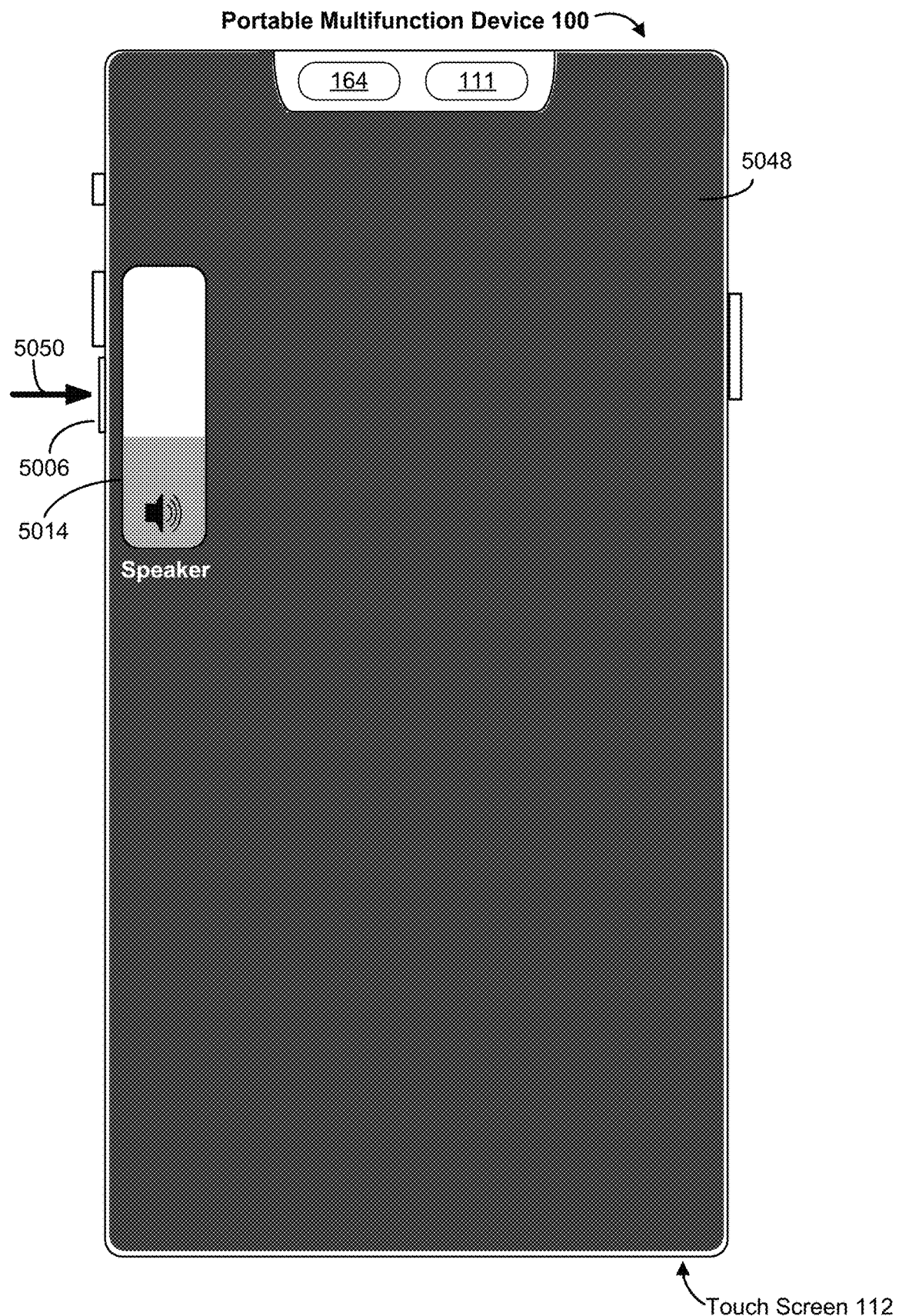
Figure 5A22

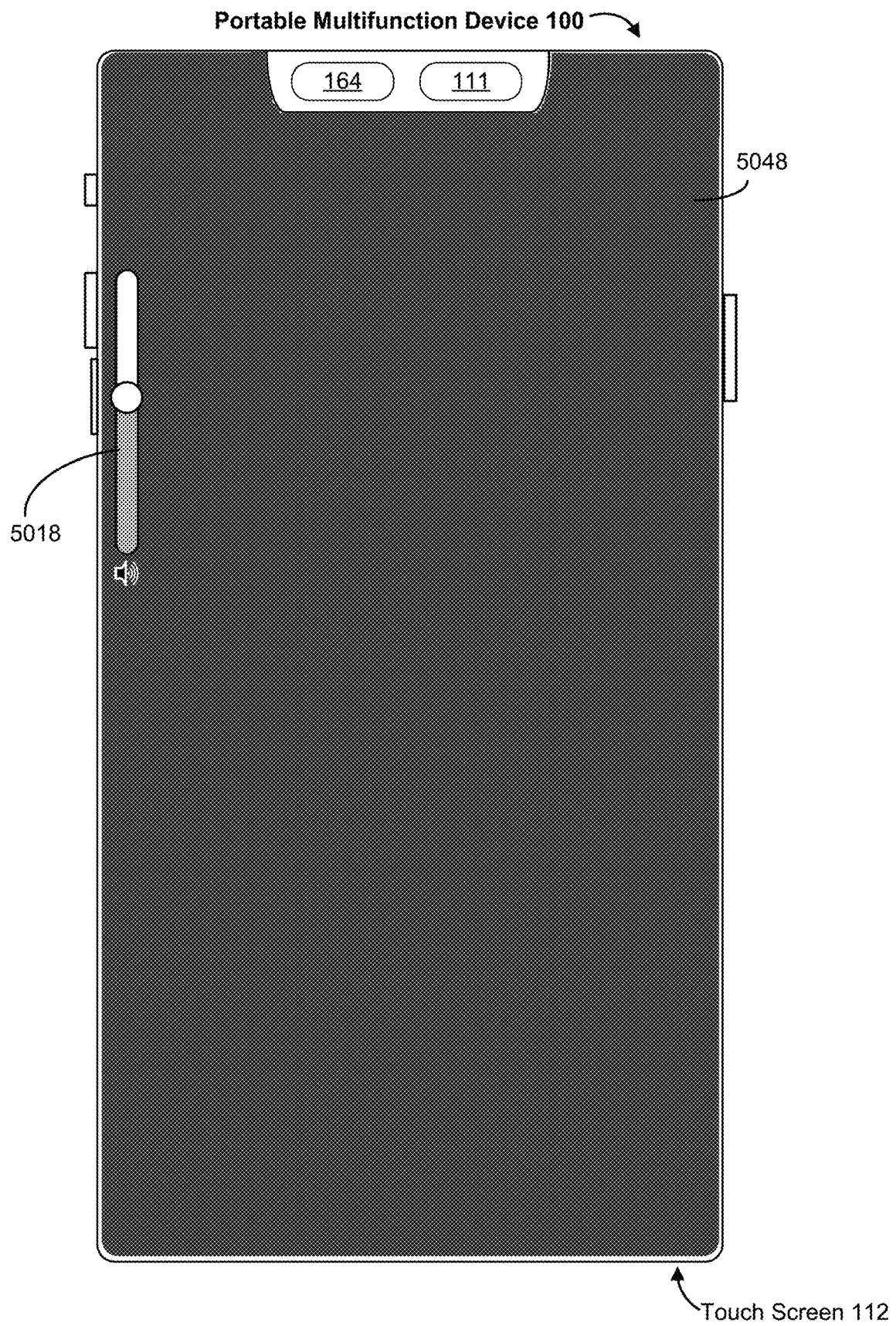
Figure 5A23

Figure 5A24

Figure 5A25

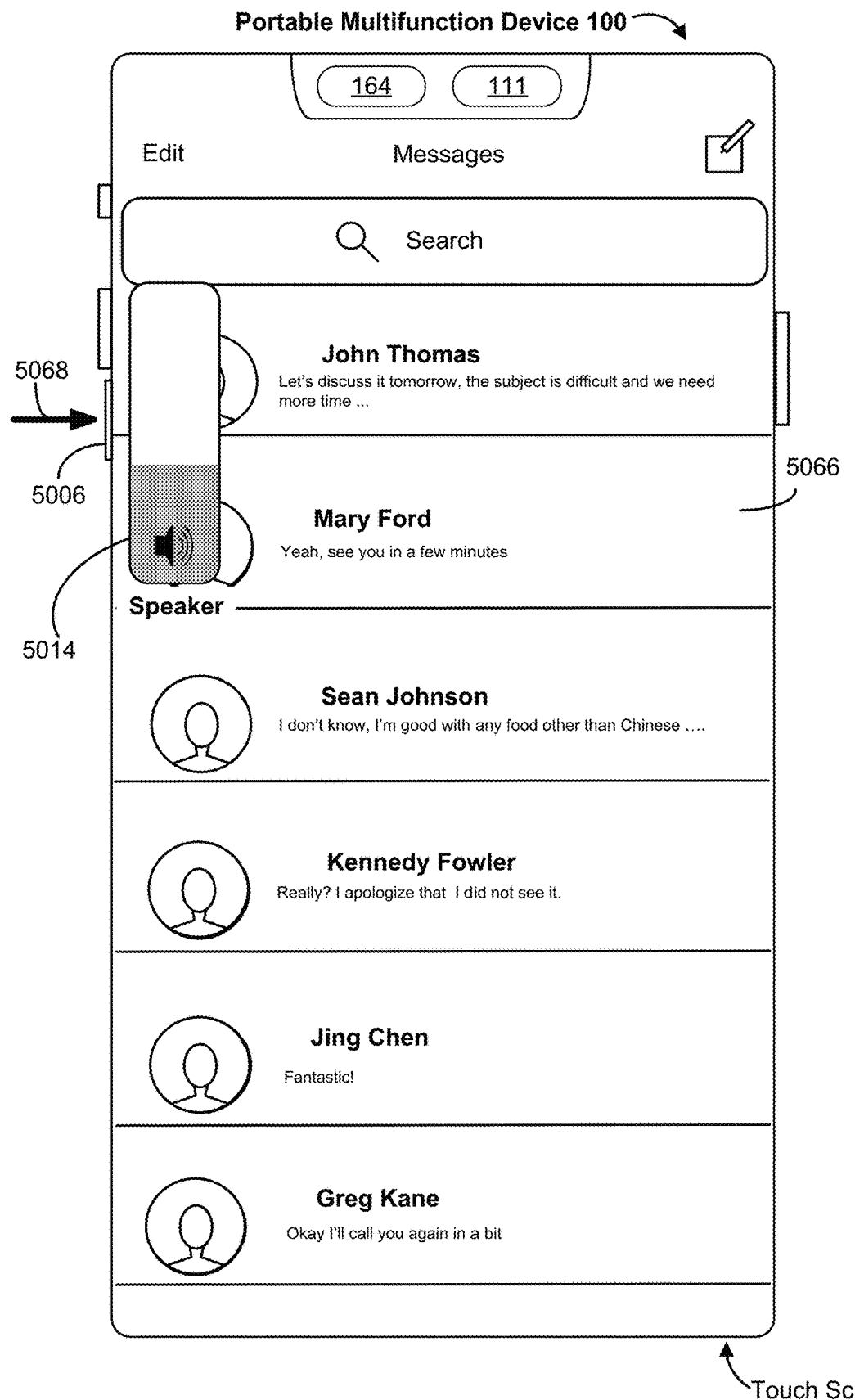
Figure 5A26

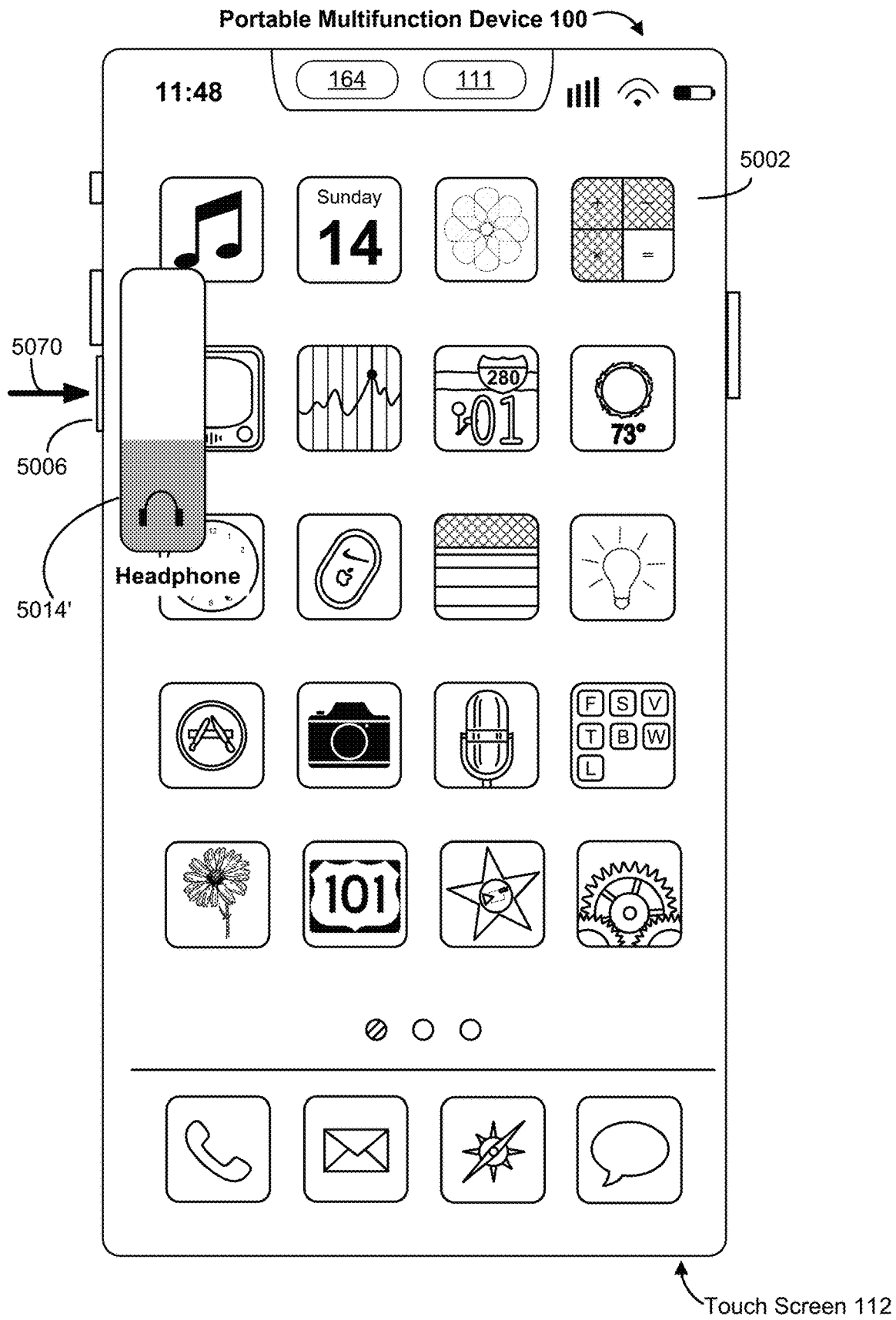
Figure 5A27

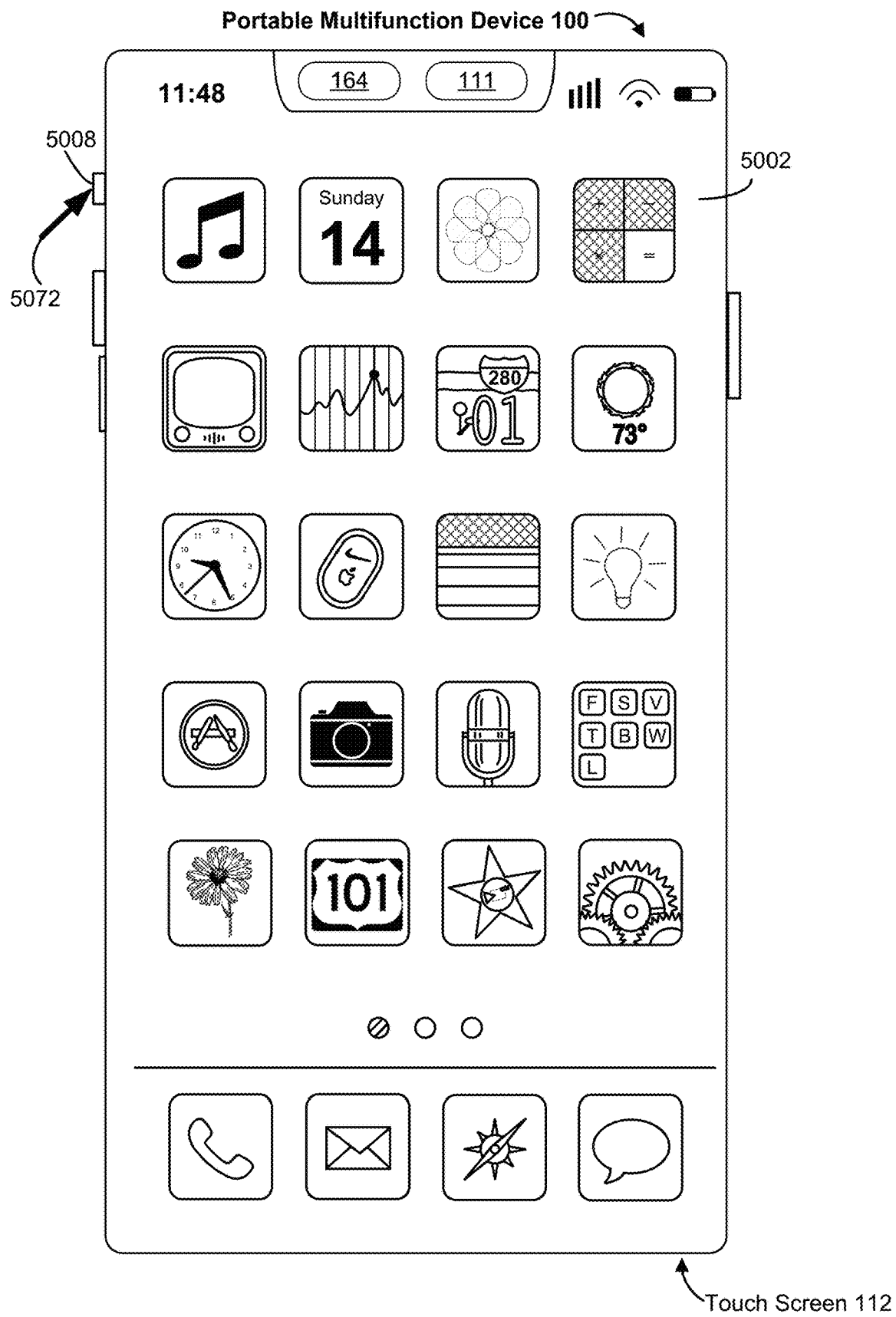
Figure 5A28

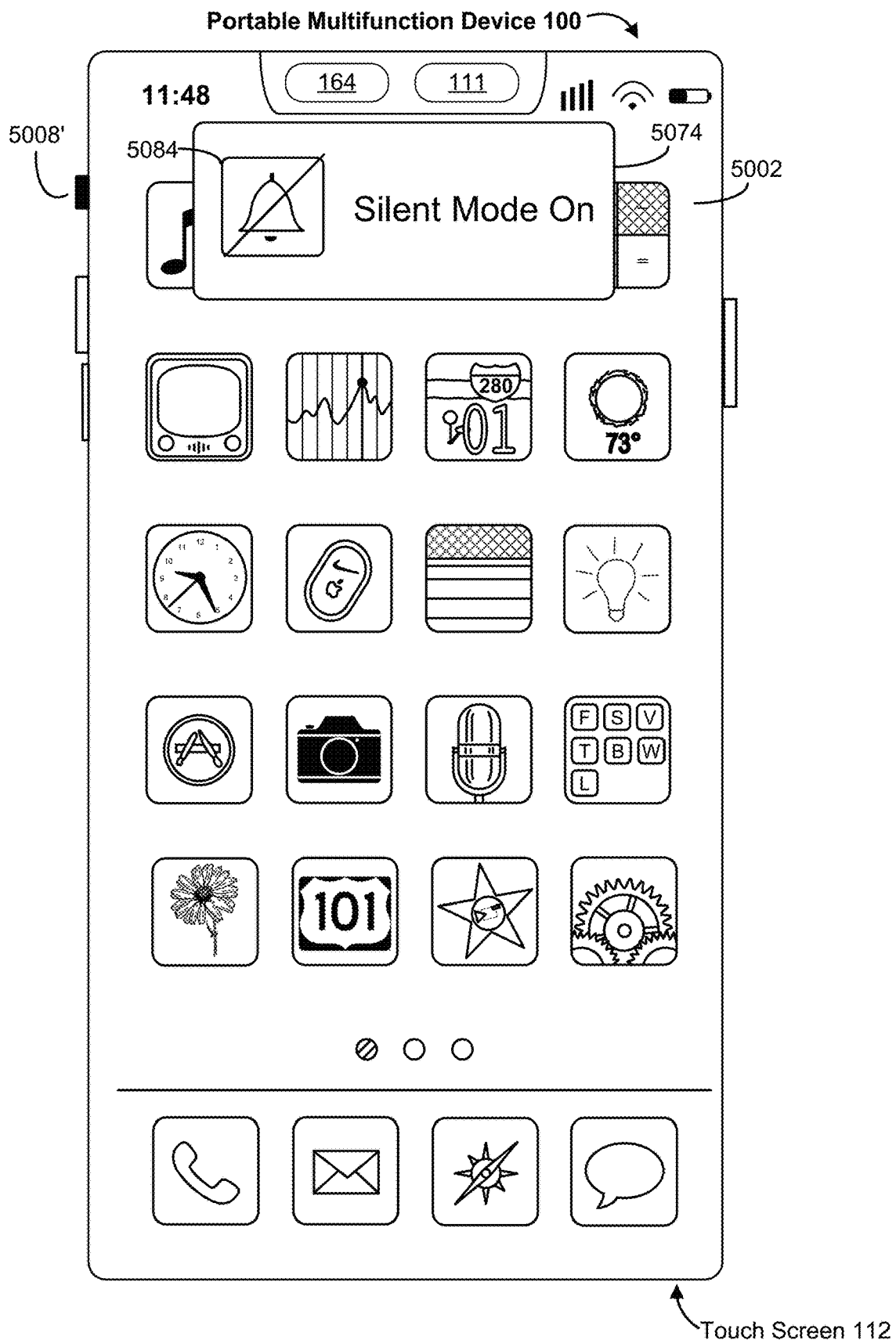
Figure 5A29

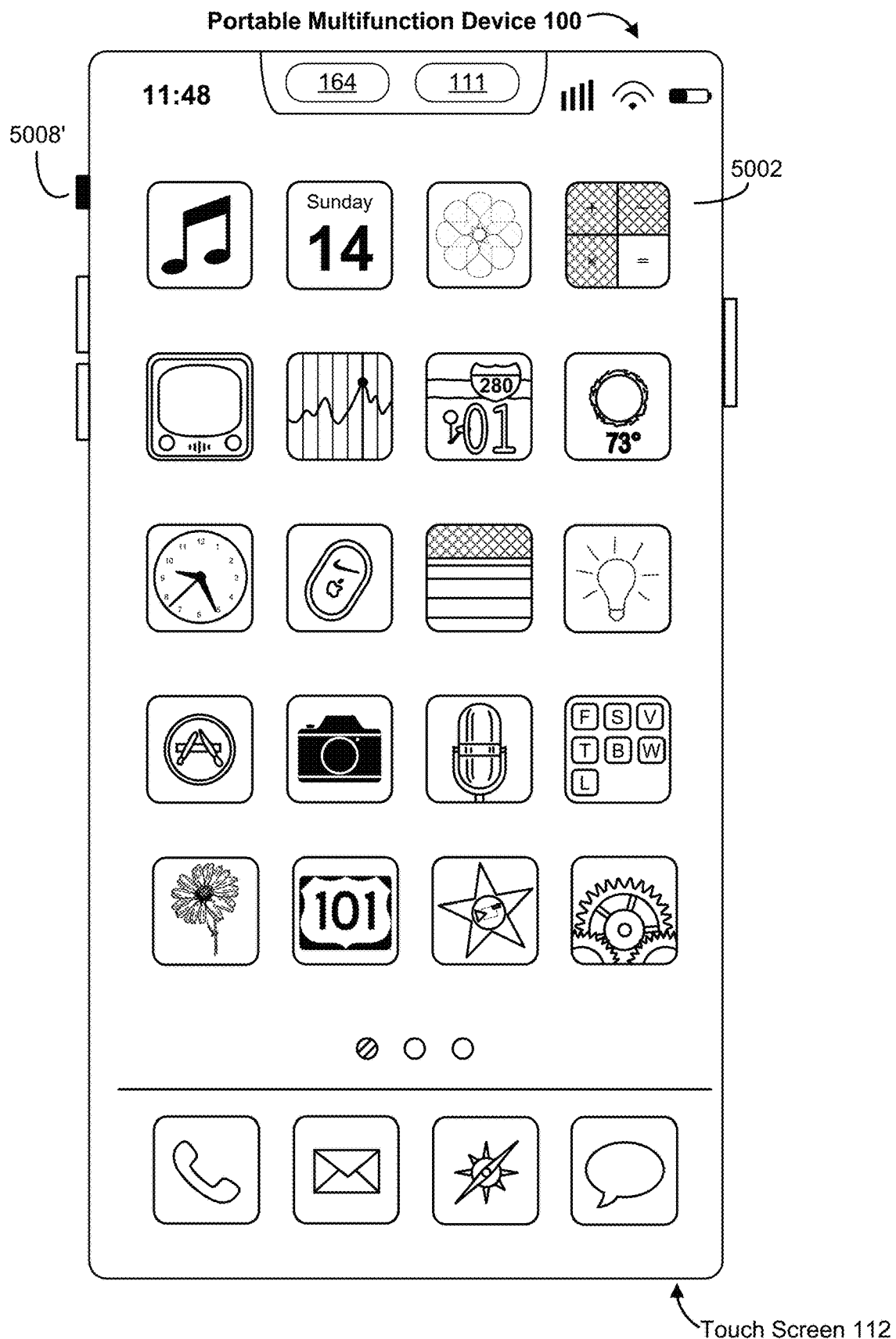
Figure 5A30

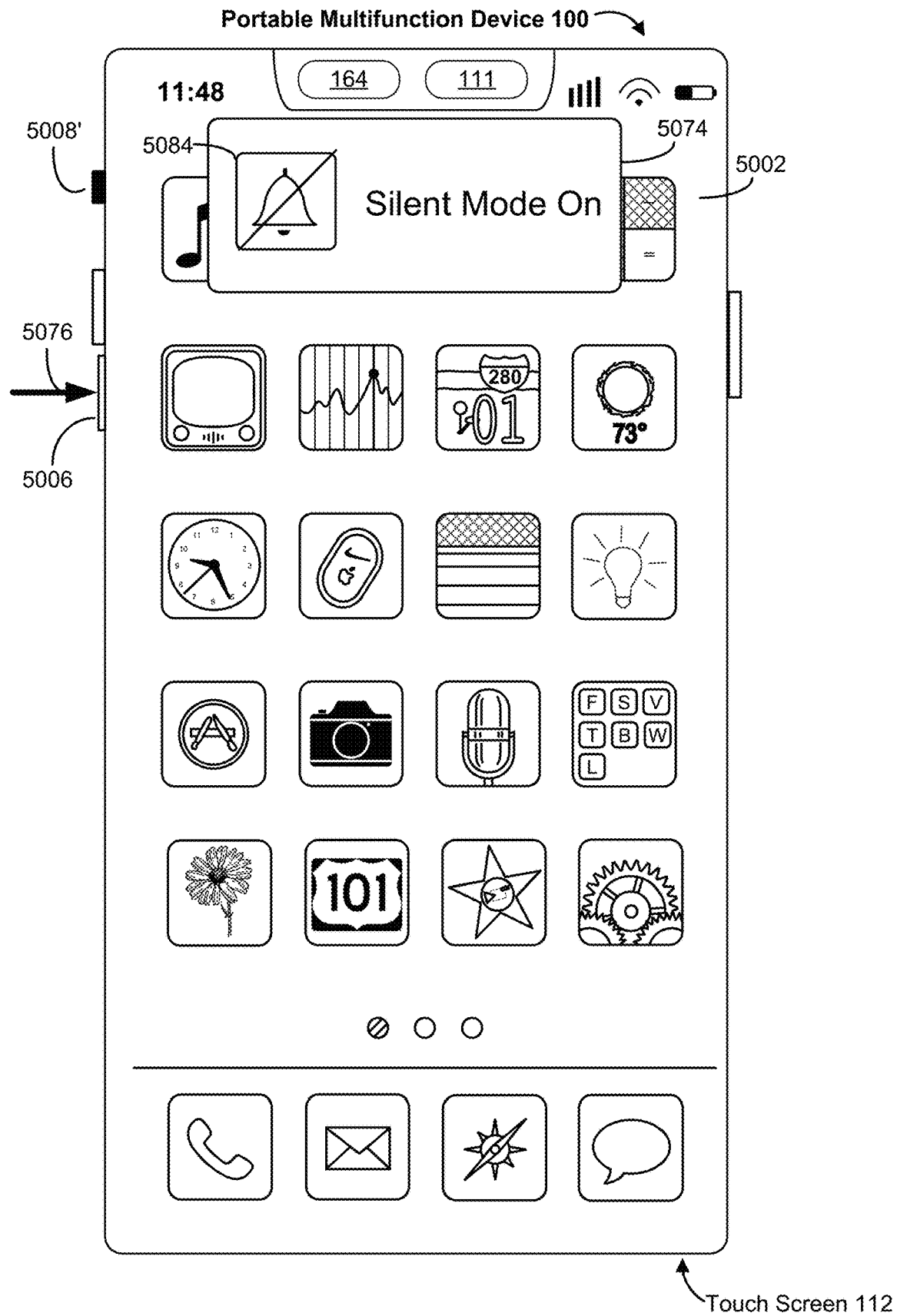
Figure 5A31

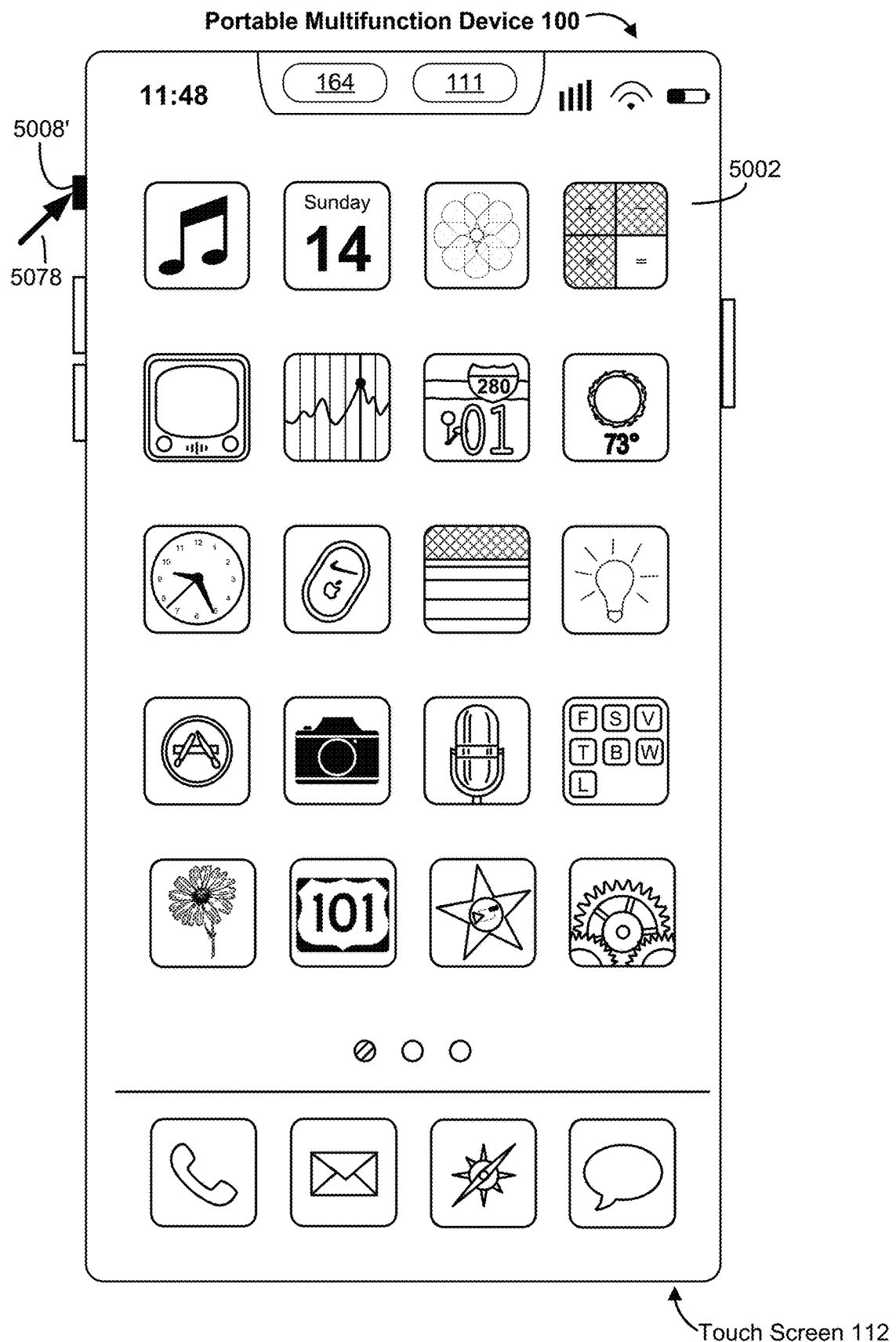
Figure 5A32

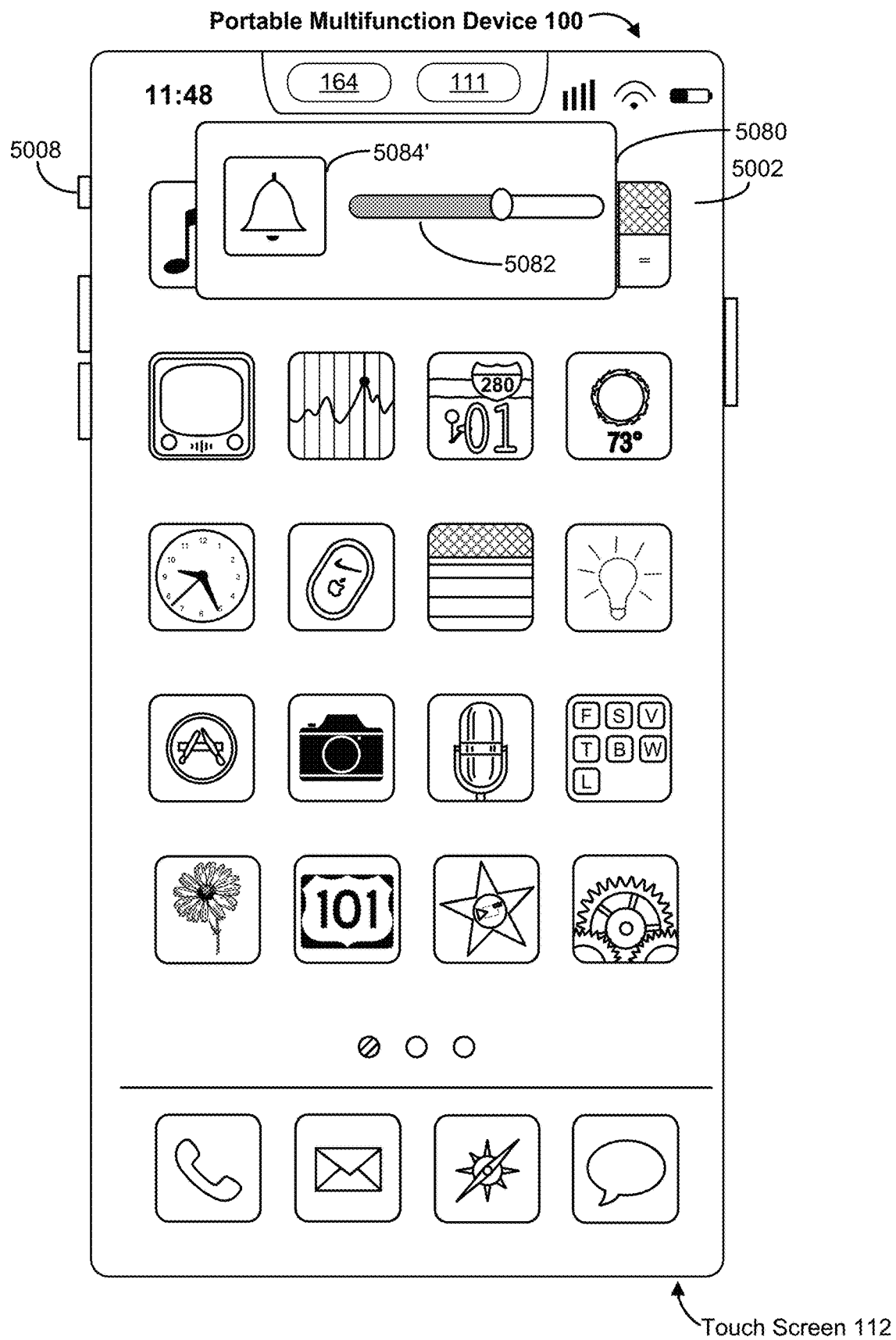
Figure 5A33

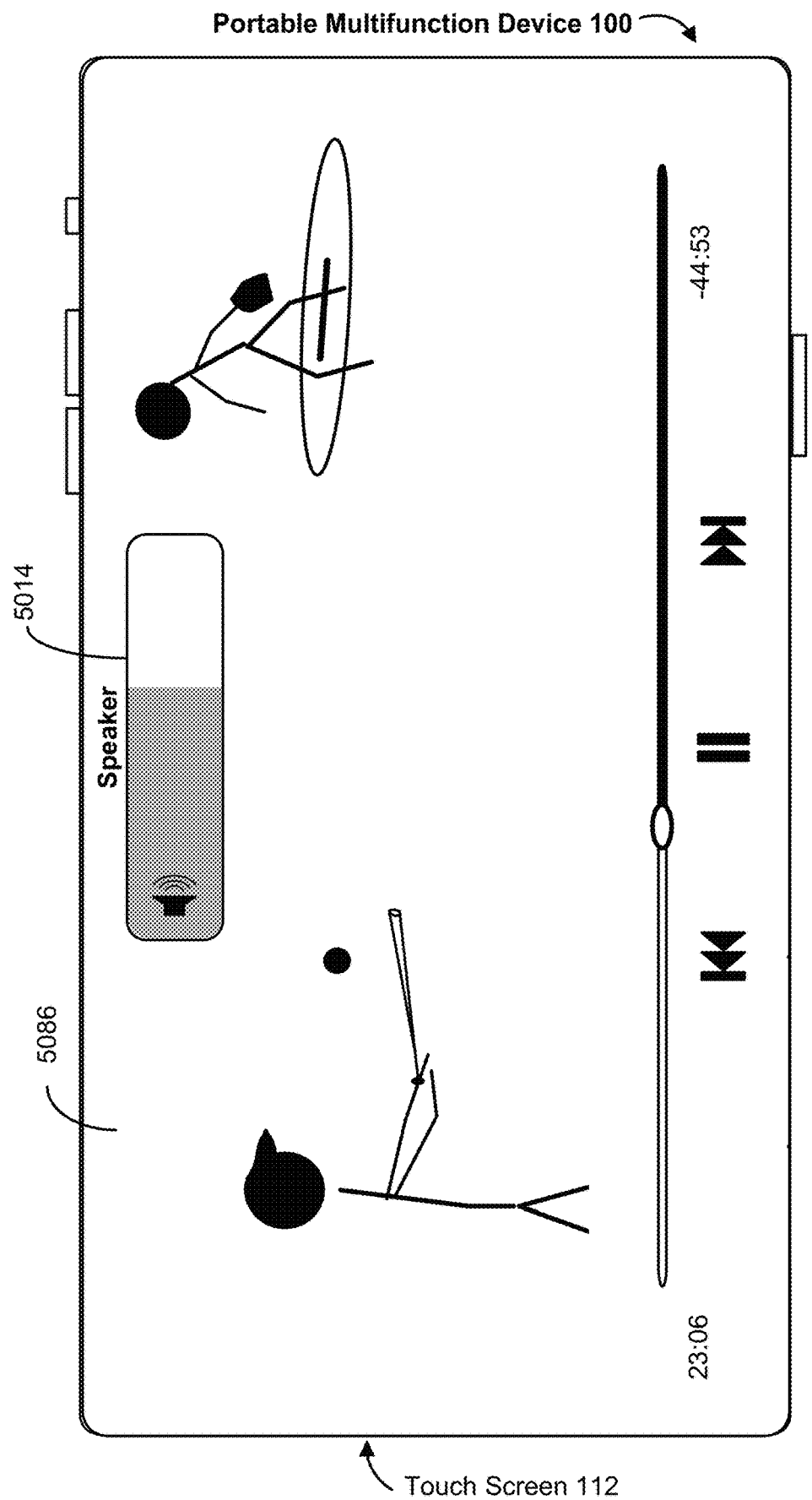

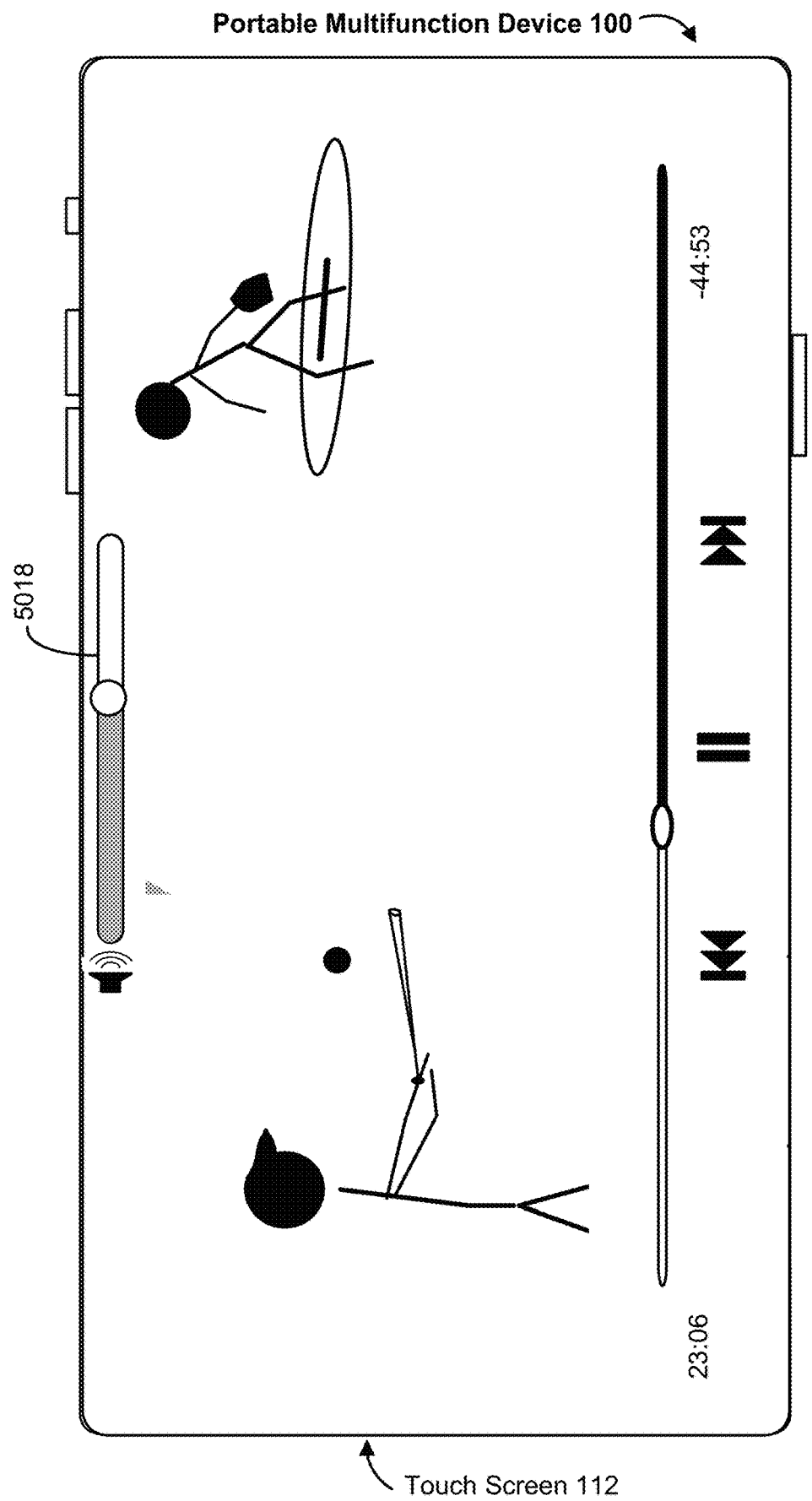

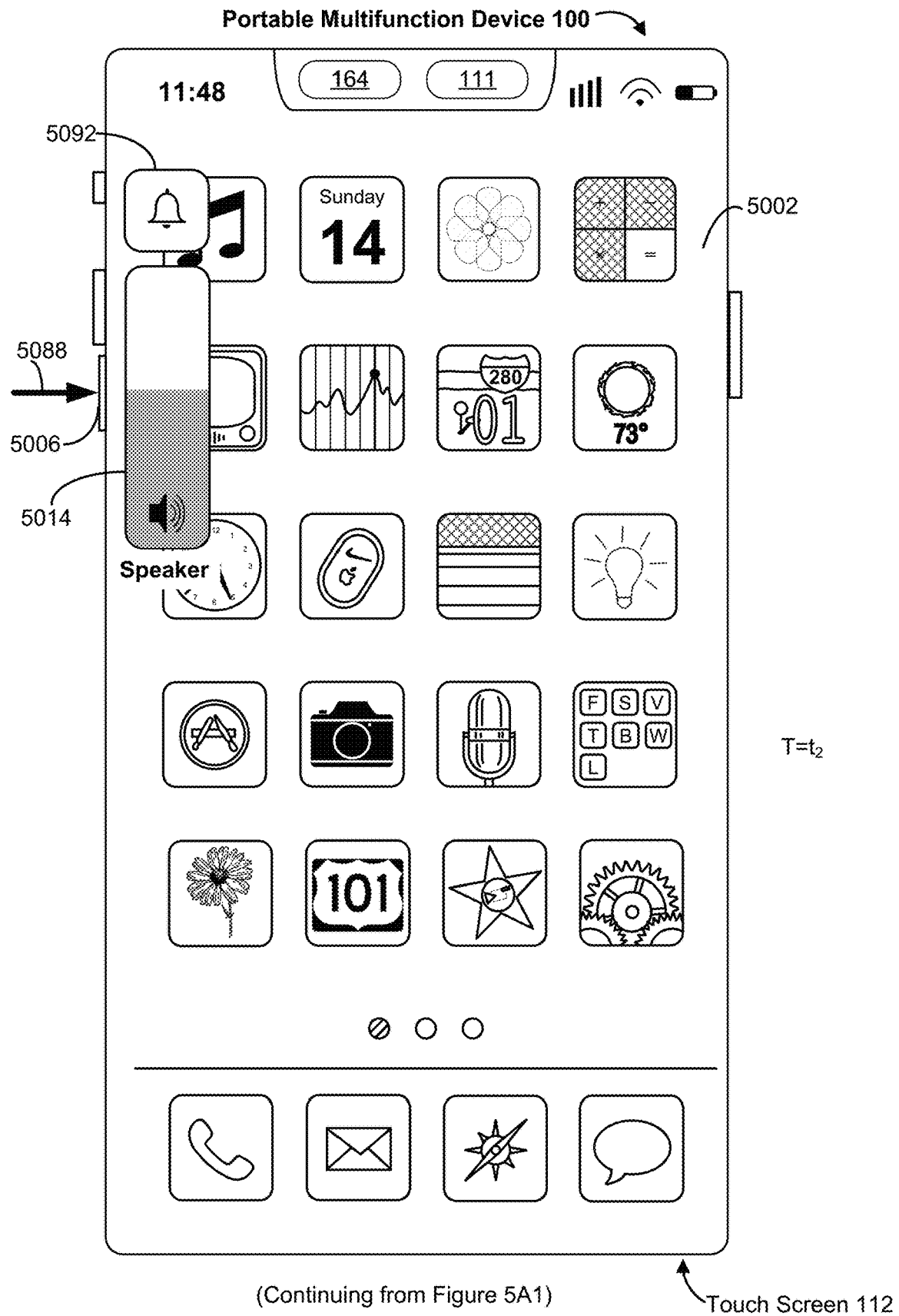
Figure 5A36

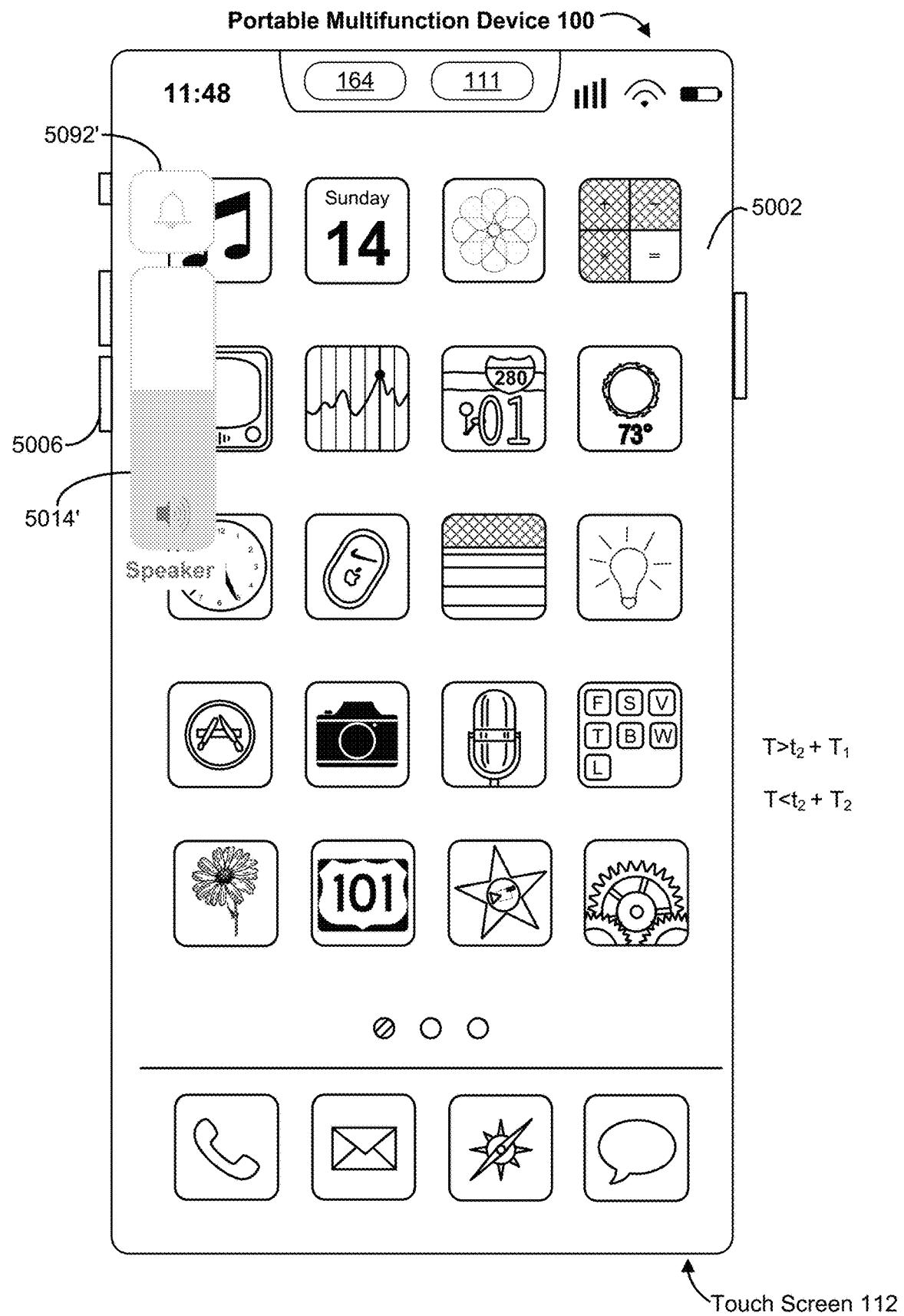
Figure 5A37

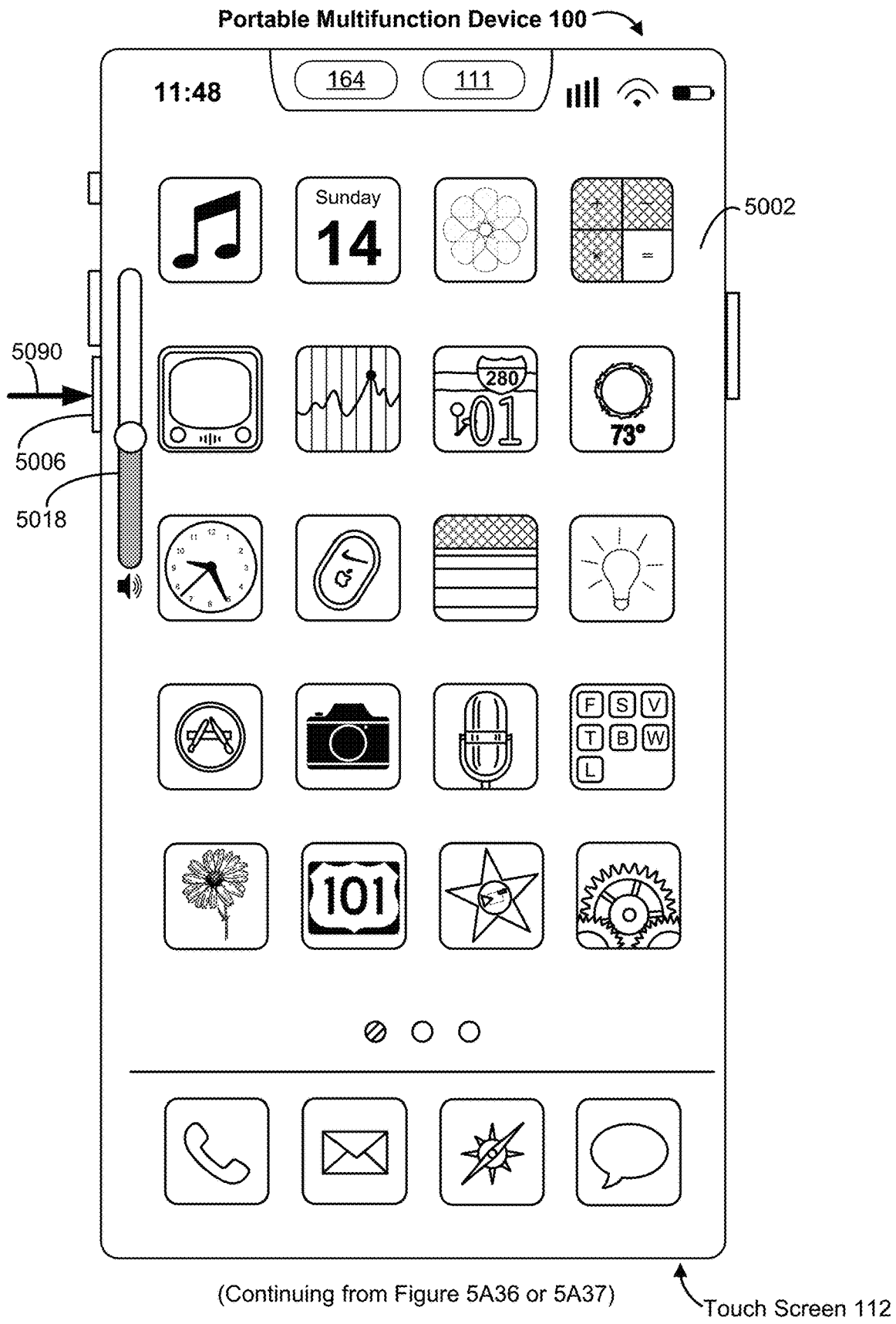
Figure 5A38

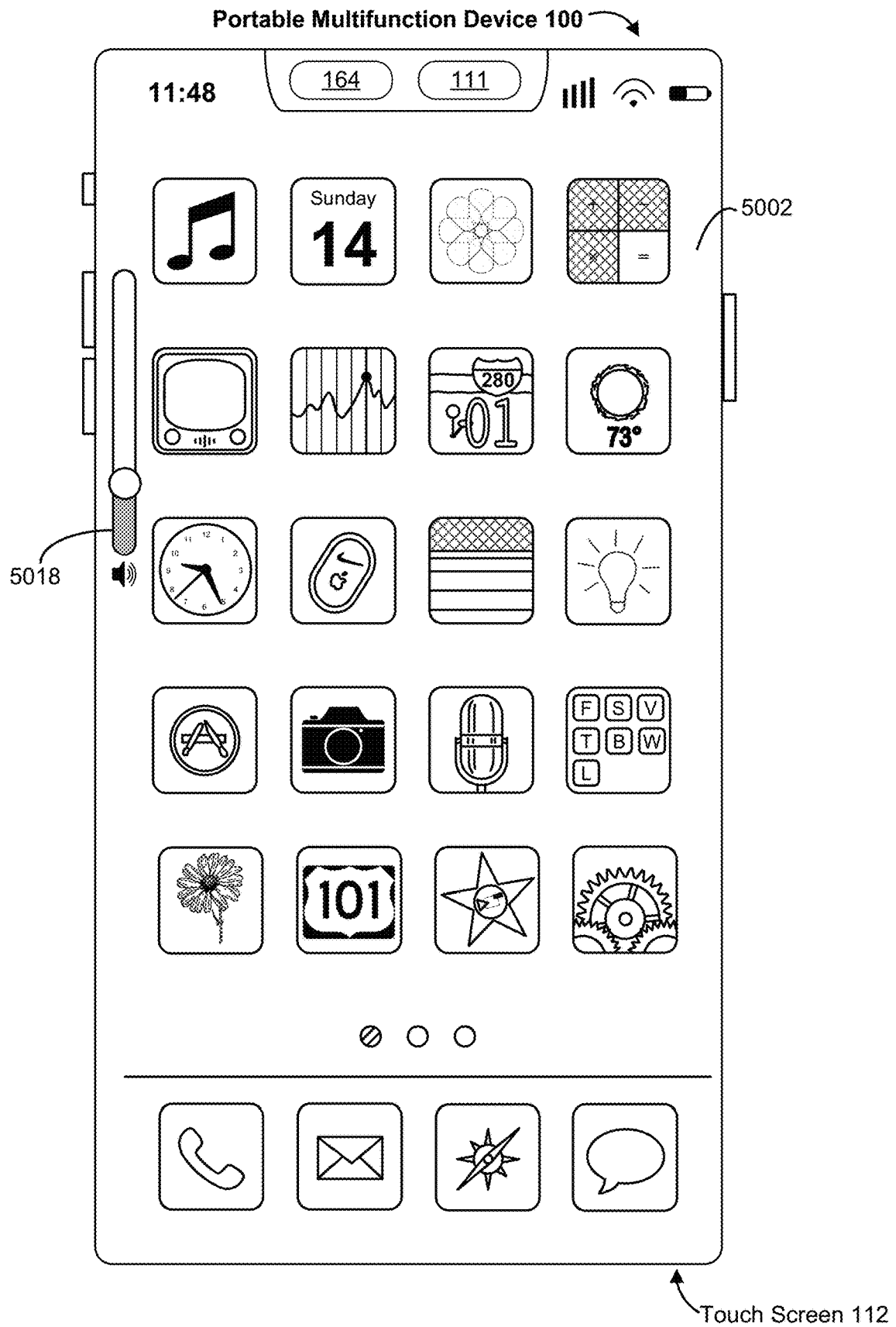
Figure 5A39

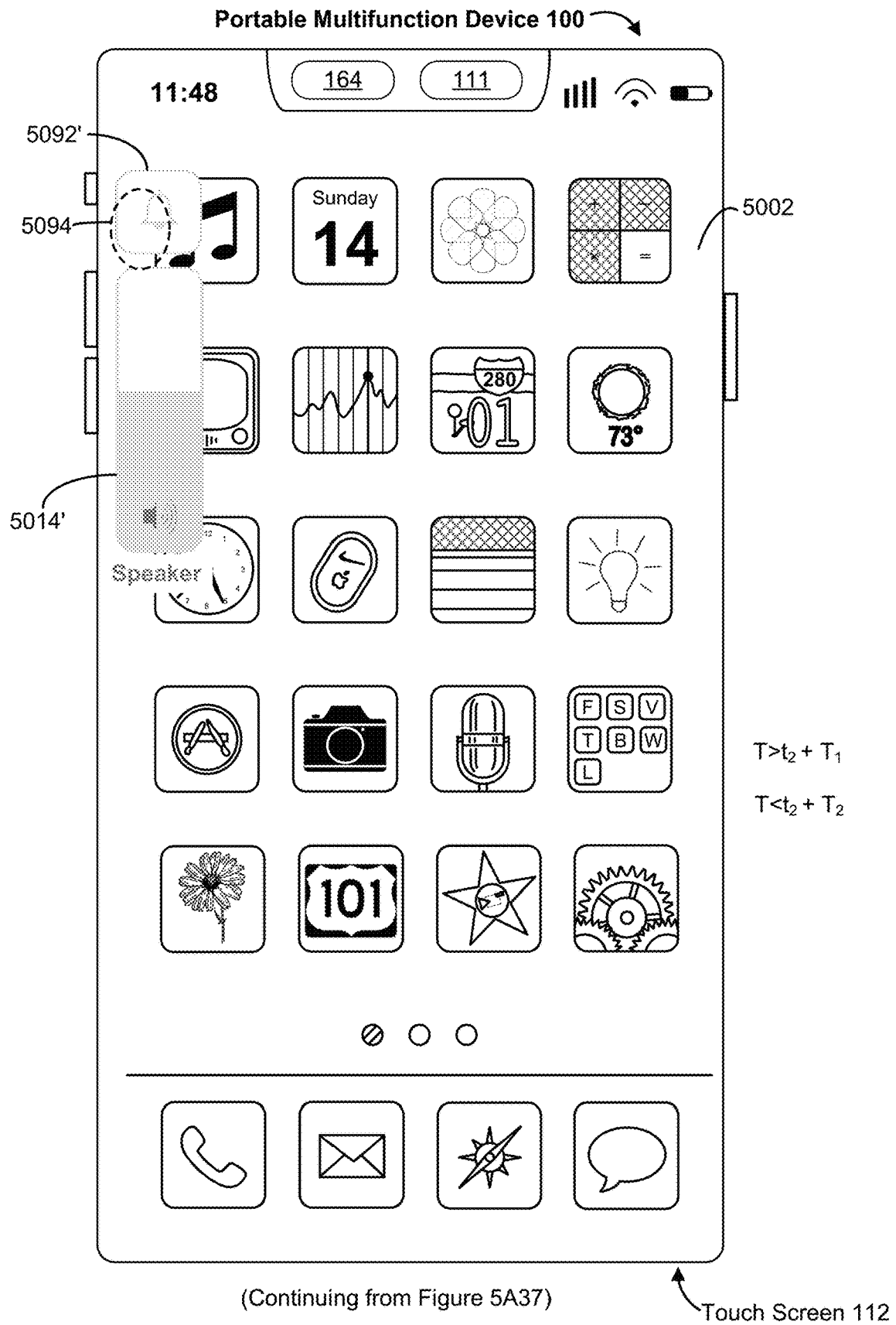
Figure 5A40

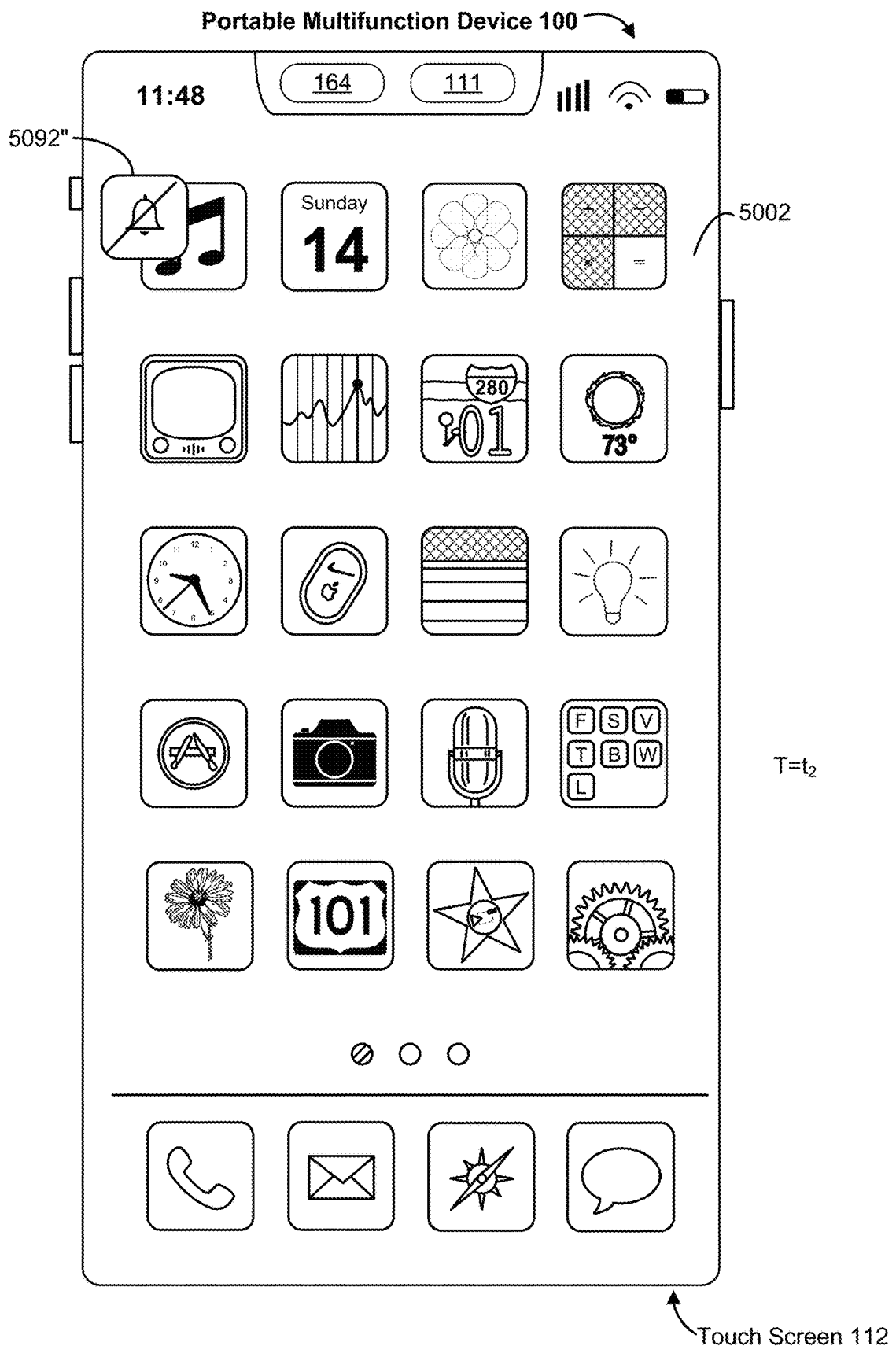
Figure 5A41

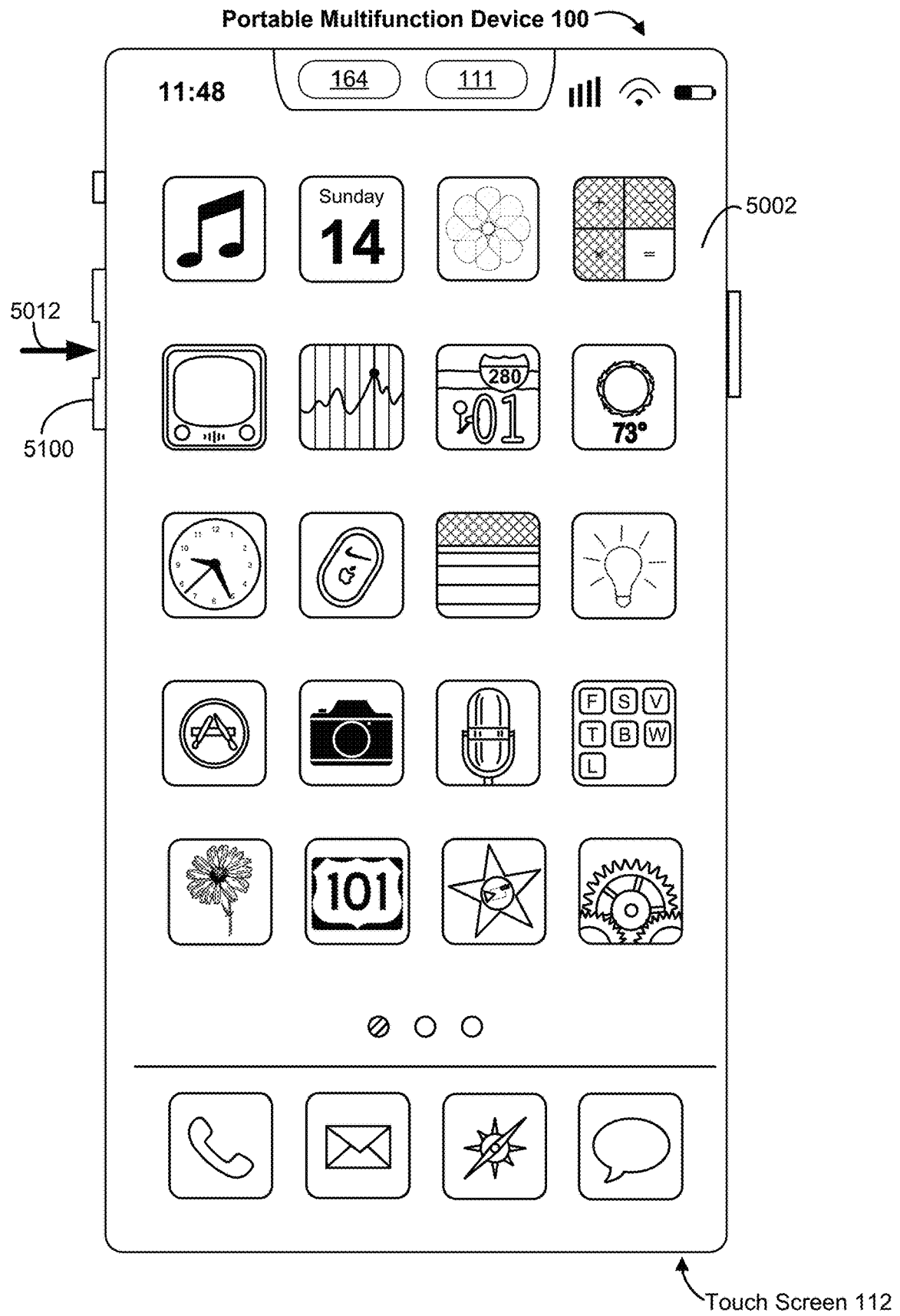
Figure 5B1

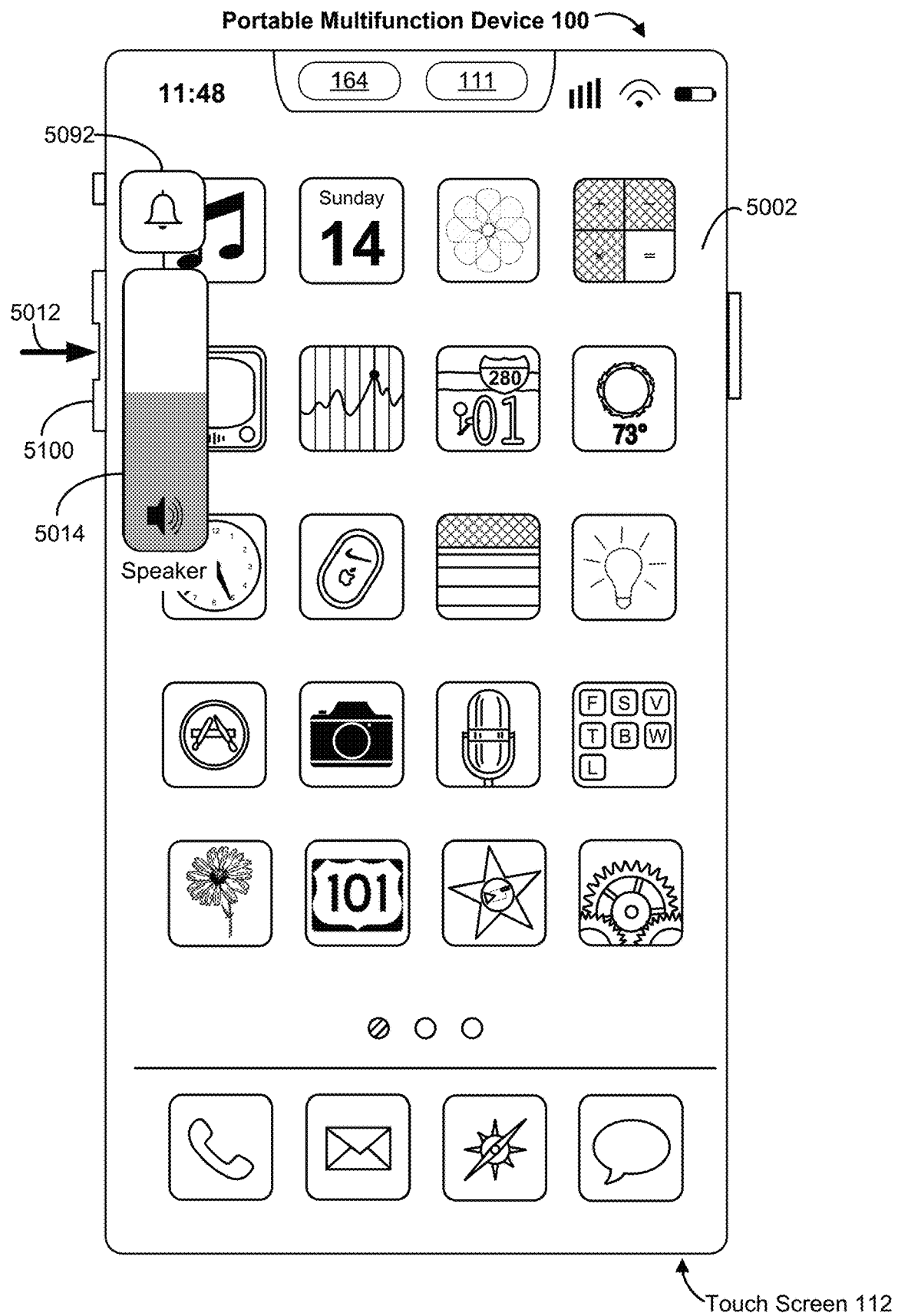
Figure 5B2

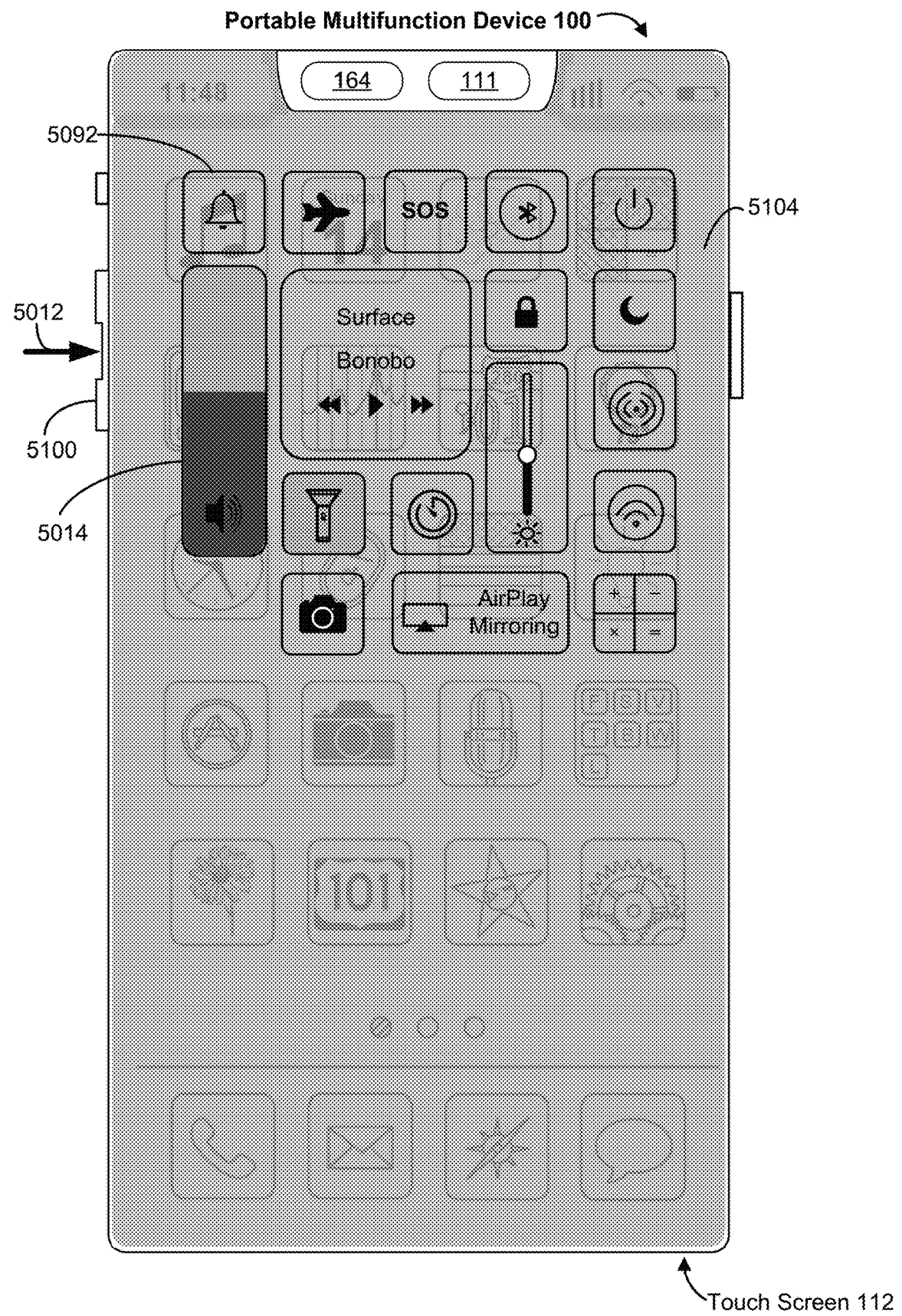
Figure 5B3

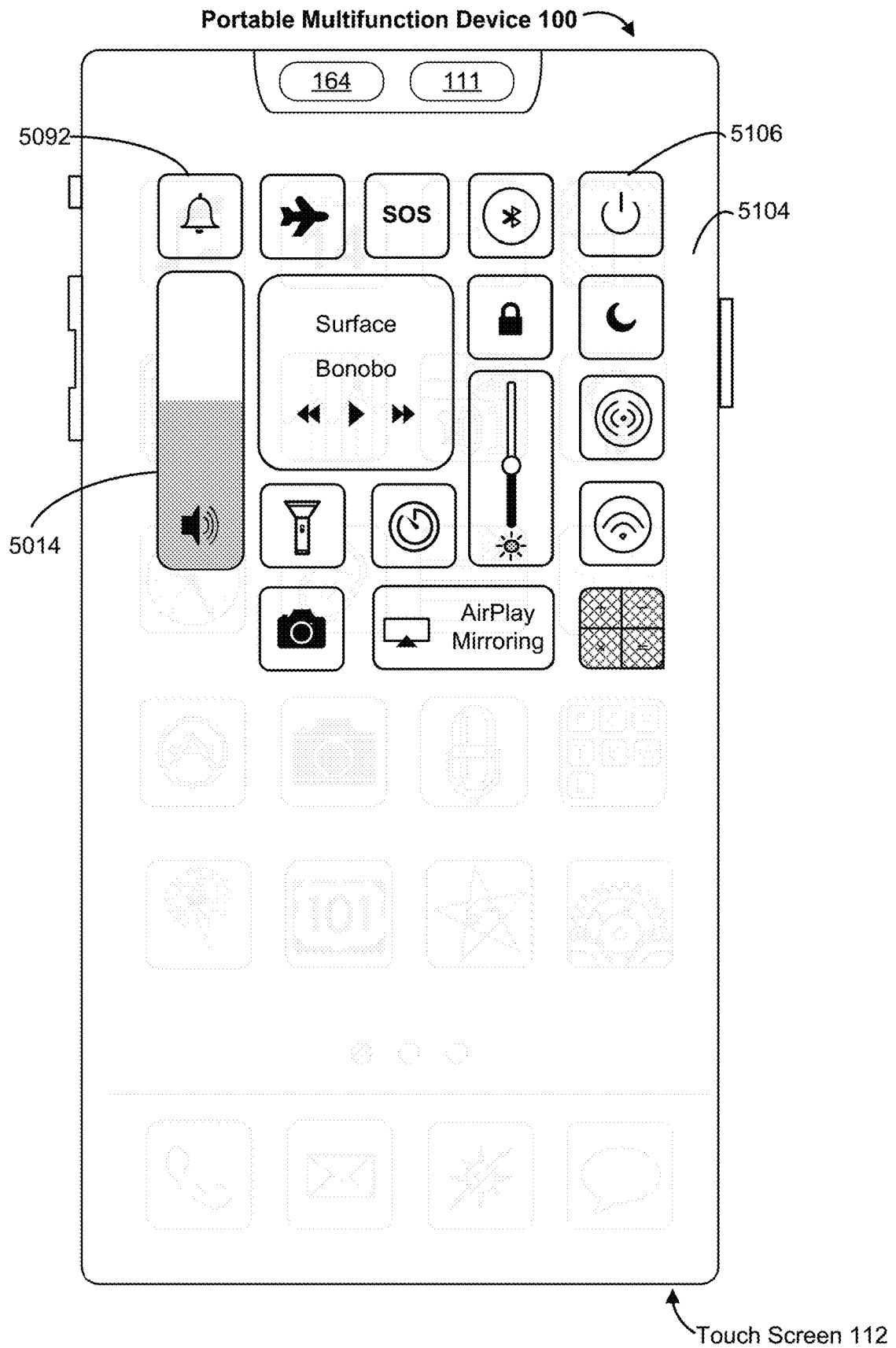
Figure 5B4

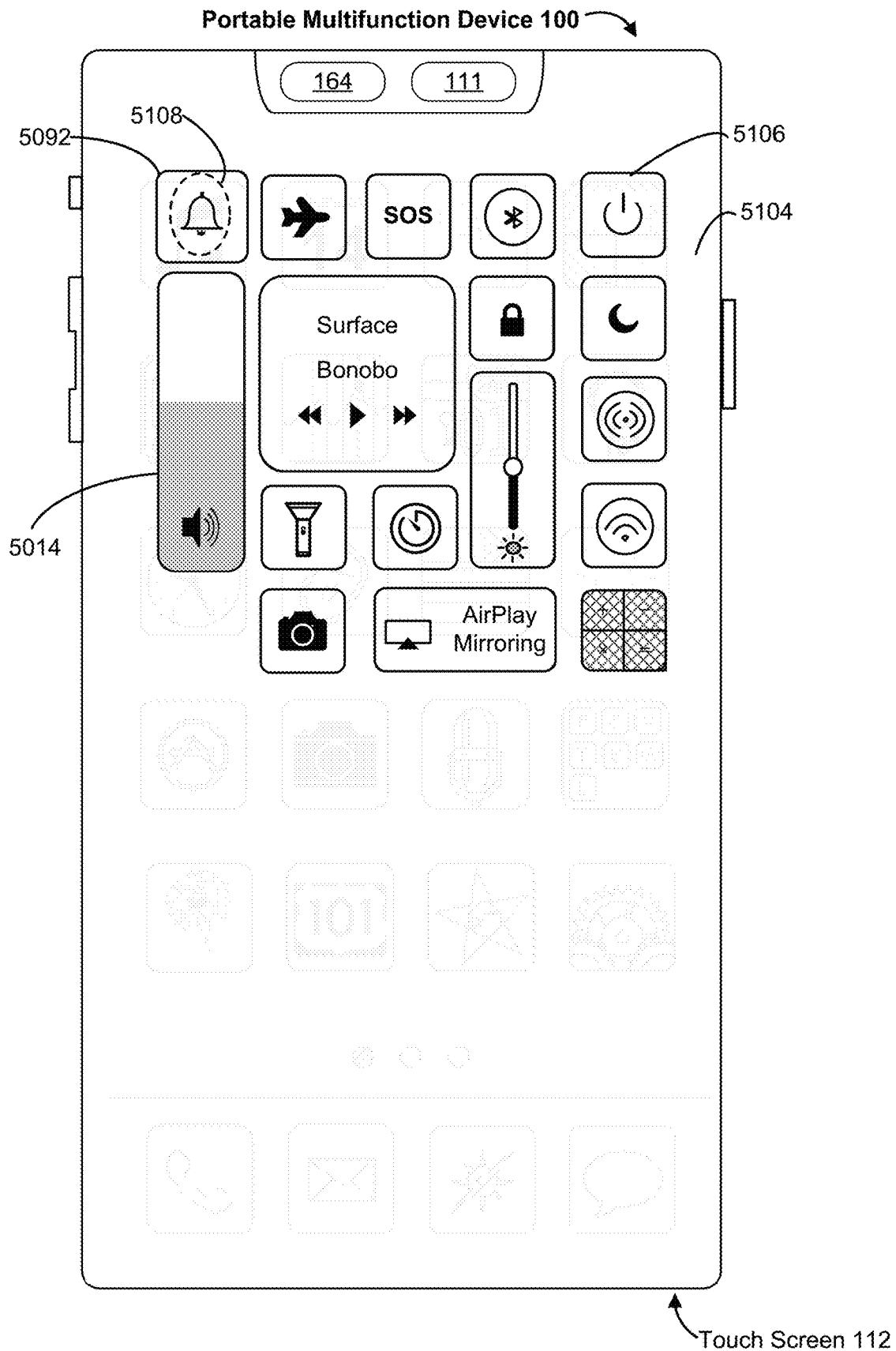
Figure 5B5

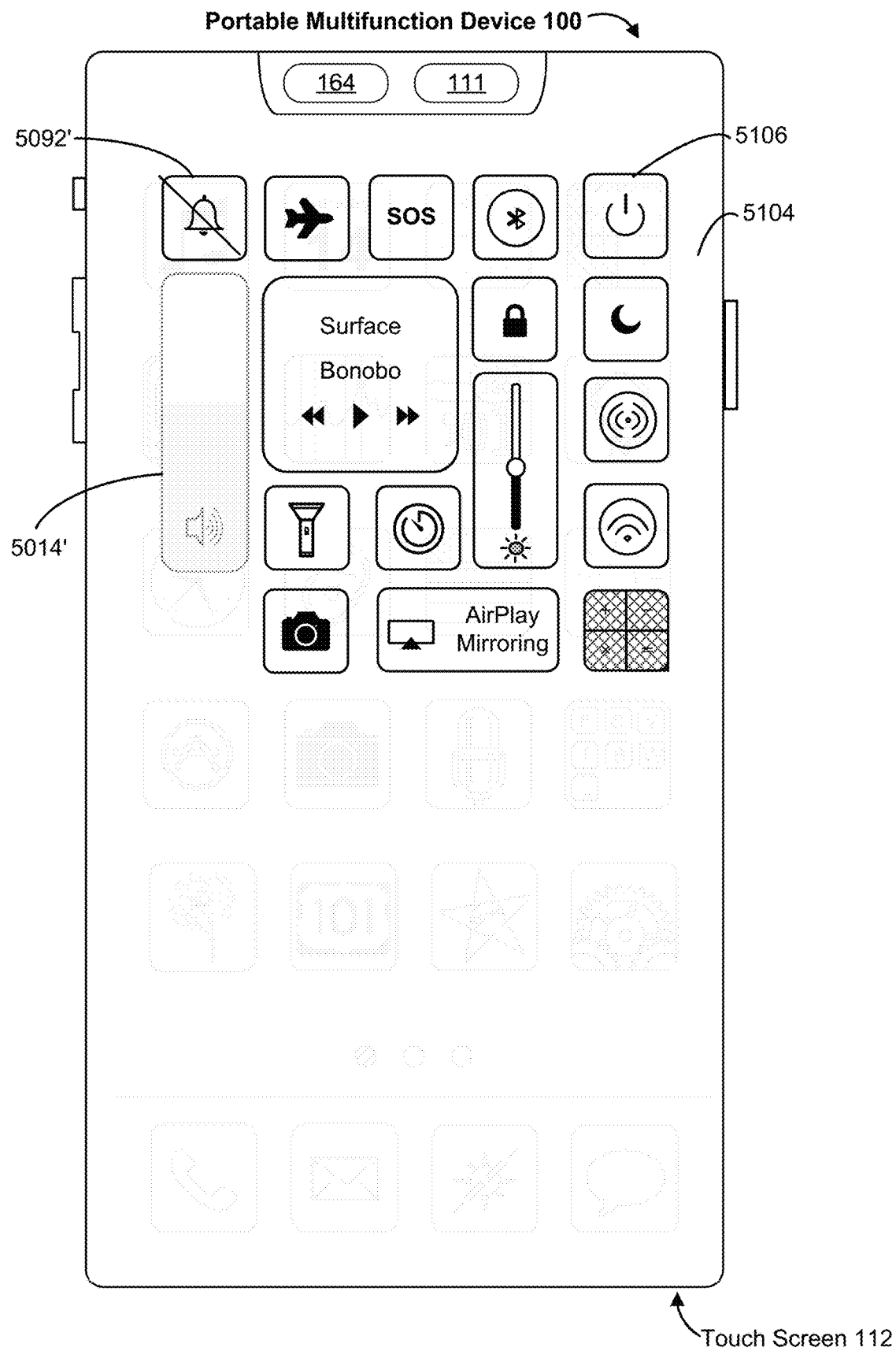
Figure 5B6

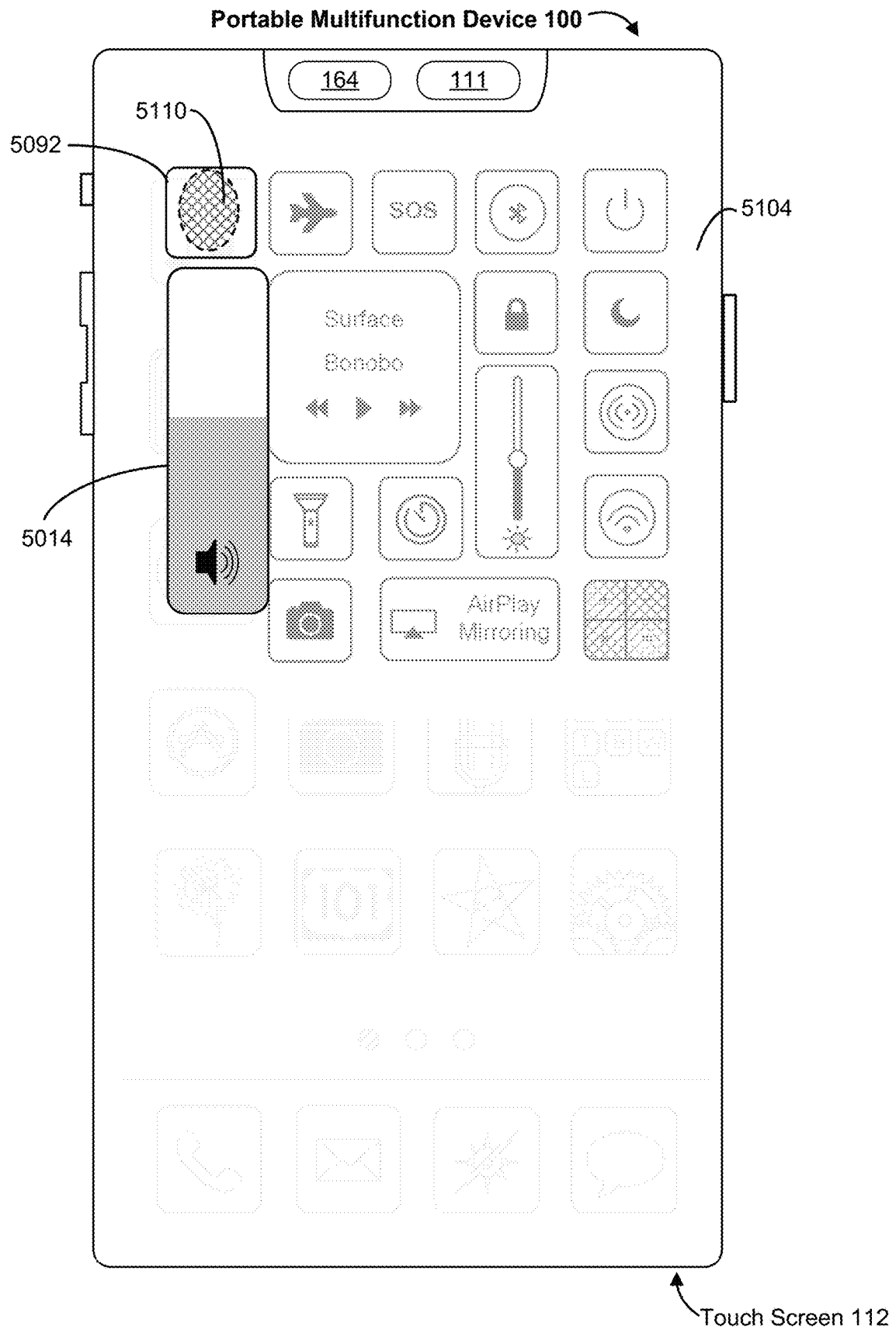
Figure 5B7

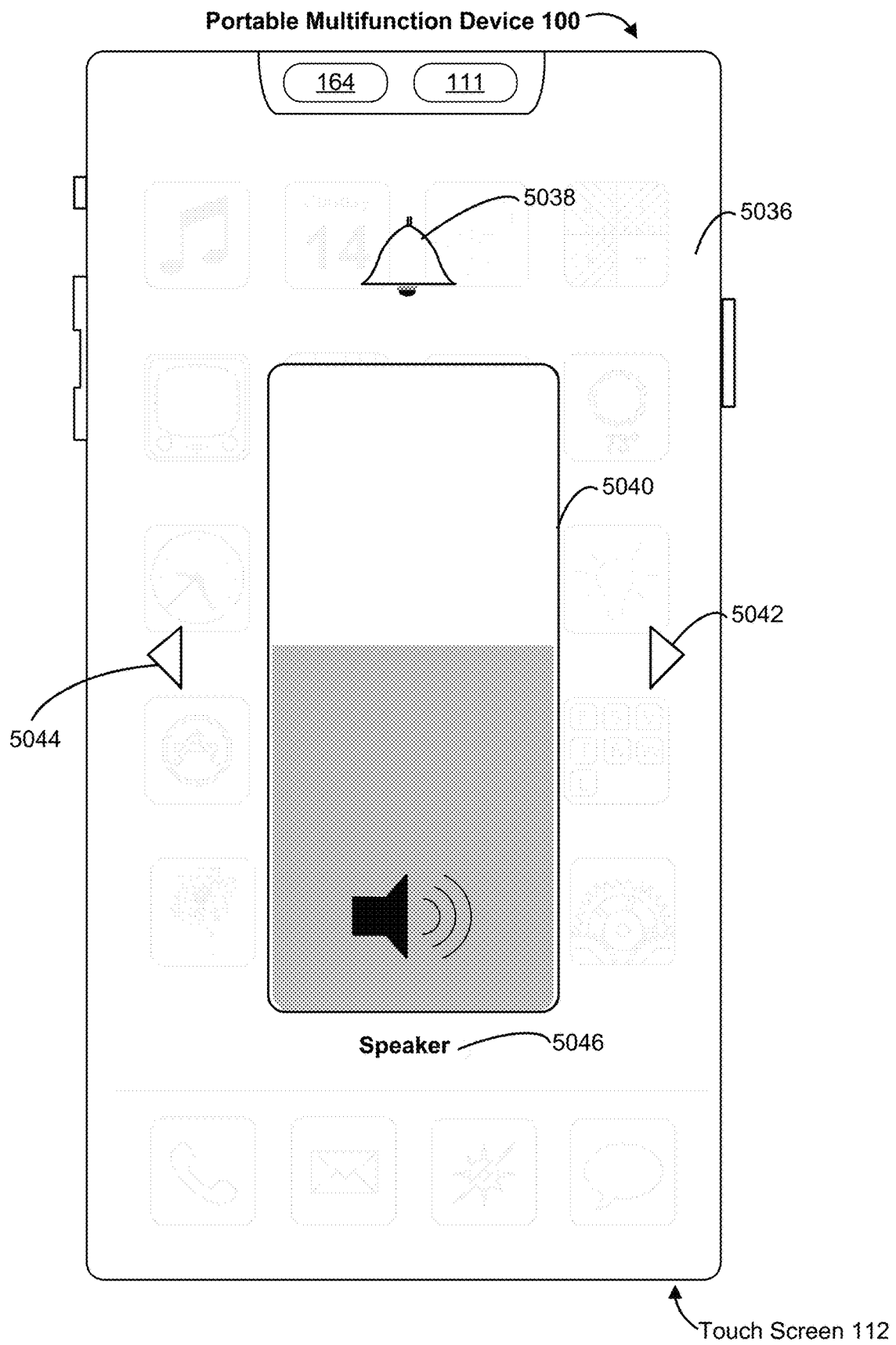
Figure 5B8

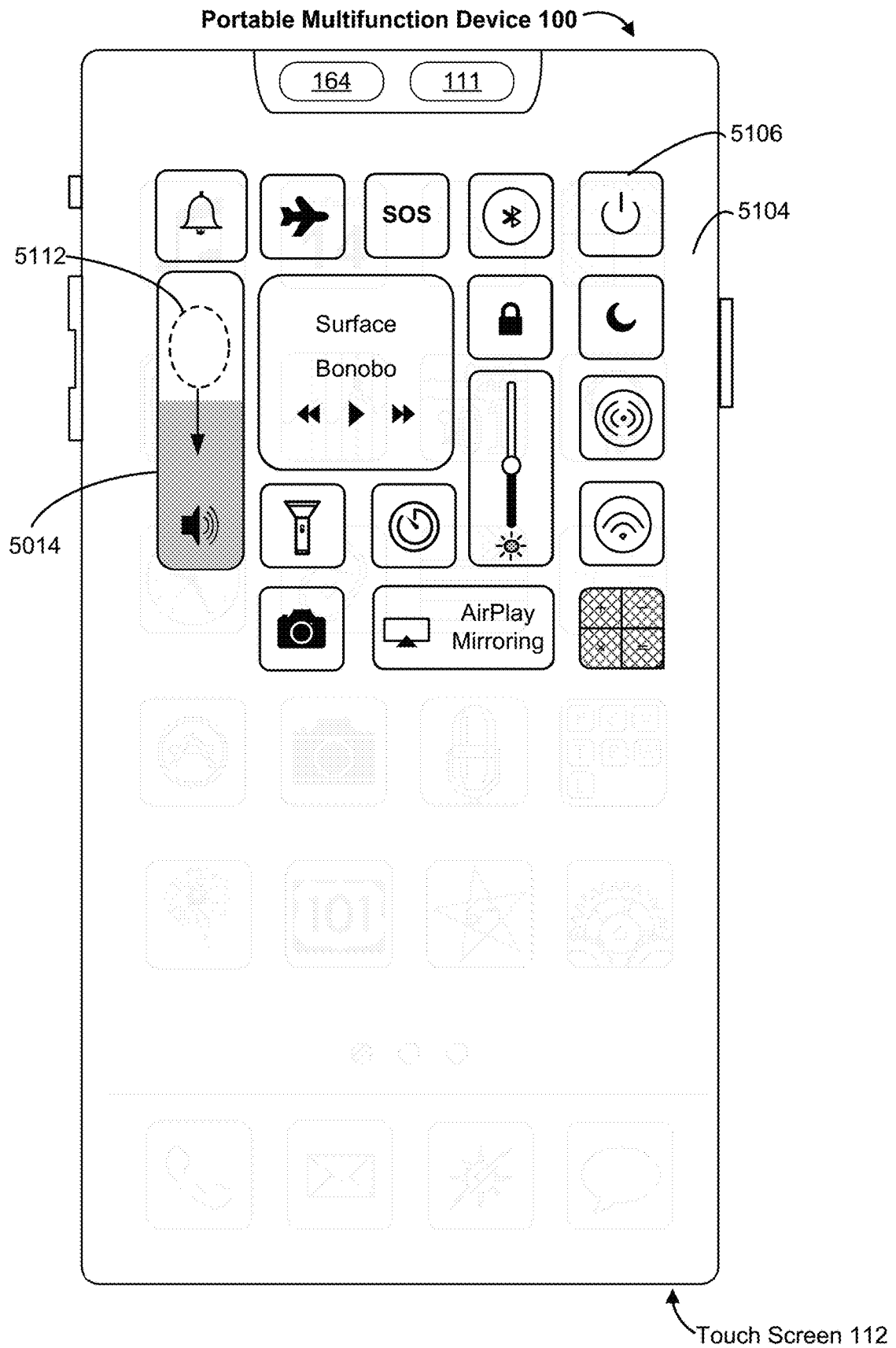
Figure 5B9

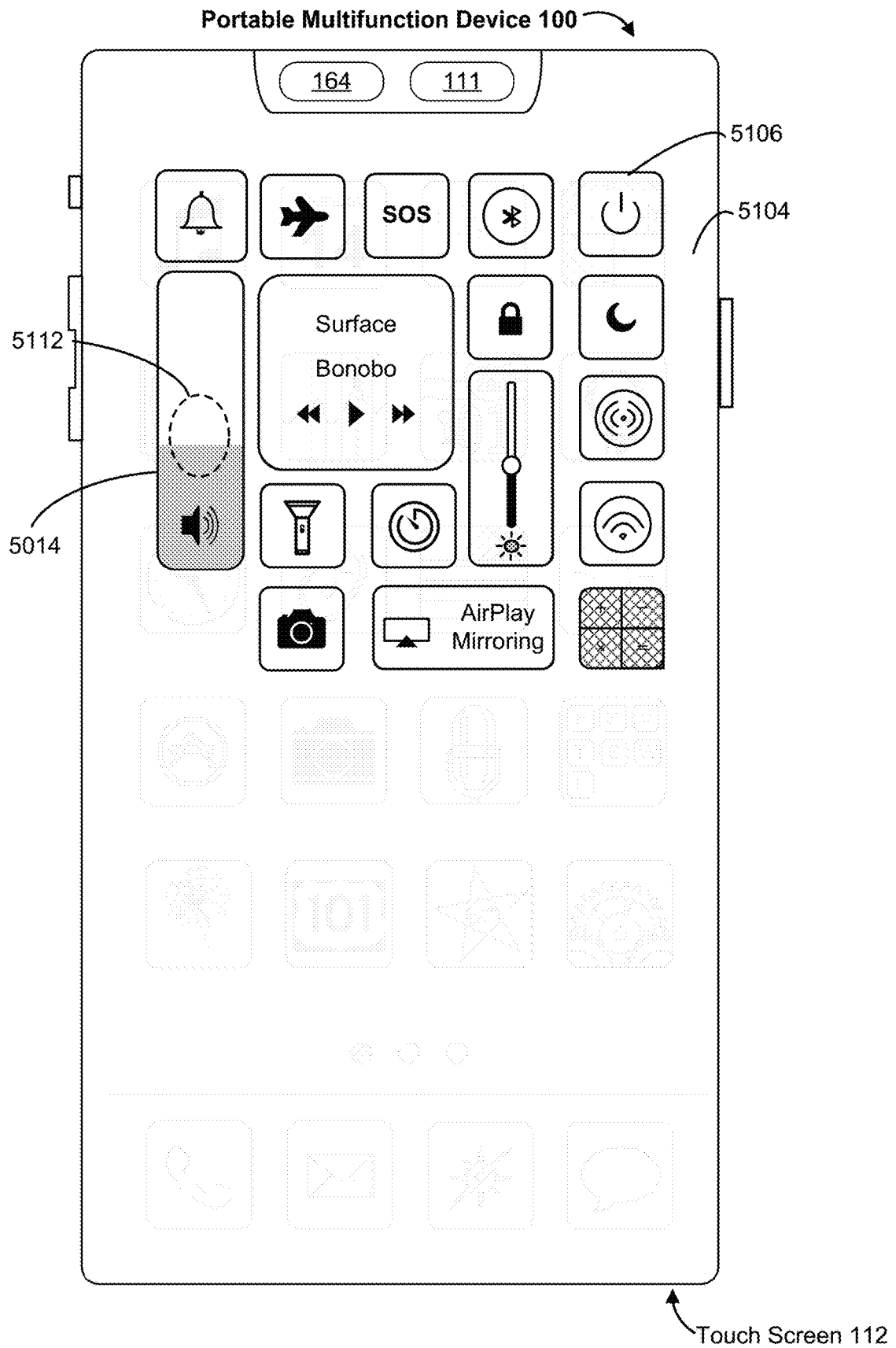
Figure 5B10

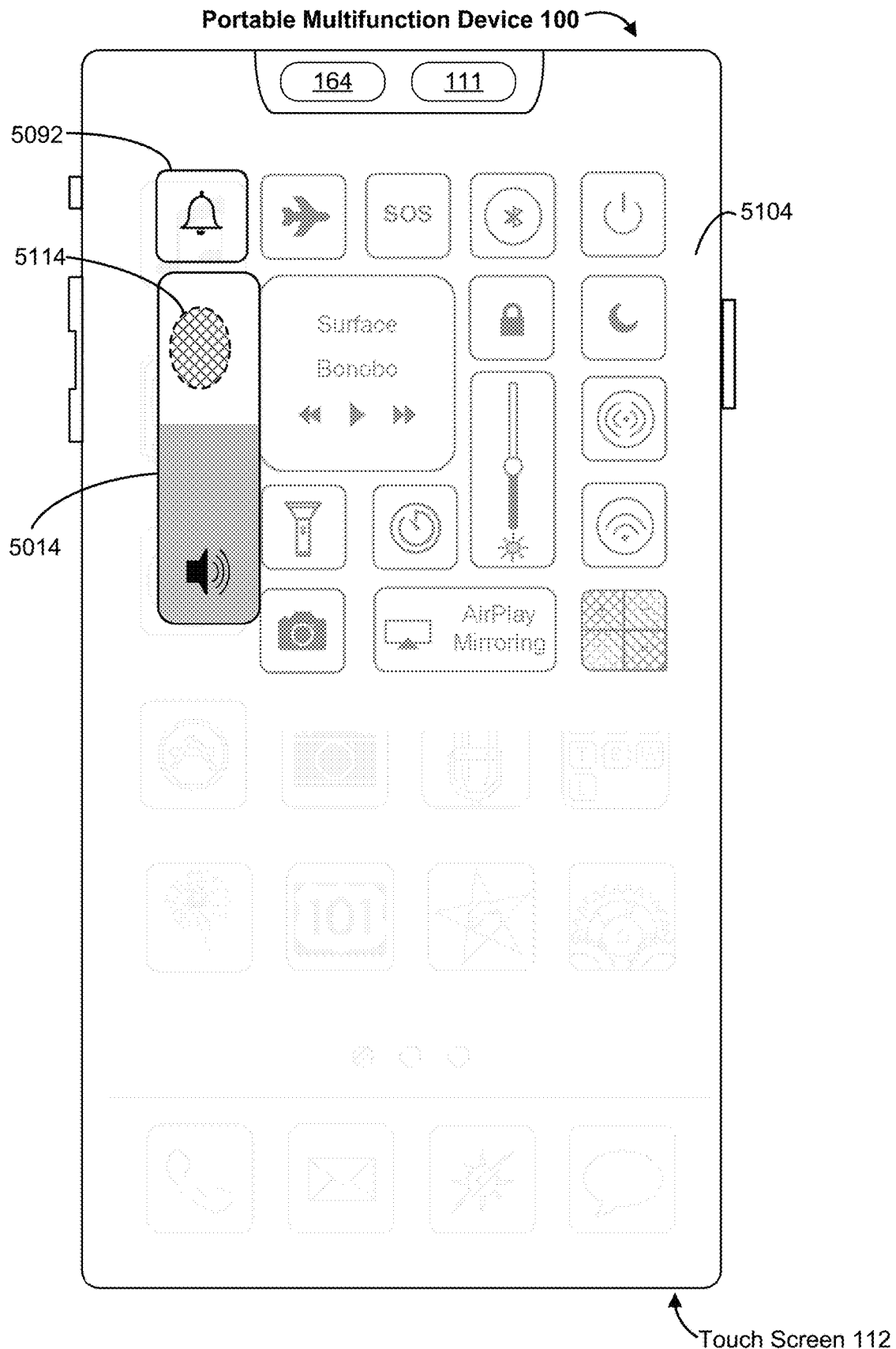
Figure 5B11

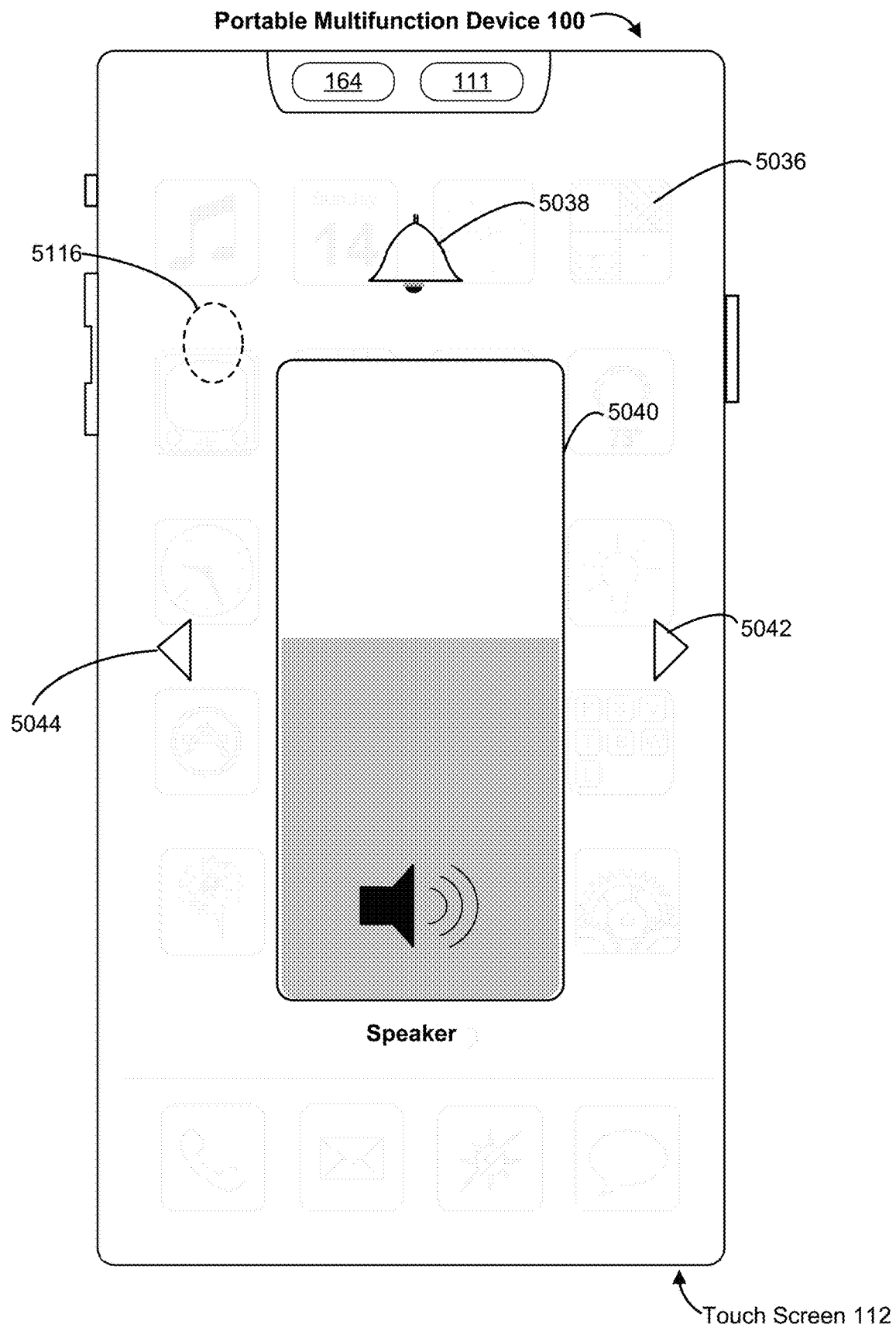
Figure 5B12

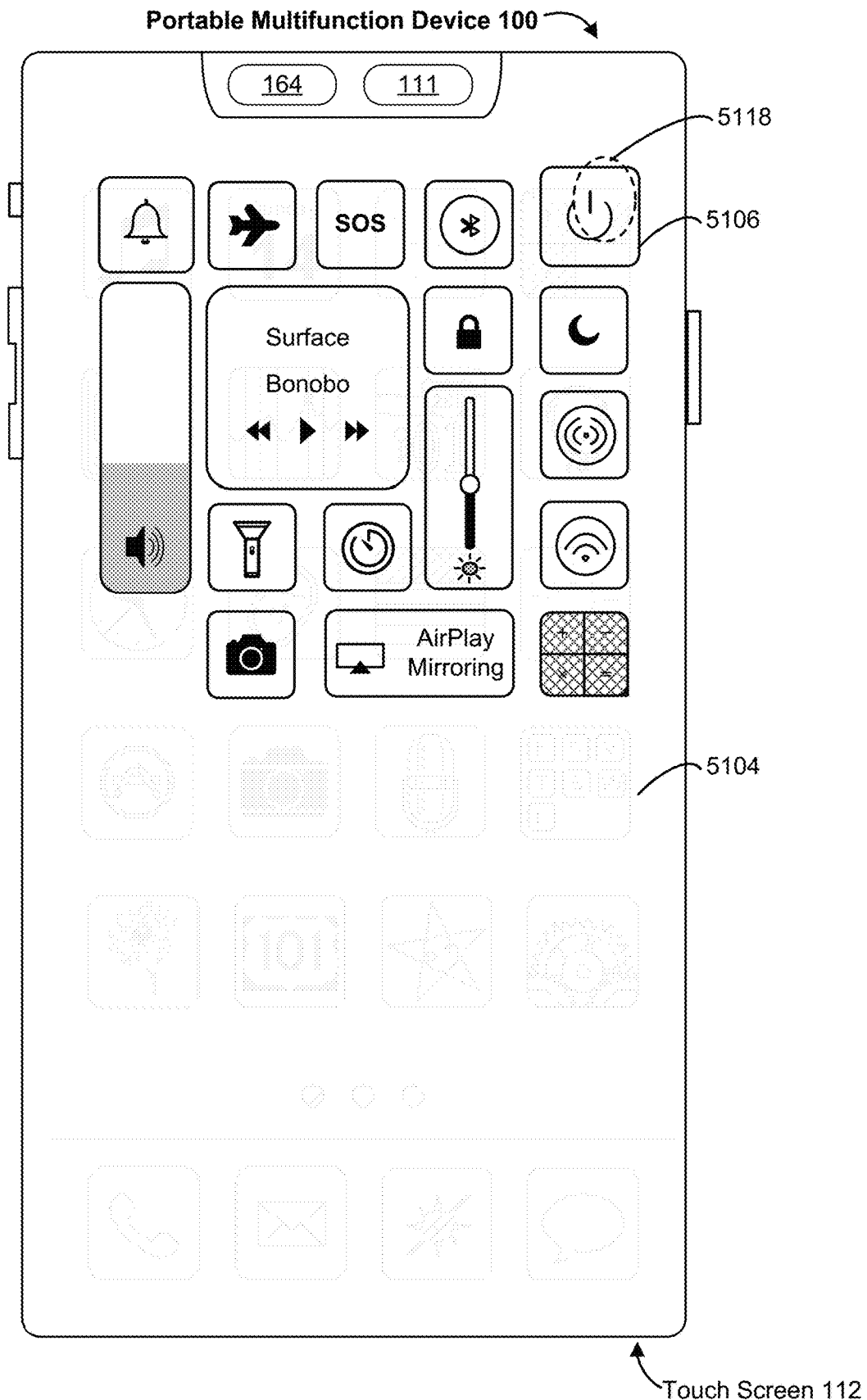
Figure 5B13

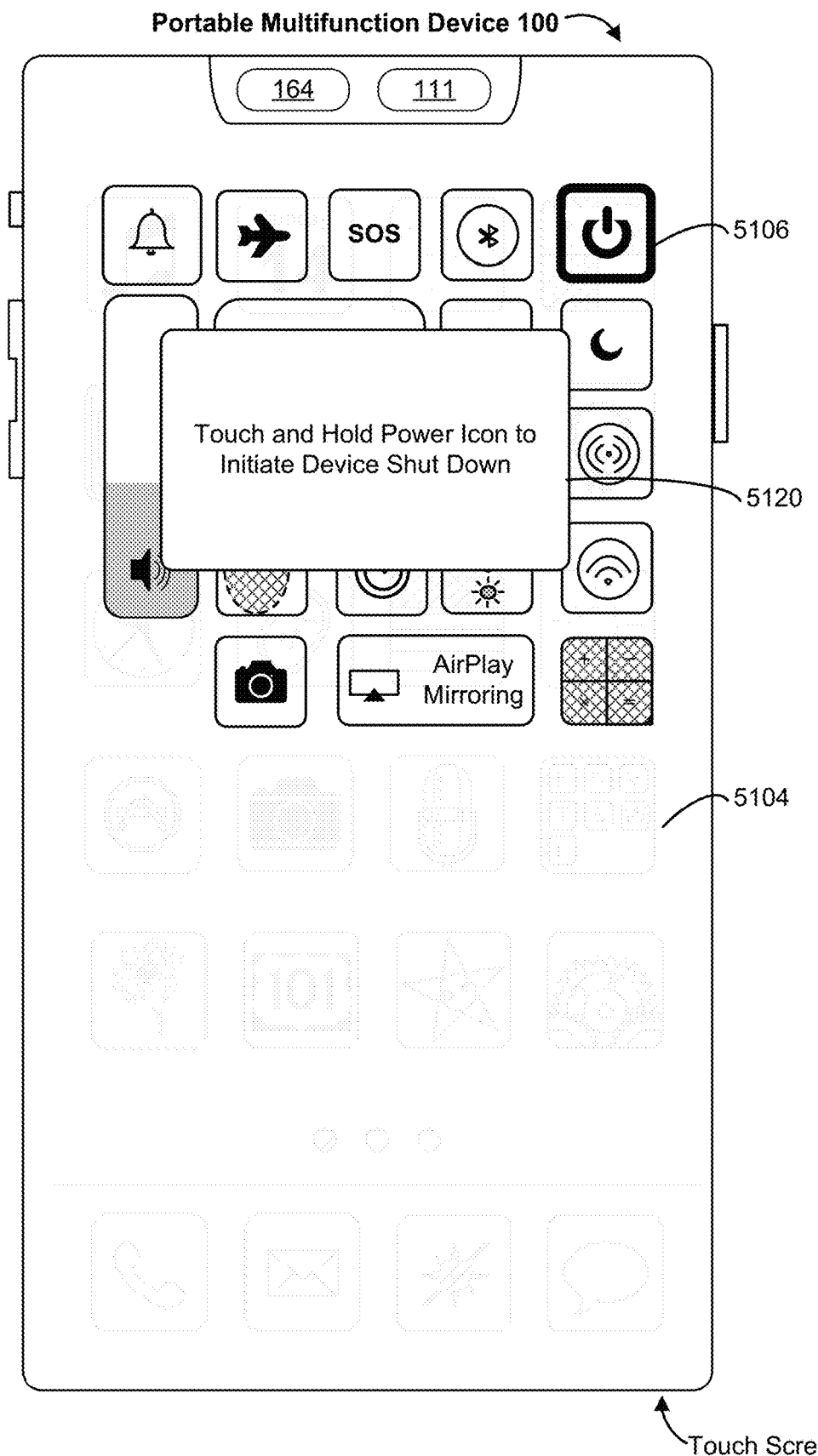
Figure 5B14

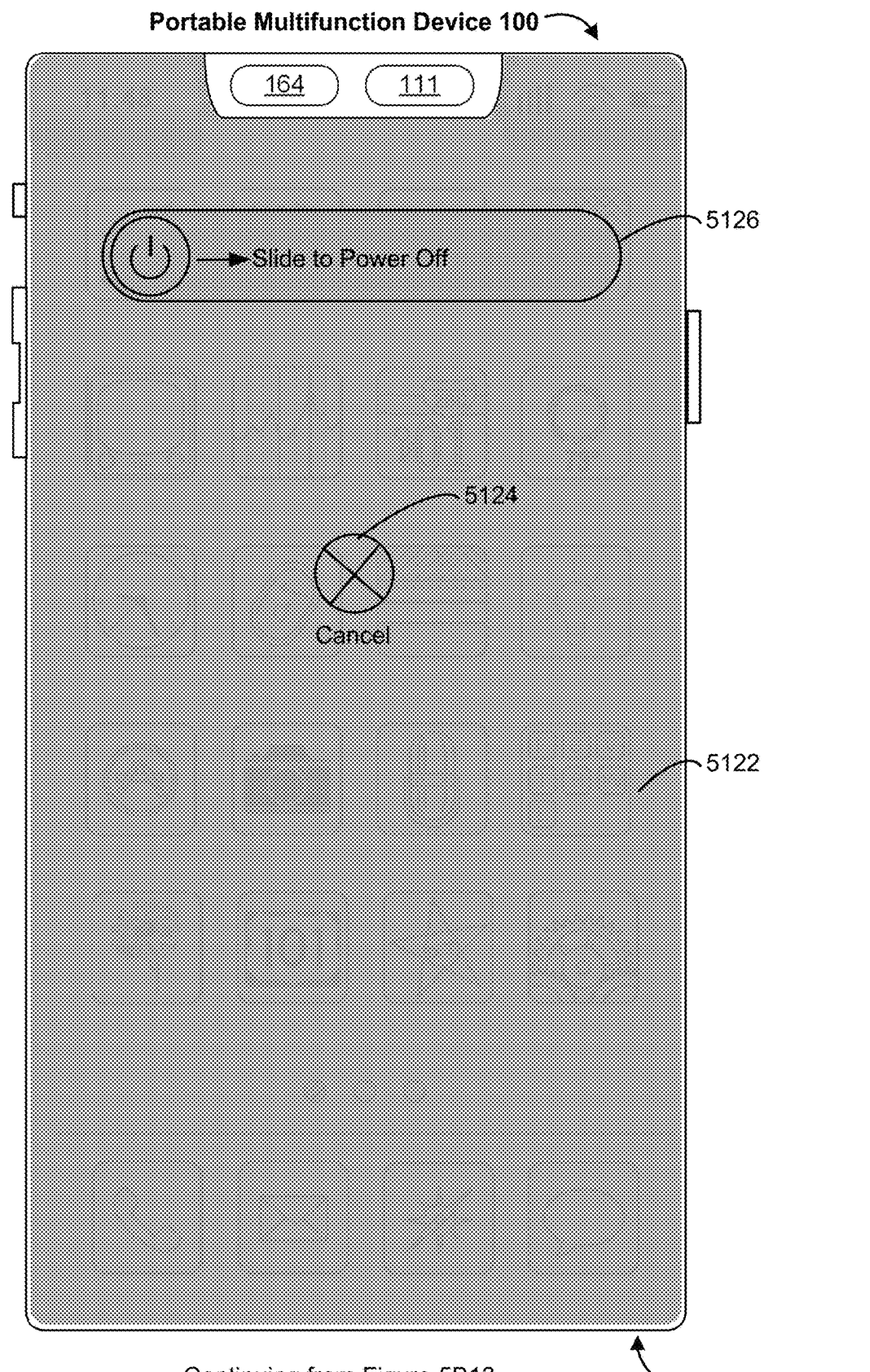
Figure 5B15

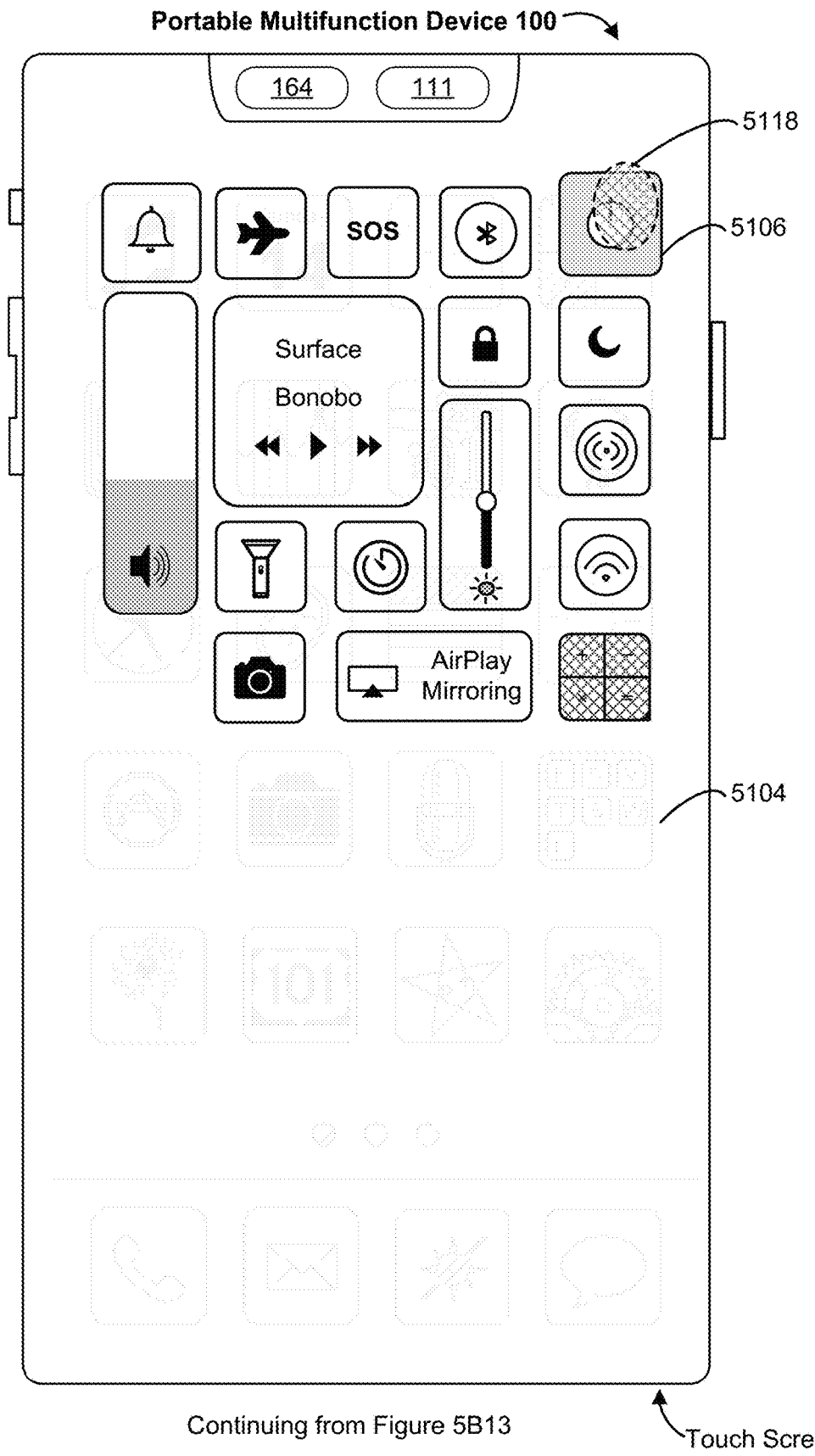
Figure 5B16

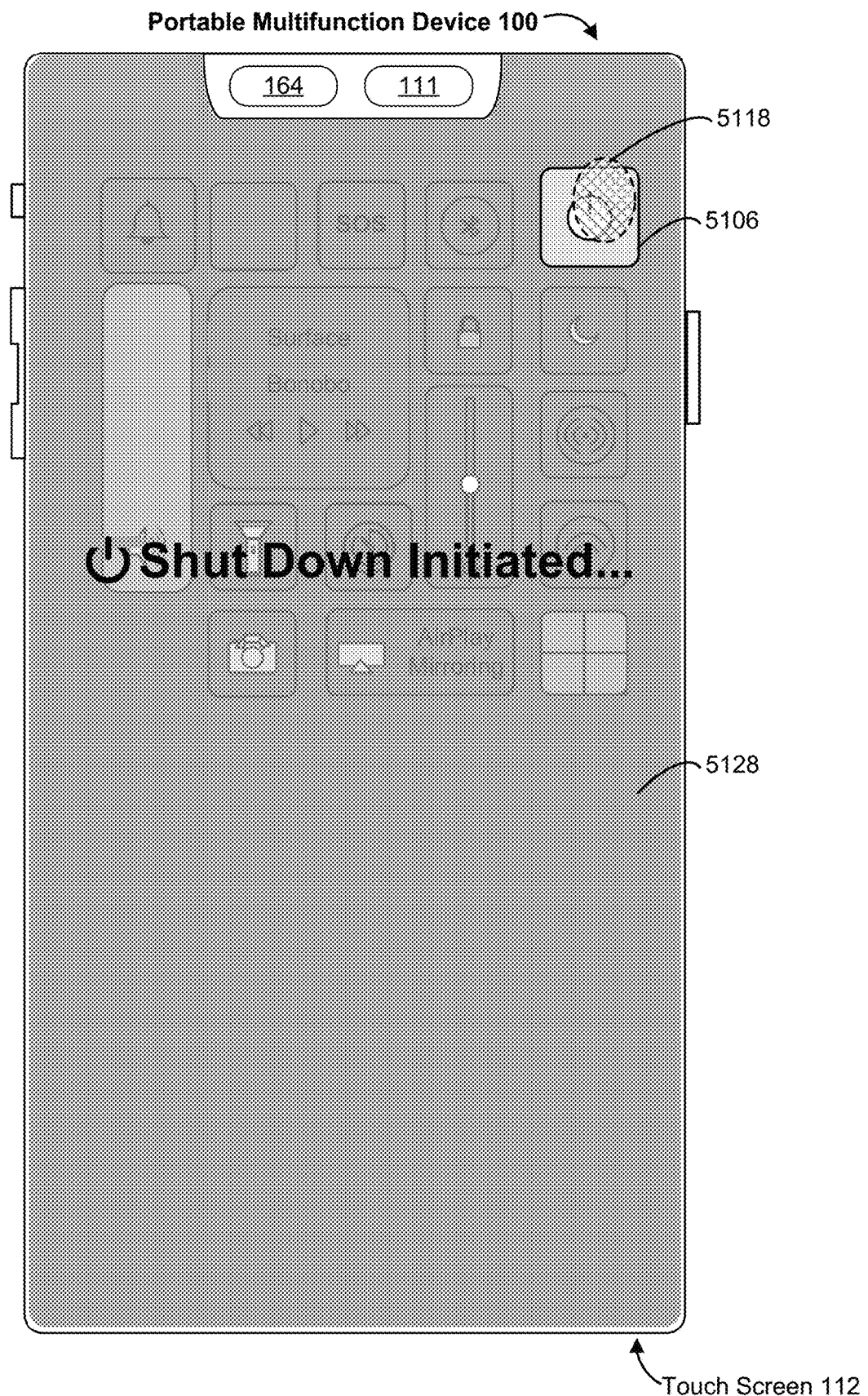
Figure 5B17

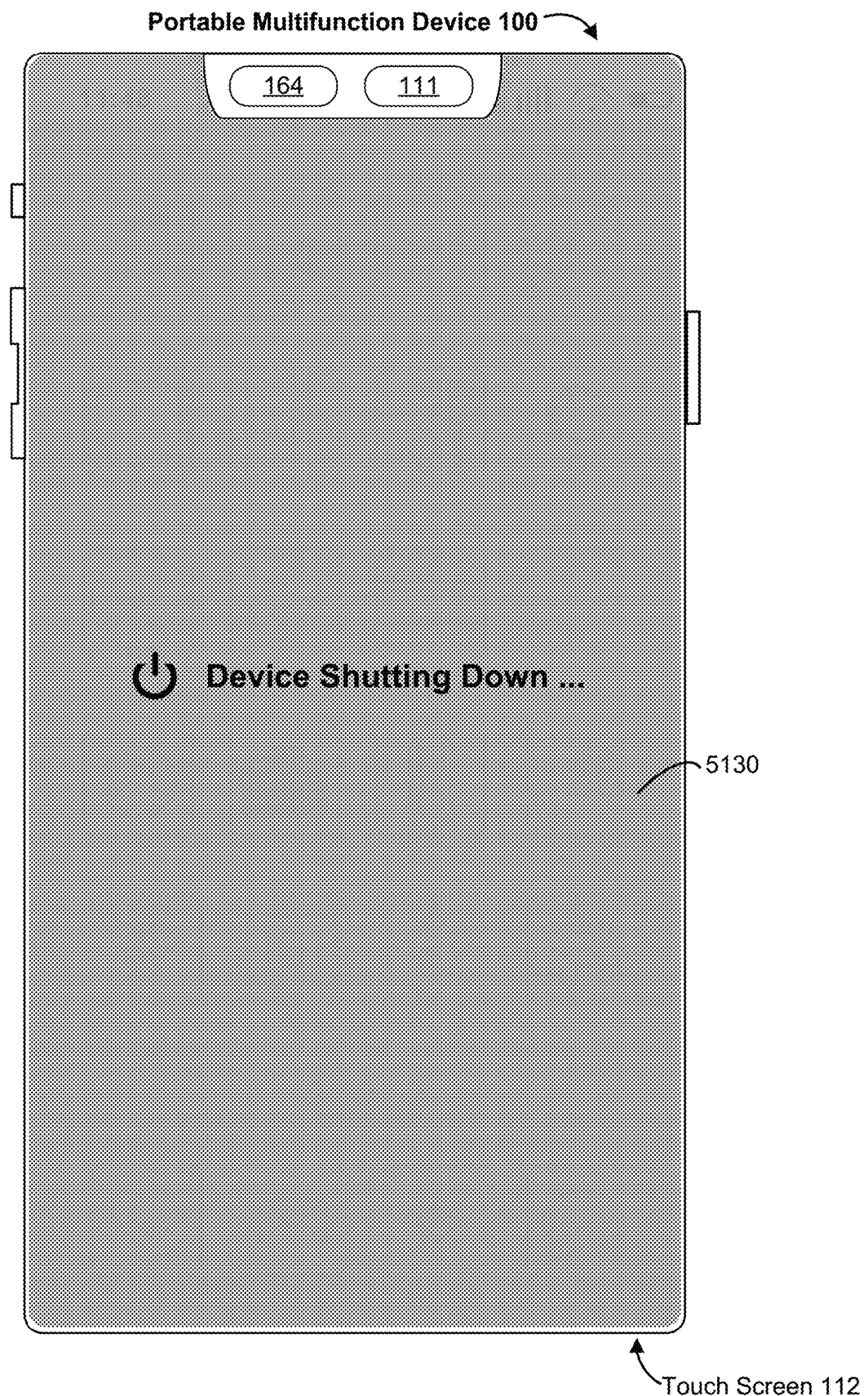
Figure 5B18

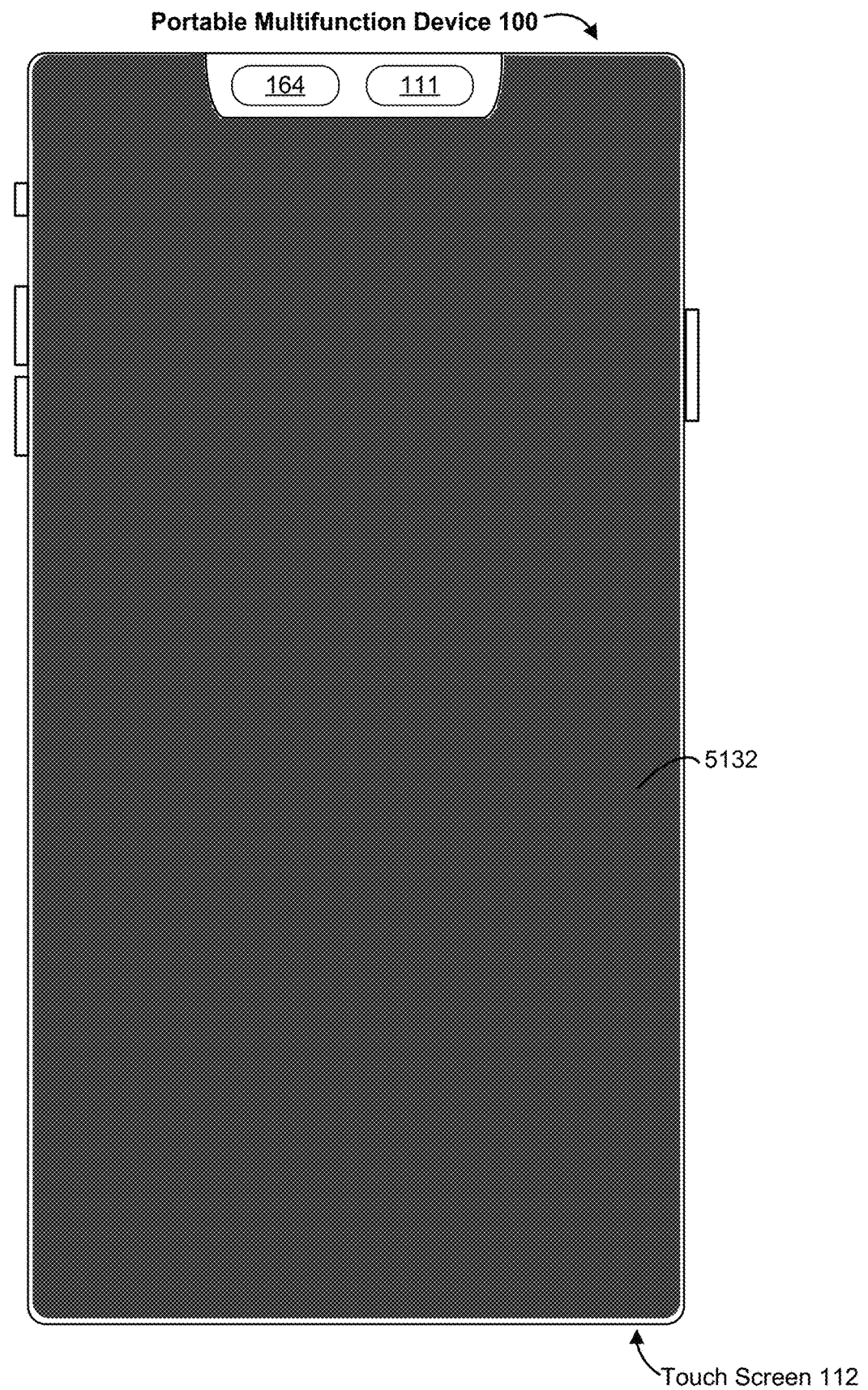
Figure 5B19

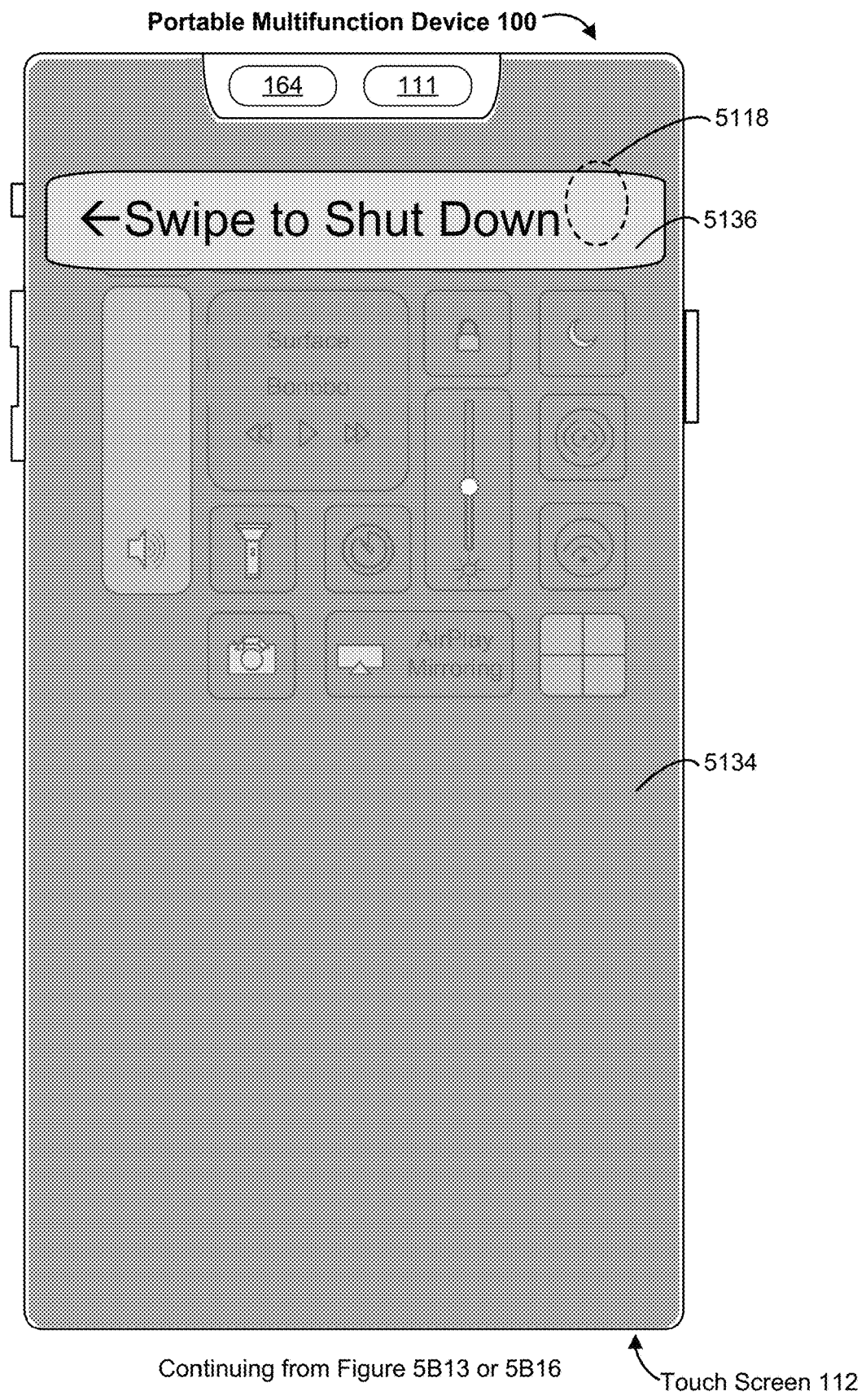
Figure 5B20

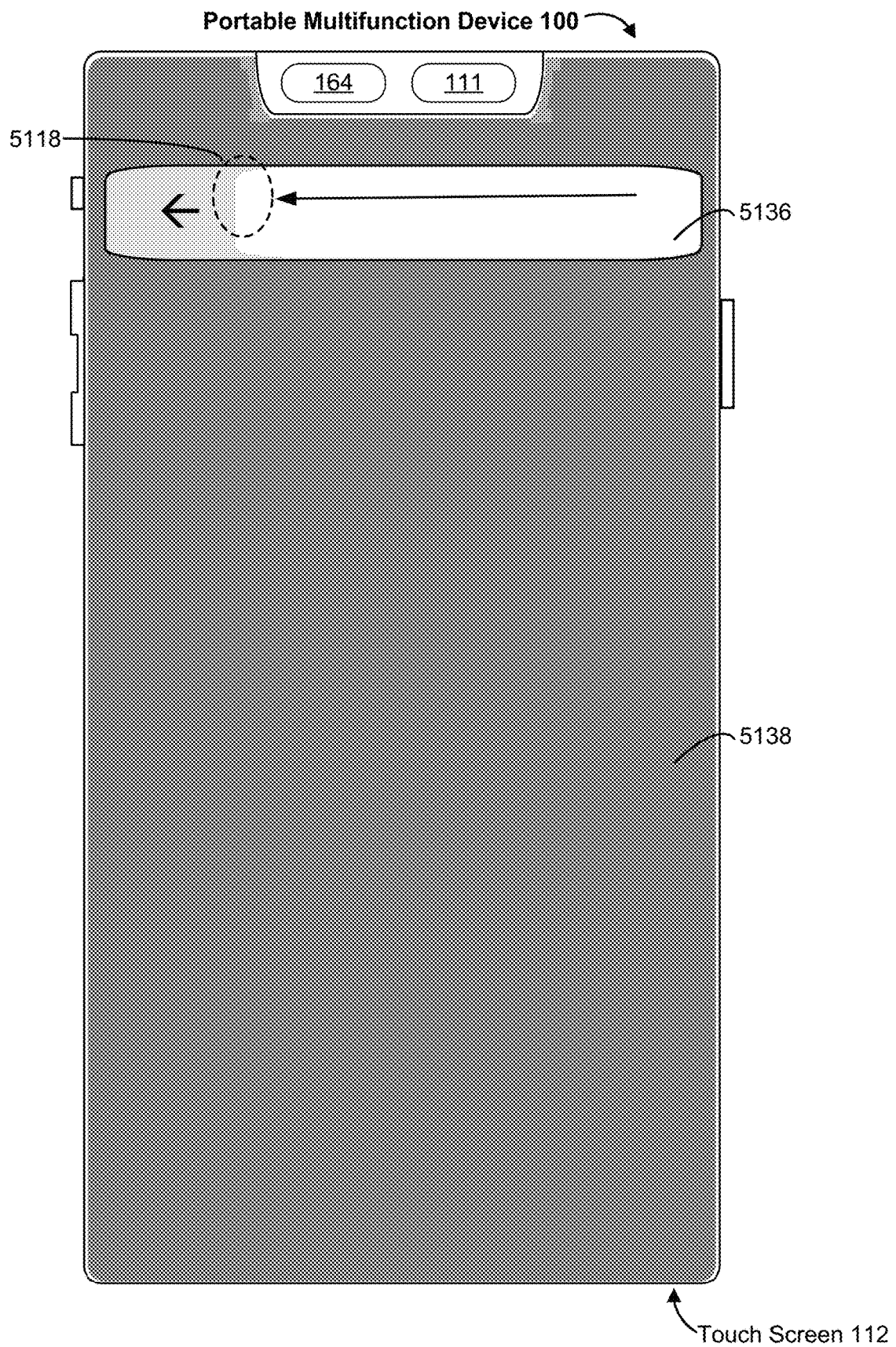
Figure 5B21

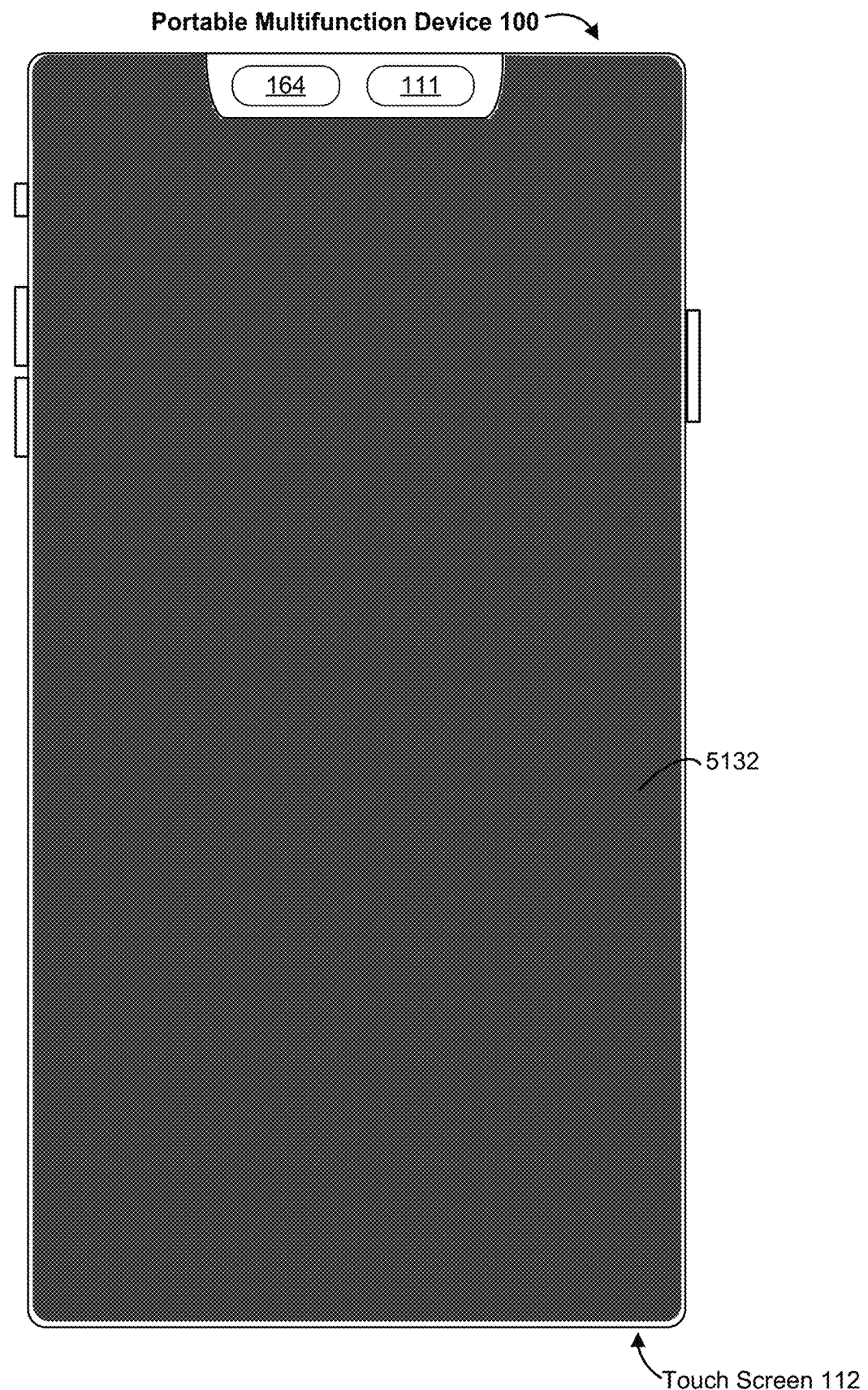
Figure 5B22

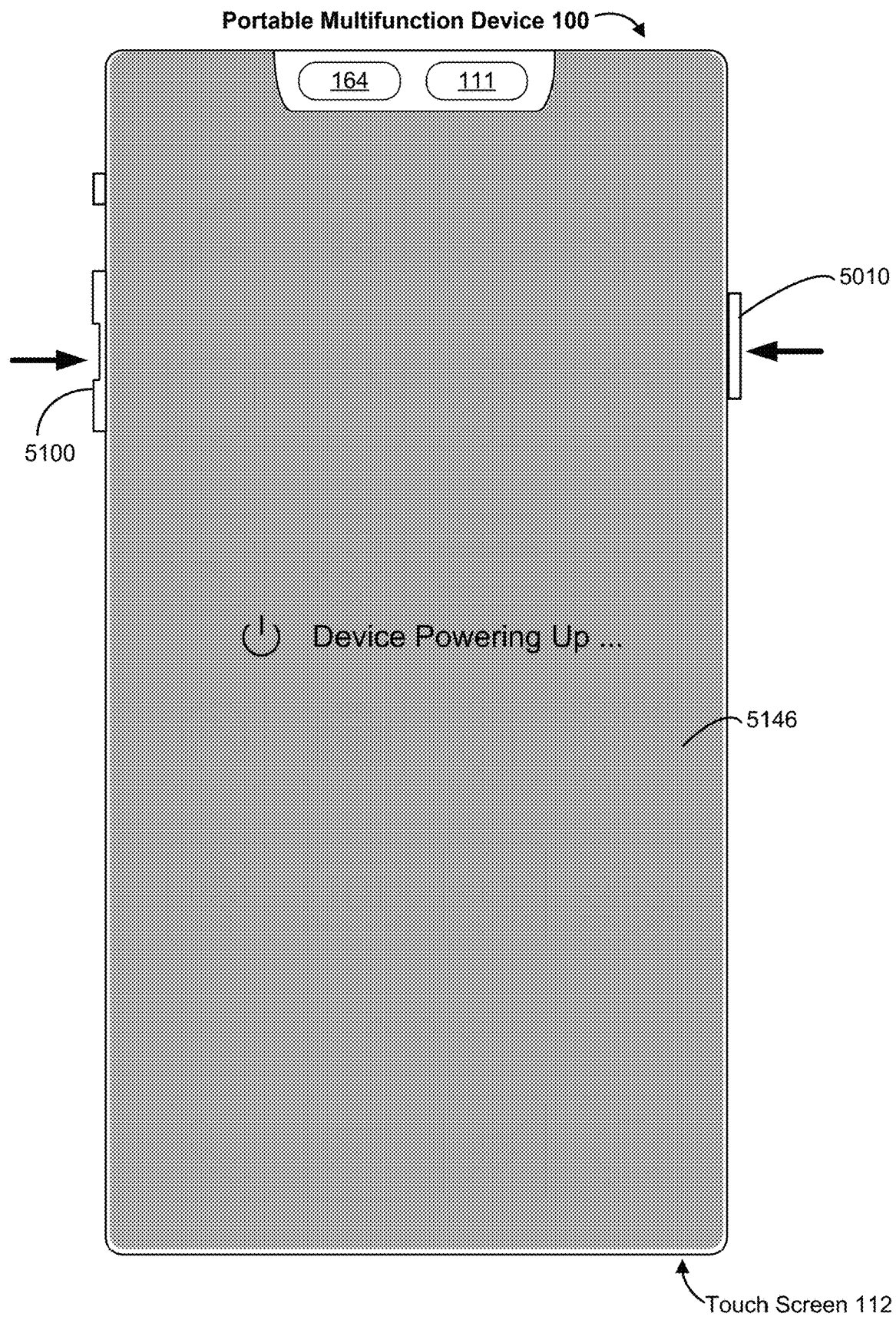
Figure 5B23

Figure 5B24

6000

6002 At an electronic device with a display, and a first input region that is separate from the display, detect a first press input on the first input region 6004 In response to detecting the first press input on the first input region:
in accordance with a determination that the first press input meets first criteria,
    display, on the display, a first control corresponding to a first control function of the device, wherein the first control is displayed with a first size and includes a value indicator to represent that a current value of the first control function of the device is a first value 6006 After displaying the first control with the first size and the value indicator representing the first value of the first control function:
    in accordance with a determination that a subsequent press input has not been detected on the first input region within a threshold time from when the first press input was detected, cease to display the first control; and
    in accordance with a determination that a second press input has been detected on the first input region within the threshold time from when the first press input was detected:
        adjust the current value of the first control function of the device from the first value to a second value that is different from the first value, wherein the second value is selected in accordance with the second press input;
        adjust a size of the first control from the first size to a second size distinct from the first size; and
        change an appearance of the value indicator in the first control to represent that the current value of the first control function is the second value

6008 In response to detecting the first press input on the first input region:

in accordance with a determination that the first input meets the first criteria, display, on the display, a second control corresponding to a second control function of the device concurrently with the first control corresponding to the first control function of the device; and after displaying the first control and the second control:

in accordance with a determination that the second press input has been detected on the first input region within the threshold time from when the first press input was detected:

cease to display the second control corresponding to the second control function of the device, while maintaining display of the first control corresponding to the first control function of the device.

6010 While displaying the first control and the value indicator corresponding to the first control function, detect an input on a second input region that is separate from the display; and in response to detecting the input on the second input region:

in accordance with a determination that the input on the second input region corresponds to a request to change a current mode of the second control function from a first mode to a second mode distinct from the first mode:

cease to display the first control and the value indicator corresponding to the first control function; and change an appearance of the second control corresponding to the second control function to indicate that the current mode of the second control function is the second mode.

6012 Displaying the first control corresponding to the first control function includes:
    moving the first control onto the display from a first location adjacent to the first input region to a second location that is farther from the first input region than the first location 6014 Displaying the first control corresponding to the first control function includes:
    in accordance with a determination that the device is being held in a first orientation, displaying the first control in a centrally aligned configuration on the display; and
    in accordance with a determination that the device is being held in a second orientation, displaying the first control aligned with the first input region, offset from the centrally aligned configuration.

6016 Adjusting the size of the control from the first size to the second size in accordance with a determination that a second press input has been detected on the first input region within the threshold time from when the first press input was detected, includes:
    increasing the size of the control in a first dimension of the control; and
    reducing the size of the control in a second dimension of the control that is distinct from the first dimension.

6018 The second press input has been detected on the first input region within the threshold time and the size of the control is adjusted from the first size to the second size, and wherein the method includes:
    while displaying the control with the second size and the value indicator representing that the current value of the first control function is the second value, detecting a third press input on the first input region;
    in response to detecting the third press input on the first input region:
        in accordance with a determination the third press input corresponds to a request to change the current value of the first control function to an end value of the first control function:
            adjusting the current value of the first control function of the device from the second value to the end value of the first control function;
            adjusting the size of the control from the second size to a third size distinct from the second size;
            changing the appearance of the value indicator in the control to represent that the current value of the first control function is the end value of the first control function; and
            adjusting the size of the control from the third size back to the second size after an end of the third press input is detected (B)

6020 In response to detecting the third press input on the first input region:

in accordance with a determination that the second value is a first end value of the first control function and the third press input corresponds to a request to change the current value of the first control function beyond the first end value of the first control function:

adjust the size of the control from the second size to the third size distinct from the second size;

adjust the size of the control from the third size back to the second size after an end of the third press input is detected; and display the value indicator with a corresponding appearance that represents that the current value of the first control function remains unchanged at the first end value of the first control function.

6022 The second press input has been detected on the first input region within the threshold time and the size of the control is adjusted from the first size to the second size, and the method includes:

while displaying the control with the second size and the value indicator representing that the current value of the first control function is the second value, detecting a first touch input on a touch-sensitive surface that is separate from the first input region; and in response to detecting the first touch input on the touch-sensitive surface that is separate from the first input region:

in accordance with a determination the first touch input is detected at a location that corresponds to a location of the first control on the display:

adjusting the size of the first control from the second size to the first size, without adjusting the current value of the first control function.

6024 The second press input has been detected on the first input region within the threshold time and the size of the control is adjusted from the first size to the second size, and the first touch-input has been detected after the second press input, and the size of the control is adjusted from the second size back to the first size, and the method includes:
  while displaying the first control with the first size and the value indicator representing that the current value of the first control function is the second value, detecting a second touch input on the touch-sensitive surface that is separate from the first input region; and
  in response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control adjusting the current value of the first control function of the device from the second value to a third value that is different from the second value, wherein the third value is selected in accordance with the second touch input.

6026 A sequence of one or more press inputs have been detected on the first input region and the size of the first control is currently displayed with the second size and with the value indicator representing that the current value of the first control function is a fourth value that is distinct from an end value of the first control function, and the method includes:
  after the sequence of one or more press inputs detected on the first input region and while the first control is displayed with the second size and the value indicator representing the fourth value, detecting a fourth press input on the first input region; and
  in response to detecting the fourth press input on the first input region:
    in accordance with a determination that the fourth press input corresponds to a request to change the current value of the first control function to an end value of the first control function:
      generating a first tactile output in conjunction with adjusting the current value of the first control function of the device from the fourth value to the end value of the first control function..

6028 While the first control is displayed and the value indicator represents that the current value of the first control function is the fourth value, detect a third touch input on the touch-sensitive surface that is separate from the first input region; and in response to detecting the third touch input on the touch-sensitive surface that is separate from the first input region:

in accordance with a determination that the third touch input corresponds to a request to change the current value of the first control function to the end value of the first control function:

generate a second tactile output in conjunction with adjusting the current value of the first control function of the device from the fourth value to the end value of the first control function.

6030 A respective tactile output characteristic of the first tactile output has a first value and the respective tactile output characteristic of the second tactile output has a second value that is different from the first value.

6032 A first tactile output characteristic of the first tactile output has a predefined fixed value that is independent of a characteristic value of the fourth press input, and the first tactile output characteristic of the second tactile output has variable value that is determined based on a characteristic speed of the third touch input.

6034 While displaying the first control and the value indicator representing the current value of the first control function, detect a fourth touch input on a touch-sensitive surface that is separate from the first input region; and in response to detecting the fourth touch input on the touch-sensitive surface that is separate from the first input region:

in accordance with a determination the fourth touch input is detected at a location that corresponds to a location of the first control on the display and that the fourth touch input meets control-expansion criteria:

display a control user interface region including the first control and a plurality of controls that are distinct from the first control.

6036 In accordance with a determination that the first press input meets the first criteria, display, on the display, the first control corresponding to the first control function of the device includes:

in accordance with a determination that a currently used output device is a first output device among a plurality of output devices associated with the electronic device, displaying the first control to control an output level of the first output device; and in accordance with a determination that the currently used output device is a second output device among a plurality of output devices that is distinct from the first output device, displaying the first control to control an output level of the second output device.

6038 Detect an input on a second input region that is separate from the display;
    in response to detecting the input on the second input region:
        in accordance with a determination that the input on the second input region meets second criteria,
            change a current mode of a second control corresponding to a second control function of the device from a first mode to a second mode that is distinct from the first mode; and
            display, on the display, a representation of the second control to represent that the current mode of the second control is the second mode.

6040 After displaying the representation of the second control to represent that the current mode of the second control is the second mode:
    in accordance with a determination a subsequent input is detected on the second input region or at a location on a touch-sensitive surface that corresponds to a location of the representation of the second control on the display, within the threshold amount of time from the time when the input on the second input region was detected:
        change the current mode of the second control from the second mode to the first mode; and
        update the representation of the second control to represent that the current mode of the second control is the first mode; and
    in accordance with a determination a subsequent input is not detected on the second input region or at a location on the touch-sensitive surface that corresponds to a location of the representation of the second control on the display, within the threshold amount of time from the time when the input on the second input region was detected:
        cease to display the representation of the second control.

6042 After displaying the representation of the second control to represent that the current mode of the toggle control is the second mode:
    reduce visual prominence of the representation of the second control after a second threshold amount of time has elapsed since the time when the input on the second input region was detected, wherein the second threshold amount of time is shorter than the first threshold amount of time.

| 7002 At an electronic device with a touch-sensitive display, detect a first input that corresponds to a request to display a control user interface |

↓

| 7004 In response to detecting the first input, display the control user interface, wherein displaying the control user interface includes concurrently displaying in the control user interface:
    a first control for selecting a value from a plurality of values for a output parameter of the device;
    a second control for switching between different modes of a first function of the device that are available while the device is on; and
    a third control that, when activated, initiates a process for turning the device off |

↓

| 7006 While displaying the control user interface, detect a second input directed to the control user interface; and |

↓

| 7008 in response to detecting the second input:
    in accordance with a determination that the second input is directed to the first control, adjusting a current value for the output parameter based on the second input;
    in accordance with a determination that the second input is directed to the second control and meets first input criteria, changing a current mode of the first function;
    in accordance with a determination that the second input is directed to the third control and meets second input criteria, initiating a process for turning off the device; and
    in accordance with a determination that the second input is directed to the third control and meets the first input criteria but does not meet the second input criteria, forgoing initiation of the process for turning off the device. |

7010 In response to detecting the second input:
in accordance with a determination that the second input is directed to the first control and meets the second input criteria, display an expanded view of the first control for the output parameter of the device.

7012 In response to detecting the second input:
in accordance with a determination that the second input is directed to the first control and meets the second input criteria and includes movement in a first predefined direction after meeting the second input criteria, adjust the current value for the output parameter based on the second input while displaying the expanded view of the first control for the output parameter of the device.

7014 In response to detecting the second input:
in accordance with a determination that the second input is directed to the third control and meets the second input criteria and includes movement in a second predefined direction after meeting the second input criteria, execute the process to turn off the device.

7016 In response to detecting the second input:
in accordance with a determination that the second input is directed to the second control and meets the second input criteria, display a control module that includes the second control and one or more controls that are not initially displayed in the control user interface.

7018 The first input that corresponds to a request to display the control user interface includes a first touch input on a touch-sensitive surface of the electronic device that corresponds to the display of the device.

7020 The first input that corresponds to a request to display the control user interface includes a first press input on a first input region of the electronic device that is separate from the display of the device.

7022 Before displaying the first input that corresponds to a request to display the control user interface, displaying the first control in response to an initial portion of the first input, without displaying the second control and the third control.

7024 After the device is turned off in response to the second input, detect a third input on the first input region that corresponds to a request to turn on the device; and in response to detecting the third input, turn on the electronic device, without displaying the control user interface.

7026 After the device is turned off in response to the second input, detect a third input that corresponds to a request to turn on the device, wherein the third input is detected using an input device that is distinct from that used to detect the second input.

Figure 7C

DEVICES, METHODS, AND GRAPHICAL USER INTERFACES FOR INTERACTION WITH A CONTROL

PRIORITY CLAIM AND RELATED APPLICATION

This application claims the benefit of U.S. Provisional Application No. 62/855,982, filed Jun. 1, 2019, the content of which is incorporated by reference herein in its entirety.

TECHNICAL FIELD

This relates generally to electronic devices with displays and intensity-sensitive input regions, including but not limited to electronic devices with displays and intensity-sensitive off-display input regions.

BACKGROUND

Many electronic devices with displays include mechanical buttons, such as mechanical home buttons, volume buttons, and power buttons. But mechanical buttons provide little, if any, feedback to a user beyond a fixed down click and a fixed up click. Some devices have solid state buttons on the display-side of the devices to replace the mechanical buttons. A display-side solid state button is coupled with tactile output generators that generate tactile outputs to simulate various types of mechanical button clicks when the solid state button is activated by a press input. Display-side solid state buttons take up valuable space on the display-side of the device, reducing available display area for visual information on a portable electronic device. The cost for manufacturing and maintain mechanical buttons and solid state buttons are high and a high number of mechanical buttons and solid state buttons on the peripheral or back sides of the device separate from the display are undesirable (e.g., due to poor appearance, dust, moisture, and debris that tend to be trapped around the buttons, etc.).

Controls for device functions are frequently displayed on a touch-screen and adjusted based on touch inputs on the touch-screen. Multiple touch inputs are frequently required to bring a control onto the display, adjust the control, and dismiss the control. Interactions with these controls through a sequence of touch inputs can be complex, timing consuming and error prone. In addition, the controls on the touch-screens are often blocked by the fingers or other input elements when the fingers or input elements are used to manipulate the controls, resulting in user error and frustration.

SUMMARY

Accordingly, there is a need for electronic devices with improved methods and interfaces for interacting with a control (e.g., controls for device functions, such as volume, ringer, and power, etc.), and providing visual, haptic, and/or audio feedback during interaction with the control.

In some embodiments, an intensity-sensitive side button or surface (e.g., a mechanical button, solid state button, or a touch-sensitive surface) is provided separately from the display (e.g., on a side edge of the display) on the device. User inputs detected on the intensity-sensitive side button or surface are used in conjunction with user inputs detected on touch-screen to cause display, adjustment/activation, expansion, and dismissal of the control. The device provides visual feedback on the display in conjunction with haptic feedback on the intensity-sensitive side button or surface to help the user interact with the control more easily and more efficiently.

There is also a need for electronic devices to have fewer buttons on the surface of the device, to reduce device manufacturing and maintenance complexity and cost. In some embodiments, an on-display power button is provided in a control user interface that includes multiple other controls to allow the user to turn off the device without using a solid state or mechanical power button on the front, back, or sides of the display. This frees up the limited number of physical and/or solid state buttons available on the device for other more frequently accessed functionalities (e.g., volume control, ringer control, camera control, etc.). One or more of the limited number of physical and/or solid state buttons provided on the device is used to turn on the device, when other functionalities of the device are not yet needed or available. In other words, the functionalities of the limited number of physical and/or solid state buttons can be automatically differentiated when the device is off versus when the device is on, reducing the device complexity without reducing the device's functionality.

The methods and interfaces disclosed herein optionally complement or replace conventional methods for interacting with a control, controlling device functions, turning the device on and off, and providing feedback during interactions with the device. Such methods and interfaces reduce the number and extent of the inputs required from a user by helping the user to understand the connection between provided inputs and device responses to the inputs and reducing user input mistakes, thereby creating a more efficient human-machine interface.

The methods and user interfaces are optionally implemented on electronic devices with one or more intensity-sensitive input regions (e.g., off-display intensity-sensitive buttons or surfaces located on peripheral sides or back side of the device). In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, and a first input region that is separate from the display. The method includes: detecting a first press input on the first input region; in response to detecting the first press input on the first input region: in accordance with a determination that the first press input meets first criteria, displaying, on the display, a first control corresponding to a first control function of the device, wherein the first control is displayed with a first size and includes a value indicator to represent that a current value of the first control function of the device is a first value; after displaying the first control with the first size and the value indicator representing the first value of the first control function: in accordance with a determination that a subsequent press input has not been detected on the first input region within a threshold time from when the first press input was detected, ceasing to display the first control; and in accordance with a determination that a second press input has been detected on the first input region within the threshold time from when the first press input was detected: adjusting the current value of the first control function of the device from the first value to a second value that is different from the first value, wherein the second value is selected in accordance with the second press input; adjusting a size of the first control from the first size to a second size distinct from the first size; and changing an appearance of the value indicator in the first control to represent that the current value of the first control function is the second value.

In accordance with some embodiments, a method is performed at an electronic device with a touch-sensitive display. The method includes: detecting a first input that corresponds to a request to display a control user interface; in response to detecting the first input, displaying the control user interface, wherein displaying the control user interface includes concurrently displaying in the control user interface: a first control for selecting a value from a plurality of values for an output parameter of the device; a second control for switching between different modes of a first function of the device that are available while the device is on; and a third control that, when activated, initiates a process for turning the device off; while displaying the control user interface, detecting a second input directed to the control user interface; and in response to detecting the second input: in accordance with a determination that the second input is directed to the first control, adjusting a current value for the output parameter based on the second input; in accordance with a determination that the second input is directed to the second control and meets first input criteria, changing a current mode of the first function; in accordance with a determination that the second input is directed to the third control and meets second input criteria, initiating a process for turning off the device; and in accordance with a determination that the second input is directed to the third control and meets the first input criteria but does not meet the second input criteria, forgoing initiation of the process for turning off the device.

In accordance with some embodiments, an electronic device includes a display, a touch-sensitive surface, one or more intensity-sensitive input regions (e.g., side buttons), one or more sensors to detect intensities of contacts with the touch-sensitive surface and the input regions, optionally, one or more tactile output generators for generating localized tactile outputs at the input regions and/or whole device tactile outputs throughout multiple regions of the device, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, one or more intensity-sensitive input regions (e.g., side buttons), one or more sensors to detect intensities of contacts with the touch-sensitive surface and the input regions, and optionally, one or more tactile output generators for generating localized tactile outputs at the input regions and/or whole device tactile outputs throughout multiple regions of the device, cause the device to perform or cause performance of the operations of any of the methods described herein. In accordance with some embodiments, a graphical user interface on an electronic device with a display, a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device; and means for performing or causing performance of the operations of any of the methods described herein. In accordance with some embodiments, an information processing apparatus, for use in an electronic device with a display and a touch-sensitive surface, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, includes means for performing or causing performance of the operations of any of the methods described herein.

Thus, electronic devices with displays, touch-sensitive surfaces, one or more intensity-sensitive input regions (e.g., side buttons), one or more sensors to detect intensities of contacts with the touch-sensitive surface, optionally, one or more tactile output generators for generating localized tactile outputs at the input regions and/or whole device tactile outputs throughout multiple regions of the device, optionally one or more device orientation sensors, and optionally an audio system, are provided with improved methods and interfaces for providing feedback to a user during interaction with an off-display input region, thereby increasing the effectiveness, efficiency, and user satisfaction with such devices. Such methods and interfaces may complement or replace conventional methods for facilitating interactions with the device and providing haptic feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates a multifunction device with a touch-sensitive surface that is separate from the display in accordance with some embodiments.

FIGS. 4H-4J illustrate example haptic audio output patterns versus time that are used in conjunction with tactile outputs to simulate button clicks in accordance with some embodiments.

FIGS. 5A1-5A41 illustrate exemplary user interfaces for interacting with a control (e.g., a volume control, and/or a ringer status control) in accordance with some embodiments.

FIGS. 5B1-5B24 illustrate exemplary user interfaces for powering on and off a device in accordance with some embodiments.

FIGS. 6A-6I are flow diagrams illustrating a method of interacting with a control for a device function in accordance with some embodiments.

FIGS. 7A-7C are flow diagrams illustrating a method of interacting with controls in a control user interface, including a control for turning off the device, in accordance with some embodiments.

DESCRIPTION OF EMBODIMENTS

Figure 1A:
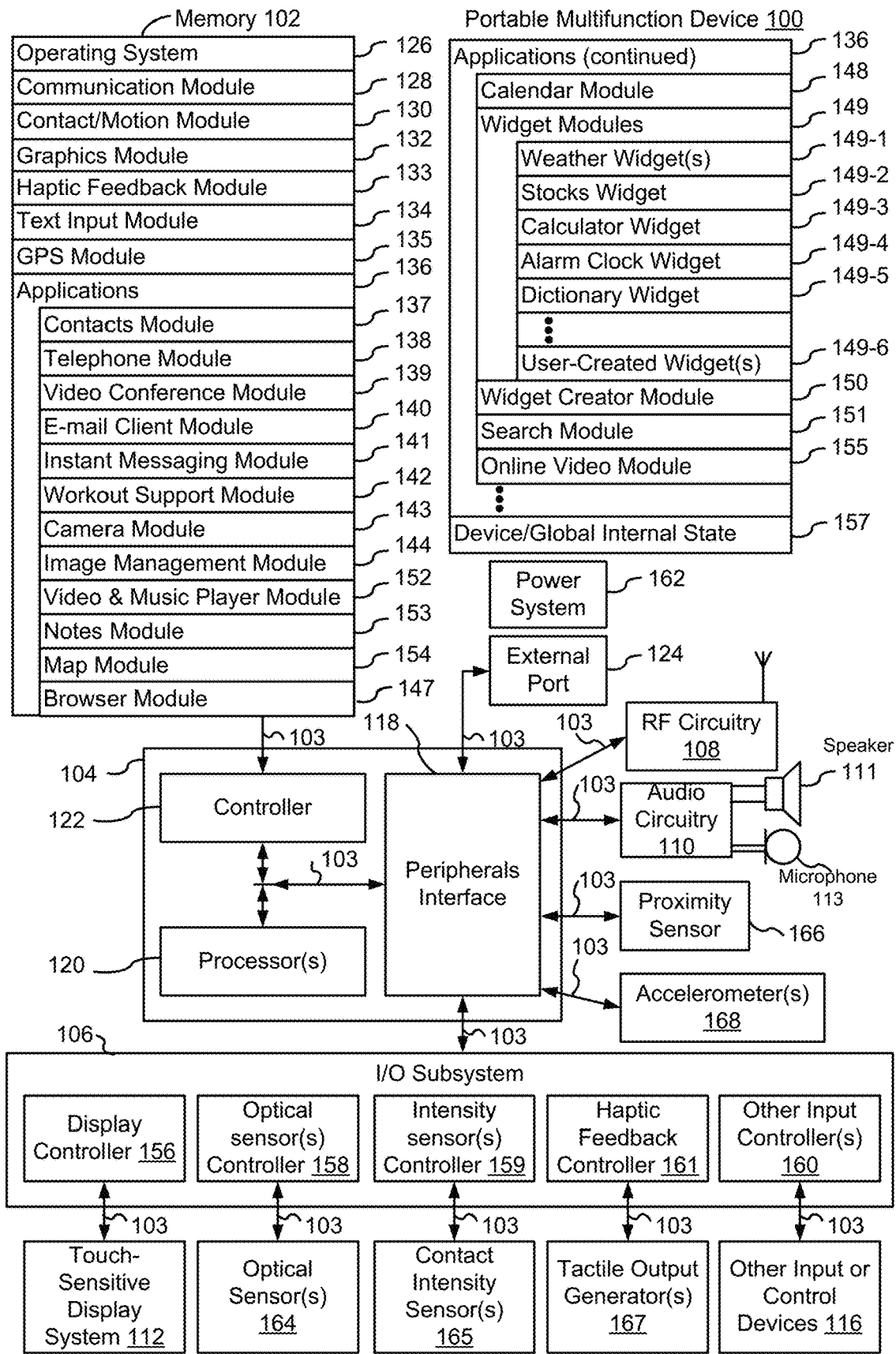
FIG. 1A is a block diagram illustrating a portable multifunction device with a touch-sensitive display in accordance with some embodiments.

The methods, devices, and GUIs described herein providing novel and improved ways of interacting with a control for a device function and using haptic and visual feedback to improve device-user interactions. In some embodiments, a press input on an input region separate from the display (e.g., an intensity-sensitive side button of the device) causes the control to be presented with a first appearance without altering a current value of the control; and a subsequent press input, if detected within a threshold amount of time of the first press input, causes the value of the control to be altered in accordance with the subsequent press input in conjunction with a change in appearance of the control. In some embodiments, a control for turning the device off is provided in a control user interface concurrently with a plurality of other controls. The criteria for activating the control for turning off the device are distinct from the criteria used for activating other types of controls that control various device functions while the device is on. Other details of the methods, devices, and GUIs are described with respect to FIGS. 5A1-5A41 and 5B1-5B24, and FIGS. 6A-6I and 7A-7C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display, a touch-sensitive surface, and one or more off-display intensity-sensitive input regions is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface or the one or more intensity-sensitive off-display input regions. One or more functions of the touch-sensitive surface as well as corresponding information displayed on the device are, optionally, adjusted and/or varied from one application to the next and/or within a respective application. In this way, a common physical architecture (such as the touch-sensitive surface or intensity-sensitive off-display input regions) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display, a trackpad, an intensity-sensitive side button, or a solid state button) is, optionally, interpreted by the user as a "down click" or "up click" of a physical actuator button, a "detent" of a physical scroll-wheel or dial, and/or a "snap" of a mechanical switch or toggle, etc. In some cases, a user will feel a tactile sensation, such as an "down click" or "up click", a "detent", or a "snap", even when there is no movement of an input region that is physically pressed or swiped by the user's finger movements, before the movement of the input region is detected, and/or when the movement of the input region is drastically different from the movement that a physical mechanical button, scroll-wheel or dial, or switch would undergo to produce the tactile sensations that the user perceives through the input region. As another example, movement of the touch-sensitive surface (e.g., a touch-sensitive display, a trackpad, an intensity-sensitive side button, or a solid state button) is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness", "detent", or "flip and snap of a toggle or switch"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, the mode of motion of the tactile output (e.g., linear oscillations in x direction, y-direction, or z-direction; or angular oscillations around x-axis, y-axis, or z-axis, etc.), and/or the duration of the tactile output.

When tactile outputs with different tactile output patterns are generated by a device, the tactile outputs may invoke different haptic sensations in a user holding or touching the device and/or the input region. The device optionally includes one or more whole device tactile output generators (e.g., a moveable mass that is coupled to the housing of the device) to generate tactile outputs at many different locations on the device at the same time. The device may also include one or more localized tactile output generators (e.g., a surface oscillator that oscillates or vibrates around a fixed pivot in various directions underneath the input region or other tactile output generator that is capable of generating tactile outputs that are directed specifically toward the input region) to generate localized tactile outputs. The localized vibrations have varying amplitudes at different locations on the device with greater amplitudes on the input region or a sub-portion thereof where a user's finger will typically rest while interacting with the input region and with lower amplitudes at other places (e.g., outside of the input region) where a user's hand will not typically rest while interacting with the input region.

While the sensation of the user is based on the user's perception of the tactile output, most users will be able to identify changes in waveform, frequency, mode of motion, and amplitude of tactile outputs generated by the device. Thus, the waveform, frequency, mode of motion, and amplitude can be adjusted to indicate to the user that different types of inputs have been detected on the input region (e.g., an intensity-sensitive side button, a solid state button, a touch pad, or a touch-screen), and/or different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device.

Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device. In some embodiments, an accompanying audio enhances the effect of the tactile output and makes the haptic sensation experienced by a user more salient and/or realistic. The tactile output profile of a tactile output is optionally extended to include an audio profile for an accompanying audio output that is generated to supplement the tactile output. The audio profile for an accompanying audio output of a tactile output includes characteristics of the audio output such as timing (e.g., timing offsets from the corresponding tactile output), amplitude (e.g., amplitude specified in predefined values or a ratio or correlation between the amplitude of the audio output and one or more characteristics of the tactile output), frequency (e.g., frequency specified in predefined values or in terms of a relationship with one or more characteristics of the tactile output), shape of a waveform (e.g., a predefined waveform or a waveform specified in terms of a relationship with one or more characteristics of the tactile output). The accompany audio output for a tactile output is distinct from regular device audio output (e.g., audio alerts or media output generated by the device independent of generation of a tactile output).

In some embodiments, multiple different tactile output generators (e.g., whole device tactile output generators, and/or localized tactile output generators located at different locations on the device) coordinate their individual outputs (e.g., with timing coordination, amplitude coordination, and wave pattern coordination, or a combination of the above) to convey a sense of direction around the device (e.g., up, down, left, right, front, back, clockwise, counter-clockwise, etc.), which further enhance a user's experience when the user interacts with a user interface and/or the device, and facilitate better conveyance of information regarding the state of the user interface and/or the device, and which reduce input errors and increase the efficiency of the user's operation of the device. In some embodiments, the tactile output profile of a tactile output to be generated by a respective tactile output generator is extended to identify other tactile output generators and specify the respective manner by which the respective tactile output generator will coordinate with these other tactile output generators to generate coordinated tactile outputs for a respective purpose (e.g., indicate a direction to a user).

Figure 4A:
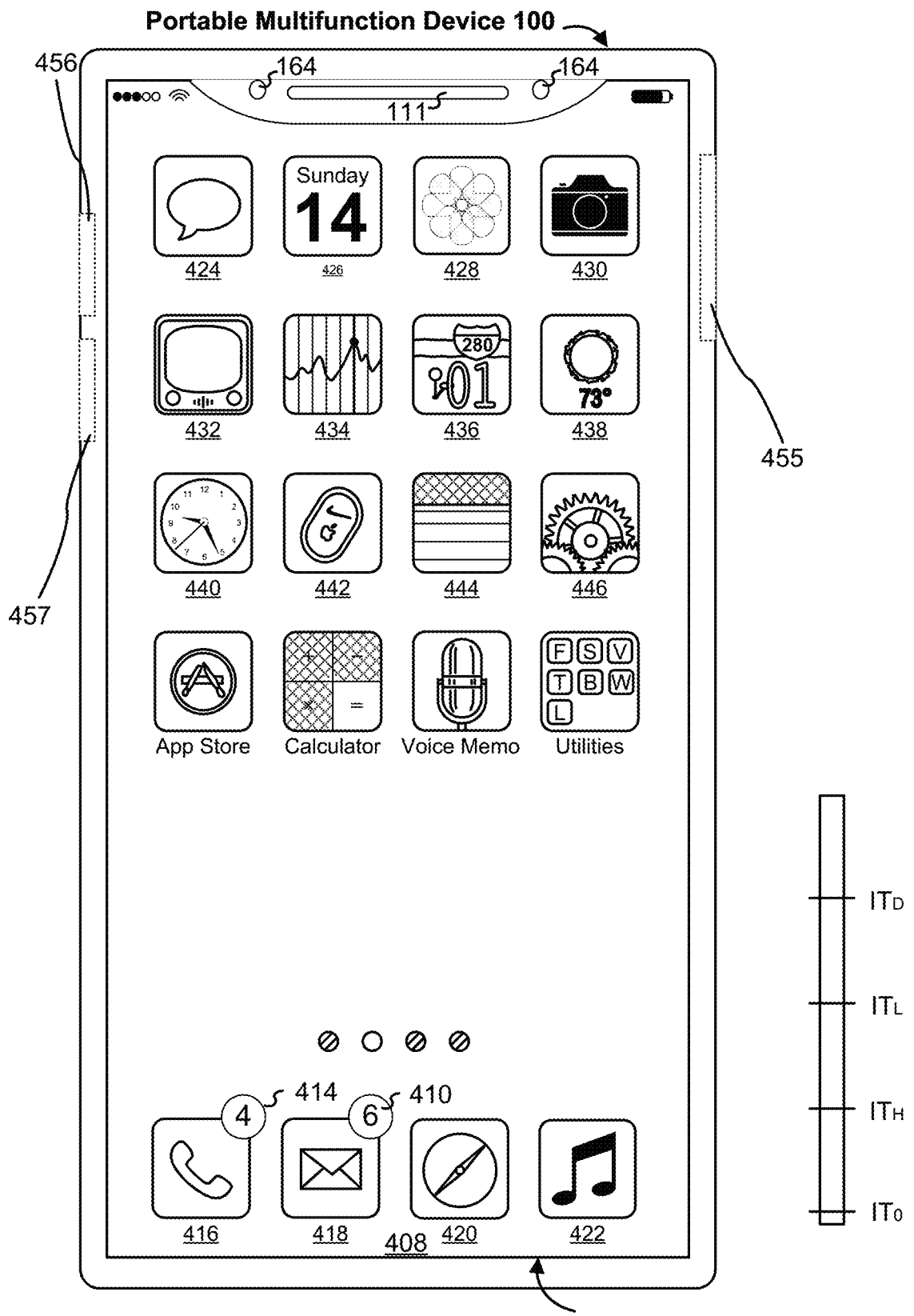
FIG. 4A illustrates a portable multifunction device with one or more intensity-sensitive off-display input regions on one or more peripheral sides of the device, and a touch-screen display showing an example home screen user interface with a menu of application launch icons corresponding to different applications, in accordance with some embodiments.
Figure 4C:
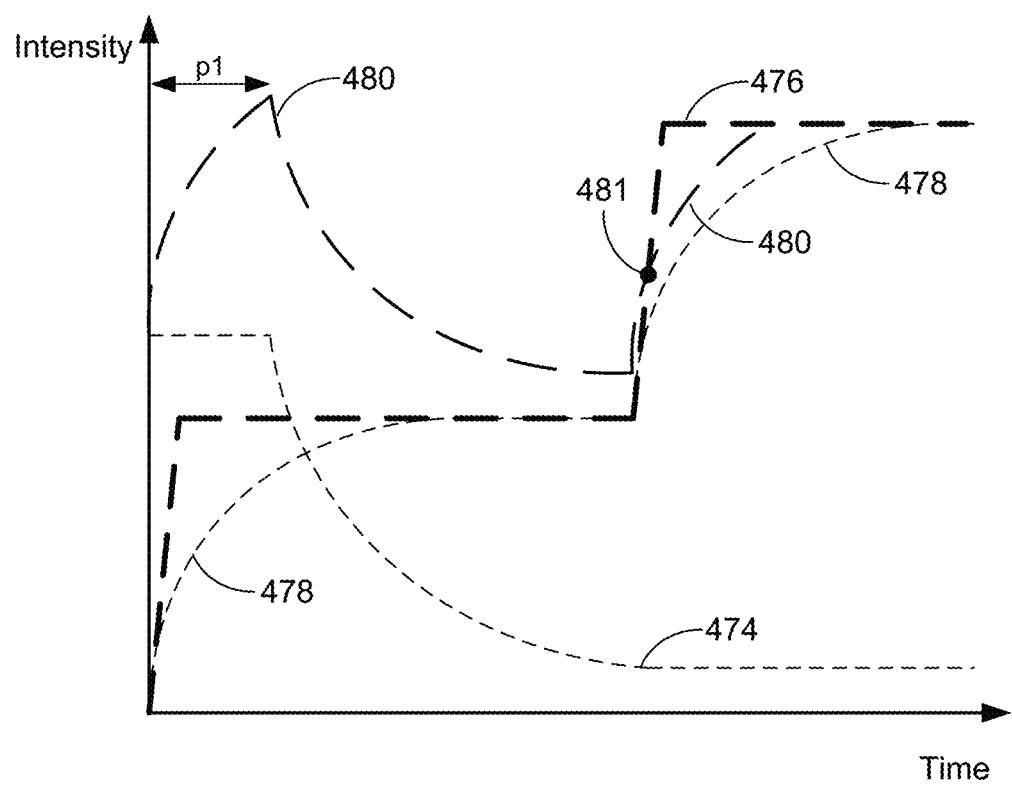
FIGS. 4C-4E illustrate examples of dynamic intensity thresholds in accordance with some embodiments.
Figure 4D:
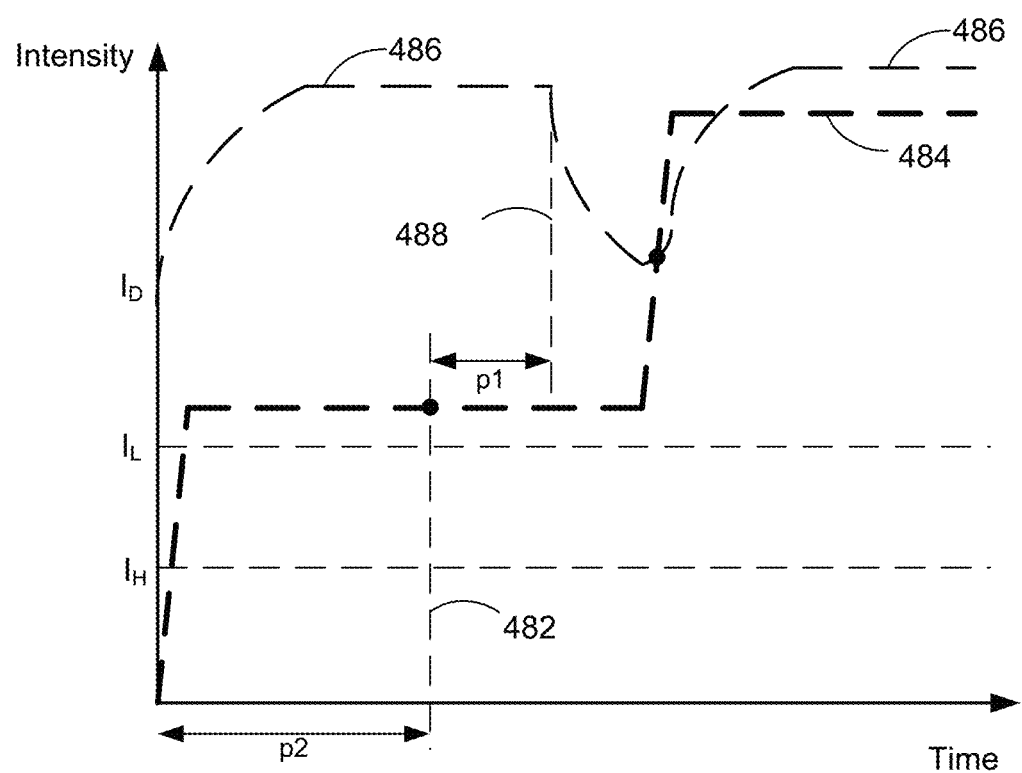
Figure 4E:
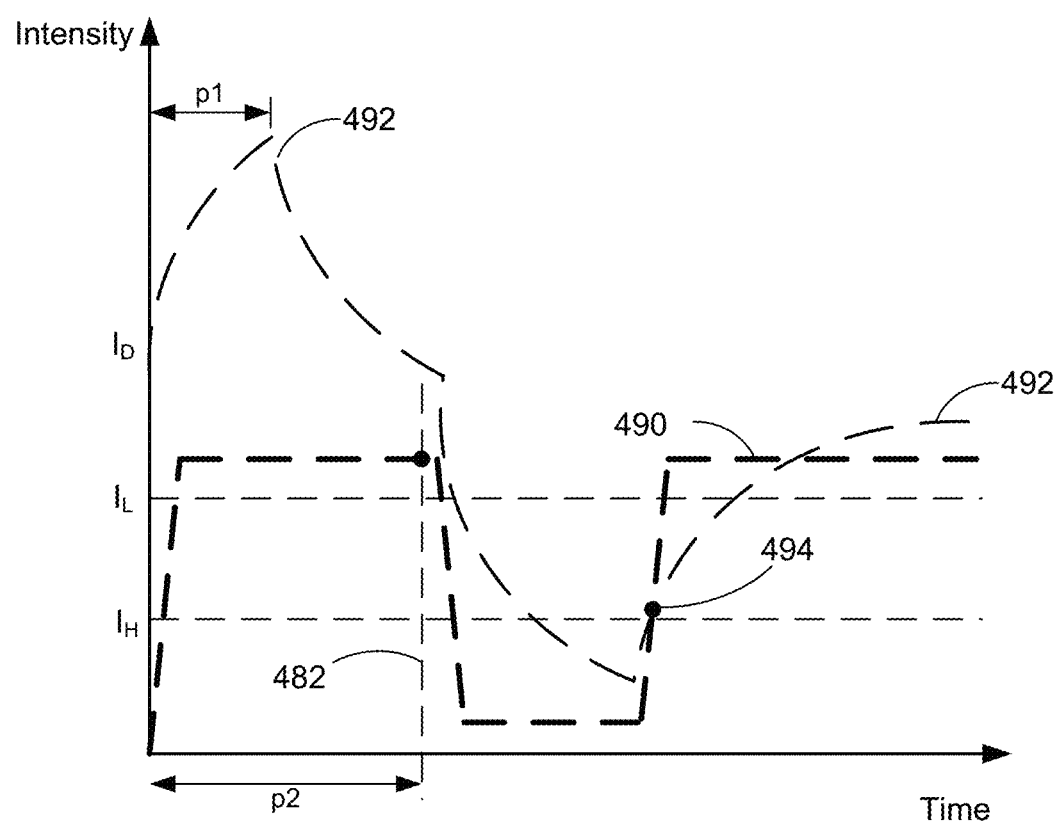
Figure 4F:
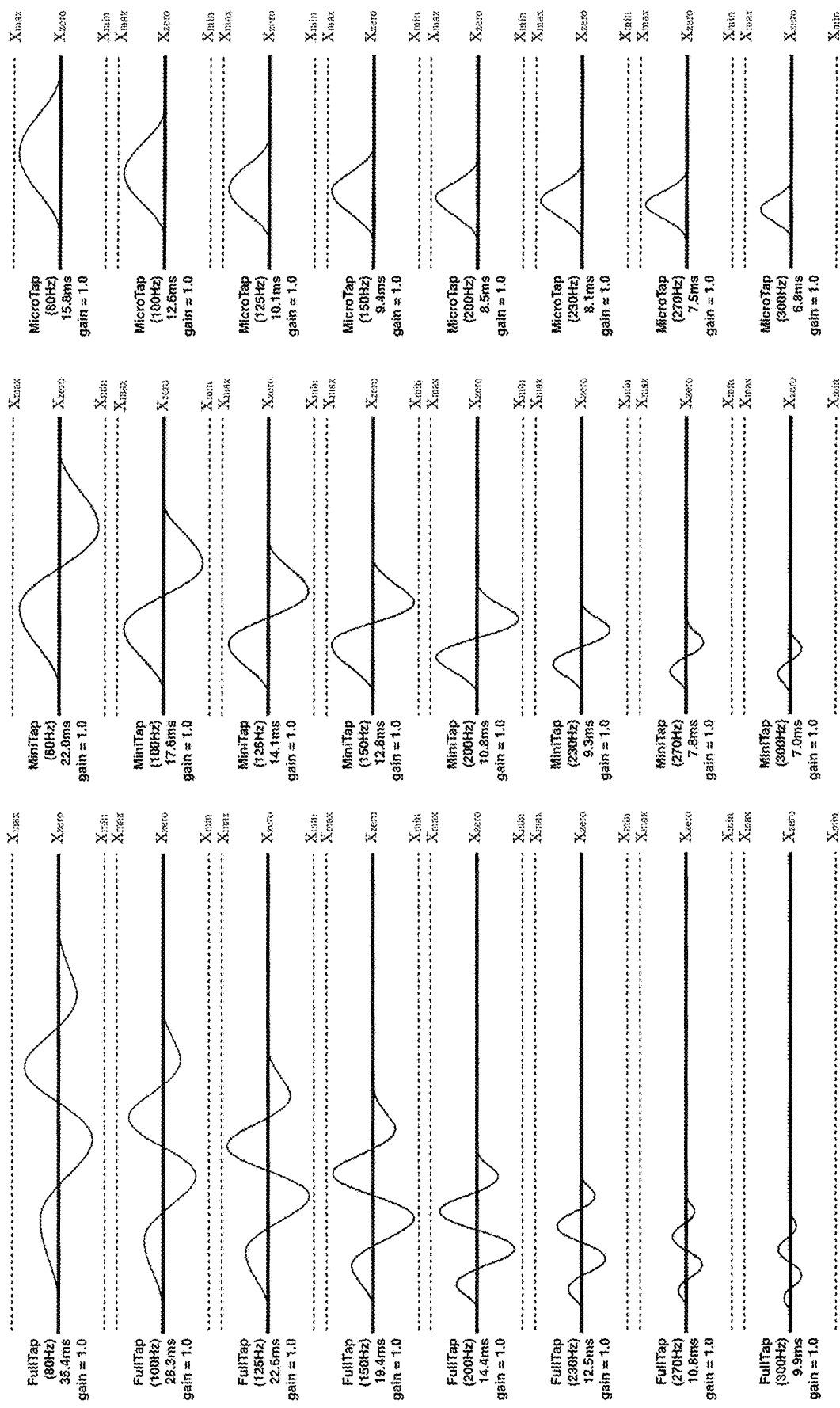
FIGS. 4F-4G illustrate a set of sample tactile output patterns in accordance with some embodiments.
Figure 4G:
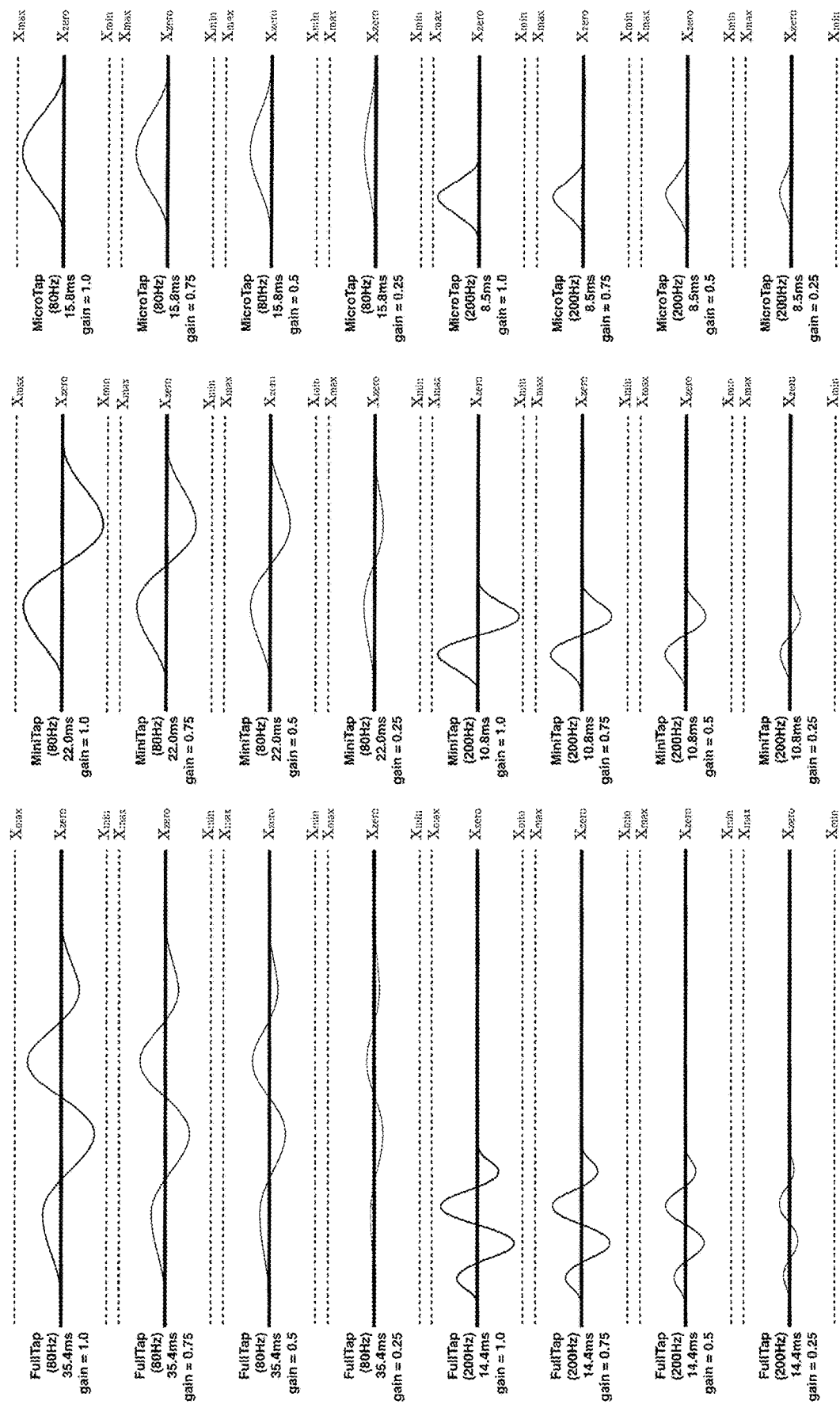

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., xzero) versus time that a moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4G include xmin and xmax values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in I dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

FIGS. 4H-4J illustrate example haptic audio output patterns versus time that are used in conjunction with tactile outputs to simulate button clicks in accordance with some embodiments.

Figure 4K:
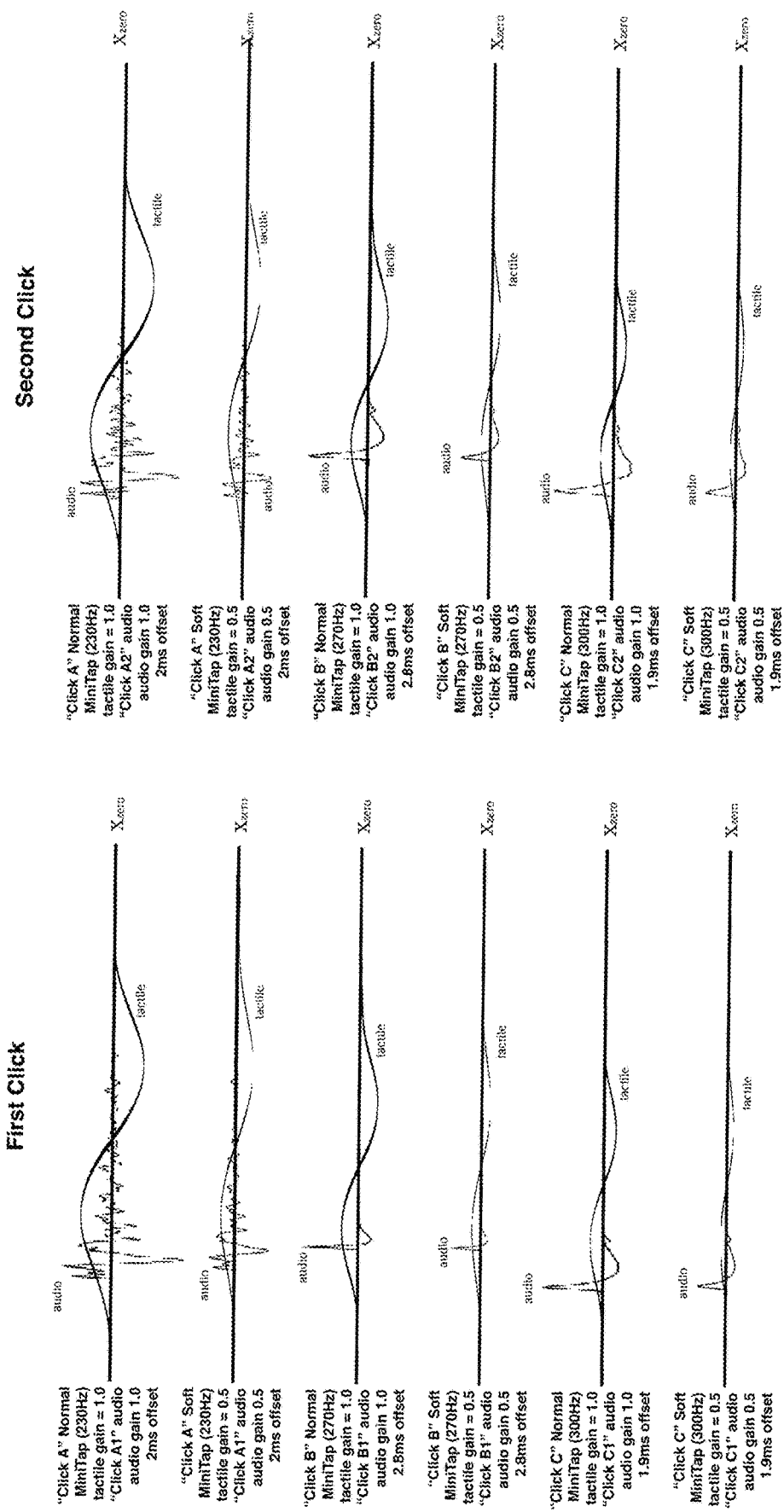
FIG. 4K illustrates example combinations of tactile output patterns and haptic audio output patterns versus time in accordance with some embodiments.
Figure 6I:
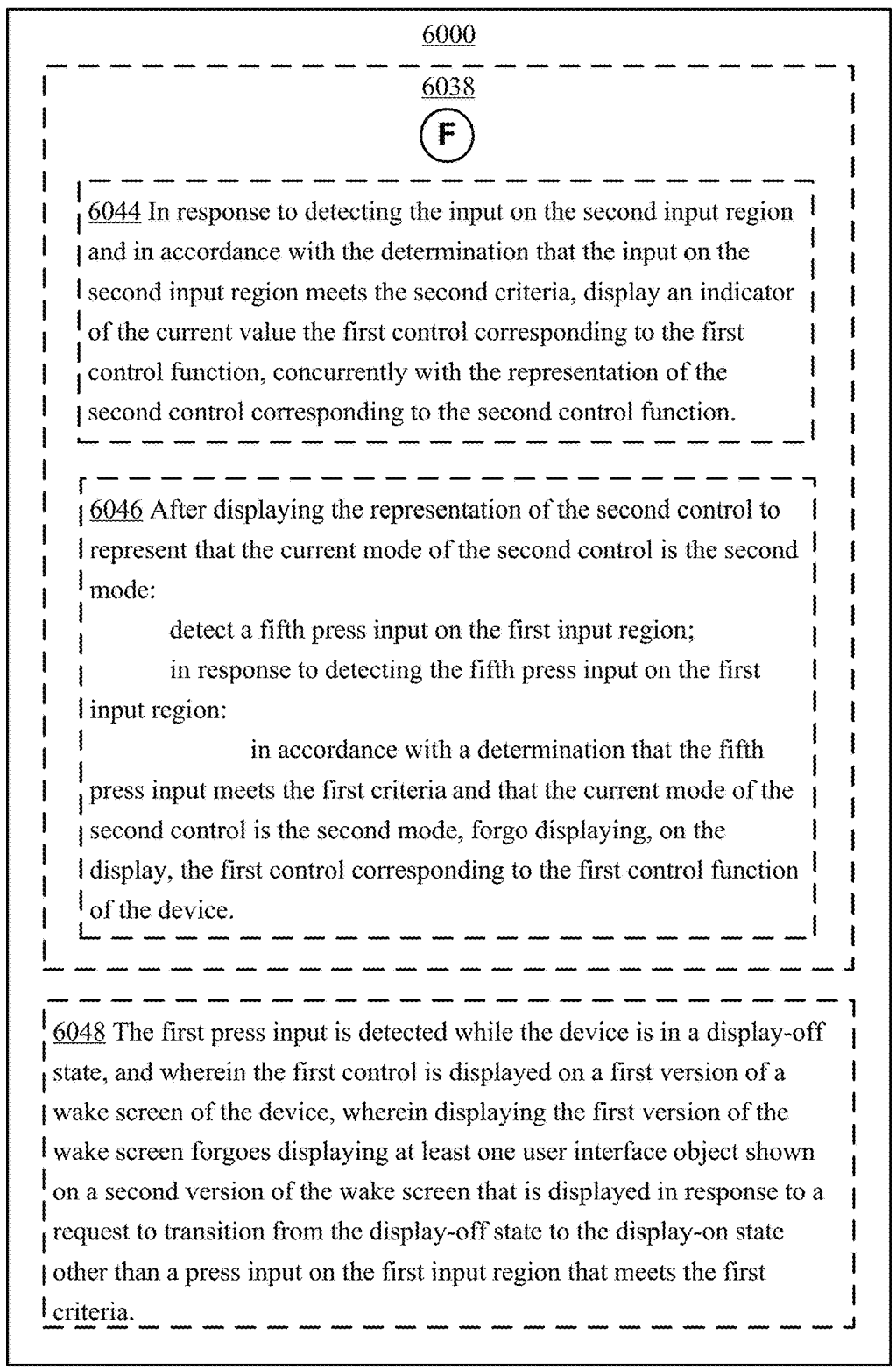

FIG. 4K illustrates example combinations of tactile output patterns and haptic audio output patterns versus time in accordance with some embodiments.

In FIG. 4H, the top haptic audio pattern "Click A1 audio" is audio output that is played conjunction with "Click A" Normal MiniTap (230 Hz) to simulate a first down-click in a "normal" first click, as shown in FIG. 4K (first row in the First Click column), where the rate of change of intensity of a contact at a control activation threshold is above a threshold rate of change (e.g., the contact is making a "normal" hard/fast press). In this example, "Click A1 audio" is offset from the start of the "Click A" Normal MiniTap (230 Hz)

tactile output by 2 ms. In some cases, the same "Click A1 audio" and "Click A" Normal MiniTap (230 Hz) are played to simulate the first up-click that follows the first down-click. In some cases, the gain of the "Click A1 audio" and/or "Click A" Normal MiniTap (230 Hz) are reduced (e.g., by 50%) in the up-click relative to the preceding down-click.

The top haptic audio pattern "Click A1 audio" is also played in conjunction with "Click A" Soft MiniTap (230 Hz) to simulate a first down-click in a "soft" first click, as shown in FIG. 4K (second row in the First Click column), where the rate of change of intensity of a contact at a control activation threshold is below a threshold rate of change (e.g., the contact is making a "soft" and/or slow press). To simulate a "soft" down-click, the gain of the "Click A1 audio" and "Click A" Soft MiniTap (230 Hz) are reduced (e.g., by 50%) in the "soft" down-click relative to the "normal" down-click. In this example, "Click A1 audio" is offset from the start of the "Click A" Soft MiniTap (230 Hz) tactile output by 2 ms. In some cases, the same "Click A1 audio" and "Click A" Soft MiniTap (230 Hz) are played to simulate the first up-click that follows the first down-click. In some cases, the gain of the "Click A1 audio" and/or "Click A" Soft MiniTap (230 Hz) are reduced (e.g., by 50%) in the up-click relative to the preceding down-click.

In FIG. 4H, the bottom haptic audio pattern "Click A2 audio" is audio output that is played conjunction with "Click A" Normal MiniTap (230 Hz) to simulate a second down-click in a "normal" second click that follows the first click within a predetermined period of time (e.g., as the second click in a double click input), as shown in FIG. 4K (first row in the Second Click column), where the rate of change of intensity of a contact at a control activation threshold is above a threshold rate of change (e.g., the contact in the second click is making a "normal" hard/fast press). In this example, "Click A2 audio" is offset from the start of the "Click A" Normal MiniTap (230 Hz) tactile output by 2 ms. In some cases, the same "Click A2 audio" and "Click A" Normal MiniTap (230 Hz) are played to simulate the second up-click that follows the second down-click. In some cases, the gain of the "Click A2 audio" and/or "Click A" Normal MiniTap (230 Hz) are reduced (e.g., by 50%) in the second up-click relative to the preceding second down-click.

The bottom haptic audio pattern "Click A2 audio" is also played in conjunction with "Click A" Soft MiniTap (230 Hz) to simulate a second down-click in a "soft" second click that follows the first click within a predetermined period of time (e.g., as the second click in a double click input), as shown in FIG. 4K (second row in the Second Click column), where the rate of change of intensity of a contact at a control activation threshold is below a threshold rate of change (e.g., the contact is making a "soft" and/or slow press). To simulate a "soft" down-click, the gain of the "Click A2 audio" and "Click A" Soft MiniTap (230 Hz) are reduced (e.g., by 50%) in the "soft" down-click relative to the "normal" down-click. In this example, "Click A2 audio" is offset from the start of the "Click A" Soft MiniTap (230 Hz) tactile output by 2 ms. In some cases, the same "Click A2 audio" and "Click A" Soft MiniTap (230 Hz) are played to simulate the second up-click that follows the second down-click. In some cases, the gain of the "Click A2 audio" and/or "Click A" Soft MiniTap (230 Hz) are reduced (e.g., by 50%) in the second up-click relative to the preceding second down-click.

In FIG. 4I, the top haptic audio pattern "Click B1 audio" is audio output that is played conjunction with "Click B" Normal MiniTap (270 Hz) to simulate a first down-click in a "normal" first click, as shown in FIG. 4K (third row in the First Click column), where the rate of change of intensity of a contact at a control activation threshold is above a threshold rate of change (e.g., the contact is making a "normal" hard/fast press). In this example, "Click B1 audio" is offset from the start of the "Click B" Normal MiniTap (270 Hz) tactile output by 2.8 ms. In some cases, the same "Click B1 audio" and "Click B" Normal MiniTap (270 Hz) are played to simulate the first up-click that follows the first down-click. In some cases, the gain of the "Click B1 audio" and/or "Click B" Normal MiniTap (270 Hz) are reduced (e.g., by 50%) in the up-click relative to the preceding down-click.

The top haptic audio pattern "Click B1 audio" is also played in conjunction with "Click B" Soft MiniTap (270 Hz) to simulate a first down-click in a "soft" first click, as shown in FIG. 4K (fourth row in the First Click column), where the rate of change of intensity of a contact at a control activation threshold is below a threshold rate of change (e.g., the contact is making a "soft" and/or slow press). To simulate a "soft" down-click, the gain of the "Click B1 audio" and "Click B" Soft MiniTap (270 Hz) are reduced (e.g., by 50%) in the "soft" down-click relative to the "normal" down-click. In this example, "Click B1 audio" is offset from the start of the "Click B" Soft MiniTap (270 Hz) tactile output by 2.8 ms. In some cases, the same "Click B1 audio" and "Click B" Soft MiniTap (270 Hz) are played to simulate the first up-click that follows the first down-click. In some cases, the gain of the "Click B1 audio" and/or "Click B" Soft MiniTap (230 Hz) are reduced (e.g., by 50%) in the up-click relative to the preceding down-click.

In FIG. 4I, the bottom haptic audio pattern "Click B2 audio" is audio output that is played conjunction with "Click B" Normal MiniTap (270 Hz) to simulate a second down-click in a "normal" second click that follows the first click within a predetermined period of time (e.g., as the second click in a double click input), as shown in FIG. 4K (third row in the Second Click column), where the rate of change of intensity of a contact at a control activation threshold is above a threshold rate of change (e.g., the contact in the second click is making a "normal" hard/fast press). In this example, "Click B2 audio" is offset from the start of the "Click B" Normal MiniTap (270 Hz) tactile output by 2.8 ms. In some cases, the same "Click B2 audio" and "Click B" Normal MiniTap (230 Hz) are played to simulate the second up-click that follows the second down-click. In some cases, the gain of the "Click B2 audio" and/or "Click B" Normal MiniTap (270 Hz) are reduced (e.g., by 50%) in the second up-click relative to the preceding second down-click.

The bottom haptic audio pattern "Click B2 audio" is also played in conjunction with "Click B" Soft MiniTap (270 Hz) to simulate a second down-click in a "soft" second click that follows the first click within a predetermined period of time (e.g., as the second click in a double click input), as shown in FIG. 4K (fourth row in the Second Click column), where the rate of change of intensity of a contact at a control activation threshold is below a threshold rate of change (e.g., the contact is making a "soft" and/or slow press). To simulate a "soft" down-click, the gain of the "Click B2 audio" and "Click B" Soft MiniTap (270 Hz) are reduced (e.g., by 50%) in the "soft" down-click relative to the "normal" down-click. In this example, "Click B2 audio" is offset from the start of the "Click B" Soft MiniTap (270 Hz) tactile output by 2.8 ms. In some cases, the same "Click B2 audio" and "Click B" Soft MiniTap (270 Hz) are played to simulate the second up-click that follows the second down-click. In some cases, the gain of the "Click B2 audio" and/or "Click B" Soft MiniTap (270 Hz) are reduced (e.g., by 50%) in the second up-click relative to the preceding second down-click.

In FIG. 4J, the top haptic audio pattern "Click C1 audio" is audio output that is played conjunction with "Click C" Normal MiniTap (300 Hz) to simulate a first down-click in a "normal" first click, as shown in FIG. 4K (fifth row in the First Click column), where the rate of change of intensity of a contact at a control activation threshold is above a threshold rate of change (e.g., the contact is making a "normal" hard/fast press). In this example, "Click C1 audio" is offset from the start of the "Click C" Normal MiniTap (300 Hz) tactile output by 1.9 ms. In some cases, the same "Click C1 audio" and "Click C" Normal MiniTap (300 Hz) are played to simulate the first up-click that follows the first down-click. In some cases, the gain of the "Click C1 audio" and/or "Click C" Normal MiniTap (300 Hz) are reduced (e.g., by 50%) in the up-click relative to the preceding down-click.

The top haptic audio pattern "Click C1 audio" is also played in conjunction with "Click C" Soft MiniTap (300 Hz) to simulate a first down-click in a "soft" first click, as shown in FIG. 4K (sixth row in the First Click column), where the rate of change of intensity of a contact at a control activation threshold is below a threshold rate of change (e.g., the contact is making a "soft" and/or slow press). To simulate a "soft" down-click, the gain of the "Click C1 audio" and "Click C" Soft MiniTap (300 Hz) are reduced (e.g., by 50%) in the "soft" down-click relative to the "normal" down-click. In this example, "Click C1 audio" is offset from the start of the "Click C" Soft MiniTap (300 Hz) tactile output by 1.9 ms. In some cases, the same "Click C1 audio" and "Click C" Soft MiniTap (270 Hz) are played to simulate the first up-click that follows the first down-click. In some cases, the gain of the "Click C1 audio" and/or "Click C" Soft MiniTap (300 Hz) are reduced (e.g., by 50%) in the up-click relative to the preceding down-click.

In FIG. 4J, the bottom haptic audio pattern "Click C2 audio" is audio output that is played conjunction with "Click C" Normal MiniTap (300 Hz) to simulate a second down-click in a "normal" second click that follows the first click within a predetermined period of time (e.g., as the second click in a double click input), as shown in FIG. 4K (fifth row in the Second Click column), where the rate of change of intensity of a contact at a control activation threshold is above a threshold rate of change (e.g., the contact in the second click is making a "normal" hard/fast press). In this example, "Click C2 audio" is offset from the start of the "Click C" Normal MiniTap (300 Hz) tactile output by 1.9 ms. In some cases, the same "Click C2 audio" and "Click C" Normal MiniTap (300 Hz) are played to simulate the second up-click that follows the second down-click. In some cases, the gain of the "Click C2 audio" and/or "Click C" Normal MiniTap (300 Hz) are reduced (e.g., by 50%) in the second up-click relative to the preceding second down-click.

The bottom haptic audio pattern "Click C2 audio" is also played in conjunction with "Click C" Soft MiniTap (300 Hz) to simulate a second down-click in a "soft" second click that follows the first click within a predetermined period of time (e.g., as the second click in a double click input), as shown in FIG. 4K (sixth row in the Second Click column), where the rate of change of intensity of a contact at a control activation threshold is below a threshold rate of change (e.g., the contact is making a "soft" and/or slow press). To simulate a "soft" down-click, the gain of the "Click C2 audio" and "Click C" Soft MiniTap (300 Hz) are reduced (e.g., by 50%) in the "soft" down-click relative to the "normal" down-click. In this example, "Click C2 audio" is offset from the start of the "Click C" Soft MiniTap (300 Hz) tactile output by 1.9 ms. In some cases, the same "Click C2 audio" and "Click C" Soft MiniTap (300 Hz) are played to simulate the second up-click that follows the second down-click. In some cases, the gain of the "Click C2 audio" and/or "Click C" Soft MiniTap (300 Hz) are reduced (e.g., by 50%) in the second up-click relative to the preceding second down-click.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

In some embodiments, in addition to the touch screen and/or touchpad, device 100 optionally include one or more off-display touch-sensitive input regions that are separate from the touch-screen and/or touch pad. In some embodiments, the off-display touch-sensitive input regions are positioned on one or more peripheral-sides of the device that is adjacent to the display-side of the device. A touch-sensitive surface of the touch-sensitive input regions are optionally perpendicular to the display of the device. In some embodiments, in addition to being able to detect different levels of intensity of a contact with the input region, the input region is also configured to detect movement in one or more directions across the surface of the input region. In some embodiments, the device will recognize different types of inputs (e.g., tap inputs, press inputs, scroll inputs, and toggle inputs) on the input region based on the duration, movement direction and intensity of the contact detected on the input region, and the device will generate localized tactile outputs at the input region to simulate the haptic feedback provided by a mechanical input device, such as a switch, a slider, a dial, a wheel, or a button. In some embodiments, the off-display touch-sensitive input region is distinct in nature from a touchpad in that, the location and movement of a contact on the off-display touch-sensitive input region does not directly correspond to a location and movement of a focus selector on the display in the manner that the location and movement of a contact on the touchpad would correspond to a location and movement of a focus selector on the display. In fact, frequently, a focus selector is not displayed or required on the display when an off-display input region is used by a user to interact with the device and manipulate a user interface shown on the display. In many cases, the focus of an input on the input region is preset to a location, an object, or a function prior to detection of the input on the input region, and/or based on the type of the input that is detected, as opposed to an exact location of a contact detected on the input region. In some embodiments, the off-display input regions are implemented by mechanical buttons, or solid state buttons that respond to physical inputs (e.g., tap, press, swipe, flick, toggle, and touch-hold inputs) provided by a finger or stylus.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. In some embodiments, the power system is configured to receive instructions corresponding to one or more inputs detected on the touch-screen display of the device at a location that corresponds to a displayed power button (e.g., power button 5108 (and user interface objects 5126, 5136 associated with power button 5108, as shown in FIGS. 5B4-5B21) of the device, and initiate a process for turning off the device and ultimately turn off the device. In addition, the power system is configured to receive instructions corresponding to one or more inputs detected on the intensity-sensitive side button of the device (e.g., one or more of input regions 5100, 5010, 5004, 5006, 5008, etc. in FIGS. 5A1 and 5B1) while the device is turned off, to initiate a process for turning on the device and ultimately turn on the device.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136.

Figure 3:
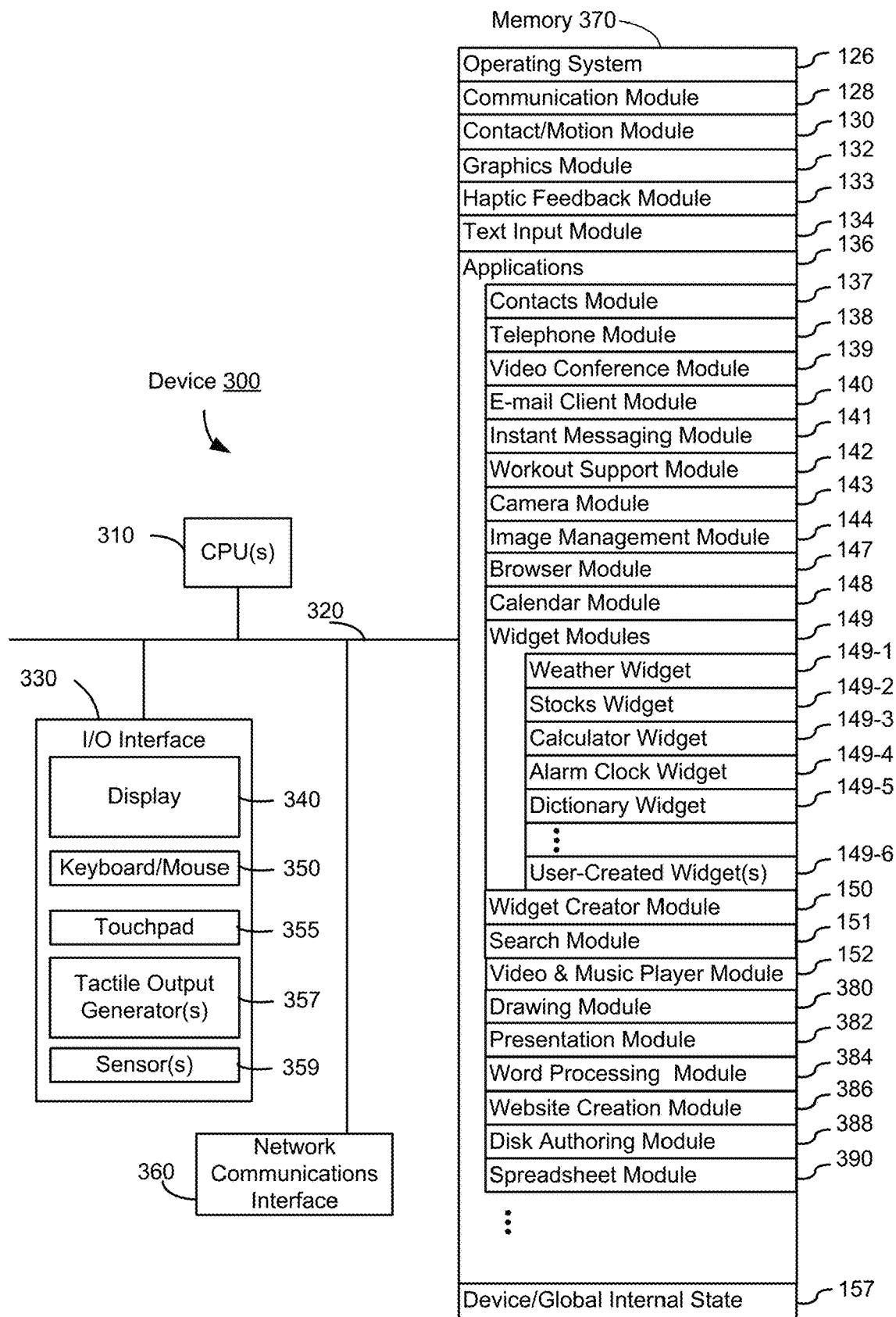
FIG. 3 is a block diagram of an example multifunction device with a display and a touch-sensitive surface in accordance with some embodiments.

Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
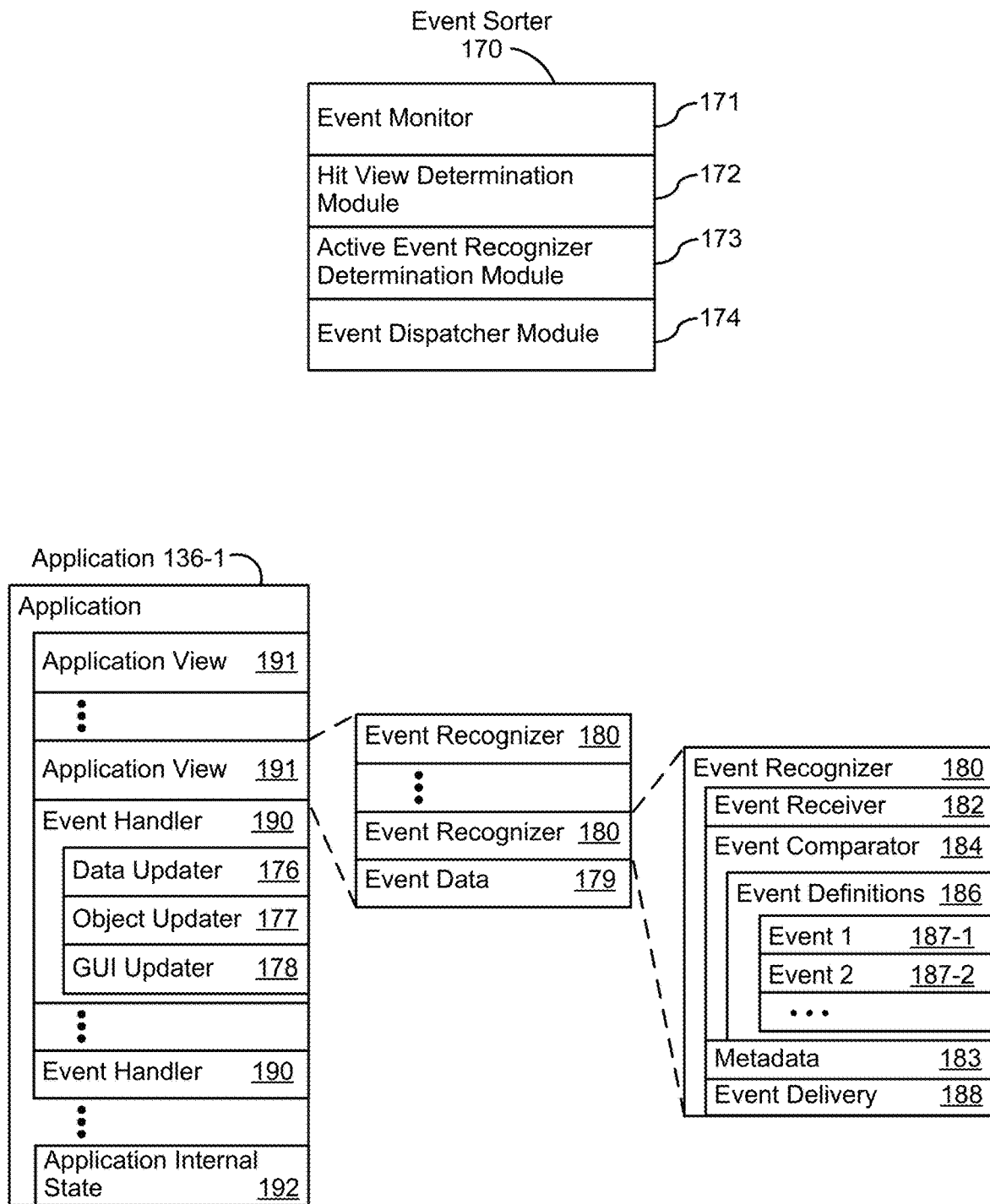
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
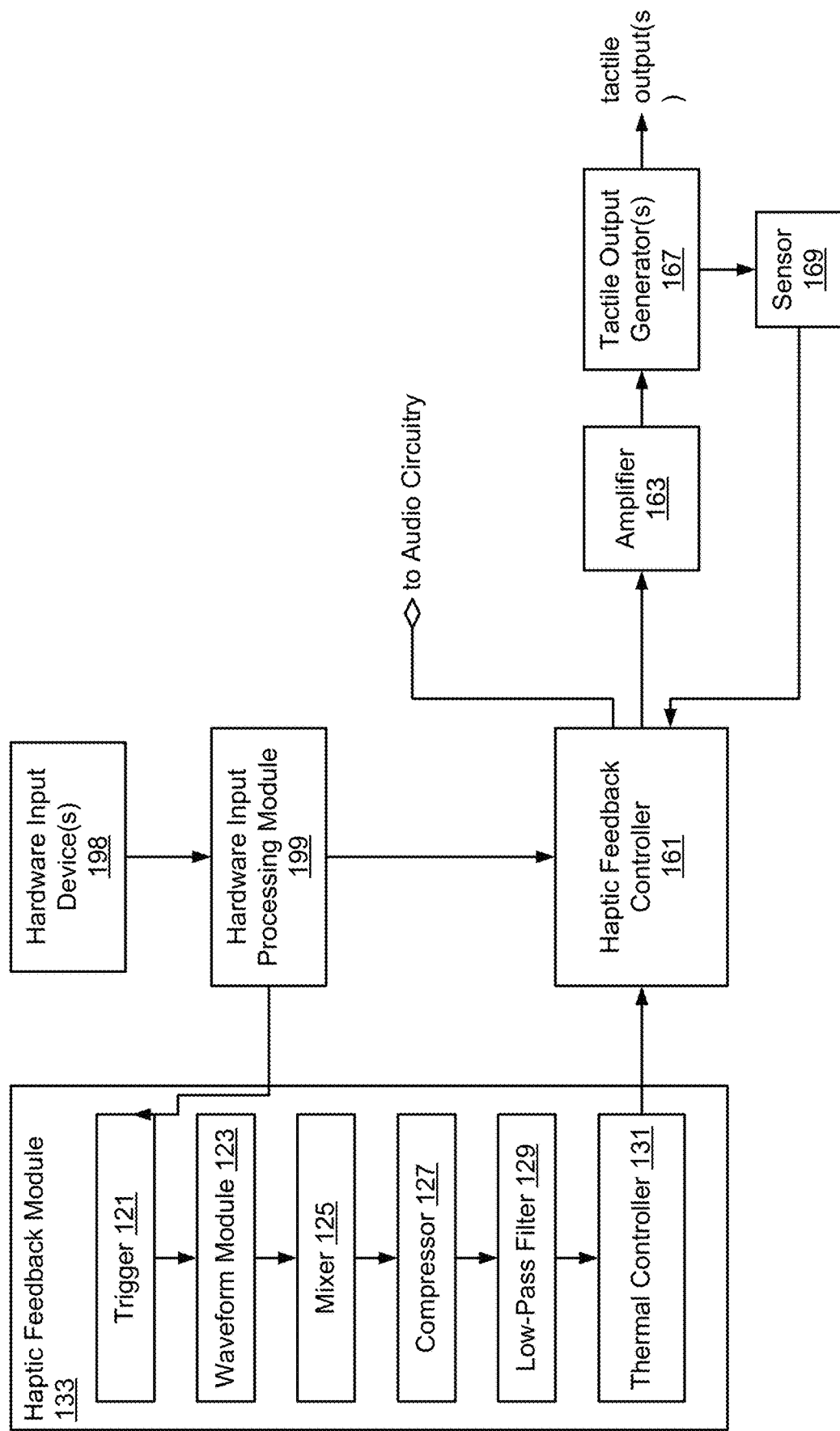
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 199 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button, a side button, a power button, etc.). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F1-4G1).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 199. In some embodiments, other input controller(s) 160 in FIG. 1A includes hardware input processing module 199. In some embodiments, hardware input processing module 199 receives inputs from hardware input device 198 (e.g., other input or control devices 116 in FIG. 1A, such as a home button, a side button, or a power button). In some embodiments, hardware input device 198 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive button (e.g., a home button as shown in FIG. 2B, a side button on the side of the device (e.g., input regions 455, 456, and 457) as shown in FIG. 4A), or a button with a mechanical actuator as illustrated in FIG. 2C). In some embodiments, hardware input device 198 consists of an intensity-sensitive input region (e.g., a home button as shown in FIG. 2B, a side button on the side of the device adjacent to the display-side as illustrated in FIG. 4A, or a button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 198, hardware input processing module 199 provides one or more trigger signals to haptic feedback module 133 to indicate that a user input satisfying predefined input criteria, such as an input corresponding to a "click" of a button (e.g., a "down click" or an "up click"), has been detected. In some embodiments, haptic feedback module 133 provides waveforms that correspond to the "click" of a button in response to the input corresponding to the "click" of a button, simulating a haptic feedback of pressing a physical button. In some embodiments, haptic feedback module 133 provides waveforms that correspond to the "detents" of a scroll wheel or dial in response to the input corresponding to the "scrolling" of a scroll wheel or "turning" of a dial, simulating a haptic feedback of rotating a physical wheel or dial. In some embodiments, haptic feedback module 133 provides waveforms that correspond to the "snap" of a switch in response to the input corresponding to the "opening" or "closing" of a switch, simulating a haptic feedback of flipping a physical switch.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 198 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 198 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator(s) 167 (e.g., any one or more of tactile output generators 167 (FIG. 1A) or 357 (FIG. 3)). For example, amplifier 163 amplifies the received waveforms to signal levels that are in accordance with physical specifications of tactile output generator(s) 167 (e.g., to a voltage and/or a current required by tactile output generator(s) 167 for generating tactile outputs so that the signals sent to tactile output generator(s) 167 produce tactile outputs that correspond to the waveforms received from haptic feedback controller 161) and sends the amplified waveforms to tactile output generator(s) 167. In response, tactile output generator(s) 167 generates tactile outputs (e.g., localized tactile outputs and/or whole device tactile outputs). In some embodiments, localized tactile outputs are generated by a surface oscillator that rocks back and forth around a fixed pivot underneath the input region (e.g., a side button) or other tactile output generator that is capable of generating tactile outputs that are directed specifically toward the input region. In some embodiments, the whole device tactile outputs are generated by shifting a moveable mass back and forth in one or more dimensions relative to a neutral position of the moveable mass. The whole device tactile outputs are created in many different locations on the device at the same time, e.g., by a tactile output generator that is coupled to a housing of the device.

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
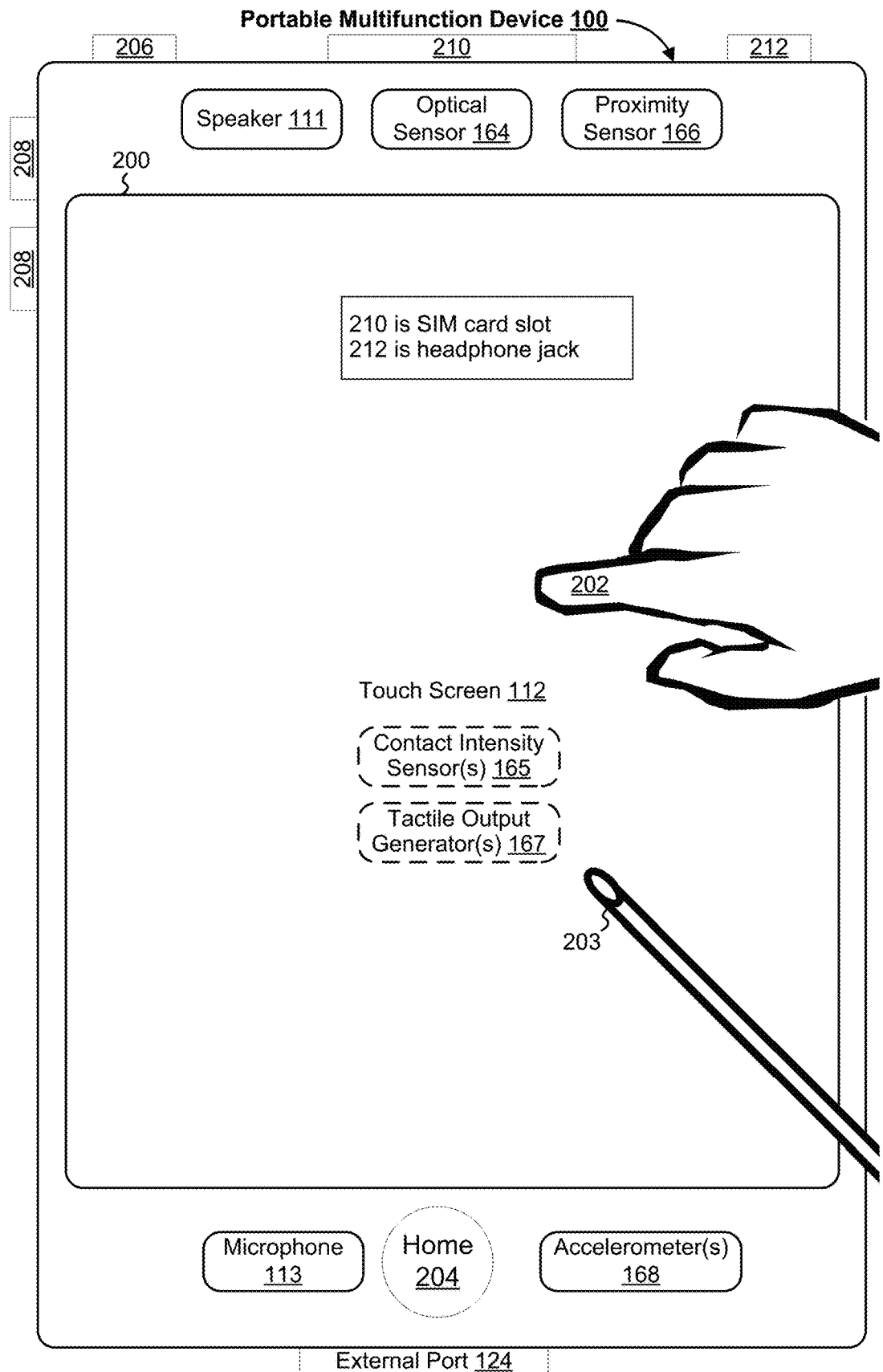
FIG. 2A illustrates a portable multifunction device having a touch screen in accordance with some embodiments.
Figure 2B:
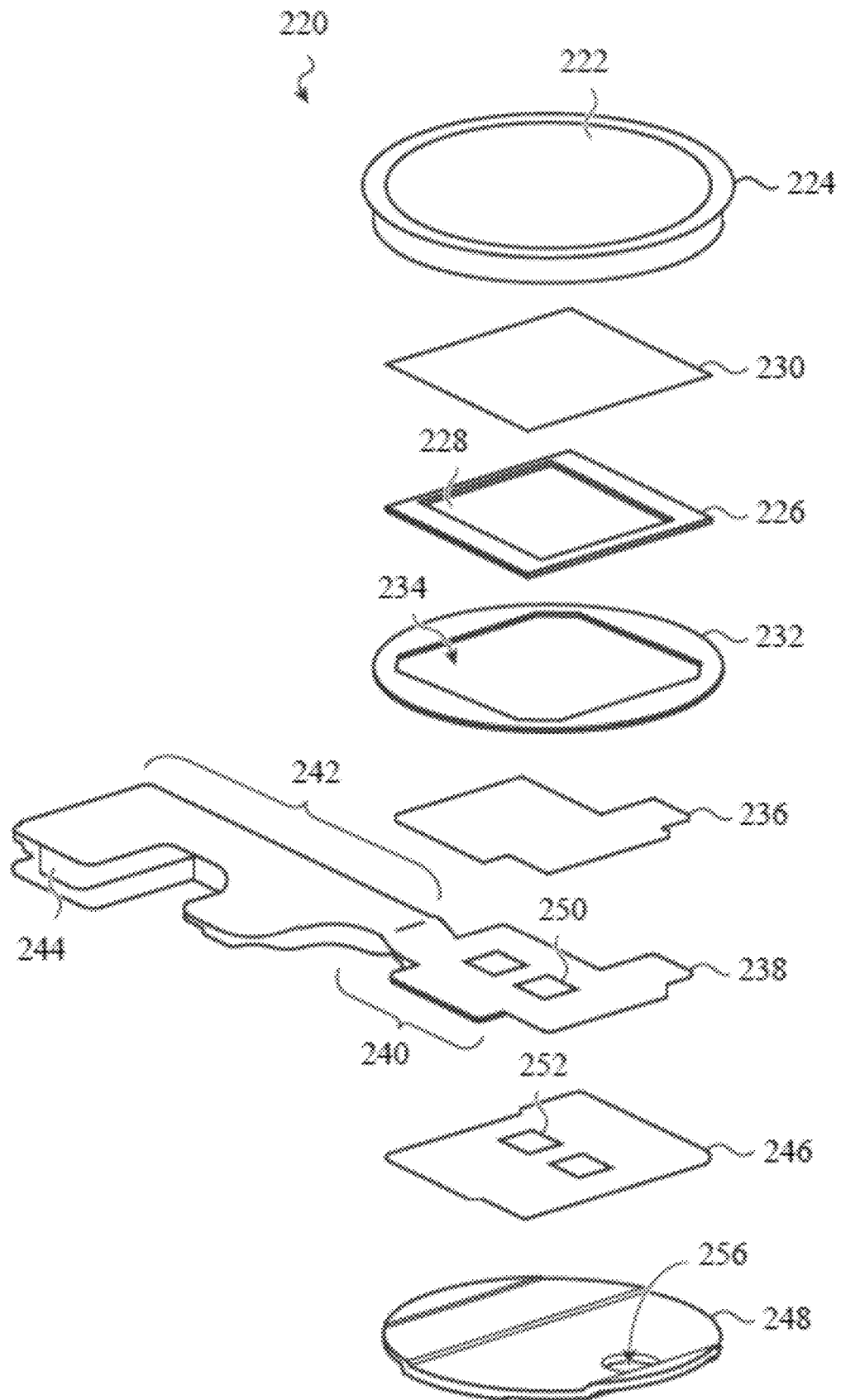
FIGS. 2B-2C show exploded views of an intensity-sensitive input device in accordance with some embodiments.
Figure 2C:
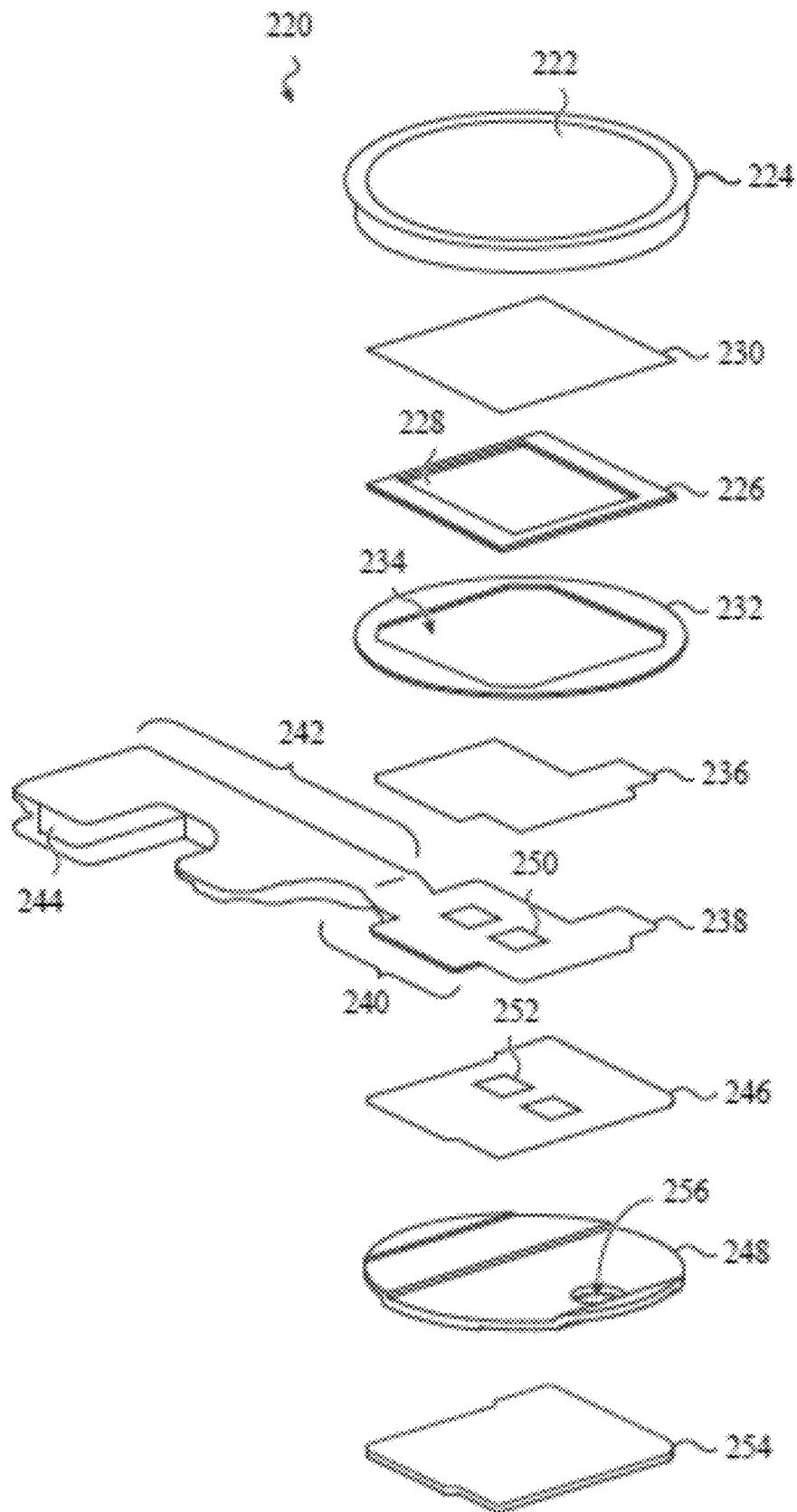

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display. In some embodiments, the home button is removed and its functions are invoked by a predefined gesture on the touch-sensitive display (e.g., an upward swipe gesture from the bottom edge of the touch-screen display).

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, the device does not includes a dedicated push button 206 for turning the device on and off. Instead, one of the other buttons (e.g., volume button(s) 208) serves as the push button for turning the device on, while a displayed user interface control serves to receive the required input to turn off the device. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100. In some embodiments, the volume buttons 208 and the push button 206 are replaced by an intensity-sensitive input region that is coupled with localized tactile output generators that provide tactile outputs for simulating the feel of a physical button, wheel, switch or other hardware input devices in response to different types of touch inputs.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive button with capacitive sensors used to determine a range of intensity values that correspond to force applied to the intensity-sensitive button. FIG. 2C shows an example of a button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally, or alternatively, the second circuit layer 238 may be operably connected to circuitry that transmits signals (e.g., sense signals) received from the intensity sensor component(s) in the first circuit section 240 to a processing device. Additionally, or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220. The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor(s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222. In some embodiments the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

Figure 2D:
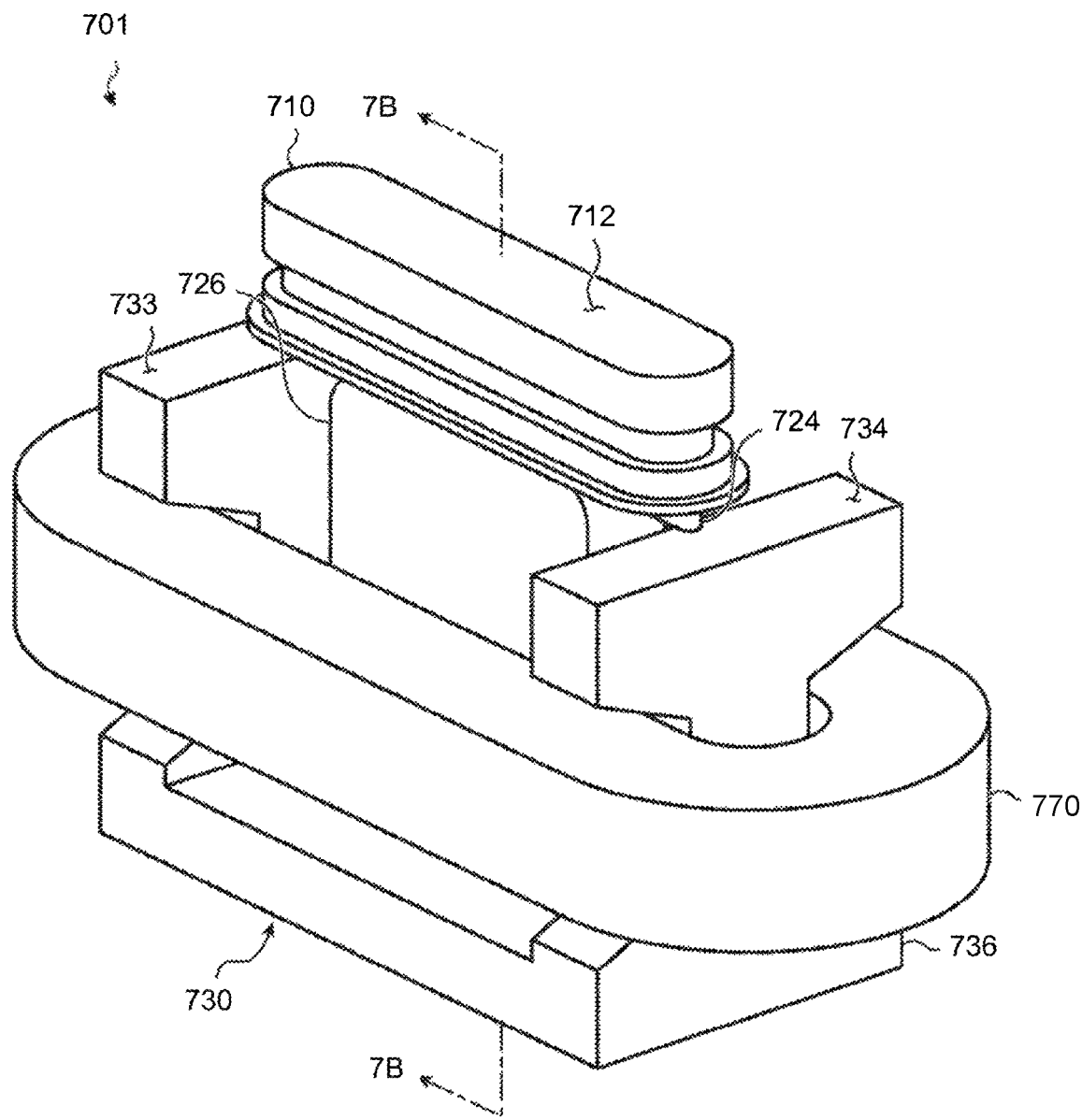
FIGS. 2D-2F show different views of an intensity-sensitive input device in accordance with some embodiments.
Figure 2E:
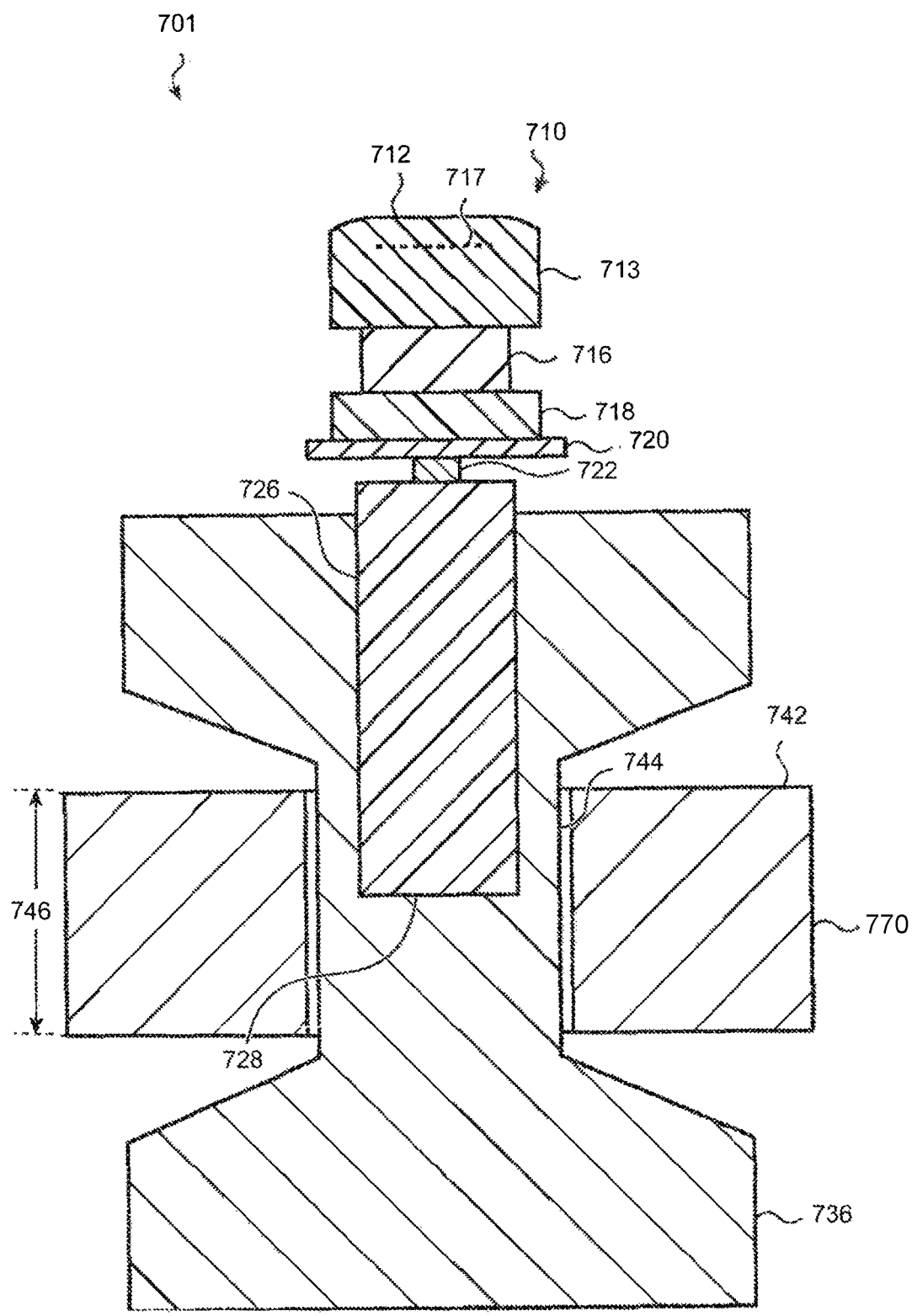
Figure 2F:
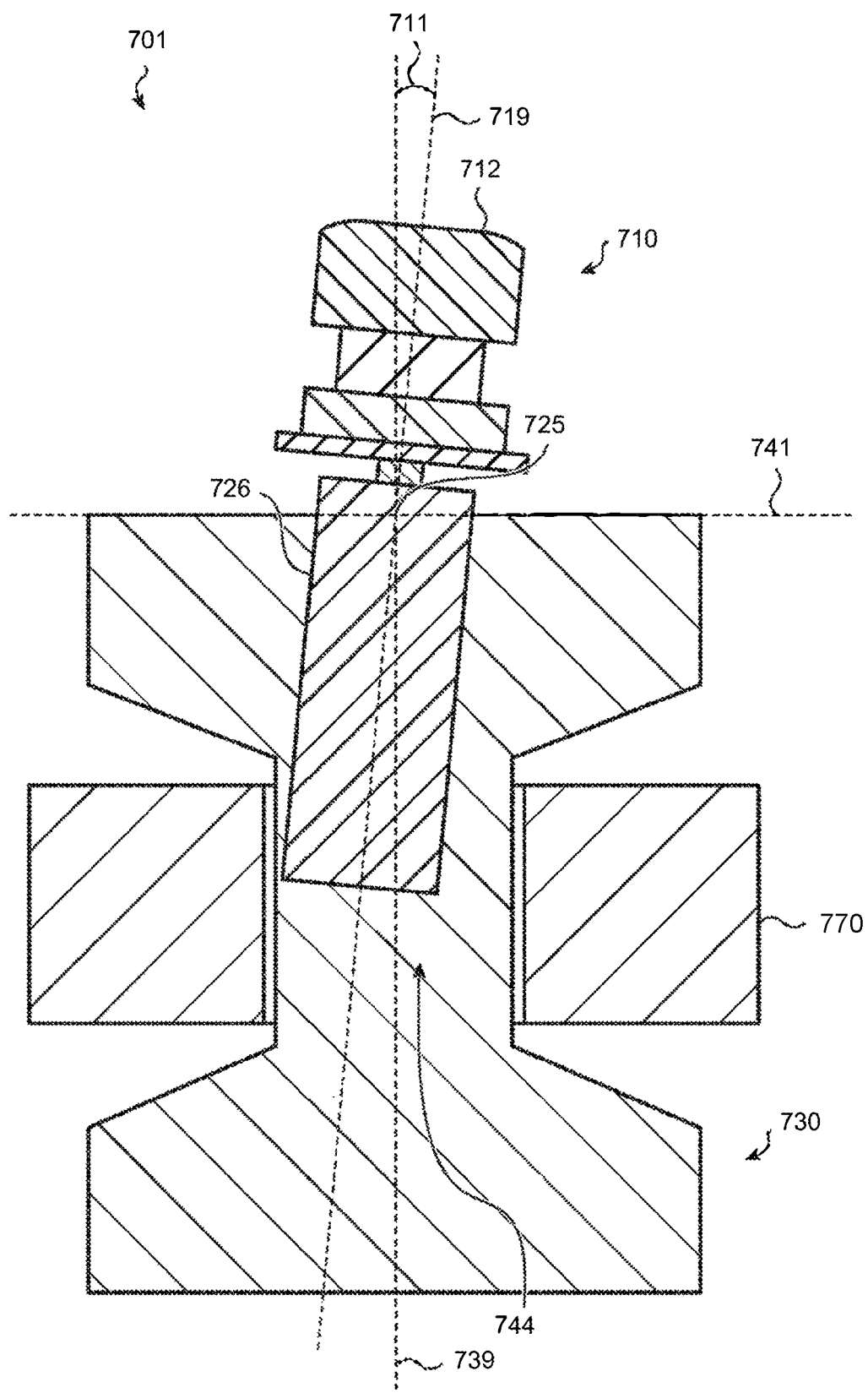

FIGS. 2D-2F show different views of an intensity-sensitive input device 701 suitable for use in the electronic devices shown in FIGS. 1A, 2A, 3, and/or 4A (e.g., as input regions 255, 256, 257, 5004, 5006, 5008, 5010, and 5100). In some embodiments, the intensity-sensitive input device 701 is a pivoting input device that implemented as a button 710. An input surface 712 of button 710 optionally serves as one or more individual input regions and/or sub-regions located on one or more peripheral sides (e.g., sides that are adjacent to the display-side) of the electronic device (e.g., device 100 and 300), in accordance with some embodiments.

Button 710 includes permanent magnet 726 attached to a lower surface of button 710. The permanent magnet 726 may be rigidly attached to button 710, such that permanent magnet 726 moves or displaces in concert with button 710.

Button 710 rotates relative to body 730 about a pair of pivots 727 (or, in some embodiments, a single pivot). The pair of pivots 727 are attached to body 730 and positioned on each of first and second projections 733, 737, both of which are part of upper body 732. Each of the two pivots 727 are positioned between a respective projection 733, 737 and a lower surface of button 710. Thus, the pair of pivots 727 are below button 710 (or other input structure) and its input surface 712. More specifically, one pivot 727 is positioned between the first projection 733 and a first lower end of the button, and another pivot 727 is positioned between the second projection 737 and a second lower end of the button 710. One pivot 727 is disposed on the first projection 733 and another pivot 727 is disposed on the second projection 737. The pivot(s) 727 may rotate with respect to body 730 or may be stationary while permitting button 710 to rotate relative to the body 730.

Input surface 712 of the button/input structure 710 may be touched, pressed, swiped in one or more directions, or otherwise interacted with by a user. In some embodiments, input surface 710 may translate, deflect, bend, or otherwise move a relatively small distance in response to user input and/or in response to a movement of permanent magnet 726. In other embodiments, input surface 712 does not translate, deflect, bend, or otherwise move in response to a user input. Input may be detected through various intensity sensors (e.g., force sensors, touch sensors, or combination of the two). Such sensors are not shown for simplicity's sake.

Button 710 may include one or more steps or shelves. The one or more shelves may aid in fitting the button to a host electronic device, such as fitting the button 710 within an opening along an exterior of a host electronic device. The one or more shelves may receive a gasket, the gasket engaging one or more shelves.

Button 710, in order from an upper portion (e.g., a portion extending from or facing an exterior of a host electronic device) to a lower portion (e.g., a portion extending into an interior of a host electronic device), includes an input surface 712, first upper portion 713, collar 716, first shelf 718, and second shelf 720. Collar 716 is narrower and/or thinner than first upper portion 713 of button 710. Collar 716 and first upper portion 713 of button 710 may have the same general shape or may be of different shapes. As one example, both may be oblong (e.g., lozenge-shaped). Collar 716 is positioned above or otherwise disposed on first shelf 718. Generally, upper button portion 713, collar 716, first shelf 718, and second shelf 720 may all be formed integrally with one another or may be formed separately and affixed to one another.

First shelf 718 of button 710 is typically wider and/or longer than collar 716. In some embodiments, first shelf 718 is of similar or identical width to first upper portion 713. First shelf 718 may have the same shape as either or both of upper portion 713 and collar 716, or may have a different shape.

Second shelf 720 of button 710 is generally wider and/or longer than first shelf 718. The second shelf 720 may have a similar shape as one or more of first upper portion 713, collar 716, and first shelf 718 of button 710, or may be differently-shaped. Second shelf 720 is positioned below first shelf 718. Second shelf 720 is positioned between first shelf 718 and connector 722.

Generally, the first shelf, collar, and second shelf cooperate to define a grove, annulus, or the like extending around a perimeter of button 710. A gasket or other seal may be seated in this groove.

Connector 722 is positioned below second shelf 720 and connects button 710 to permanent magnet 726. Connector 722 may be positioned at a central portion of the upper surface of permanent magnet 726. Connector 722 may be connected to permanent magnet 726 along substantially all of the length of an upper surface of permanent magnet 726. The permanent magnet may be rigidly connected to button 710 by way of connector 722. In some embodiments, permanent magnet 726 extends into a space within body 730. That is, the body may be hollow or may have multiple projections defining a space receiving at least part of permanent magnet 726.

Body 730 includes upper body 732 and lower body 736. Each of first projection 733 and second projection 737 are part of upper body 732; the first and second projections define a volume or space therebetween in which part of permanent magnet 726 rests. Upper body 732 and lower body 736 are separated by a region of reduced width configured to receive electromagnet 770. The body may be attached to an enclosure of the electronic device, or a structure within the enclosure.

Electromagnet 770 is configured to attach to body 730 and positioned relative to permanent magnet 726 such that a magnetic field generated by electromagnet 770 is received by permanent magnet 726 sufficient to displace or move permanent magnet 726. Electromagnet 770 encircles body 730 (specifically, the first and second projections 733, 737 and is positioned between upper body 732 and lower body 736. More specifically, electromagnet 770 is positioned to fit around a region of reduced width formed between upper body 732 and lower body 736. Electromagnet 770 has sidewall 776. Generally, electromagnet 770 is located below button 710 (or other input structure) and its input surface 712.

The positioning of permanent magnet 726 relative to electromagnet 770 modifies the operation (e.g., actuation) of button 710. More specifically, the magnetic interaction between electromagnet 770 and permanent magnet 726 is influenced by the relative positioning of permanent magnet 726 with respect to the electromagnet. In the embodiment of FIGS. 2D-2F, lower surface 728 of permanent magnet 726 is positioned between ends of electromagnet 770. Stated another way, a horizontal plane extending from the lower surface 728 of permanent magnet 726 intersects a sidewall of electromagnet 770. In one embodiment, the horizontal plane extending from lower surface 728 of permanent magnet 726 intersects sidewall 776 of electromagnet 770 at a midpoint of sidewall 776 (e.g., the end of permanent magnet 726 is coplanar with a midpoint of sidewall 776). Thus, permanent magnet 726 extends halfway through the electromagnet 770.

In some embodiments, permanent magnet 726 may be replaced by a second electromagnet, or may be supplemented by a second electromagnet. Using an electromagnet in place of, or in addition to, permanent magnet 726 may facilitate fine control of the magnetic force exerted on button 710 (or other input structure), thereby likewise providing fine control of the force of the haptic output. It should be appreciated that haptic output via button 710 or other input structure may be increased by increasing the field strength of the second electromagnet or decreased by decreasing its field strength. Likewise, field strength of first electromagnet 770 may be varied to vary haptic output force even when permanent magnet 726 is used instead of a second electromagnet.

Further, it should be noted that such variations in field strength generally vary haptic output strength, but not travel; a distance traveled by the input structure (e.g., button 710) and associated input surface varies with the distance of the pivot point from the input surface, as discussed above. Increases in both haptic output strength and travel distance may increase saliency and/or perceptibility of a haptic output.

Button 710, and attached permanent magnet 726, are depicted in a neutral, unactuated first button position and in an actuated second button position. Button 710 actuates or pivots between the first button position and the second button position through reaction of permanent magnet 726 to a magnetic field generated by electromagnet 770.

Button 710 is attached to permanent magnet 726 by way of connector 722; in many embodiments, the ends of connector 722 define pivots 727. Button 710 is configured to pivot on body 730 by way of the pair of pivots 727. In other embodiments, the connector and pivot(s) may be separate elements. Body 730, permanent magnet 726, and electromagnet 770 may be disposed within a host electronic device.

Electromagnet 770, which may encircle at least a portion of permanent magnet 726, generates a magnetic field which interacts with permanent magnet 726, in turn pivoting button 710 between a neutral, unactuated first button position and an actuated, second button position.

When no electric current is flowing through the wire windings of electromagnet 770, no magnetic field is generated by electromagnet 770 and permanent magnet 726 is in a neutral position that is approximately in the middle of the electromagnet's interior volume 777, with one end within the interior volume. This corresponds to a neutral, unactuated first button position. However, when electromagnet 770 is turned on, the resulting magnetic field moves (e.g., tilts) permanent magnet 726 within interior volume 777. More specifically, permanent magnet 726 tilts or rotates about pivot(s) 723, 727 such that its lower surface 728 moves closer to one side of electromagnet 770. Since button 710 is attached to permanent magnet 726, it also moves about the pivot(s) in a direction opposite the motion of the permanent magnet. Put another way, the button (or other input surface) and permanent magnet both rotate in the same direction (e.g., clockwise or counterclockwise) but move in opposite directions, since they are positioned on opposing sides of the pivot(s). Thus, when the electromagnet is activated, button 710 moves into an actuated position. This motion may provide haptic feedback to a person touching the button 710 (and typically, the button's input surface 712) to indicate the input device 701 has been actuated. In some embodiments, the button 710 and permanent magnet 726 may oscillate back and forth about the pivot 727 to provide haptic feedback. In some embodiments, a haptic feedback controller (e.g., haptic feedback controller 161 in FIG. 1C) varies the operating parameters of the electromagnet 770, in accordance with the requirements of a selected tactile output profile (e.g., selected based on the characteristics of the input, and the function that is triggered, and the user interface feedback that is displayed).

The permanent magnet 726, when influenced by the magnetic field, moves from its neutral position to its actuated position. In its neutral position, the permanent magnet's 726 centerline is generally aligned with a major axis of the input device 701, as is a centerline of button 710. In the actuated position, the centerline of button 712 and permanent magnet 726 is offset from major axis 739 of input device 701 by angle 711. The angle between centerline of the button 712 and major axis 739 is generally the same as the angle between the centerline of permanent magnet 726 and major axis 739.

The button/permanent magnet centerline 719 and major axis 739 intersect at pivot point 725. Pivot point 725 is positioned at the bottom of pivot 727. Permanent magnet 726, and thus button 710, rotates about the pivot point in a plane defined by major axis 739 and minor axis 771 of the input device 701. Typically, although not necessarily, major axis 739 passes through input surface 712 and button 710, while minor axis 771 is parallel to the input surface and button. Likewise, the pivot axis (which passes through pivot point 725) is generally parallel to the input surface.

The direction of rotation about pivot point 725 may change with the direction of current passing through electromagnet 770; thus, button 710 and permanent magnet 726 may both rotate in two directions (e.g., clockwise or counterclockwise about the pivot point 725). As previously mentioned, permanent magnet 726 and button 710 generally move in opposite directions while rotating about the pivot point 725 and any associated pivot(s) 727.

A user receives haptic feedback from button 710 actuation in that the input surface 712 of button 710 pivots with button 710. A user touching input surface 712 may sense the pivoting or actuation of button 710. Furthermore, the user may be able to see the pivoting of button 710 from the neutral, unactuated first position to the actuated, second position.

Button 710 (or other input structure) may include intensity sensors (e.g., force sensor 717) below input surface 712 and within upper portion 713, although it should be appreciated that the location of the intensity sensors (e.g., force sensor 717) may vary in various embodiments. For example, force sensor 717 may be positioned below input surface 712 and upper portion 713 instead of within the upper portion, or may be positioned below or to the side of permanent magnet 726, or anywhere else within the input device (or on a portion of an associated electronic device's enclosure). Force sensor 717 senses an input force on input surface 712 (e.g., detecting contact of a user's finger on input surface 712) and produces an output signal. Force sensor 717 may be any type of force sensor 717 known to those skilled in the art, such as a strain gauge, a capacitive sensor, a resistive sensor, an optical sensor, and so on. If force sensor 717 is a capacitive sensor, for example, changes in capacitance may be sensed by sensor 717 and output as an electrical output signal to the processor. In one embodiment, the force sensor is a strain gauge. The output signal produced by force sensor 717 is received by a processor.

The output signal generated by force sensor 717 allows the processor (e.g., via the tactile output controller 161 in FIG. 1C) to control, for example, electromagnet 770 (or other actuator) to effect actuation of button 710 and may also be used as a system input to the electronic device. For example, the force sensor output may be used to indicate that a user has pressed or otherwise interacted with (e.g., touched, swiped) the button 710 and thus control or change some function of the electronic device.

The processor also may control any of several inputs to electromagnet 770 to vary the magnetic field generated by electromagnet 770. For example, the processor may control the current running through the wire of electromagnet 770. Generally, an increased current will result in an increase in magnetic field strength, thereby moving permanent magnet 726 more quickly and increasing the haptic output's strength.

The processor may control additional aspects of electromagnet 770. For example, upon receipt of force sensor's 717 signal, the processor may power up the electromagnet and/or alter the state of the electromagnet so as to ready electromagnet 770 to generate a magnetic field to actuate button 710. Such a scenario may occur if the electromagnet is consistently powered on but at a level that generates a magnetic field of a size and/or strength that does not pivot permanent magnet 726. Upon receipt of the output signal from force sensor 717, the processor may control electromagnet 770 to move from stand-by status to a full power-on mode, thereby actuating button 710 by moving permanent magnet 726. In some embodiments, input device 701 may be configured to actuate (e.g., the button moves) only upon receiving an input exceeding a threshold force level, below which no actuation is triggered.

In some embodiments, motion of permanent magnet 726 within electromagnet 770 may be sensed by measuring the back electromotive force (EMF) of the electromagnet.

Generally, the EMF induced in the electromagnet will vary with a magnitude of permanent magnet's 726 travel. Further, as a user presses harder on input surface 712 or otherwise more rigidly constrains the input surface with his or her finger, the permanent magnet's travel reduces. Thus, if a user has a "stiff" input, input structure 710 (e.g., button) travel is constrained and this may be sensed by measuring the back EMF of electromagnet 770 via a sensor. A user may provide a stiff input if the user is exerting high force on input surface 712, is wearing gloves, has dry skin, a calloused finger, and so on. Generally, conditions that yield a stiff input also reduce sensitivity to haptic output. Accordingly, when the back EMF of the electromagnet 770 is exceeds a threshold, a processing unit of input device 701 may direct additional power to the electromagnet 770 to increase the force and perceptibility of haptic output.

Button 710 may be positioned in an opening along an exterior surface of an electronic device, such that the button presents an input surface to a user. Button 710 may be conformal with the exterior surface, or may project from the exterior surface of a host electronic device. In one embodiment, button 710 is oblong and fits along an exterior edge of an electronic device, such as a mobile phone.

Button 710 may actuate (e.g., move) in any of several ways. In some embodiments, button 710 pivots off major axis 739 of the input device 701, which is generally perpendicular to its pivot axis. However, other configurations are possible. For example, button 710 may be configured to actuate along a minor axis. In some embodiments, button 710 may actuate in a seesaw manner. In some embodiments, button 710 moves along a surface or edge of a host electronic device.

In one embodiment, although button 710 may actuate, the actuation is not required to register a button input to an electronic device, such as to register a button input by a processor of an electronic device. Stated another way, the physical movement or actuation of button 710 is not required to register a button on or off input. Instead, button actuation is effected to provide a type of haptic feedback to the user.

Button 710 may have a variety of shapes, including defining a curved or convex input surface 712, and/or may be rectangular, square, and so on. As another example, input surface 712 may be substantially flat. Input surface 712 and/or other parts of button 710 may include texture such as bumps, ridges, or the like. Button 710 may have readjusted, beveled, or flat edges. Generally, the smaller the curvature of input surface 712, the greater the shear (e.g., transverse displacement) of the user's skin contacting the input surface and thus the greater the perceptibility of the haptic output. Accordingly, travel of planar input surfaces 712 may be more easily perceived by a user than the same travel of a curved input surface. The curvature of the input surface 712 may be selected to impart a particular haptic output or particular perceptibility of a haptic output.

Generally, if the curvature of input surface 712 equals the curvature of an arc segment along which input surface 712 travels during rotation of the input structure 710 about the pivot, the skin of a user's finger in contact with the input surface 712 experiences purely tangential motion from the input surface. The "arc segment" is the portion of a circle through which a point on the input surface moves while the input structure rotates. Put another way, if every point of input surface 712 lies on a single arc circumscribed by the entirety of input surface 712 while haptic output is provided, then the curvature of the input surface equals the curvature of an arc segment. Put still another way, if the distance from pivot 727 to every point of the input surface within the rotational plane is equal, then the curvature of the input surface 712 matches the curvature of the arc segment during rotation. Purely tangential motion of the input surface 712 against a user's skin yields a high degree of skin shear and a unique feeling of haptic output. Generally, such haptic output is indistinguishable or near-indistinguishable from a "click" or depress of a typical button that moves in the direction of an input force.

By changing the curvature of input surface 712, the feel of the haptic output may be varied. The more the curvature of the input surface varies from the arc segment along which the input surface 712 travels during rotation, the more the haptic output feels like a "rocking" (e.g., for simulating a "toggle" operations) motion to a user as opposed to a "clicking" or depressing/collapsing motion. The curvature of the input surface 712 may be tuned to provide particular haptic outputs, as desired or necessary.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates a portable multifunction device 100 with one or more intensity-sensitive off-display input regions on one or more peripheral sides of the device, and a touch-screen display showing an example home screen user interface with a menu of application launch icons corresponding to different applications, in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
a Bluetooth indicator;
Battery status indicator 406;
Tray 408 with icons for frequently used applications, such as:
  a Icon 416 for telephone module 138, labeled "Phone," which optionally includes an indicator 414 of the number of missed calls or voicemail messages;
  a Icon 418 for e-mail client module 140, labeled "Mail," which optionally includes an indicator 410 of the number of unread e-mails;
  a Icon 420 for browser module 147, labeled "Browser;" and
  Icon 422 for video and music player module 152, also referred to as iPod (trademark of Apple Inc.) module 152, labeled "iPod;" and
Icons for other applications, such as:
  a Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon. In some embodiments, when an icon corresponding to a respective application is activated (e.g., by a tap input), the device launches the respective application and replaces the home screen user interface with a user interface of the respective application. When a request for dismissing the currently displayed user interface and returning to the home screen user interface is received (e.g., a predefined home gesture or activation of a home button is detected), the device dismisses the currently displayed user interface and redisplays the home screen user interface (e.g., a last displayed page of the home screen user interface or a default starting page of the home screen user interface).

As shown in FIG. 4A, in some embodiments, the portable multifunction device 100 does not include a home button on the display-side of the device, and the touch-screen 112 occupies substantially all of available areas on the display-side of the device. The device 100 as shown in FIG. 4A includes a number of discrete intensity-sensitive input regions 455, 456, and 457. The input regions 456 and 457 are optionally implemented on two sub-portions of a contiguous touch-sensitive surface. Each of the input regions are coupled with a respective set of one or more localized tactile output generators for generating localized tactile outputs that have greater amplitudes at the input region (or a respective sub-portion thereof), and smaller amplitudes or negligible amplitudes at locations outside of the input region (or the respective sub-portion thereof).

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300. In some embodiments, the device includes an intensity-sensitive input region that is distinct from touch-sensitive surface 451. For example, the intensity-sensitive input region is disposed on a peripheral side of the device (e.g., a side edge of the device) that is adjacent to the display-side of the device, and the touch-sensitive surface 451 is coplanar with the display-side of the device or disposed on the display-side of the device. In some embodiments, a contact detected on the intensity-sensitive input regions do not have a corresponding focus selector displayed on the display of the device that is located at a corresponding location of the contact on the input region and/or that move in accordance with movement of the contact across the input region. In some embodiments, the touch-sensitive surface 451 serves as an off-display input region of the device.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a hint intensity threshold $IT_H$ (e.g., that is higher than $IT_0$), a light press intensity threshold $IT_L$ (e.g., that is at least initially higher than $IT_H$), a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold ID (e.g., also referred to as $IT_D$)). FIG. 4D also illustrates two other intensity thresholds: a first intensity threshold $I_H$ (e.g., also referred to as $IT_H$) and a second intensity threshold IL. In FIG. 4D, although touch input 484 satisfies the first intensity threshold $I_H$ and the second intensity threshold IL (e.g., also referred to as $IT_L$) prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold IL was triggered). This type of dynamic intensity threshold reduces accidental triggering of a response associated with the dynamic intensity threshold ID immediately after, or concurrently with, triggering a response associated with a lower intensity threshold, such as the first intensity threshold $I_H$ or the second intensity threshold IL.

FIG. 4E illustrate yet another dynamic intensity threshold 492 (e.g., intensity threshold ID). In FIG. 4E, a response associated with the intensity threshold IL is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold IL, followed by an increase in the intensity of touch input 490, without releasing touch input 490, can trigger a response associated with the intensity threshold ID (e.g., at time 494) even when the intensity of touch input 490 is below another intensity threshold, for example, the intensity threshold IL.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, one or more tactile output generators for generating tactile outputs (e.g., one or more localized tactile output generators and/or one or more whole device tactile output generators), one or more sensors to detect intensities of contacts with the touch-sensitive surface and one or more input regions of the device (e.g., one or more off-display side buttons).

FIGS. 5A1-5B24 illustrate exemplary user interfaces for providing tactile outputs and visual feedback in response to multiple types of inputs on intensity-sensitive input regions (e.g., off-display input regions 5004, 5006, 5008, 5010, 5100, etc.) and a touch screen of the device in accordance with some embodiments. The user interfaces in these figures are used to illustrate the processes described below, including the processes in FIGS. 6A-6I and 7A-7C. For convenience of explanation, the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A1-5A41 illustrate exemplary user interfaces for interacting with a control and providing haptic and visual feedback for these interactions, in accordance with some embodiments. The user interfaces in these figures are used to illustrate the processes described below, including the processes in FIGS. 6A-6I.

FIG. 5A1 illustrates an electronic device 100 that includes a plurality of touch-sensitive input regions 5004, 5006, 5008, and 5010 that are located on the peripheral sides of the device, separate from the touch-sensitive display of the device. In some embodiments, the touch-sensitive input regions provides different haptic feedback in response press inputs that have different characteristic intensities. In some embodiments, one or more of the touch-sensitive input regions are mechanical buttons or switches that are actuated in response to press inputs detected on the mechanical buttons or switches. In some embodiments, the one or more of the touch-sensitive input regions are solid-state buttons and switches that do not actuate in response to press inputs but provides haptic feedback (e.g., via tactile and/or audio outputs) that mimic button presses and actuations on the solid-state buttons. Various features of the touch-sensitive input regions 5004, 5006, 5008, and 5010 are described with respect to input regions 455, 456, and 457 in FIG. 4A, buttons 204, 208, 206 in FIG. 2A, input device 220 in FIGS. 2B-2C, and intensity-sensitive input device 701 in FIGS. 2D-2F, in accordance with various embodiments. Electronic device 100 also includes touch-screen 112 that is configured to display a user interface and detect touch-down and liftoff of contacts at various locations on the touch-screen. In some embodiments, touch-screen 112 includes sensors that are configured to detect intensities of the contact relative to a plurality of predefined (e.g., static or dynamic) intensity thresholds. In FIG. 5A1, displays a user interface (e.g., home screen user interface 5002) of the device. The user interface includes user interface objects (e.g., application icons) that, when activated by one or more touch inputs (e.g., a tap input, a swipe input, a light press input, a touch-hold input, etc.) on the touch-screen, causes the device to perform corresponding operations (e.g., to launch an application and displaying a user interface of an application, to display a quick action menu, to navigate to a different page of the home screen, to display a control user interface, to display a multitasking user interface, to enter a user interface reconfiguration mode, etc.).

In FIGS. 5A2-5A3, while the device displays the user interface (e.g., home screen user interface 5002), a press input (e.g., press input 5012) is detected on input region 5006 located on the side of the device. With increasing intensity of press input 5012, the device gradually reveals a control object (e.g., volume control 5014) that corresponds to a first control function of the device (e.g., controlling output level of a speaker associated with the device) on the touch-screen. In some embodiments, the control object gradually slides onto the display from a location immediately adjacent to input region 5006 in accordance with increasing intensity of the press input during the down-press portion of press input 5012. At the end of the press input, the control object (e.g., control 5014) is fully revealed on the touch-screen (e.g., overlaying a portion of home screen user interface 5002 that is next to, and aligned with input region 5006), and has a first appearance (e.g., a first size and a first shape (e.g., first x-y dimensions)). In some embodiments, the control object gradually fades in onto the display in response to increasing intensity of the press input. In some embodiments, the control object is gradually revealed in response to increasing intensity of the press input, and is fully revealed in accordance with a determination that a characteristic intensity of the press input exceeds a first intensity threshold (e.g., a light press intensity threshold) above the lowest activation intensity threshold (e.g., input detection intensity threshold) for input region 5006.

In FIG. 5A3, in accordance with a determination that press input 5012 met control-display criteria (e.g., intensity of press input 5012 exceeded the first intensity threshold), the device displays the control object with the first appearance (e.g., control 5014). In this example, the control object is a volume control for controlling a speaker of the device (e.g., a speaker that is currently connected to the device and outputting audio received from the device). In some embodiments, an identifier (e.g., "Speaker") of the output device controlled by the control object is displayed next to control 5014 with the first appearance. In some embodiments, the device automatically selects which control object to display in response to a press input on input region 5006 in accordance with which audio output device is currently or last controlled by the device. In some embodiments, the device automatically selects which control object to display in response to a press input on input region 5006 in accordance with a characteristic of the press input (e.g., intensity, duration, input pattern, etc.). For example, a press input that meets a first intensity threshold but not a second intensity threshold causes the device to display a control object for a first device function (e.g., controlling device volume), while a press input that meets the second intensity threshold causes the device to display a control object for a second device function (e.g., controlling display brightness) that is distinct from the first device function. In some embodiments, the control object with the first appearance (e.g., control 5014) includes an icon (e.g., icon of a speaker) representing the device function that is controlled by the control object. In some embodiments, control 5014 includes a value indicator that indicates the current value of the control immediately before the press input is detected (e.g., the value indicator for control 5014 is a gray region within control 5014 with a height that indicates the current volume level of the speaker). As shown in FIG. 5A3, the current value of the device function is not altered by the first press input on input region 5006.

In FIG. 5A4, after the control object with the first appearance (e.g., control 5014) is displayed (e.g., at $T=t_0$) in response to press input 5012 on input region 5006, the control object with the first appearance (e.g., control 5014) is gradually transformed (e.g., at a time T after a first time period (e.g., $T_1$) has elapsed) to a state that is less visually prominent than the first appearance (e.g., blurred, reduced in width and/or length, faded, etc.) (e.g., shown as control 5016). This change in appearance provides the user with a feedback to indicate that if an input to alter the current value of the control is not received soon (e.g., before $T=t_0+T_2$), the control will cease to be displayed.

In FIG. 5A5, a contact (e.g., contact 5022) is detected on touch-screen 112 at a location that corresponds to the faded control object (e.g., control 5016) at a time T before the second time period T has elapsed (e.g., $T<t_0+T_2$). In response to detecting the touch input (e.g., a tap input or just touch-down of the contact) by contact 5022, the device resets the start time (e.g., reset to a current time $t_1$) of the time window for maintaining displaying the control object and altering the current value of the control in response to a subsequent input (e.g., another press input on input regions 5004 and 5006, or a swipe input on the displayed control). As shown in FIG. 5A6, in response to the touch input by contact 5022, the device restores display of the control object with the first appearance (e.g., control 5014). In FIG. 5A5, the device optionally displays a transitional appearance of the control object (e.g., control 5018) between the faded appearance and the first appearance of the control object.

FIG. 5A7 illustrates that, if a subsequent input for altering the current value of the control function is not detected within the time window set by the first time period $T_1$ (e.g., $T>t_1+T_1$), the control object with the first appearance begins to fade out again (e.g., shown as control 5016 in FIG. 5A7). If a subsequent input for altering the current value of the control function or a touch input on the control object is not detected within the time window set by the second time period $T_2$ (e.g., $T>t_1+T_2$), the control object ceases to be displayed completely. A subsequent press input on input region 5060 will serve to redisplay control 5014, but will not alter the current value of the control function.

FIG. 5A8 continues from FIG. 5A4 and illustrates a scenario in contrast to that shown in FIGS. 5A5-5A6, in which a touch input (e.g., a tap input, or just touch-down of the contact) was not detected on touch-screen 112 at a location that corresponds to faded control 5016. As a result, the device ceases to display the control object completely at the expiration of the time window set by the second time period $T_2$ (e.g., at $T=t_0+T_2$). A subsequent press input on input region 5060 will serve to redisplay control 5014, but will not alter the current value of the control function.

FIG. 5A9 continues from any of FIG. 5A3, 5A4, 5A6, or 5A7 in which different versions of the control object (e.g., control 5014, control 5016) remain displayed on touch-screen 112. In FIG. 5A9, a swipe input (e.g., a downward swipe input) by contact 5024 is detected on the control object shown on touch-screen 112 (e.g., at a location that corresponds to the top of the value indicator of the control). In FIG. 5A10, in response to the swipe input by contact 5024, the current value of the control function is adjusted (e.g., reduced from a first value to a second value) in accordance with the swipe input by contact 5024. In FIGS. 5A9-5A10, the control object is displayed with the first appearance (e.g., as control 5014), in accordance with some embodiments. In some embodiments, the control is optionally displayed with a second appearance (e.g., control 5018 in FIG. 5B13) during the swipe input and the adjustment of the value of the control function. In some embodiments, the control object with the first appearance (e.g., control 5014) or the second appearance (e.g., control 5018) does not change its dimensions (e.g., has no squishiness), if the input for adjusting the value of the control is detected on the touch screen (e.g., as opposed to being detected on input regions 5004 and 5006).

FIG. 5A11 continues from FIG. 5A10 after the value of the control is reduced in response to a previous swipe input. However, FIG. 5A11 can also continue from any of FIG. 5A4, 5A6, or 5A7 in which different versions of the control object remain displayed on touch-screen 112. In FIG. 5A11, a quick flick input (e.g., a downward flick) by contact 5026 is detected on control 5014, and as a result of the flick input, the current value of the control function is further reduced in accordance with characteristics of the flick input (e.g., speed, direction, and distance). In FIG. 5A12, the flick input by contact 5026 causes the current value of the control function to reach an end value (e.g., a minimum value) of the value range for the control function, and the device generates tactile output 5028 (e.g., e.g., a whole device tactile output, as opposed to a localized tactile output near the input regions on the sides of the device) in conjunction with changing the appearance of the value indicator of control 5014 to indicate that the current value of the control function is now the minimum value of the value range. In some embodiments, the device changes the appearance of the icon (e.g., the speaker icon in control 5014) for the output device controlled by the control object to indicate that the output device is disabled or operating at its minimum level. In some embodiments, a swipe input or flick input on the control object with the first appearance (e.g., control 5014) in the reverse direction (e.g., upward) along the control object with the first appearance (e.g., control 5014) causes the current value of the control function to increase in accordance with the input. In some embodiments, a tactile output (e.g., whole device tactile output) is generated when the current value of the control function reaches the maximum value of the value range. In some embodiments, tactile outputs with different tactile output characteristics (e.g., frequency, pattern, magnitude) are provided in accordance with whether the maximum value or the minimum value is reached in response to the input.

FIGS. 5A13-5A15 continue from any of FIGS. 5A3, 5A4, 5A6, and 5A7 in which different versions of the control object (e.g., control 5014, control 5016) remain displayed on touch-screen 112 (e.g., before a time window set by the second time period $T_2$ has expired). In FIG. 5A13, a second press input (e.g., press input 5030) is detected on input region 5006 while the control object (e.g., control 5014 or control 5016) remains displayed on touch-screen 112 and before the time window set by the second time period $T_2$ has expired (e.g., $T<t_0+T_2$, or $T<t_1+T_2$). In response to detecting the second press input 5030 on input region 5006 within the time window set by the second time period $T_2$, the device changes the appearance of the control object (e.g., from the first appearance (e.g., control 5014 shown in FIGS. 5A3 and 5A6), or the faded appearance (e.g., control 5016 shown in FIGS. 5A4 and 5A7)) to a second appearance (e.g., shown as control 5018) that is not faded but has a different set of dimensions compared to the first appearance (e.g., elongated lengthwise and narrowed widthwise). In some embodiments, the control object with the second appearance optionally has a value indicator that is different in aspects other than size (e.g., more visually distinct (e.g., shown as circular indicator 5020)) from the value indicator shown in the control object with the first appearance. In FIGS. 5A13-5A15, during the second press input 5030 (e.g., while intensity of the press input is increasing), the appearance of the control object (control 5018 including value indicator 5020) continues to change (e.g., the control becomes further elongated and narrowed (e.g., shown as control 5018') and the value indicator becomes smaller (e.g., shown as value indicator 5020')). In addition, during the second press input 5030 (e.g., while intensity of the press input is increasing), the value indicator moves from a first position to a second position along the control object (e.g., while the control object is being resized) to indicate the change in the current value of the control function (e.g., from a first value to a smaller second value). In FIG. 5A15, after the end of the second press input is detected, the appearance of the control object is returned to the second appearance (e.g., control 5018), with the value indicator indicating a new, reduced value as the current value of the control function.

FIG. 5A16 following FIG. 5A15 illustrates that, a third press input (e.g., press input 5032) is detected on input region 5006 within the time window set by the second time period $T_2$ after the second press input 5030 ended. In response to detecting the third press input 5032 (e.g., while an intensity of the press input is increasing), the device changes the appearance of the control object further (e.g., from the second appearance (e.g., control 5018 shown in FIGS. 5A15) to a third appearance that is further elongated lengthwise and narrowed widthwise (e.g., control 5018" shown in FIG. 5A16)). In addition, during the third press input 5032 (e.g., while intensity of the press input is increasing), the value indicator moves from the second position to an end position along the control object (e.g., while the control object is being resized) to indicate the change in the current value of the control function (e.g., from the second value to the minimum value). In FIG. 5A17, after the end of the third press input is detected, the appearance of the control object is returned to the second appearance (e.g., control 5018), with the value indicator indicating that the current value of the control function is the minimum value of the control function. In some embodiments, as shown in FIG. 5A16, in response to detecting that the current value of the control function has reached an end value of the control function (e.g., the minimum value), the device generates a tactile output (e.g., localized tactile output 5033 produced by a localized tactile output generator at input region 5006) to indicate that an end value (e.g., the minimum value) of the control function is reached in response to the current press input. In some embodiments, if a subsequent press input is detected on input region 5006 while control 5018 shown in FIG. 5A17 is displayed, the device optionally displays the same visual feedback as that shown in FIG. 5A16 (e.g., showing the extra elongated control 5018″ with the value indicator 5020″ at the bottom of the control) and generates a localized tactile output on input region 5006 to alert the user that the end value for the control function has been reached and no further change to the current value of the control function will be carried out in response to the present input. In some embodiments, the visual feedback shown in FIG. 5A16 (e.g., further elongation and narrowing of the control) is provided if the second press input is continuously maintained on input region 5006 (e.g., with constant or increasing intensity, or intensity above a predefined threshold level) after an initial portion of the second press input has caused reduction of the current value of the control function (e.g., as shown in FIG. 5A14).

FIGS. 5A18-5A20 continue from FIG. 5A3 or 5A4 in which different versions of the control object (e.g., control 5014, control 5016) remain displayed on touch-screen 112 (e.g., before a time window set by the second time period $T_2$ has expired). In FIG. 5A18, a contact (e.g., contact 5034) is detected on control 5014 (e.g., touch-down of the contact is on control 5014, or touch-down of the contact on control 5016 has bought control 5014 back onto the display), before the time window set by the second time period $T_2$ has expired. In FIG. 5A19, a current value of a first input parameter of the contact (e.g., intensity, or duration that the contact has been kept substantially stationary since touch-down of the contact) increases, and control 5014 is highlighted while its background user interface (e.g., home screen user interface 5002) becomes visually obscured (e.g., blurred or darkened). In FIG. 5A20, in accordance with a determination that the value of the first input parameter (e.g., intensity, or duration that the contact has been kept substantially stationary since touch-down of the contact) has exceeded a first input threshold (e.g., a light press intensity threshold, or a touch-hold duration threshold), the device replaces control 5014 displayed next to input regions 5004 and 5006 with expanded control 5040 corresponding to the control object. As shown in FIG. 5A20, expanded control 5040 and control 5014 correspond to the same control function of the device (e.g., controlling the volume of a currently selected audio output device (e.g., in response to a swipe input along the expanded control or in response to press inputs on input regions 5004 and 5006)), and expanded control 5040 has a third, larger size, as compared to control 5014. In some embodiments, expanded control 5040 is displayed overlaying background 5036, and concurrently with one or more other controls and/or user interface objects, including, for example, ringer status indicator 5038 for switching an operation mode of the ringer for the device (e.g., in response to a tap input on ringer status indicator 5038), switching controls 5042 and 5044 for switching to displaying a control object (e.g., a different expanded control) that corresponds to a different audio output device (e.g., headphone, wireless headphone, car audio, etc.) associated with device 100 on background 5036. In some embodiments, an identifier (e.g., label "Speaker" 5046) of the currently displayed control object (e.g., control 5040) is displayed next to the displayed control object. Providing the control object in an expanded view concurrently with other control objects and user interface objects allow the user to adjust the control function more easily and access (e.g., review and adjust) additional related functionalities (e.g., other audio controls and ringer control).

Although input region 5006 (e.g., a volume down button) and downward swipe inputs are used in the above examples to illustrate how a volume control is displayed, adjusted, expanded, and dismissed, in accordance with some embodiments, analogous behaviors (e.g., same behavior but with volume adjustment in the opposite direction) of the volume control can be elicited by press inputs on input region 5004 (e.g., a volume up button) and upward swipe inputs. In addition, analogous behaviors are optionally implemented for other types of controls (e.g., radial controls, other slider controls, ratchet controls, etc.) corresponding to different control functions (e.g., brightness control, flashlight, screen contrast, etc.) of the device.

FIGS. 5A21-5A23 illustrate that the control object is displayed in response to press input 5050 on input region 5006 (or input region 5004) while the display of the device is not lit (e.g., while the display is in an off state, but the device remains turned on) and not showing any other user interface objects. This occurs when the device is in the sleep mode or low power mode. While the display is turned off, press input 5050 on input region 5006 causes the device to display control 5014 on the dark screen, without other user interface objects, as shown in FIGS. 5A21-5A22. After a first time period $T_1$ has expired since termination of press input 5050, the device changes the appearance of the control object to fade out the control object (e.g., shown as control 5016), and eventually ceases to display the control object on the dark screen. In response to additional press inputs on input regions 5006 or 5004 while a version of the control object remains displayed on the dark screen, the control object with the second appearance (e.g., control 5018) is shown (e.g., in FIG. 5A23) and the control object with the second appearance changes its dimensions (e.g., becomes elongated and narrowed, shown as controls 5018′ and 5018″ in 5A14 and 5A16) during each press input in accordance with changing intensities of the press input (e.g., the rise and fall of the intensity during the press input). Displaying the control object in response to input on input region that is separate from the touch-screen allows the user to review and adjust a control without distraction of other user interface features and saves battery power of the device.

FIGS. 5A24-5A25 illustrate that the same control object is displayed overlaying a wake screen user interface (e.g., wake screen 5054) as well. A wake screen user interface is the first user interface that is displayed when the display is switched from a display-off state to a display-on state in response to a press input (e.g., press input 5052) on a wake button of the device (e.g., button 5010, button 5100, or another button or set of buttons (e.g., input regions 5004 and 5006 together)). The wake screen user interface includes various user interface objects, such as time object 5056 for displaying the current time, date object for displaying the current date, device status indicators for displaying various device statuses (e.g., battery level, network connection status, cellular service provider and signal strength, etc.), application icon 5058 for launching the camera application, and application icon 5060 for turning on/or the flashlight of the device, etc. In response to a press input (e.g., press input 5064) on input region 5006 while the wake screen user interface is displayed, the control object with the first appearance (e.g., control 5014) is displayed overlying the wake screen user interface. Analogous behaviors as those shown in earlier examples with the home screen user interface as the background user interface are applicable when the wake screen user interface is the background user interface as well.

FIG. 5A26 illustrates that the same control object is displayed overlaying an application user interface (e.g., application user interface 5056 for the messages application) as well. In response to detecting a press input (e.g., press input 5068) on input region 5006 while the application user interface is displayed, the control object with the first appearance (e.g., control 5014) is displayed overlying the application user interface. Analogous behaviors as those shown in earlier examples with the home screen user interface as the background user interface are applicable when the application user interface is the background user interface as well.

FIG. 5A27 illustrates that the control object corresponding to a different control function or a different subject of the same control function (e.g., volume control for "headphone") is displayed (e.g., as control 5014' with a different device label (e.g., headphone) and icon (e.g., a headphone symbol) for the control function) in accordance with a determination that the currently selected output device for the device is a different device (e.g., a different display for screen brightness control, or a different audio output device for volume control). Analogous behaviors as those shown in earlier examples for the speaker volume control are applicable when headphone volume control is the targeted control function as well.

FIGS. 5A28-5A29 illustrate that an input (e.g., toggle input or press input 5072) on input region 5008 is detected while a user interface (e.g., home screen user interface 5002) is displayed. In response to detecting the input on input region 5008, the device displays user interface object (e.g., ringer status indicator 5074) to indicate the current operation mode of the ringer of the device (e.g., ON or OFF). In some embodiments, the user interface object slides down from the top of the display. In some embodiments, the user interface object emerges from the location on the display that is next to and aligned with input region 5008. In some embodiments, the user interface object fades in onto the display. In some embodiments, the user interface object includes icon 5084 that shows the current operation mode of the ringer, and switches the current operation mode of the ringer to a different mode (e.g., OFF to ON, or ON to OFF, or cycle to the next mode in a plurality of three or more available modes of the control) in response to a tap input directed to the icon.

FIGS. 5A30-5A31 illustrate that a press input (e.g., press input 5076) is detected on input region 5008 while the ringer operation mode is the silent mode (e.g., OFF, indicated as input region 5008'). In some embodiments, in response to detecting the press input (and in accordance with a determination that the currently connected audio output channel is the ringer (e.g., no other audio channel is active)), the device displays ringer status indicator 5074 to alert the user that the ringer status is off, and volume control will not change the audio output level of the ringer.

FIGS. 5A32-5A33 illustrate that an input (e.g., press input or toggle input 5078) on input region 5008 (e.g., shown as 5008' to indicate that the ringer is operating in the silent mode) switches the current operation mode of the ringer (e.g., from OFF to ON). In response to the input on input region 5008, the device switches the current operation mode of the ringer, and displays a user interface object (e.g., ringer status indicator 5080) to indicate that the current operation mode of the ringer has been switched to a non-silent mode (e.g., icon 5084' showing that the ringer is ON) and volume indicator 5082 shows the current ringer volume). A tap input on icon 5084' switches the current operation mode of the ringer back to the OFF state. A swipe input on volume indicator 5082 adjusts a current value of the ringer volume, in accordance with some embodiments.

FIGS. 5A34 and 5A35 illustrate that control 5014 and 5018 are displayed at a different location relative to input regions 5004 and 4006 when the device is held in a landscape orientation (and/or that the currently displayed user interface is in the landscape orientation). As shown in the example in FIGS. 5A34 and 5A35, the currently displayed user interface 5086 is a video player user interface playing a video in a full-screen mode, in the landscape orientation; and controls 5014 and 5018 are displayed near the top edge of the device (the same edge that used to be the left edge when the device is in the portrait orientation) and is center aligned (as opposed to aligned with the input regions 5004 and 4006).

FIG. 5A36 following FIG. 5A1 illustrate an example embodiment where ringer status indicator 5092 is concurrently displayed with control 5014 in response to a first press input (e.g., press input 5088) on input region 5006.

FIG. 5A37 following FIG. 5A36 illustrate that, if another input (e.g., a second press input on input regions 5004 and 5006, or a touch input on control 5014) is not detected within a first time period $T_1$, the device changes the appearance of ringer status control 5092 and volume control 5014 to a faded appearance (e.g., shown as ringer status control 5092' and control 5014'). If another input (e.g., a second press input on input regions 5004 and 5006, or a touch input on control 5014' or 5092') is not detected within a second time period $T_2$, the device ceases to display both the ringer status indicator (e.g., ringer status indicator 5092') and the volume control (e.g., control 5014').

FIG. 5A38 and FIG. 5A39 follow FIGS. 5A36 and 5A37, and illustrate that a second press input (e.g., press input 5090) is detected on input region 5006 before the second time period $T_2$ expired after the end of the first press input (e.g., press input 5088). In FIG. 5A38, in response to detecting the second press input (e.g., press input 5090), the device ceases to display ringer status indicator 5092 (or faded ringer status indicator 5092') while maintaining display of the volume control (e.g., transforming control 5014 or faded volume control 5014' into volume control 5018). In some embodiments, in addition to ceasing to display the ringer status indicator 5092 and transforming the volume control object from the first appearance (e.g., shown as control 5014) to the second appearance (e.g., shown as control 5018), the device also adjusts the current value of the control function corresponding to the volume control object and updates the value indicator of the control object to reflect that the current value of the control function has been changed from a first value to a second, lower value in response to the second press input 5090 on input region 5006. In some embodiments, the appearance of the control object is dynamically changed in accordance with the intensity of the press input in a manner analogous to that described in FIGS. 5A13-5A17 where the control object with the second appearance is further elongated and narrowed with the increasing intensity of the press input, and restored to the steady state second appearance (e.g., shown as control 5018) after the intensity of the press input falls below a predefined threshold intensity (e.g., input detection threshold intensity). In addition, while control 5014 or faded control 5014' remains displayed on the screen (e.g., before the second amount of time $T_2$ expired after the previous press input ended), touch-inputs (e.g., upward or downward swipe inputs, light press inputs, and/or touch-hold inputs) on the touch-screen at a location corresponding to the control 5014 or 5014' causes adjustment to the current value of the control function and/or expansion of the volume control in manners analogous to those shown in FIGS. 5A9-5A12 (e.g., illustrating value adjustments) and FIGS. 5A18-5A20 (e.g., illustrating expansion of control), in accordance with some embodiments. In some embodiments, swipe inputs on control 5014 to adjust value of the volume control also causes the ringer status indicator to disappear from the touch screen.

FIG. 5A40 continues from FIG. 5A37, and illustrates an example scenario in which a tap input by a contact (e.g., contact 5094) is detected at a location on touch-screen 112 that corresponds to ringer status indicator 5092' (e.g., before the second time period $T_2$ after the end of the first press input (e.g., press input 5088 in FIG. 5A36) has expired). In response to detecting the tap input by contact 5094, the device changes the operation mode of the ringer (e.g., from ON to OFF) and updates the appearance of ringer status indicator to reflect that the current operation mode of the ringer has been changed from ON (e.g., shown by ringer status indicator 5092') to OFF (e.g., shown by ringer status indicator 5092"), as shown in FIG. 5A41. In some embodiments, the device also ceases to display the volume control 5014 or 5014', as shown in FIG. 5A41.

In some embodiments, the features illustrated in FIGS. 5A21-5A35 are applicable to the embodiments illustrated in FIGS. 5A36-5A41 and are optionally combined with the features shown in FIGS. 5A36-5A41 in various embodiments.

In the examples shown in FIGS. 5A1-5A34 and the examples shown in FIG. 4A36-4A41, an initial press input on the input region (e.g., input region 5006) on the side of the device separate from the touch-screen 112 causes the device to display the control object with a first appearance (e.g., control 5014 alone, or control object 5014 with ringer status indicator 5092), and a second press input on input region (e.g., input region 5004 or 5006) or a touch input at a location of the control object (or ringer status indicator) on the touch-screen that is within the second time period $T_2$ after the end of the first press input causes the device to (1) change the current value of the control object (or the current mode of the ringer status indicator), (2) update the appearance of the control object (or the ringer status indicator), and (3) optionally cease to display a concurrently displayed control that is not being altered (e.g., ceasing to display the volume control if the ringer status is changed by the second input, or ceasing to display the ringer status indicator if the volume is changed by the second input). These features allow the user to quickly review the current value and/or current operation mode of the control(s), without accidentally altering them. After the current value and/or current operation mode of the control(s) is displayed in response to the initial press input, the control(s) automatically disappear if no subsequent inputs directed to the control(s) are detected within a time window (e.g., $T_2$). If the user wishes to change the current value or operation mode of the control(s), the user provides a required press input on the side input regions (e.g., input regions 5004, 5008, or 5010) or a touch input on the desired control. When changing the control value in response to the subsequent input, the device also alters the appearance of the control to make the changes more visible and dynamic to provide adequate feedback to the user. In some embodiments, if multiple controls are concurrently displayed in response to the initial press input, only the control that is altered by the subsequent input remains displayed after the subsequent input is detected and the target of the subsequent input is ascertained. This feature provides additional feedback to the user about the effect of his/her inputs and reduces screen clutter that may be distracting to the user.

FIGS. 5B1-5B24 illustrate exemplary user interfaces for turning a device on and off in accordance with some embodiments. The user interfaces in these figures are used to illustrate the processes described below, including the processes in FIGS. 7A-7C.

In FIGS. 5B1-5B3, a control user interface (e.g., control user interface 5014) is displayed on touch-screen 112 in response to an input (e.g., press input 5012 on a middle portion of input region 5100). As shown in FIG. 5B2, in response to an initial portion of the input (e.g., press input 5012), volume control 5014 and ringer status indicator 5092 are displayed adjacent to input region 5100 on the touch-screen. In FIG. 5B2, in response to a subsequent portion of the input (e.g., press input 5012), control user interface 5014 including volume control 5014 and ringer status indicator 5092 along with a plurality of other controls are displayed on the touch-screen. In some embodiments, various features described with respect to the volume control and ringer status indicator in FIGS. 5A1-5A41 are applicable to volume control 5014 and ringer status indicator 5092 shown in FIG. 5B2 as well, and descriptions of the various features are not repeated here in the interest of brevity. In some embodiments, the input region 5100 shown in FIG. 5B1 can be used to provide the functions of input regions 5004 and 5006 in FIGS. 5A1-5A41, with the upper portion of the input region 5100 providing the functions of input region 5004, and the lower portion of the input region 5100 providing the functions of input region 5006. In some embodiments, input region 5100 responds to toggle inputs and is optionally used to implement input region 5008 shown in FIGS. 5A1-5A41. In some embodiments, control user interface 5194 is displayed in various manners and/or in response to other types of inputs, such as a downward swipe input on the status indicators shown in the upper right corner of the currently displayed user interface (e.g., status indicators shown in the upper right corner of home screen user interface 5002, as shown in FIG. 5B1), a double-press input on input region 5100, simultaneous presses on both input regions 5004 and 5006, double presses on a home button, a tap input on control center icon shown on the touch-screen, a press input on a control object shown on the touch-screen, etc.

In FIG. 5B4, a control user interface (e.g., control user interface 5014) is displayed, including a plurality of user interface objects. As shown in FIG. 5B4, the control user interface includes one or more first controls that are configured to switch an operation mode of a respective control functions. Examples of the first controls include ringer status indicator 5092 for switching the ringer operation mode between ON and OFF, an airplane mode control for switching the airplane mode between ON and OFF, a WiFi control for turning a WiFi connection ON and OFF, a screen rotation lock for switching automatic screen rotation ON and OFF, a flashlight control for turning the flashlight ON and OFF, a timer control for starting and stopping a timer, a nightshift control for turning the nightshift mode ON and OFF, etc. As shown in FIG. 5B4, the control user interface includes one or more second controls that are configured to adjust a current value of a respective control function corresponding an operation mode of a respective control function. Examples of the second controls include volume control 5014 for adjusting a volume of an audio output device, a brightness control for adjusting a brightness of a display, a font size slider control for adjusting a font size of the displayed user interfaces, a brightness slider for adjusting a brightness of a flashlight, a timer slider for adjusting a duration of a timer, etc. As shown in FIG. 5B4, the control user interface optionally includes one or more application icons for activating a respective application from the control user interface. Examples of the application icons include an application icon for launching the camera application, an application icon for launching the calculator application, an application icon for launching a smart home application, etc. As shown in FIG. 5B5, the control user interface optionally includes one or more control modules that include multiple controls, such as a media play control module that includes multiple playback controls, connectivity control module that include controls corresponding to various network connection protocols, a screen projection module for projecting content onto different display devices, etc. As shown in FIG. 5B4, control user interface 5104 includes one or more system controls, including control 5106 for turning off the device and a control for initiating a SOS call, etc. Each of these controls optionally respond to more than one type of inputs, and share characteristics of other types of controls in the control user interface. In some embodiments, one or more of the first controls and second controls each have a corresponding expanded control module that includes the control itself and one or more other controls that are selected from control user interface 5104 and/or one or more other controls that are not initially displayed on control user interface 5104. In some embodiments, the expanded control module corresponding to a displayed control in control user interface 5104 is displayed in response to an input that meets enhanced criteria that are distinct from the criteria for triggering the primary functions of the control (e.g., criteria for detecting a tap input to switch an operation mode of a toggle control or launch an application, or criteria for detecting a swipe input to adjust a value of a slider control).

In FIGS. 5B5-5B8, two types of inputs directed to a first control (e.g., ringer status indicator 5092) in control user interface 5104 are detected and cause distinct responses. In FIG. 5B5, a tap input by contact 5108 is detected on ringer status indicator 5092 shown in control user interface 5104. In response to detecting the tap input on ringer status control 5092, the device switches the operation mode of the ringer from ON to OFF, and alters the appearance of the ringer status control to indicate that the current mode of the ringer is OFF (e.g., indicator 5092' replaced indicator 5092 in FIG. 5B6). In some embodiments, the appearance of volume control 5014 is also altered (e.g., switched to a faded state shown as control 5014'), if the volume control 5014 is currently configured to control the volume of the ringer. In FIG. 5B7 following FIG. 5B4, a light press input (or a touch-hold input) by contact 5110 is detected on ringer status indicator 5092 shown in control user interface 5104. In response to detecting the light press input (or the touch-hold input) on ringer status indicator 5092 shown in control user interface 5104, the device displays an expanded version 5028 of the ringer status indicator in an expanded control user interface 5036 (e.g., also shown in FIG. 5A20), as shown in FIG. 5B8. In some embodiments, the expanded control user interface 5036 is displayed after the end of the input has been detected and the criteria for displaying the expanded control user interface have been met by the input. In FIG. 5B8, expanded control user interface 5036 also includes expanded volume control 5040, user interface objects 5042 and 5044 for switching to volume controls for different devices, and identifier 5046 for identifying the audio output device that is controlled by volume control 5040.

In FIG. 5B9-5B12, two types of inputs directed to a second control (e.g., volume control 5014) in control user interface 5104 are detected and cause distinct responses. In FIG. 5B9 following FIG. 4B4, a swipe input (e.g., a downward swipe input) by contact 5112 is detected on volume control 5014 shown in control user interface 5104. In response to detecting the swipe input on volume control 5014, the device adjusts a current value of the volume control from a first value to a second value in accordance with the movement of contact 5112, and alters the appearance of the volume control (e.g., the location of the value indicator in the volume control) to indicate that the current value of the volume control has been adjusted. In FIG. 5B11 following FIG. 5B4, a light press input (or a touch-hold input) by contact 5114 is detected on volume control 5014 shown in control user interface 5104. In response to detecting the light press input (or touch-hold input) on volume control 5014 shown in control user interface 5104, the device displays an expanded version 5040 of the volume control in the expanded control user interface 5036 (e.g., also shown in FIG. 5A20 and FIG. 5B8), as shown in FIG. 5B12. In some embodiments, the expanded control user interface 5036 is displayed after the end of the input has been detected and the criteria for displaying the expanded control user interface have been met by the input. In FIG. 5B12, expanded control user interface 5036 also includes expanded ringer status indicator 5038, user interface objects 5042 and 5044 for switching to volume controls for different devices, and identifier 5046 for identifying the audio output device that is controlled by volume control 5040.

FIGS. 5B13-5B21 illustrate different types of input being directed to a third control (e.g., power button 5106) in control user interface 5014 to power off the device (e.g., including shutting down the display and other normal functions (e.g., functions provided by the main processors) of the device), in accordance with various embodiments. In some embodiments, when a device is turned off, the device maintains availability of some baseline functions, such as a remote self-erase function and a restart function implemented by a baseline processor of the device.

In FIG. 5B13, a tap input by contact 5118 is detected on power button 5106. In FIG. 5B14 following FIG. 5B13, in response to detecting the tap input by contact 5118, the device displays visual feedback (e.g., a pop-up or shaking of the power button) indicating that an input on power button 5016 has been detected, but the input does not meet the criteria for turning the device off. In some embodiments, a pop-up window (e.g., window 5120) is displayed overlaying control user interface 5104, with an explanation regarding the input that is required to turn the device off (e.g., "Touch and hold power button icon to initiate device shut down"). In some embodiments, if a touch-hold input meeting a threshold duration on power button 5016 is detected, the device initiates the process for shutting down the device, and eventually turns off the device. In FIG. 5B15 following FIG. 5B13, in some embodiments, in response to detecting the tap input by contact 5118, the device displays shut-down user interface 5122 that includes a first user interface object that, when activated, turns off the device (e.g., slider 5126 that prompts the user to touch on the left end of the slider and swipe to the right end of the slider to turn off the device) and a second user interface object (e.g., cancel button 5124) that, when activated, redisplays control user interface 5104. In some embodiments, shut down user interface 5126 is optionally displayed in response to a light press input or touch-hold input on power button 5118, while a tap input causes display of prompt window 5120.

In FIG. 5B16 following FIG. 5B13, a light press input (or a touch-hold input) is detected on power button 5118 in control user interface 5104. In response to detecting the light press input (or the touch-hold input) by contact 5118, the device initiates a process for shutting down the device. As shown in FIG. 5B17, the device starts to dim the screen and displays a prompt indicating the shut-down process has been initiated in accordance with a determination that the intensity (and/or duration) of the input by contact 5118 has met the criteria for shutting down the device. In some embodiments, if the press input (or touch-hold input) ends after the criteria for shutting down the device has been met, the device completes the shut-down process, irrespective of whether an end of the press input (or touch-hold input) is detected by the device. In FIG. 5B19 following FIG. 5B18, the device is completely turned off (e.g., showing a dark screen 5132) after the completion of the shut-down process that is initiated through interactions with power button 5118. While the device is shut down, the device does not respond to inputs, except for one or more limited inputs for turning on the device and optionally self-erasing the device in response to preset remote instructions.

FIG. 5B20 optionally follows FIG. 5B13 or FIG. 5B16 in which a contact (e.g., contact 5118) has been detected on power button 5106 in control user interface 5104. In response to detecting the contact 5118, and in accordance with a determination that an initial portion of the input by contact 5118 meets first criteria (e.g., first criteria requires that the duration and/or intensity of the contact is at least a first duration (e.g., a nominal duration, or a first non-nominal time threshold) and/or a first intensity (e.g., a contact detection intensity threshold, or a light press intensity threshold)), the device displays user interface object 5136 (e.g., overlaying blurred and darkened control user interface 5104 (e.g., displayed as background 5134)) that prompts the user to provide a swipe input along the user interface object 5136 to complete the shut-down process. In FIG. 5B21, movement of contact 5118 or a swipe input by another contact along the length of user interface object 5136 is detected, and the device initiates and eventually completes the process for turning off the device.

FIGS. 5B22-5B24 illustrates a process for turning on the device after the device has been turned off using power button 5106 in control user interface 5104. In FIG. 5B22, the device is in the powered off state, with a dark screen 5132. In FIG. 5B23, an input on one or more off-screen input regions that remain responsive during the power off state (e.g., simultaneous press inputs on input regions 5100 and 5010) have been detected. In response to detecting the input and in accordance with a determination that the input meets predefined criteria for turning on the device, the device (e.g., a baseline power module thereof) initiates a process for turning on the device into a normal operational state. The device displays user interface 5146 indicating that the process for turning on the device has been started. In FIG. 5B24, after the device for turning on the device is completed, a default starting user interface (e.g., a home screen user interface, wake screen user interface 5054, a lock screen user interface, etc.) is displayed on touch-screen 112, as shown in FIG. 5B24.

FIGS. 6A-6I are follow diagrams illustrating a method 6000 of interacting with a control in accordance with some embodiments.

Method 6000 provides a mechanism for a user to query the device regarding a current value or operation mode of a control of the device by a press input on an intensity-sensitive off-display input region (e.g., a mechanical or solid state button, a touch-sensitive surface etc.) without altering the current value or operation mode of the control. At the same time, the option to alter the current value or operation mode of the control is preserved and is executed if a second press input is detected on the intensity-sensitive off-display input region within a predefined time window after the end of the previous press input. If no such press input is received within the predefined time window, the control ceases to be displayed automatically after expiration of the predefined time window. The device generates dynamic visual feedback (optionally, in conjunction with haptic feedback) during the second press input to make the changes to the value or operation mode of the control more salient to the user during the input. In particular, the control has a first appearance when initially displayed, and has a second appearance, distinct from the first appearance, when the value or operation mode of the control is adjusted in response to the second press input. Providing a light-weight mechanism for a user to obtain a current state of a control without altering the current value of the control and allowing the user the option to subsequently alter the value with an additional input or forgoing such option by not providing the additional input, enhance the operability of the device and make the user-device interface more efficient (e.g., by helping the user to provide inputs required to achieve an intended outcome and reducing user mistakes when operating/interacting with the device, and by reducing the number of steps to perform an action), which, additionally, reduces power usage and improves battery life of the device by enabling the user to use the device more quickly and efficiently. In addition, changing the appearance of the control (e.g., dimensions of the control) in addition to adjusting the value of the control and moving the value indicator in accordance with the second press input, provides additional feedback to the user, that further improves responsiveness of the user interface and reduces user mistakes when operating the device, which further reduces power usage and improves the battery life of the device.

The method 6000 is performed at an electronic device (e.g., device 300, FIG. 3, or portable multifunction device 100, FIGS. 1A and 4A) with a display (e.g., a display that is disposed on a front-side of the device), and a first input region (e.g., input regions 5004, 5006, 5008, 5010, 5100, 455, 456, or 457) that is separate from the display (e.g., a depressible button, a solid state button, or a touch-sensitive region that is configured to respond to inputs in place of a button). In some embodiments, the device is a tablet-shaped device that has a flat front-side (e.g., display-side), a flat back-side (e.g., back-side), and one or more flat, beveled, or curved peripheral-sides (e.g., four narrow flat faces joined by sharp straight edges, four narrow flat faces joined by rounded edges, or a continuous curved surface) that join the front and back sides, with sharp or rounded edges. In some embodiments, the display is a touch-screen display and the touch-sensitive surface is on or integrated with the display. In some embodiments, the display is separate from the touch-sensitive surface. In some embodiments, the first input region is a touch-sensitive surface that detects intensity of a contact with the touch-sensitive surface, e.g., based on capacitive and/or resistive touch sensing technologies. In some embodiments, the first input region is a touch-sensitive surface that detects presence of a contact and/or pressing of an input object (e.g., a finger) based on force, pressure, and/or vibration sensors coupled to the surface. In some embodiments, the first input region is a surface that is coplanar with the display (e.g., a touch-screen display). In some embodiments, the first input region is a surface (e.g., a protruding region, a recessed region, or a region that is flush with the surrounding surface) that is disposed on a peripheral-side of the device adjacent to the front-side of the device (e.g., a left edge, a right edge, a top edge, or a bottom edge, or along two or more of those edges). In some embodiments, the electronic device further includes one or more first sensors to detect presence and/or intensities of contacts with the display of the device (e.g., capacitive and/or resistive sensors to detect intensities of a contact on the touch-screen display), and one or more second sensors to detect presence and/or intensities of contacts with the first input region of the device, (e.g., capacitive, resistive, pressure, force, and/or vibration sensors to detect presence, activation, and, optionally, intensities of contact with the first input region (e.g., the side "button" region)). In some embodiments, the device further includes one or more tactile output generators for generating tactile outputs (e.g., button actuators for generating localized tactile outputs at the first input region, and/or one or more internal actuators for generating whole-device tactile outputs, etc.). In some embodiments, the method 6000 is governed by instructions that are stored in a computer-readable storage medium (e.g., a non-transitory computer readable storage medium) and that are executed by one or more processors of the electronic device, such as the one or more processors 122 of device 100 (FIGS. 1A and 4A). For ease of explanation, the following describes method 6000 as performed by the device 100. Some operations in method 6000 are, optionally, combined and/or the order of some operations is, optionally, changed.

Referring to FIG. 6A, in method 6000, the device detects (6002) a first press input (e.g., press input 5012 in FIG. 5A2) on the first input region (e.g., a button activation input on a physical button or a hard press input on an intensity sensitive element with a characteristic intensity that is above an intensity threshold). In some embodiments, detecting the first press input includes detecting touch-down of the first contact on the touch-sensitive side button of the device, and detecting a press input (e.g., an increase in intensity of the first contact above a light press intensity threshold that is greater than a nominal contact detection intensity threshold) by the first contact). In response to detecting the first press input on the first input region, and in accordance with a determination that the first press input meets first criteria (and optionally that the toggle state of a related control (e.g., the ringer on/off control) is not currently in the off state) (e.g., the first press input meets indicator-display criteria), the device displays (6004), on the display, a first control (e.g., volume control 5014) corresponding to a first control function (e.g., controlling volume of an audio output device) of the device (e.g., a control for selecting a value from a plurality of values for the first control function), wherein the first control is displayed with a first size (e.g., the control is a slider control with a first length and first width, a dial with a first radius, etc.) and includes a value indicator to represent that a current value of the first control function of the device is a first value (e.g., the first value is the current value of the first control function and is not adjusted in response to the first input). In some embodiments, the display is off before the first input is detected, and the display is turned on in response to the first portion of the first input is detected and in accordance with the determination that the first criteria are met by the first portion of the first input. In some embodiments, the first input is detected while a wake screen user interface or a lock screen user interface is shown on the display. In some embodiments, the first input is detected while a home screen or springboard user interface is shown on the display. In some embodiments, the first input is detected while a user interface of an application is shown on the display. After displaying the first control with the first size and the value indicator representing the first value of the first control function (e.g., during and after a predefined time window (e.g., defined by a preset threshold amount of time (e.g., $T_2$)) that is started from displaying the control and the value indicator in response to the first press input, the device performs (6006) the following operations: (1) In accordance with a determination that a subsequent press input has not been detected on the first input region within a threshold time from when the first press input was detected (and that the time window has not been reset in response to a tap input on the control shown on the touch-screen), the device ceases to display the first control (e.g., fading out the control and the value indicator) (e.g., without changing the current value of the first control function, without changing a size of the control from the first size to the second size); and (2) In accordance with a determination that a second press input has been detected on the first input region within the threshold time from when the first press input was detected (e.g., detecting a second press input that meets control-adjustment criteria) (e.g., detecting an initial press input by the first contact on the touch-sensitive side button of the device and detecting a second press input after an initial press input by the first contact, or detecting a second contact on the first input region (e.g., after lift-off of the first contact) and detecting a press input by the second contact): the device adjusts the current value of the first control function of the device from the first value to a second value that is different from the first value (e.g., increasing or decreasing the current value of the first control function), wherein the second value is selected in accordance with the second press input (e.g., a greater amount of increase or decrease in the current value of the control function is made in response to a press input with a greater intensity or a greater rate of change in intensity, a greater movement speed (e.g., in a press and flick gesture on the input region), and/or a greater duration (e.g., in a press and hold gesture or a touch and hold gesture), and vice versa); the device adjusts a size of the first control from the first size to a second size distinct from the first size (e.g., the control is stretched lengthwise, and contracts widthwise, or expanded radially in response to the second press, and in conjunction with the change in appearance of the value indicator to reflect the adjustment to the current value of the first control function); and the device changes an appearance of the value indicator in the first control to represent that the current value of the first control function is the second value (e.g., the value indicator is moved along the slider control in response to the second press input, as the size of the control is adjusted from the first size to the second size, and the location of the value indicator represents the second value on the control of the second size). These features are illustrated in FIGS. 5A2-5A3 (e.g., volume control 5014 is displayed in response to a first press input 5012), FIG. 5A3 followed by FIGS. 5A7-5A8 (e.g., volume control 5014 ceases to be displayed after time window $T_2$), and FIGS. 5A13-5A15 following FIG. 5A3 (e.g., volume control 5014 is transformed to volume control 5018 and 5018' in response to a second press input detected within the time window $T_2$, and value of the control is adjusted), and accompanying descriptions, for example. Adjusting the current value of the first control function, adjusting the size of the first control, and changing the appearance of the value indicator, in accordance with the determination that the second press input has been detected on the first input region within the threshold time from when the first press input was detected provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first press input on the first input region: in accordance with a determination that the first input meets the first criteria (e.g., the indicator-display criteria), the device displays (6008), on the display, a second control (e.g., ringer status indicator 5092 in FIG. 5A36) corresponding to a second control function of the device (e.g., a control for switching between a plurality of modes of the second control function (e.g., ringer on/off control)) concurrently with the first control (e.g., with the first size) corresponding to the first control function of the device (e.g., volume status indicator). After displaying the first control (e.g., with the first size and the value indicator representing the first value of the first control function) and the second control: in accordance with a determination that the second press input has been detected on the first input region within the threshold time from when the first press input was detected (e.g., the second press input meets the control-adjustment criteria): the device ceases to display the second control corresponding to the second control function of the device, while maintaining display of the first control corresponding to the first control function of the device (e.g., while adjusting the current value of the first control function of the device in accordance with the second press input and updating an appearance of the first control (e.g., changing the size of the first control from the first size to the second size and changing the appearance of the value indicator to represent that the current value of the first control function is the second value). In some embodiments, the currently selected modes of the second control enables or disables the first control, e.g., when the second control is in a first state, the values of the first control does not affect the first control function of the device; and when the second control is in a second state, the values of the first control affects the first control function of the device. These features are illustrated in FIGS. 5A36-5A39 (e.g., volume control 5014 and ringer status indicator 5029 are concurrently displayed in response to a first press input, and ringer status indicator ceases to be displayed while volume control is adjusted in response to a second press input) and accompanying descriptions, for example. Ceasing to display the second control corresponding to the second control function of the device, while maintaining display of the first control corresponding to the first control function of the device, in accordance with the determination that the second press input has been detected on the first input region within the threshold time from when the first press input was detected, provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, while displaying the first control and the value indicator corresponding to the first control function, the device detects (6010) an input (e.g., a switching input) on a second input region that is separate from the display (e.g., the ringer on/off switch on the side of the display, that is separate from the first input region). In response to detecting the input on the second input region: in accordance with a determination that the input on the second input region corresponds to a request to change a current mode of the second control function from a first mode (e.g., ringer on mode) to a second mode (e.g., ringer off mode) distinct from the first mode: the device ceases to display the first control and the value indicator corresponding to the first control function; and the device changes an appearance of the second control corresponding to the second control function to indicate that the current mode of the second control function is the second mode. These features are illustrated in FIGS. 5A40-5A41 following FIG. 5A36 or 5A37 (e.g., a tap input on ringer status indicator 5092 causes volume control 5014 to disappear while the ringer is turned off) and accompany descriptions, for example. Ceasing to display the first control and the value indicator corresponding to the first control function and changing an appearance of the second control corresponding to the second control function to indicate that the current mode of the second control function is the second mode provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, displaying the first control corresponding to the first control function includes (6012): moving the first control onto the display from a first location adjacent to the first input region to a second location that is farther from the first input region than the first location. For example, in some embodiments, the volume control indicator expands out from the portion of the display that is adjacent to the volume buttons of the device. These features are illustrated in FIG. 5A1-5A3 and accompanying descriptions, for example. Providing the controls at a location close to the input region receiving the input for displaying the control provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, displaying the first control corresponding to the first control function includes (6014): in accordance with a determination that the device is being held in a first orientation (e.g., the device is held in a landscape orientation, with the edge of the device on which the first input region is located becoming the top edge of the device in the landscape orientation), displaying the first control in a centrally aligned configuration on the display (e.g., unaligned with the location of the first input region); and in accordance with a determination that the device is being held in a second orientation (e.g., the device is held in a portrait orientation, with the edge of the device on which the first input region is located becoming a side edge of the device in the landscape orientation), displaying the first control aligned with the first input region, offset from the centrally aligned configuration. These features are illustrated in FIGS. 5A1-5A3 (e.g., portrait orientation case) and FIGS. 5A34 and 5A35 (e.g., landscape orientation case) and accompanying descriptions, for example. Displaying the first control aligned with the first input region, offset from the centrally aligned configuration or displaying the first control in a centrally aligned configuration on the display, in accordance a determination whether the device is being held in a second orientation or a first orientation, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, adjusting the size of the control from the first size to the second size in accordance with a determination that a second press input has been detected on the first input region within the threshold time from when the first press input was detected, includes (6016): increasing the size of the control in a first dimension of the control (e.g., increasing the length of the slider control); and reducing the size of the control in a second dimension of the control (e.g., decreasing the width of the slider control) that is distinct from the first dimension (e.g., a dimension that is orthogonal to the first dimension). In some embodiments, as the intensity of the press input increases, the slider control is elongated, and becomes thinner in width. In some embodiments, the slider control is increasingly elongated and thinner with each additional press input that is detected on the same input region (e.g., the volume down button). In some embodiments, the slider control is restored to the same length and width (e.g., the second size) after each additional press input that is detected after the first press input, even though the slider control is stretched out (e.g., becomes longer and thinner) during each of the press input (e.g., during the increase of the intensity of the press input). In some embodiments, the slider control is stretched longer and longer with consecutive press inputs that is detected within a short amount of time (e.g., before the slider is restored to the second size after a previous press input). These features are illustrated in FIGS. 5A13-5A17 (e.g., control 5014 is transformed to control 5018, 5018', 5018" (e.g., elongated and narrower) in response to consecutive press inputs) and accompanying descriptions, for example. Increasing the size of the control in a first dimension of the control and reducing the size of the control in a second dimension of the control provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, the second press input has been detected on the first input region within the threshold time and the size of the control is adjusted (6018) from the first size to the second size. While displaying the control with the second size and the value indicator representing that the current value of the first control function is the second value, the device detects a third press input on the first input region. In response to detecting the third press input on the first input region: in accordance with a determination the third press input corresponds to a request to change the current value of the first control function to an end value of the first control function (e.g., a maximum value or a minimum value among the plurality of values of the first control function): the device adjusts the current value of the first control function of the device from the second value to the end value of the first control function; adjusting the size of the control from the second size to a third size distinct from the second size (e.g., the control is stretched lengthwise, and contracts widthwise, or expanded radially) (e.g., before an end of the third press input is detected (e.g., before a reduction of the intensity of the third press input is detected)); the device changes the appearance of the value indicator in the control to represent that the current value of the first control function is the end value of the first control function (e.g., while and after the size of the control is adjusted from the second size to the third size); and the device adjusts the size of the control from the third size back to the second size after an end of the third press input is detected (and, optionally, also adjusting the appearance of the value indicator in the control to represent that the current value of the first control function is the end value of the first control function). These features are illustrated in FIGS. 5A13-5A17 (e.g., control 5014 is transformed to control 5018, 5018', 5018" (e.g., elongated and narrower) in response to consecutive press inputs, and returns to control 5018 after the end of the press inputs) and accompanying descriptions, for example. Adjusting the current value of the first control function, adjusting the size of the control from the second size to a third size, changing the appearance of the value indicator in the control, and adjusting the size of the control from the third size to the second size, provide improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, in response to detecting the third press input on the first input region (6020): in accordance with a determination that the second value is a first end value of the first control function and the third press input corresponds to a request to change the current value of the first control function beyond the first end value of the first control function: the device adjusts the size of the control from the second size to the third size distinct from the second size (e.g., the control is stretched lengthwise, and contracts widthwise, or expanded radially) (e.g., before an end of the third press input is detected (e.g., before a reduction of the intensity of the third press input is detected)) (e.g., while adjusting the appearance of the value indicator to represent that the current value of the first control function remains unchanged at the end value of first control function); the device adjusts the size of the control from the third size back to the second size after an end of the third press input is detected (e.g., while adjusting the appearance of the value indicator to represent that the current value of the first control function remains unchanged at the end value of first control function); and the device displays the value indicator with a corresponding appearance that represents that the current value of the first control function remains unchanged at the first end value of the first control function. Adjusting the size of the control from the second size to the third size, adjusting the size of the control from the third size back to the second size, and displaying the value indicator with a corresponding appearance provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, the second press input has been detected (6022) on the first input region within the threshold time and the size of the control is adjusted from the first size to the second size. While displaying the control with the second size and the value indicator representing that the current value of the first control function is the second value, the device detects a first touch input on a touch-sensitive surface (e.g., the touch-screen display that displays the control) that is separate from the first input region; and in response to detecting the first touch input on the touch-sensitive surface that is separate from the first input region: in accordance with a determination the first touch input is detected at a location that corresponds to a location of the first control on the display (e.g., and that the first touch input is a tap input with lift-off of the contact detected within a threshold amount of time after touch-down of the contact on the touch-sensitive surface, or a touch-down of the contact on the first control shown on the touch-screen without lift-off of the contact): the device adjusts the size of the first control from the second size to the first size, without adjusting the current value of the first control function. In some embodiments, the appearance of the value indicator in the control to represent that the current value of the first control function is the second value of the first control function, given the changed size of the control from the second size back to the first size. For example, control 5018 shown in FIGS. 5A15 and 5A17 will be transformed to control 5014 with corresponding value indicators to show the current value of the control function, in response to a touch input on control 5018 on the touch-screen, in accordance with some embodiments. Adjusting the size of the first control from the second size to the first size without adjusting the current value of the first control function in accordance with a determination the first touch input is detected at a location that corresponds to a location of the first control on the display provides improved visual feedback to the user (e.g., allowing the user to see the change of size of the first control in response to the first touch input). Providing improved visual feedback enhances the operability of the device and makes the user-device interface more efficient, which, additionally, reduces power usage and improves battery life of the device by enabling the user to use the device more quickly and efficiently.

In some embodiments, the second press input has been detected (6024) on the first input region within the threshold time and the size of the control is adjusted from the first size to the second size. The first touch-input has been detected after the second press input, and the size of the control is adjusted from the second size back to the first size. While displaying the first control with the first size and the value indicator representing that the current value of the first control function is the second value, the device detects a second touch input (e.g., the second touch input is a continuation of the first touch input with the same contact, or a separate touch input after the lift-off of the first touch input) on the touch-sensitive surface (e.g., the touch-screen display that displays the control) that is separate from the first input region. In response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control (e.g., a direction of increasing values or a direction of decreasing values): the device adjusts the current value of the first control function of the device from the second value to a third value that is different from the second value, wherein the third value is selected in accordance with the second touch input (e.g., a greater amount of increase or decrease in the current value of the control function is made in response to a touch input with a greater movement or a greater movement speed (e.g., in a press and flick gesture on the input region), and vice versa). In some embodiments, the device adjusts the size of the first control from the first size to the second size (e.g., the control is stretched lengthwise, and contracts widthwise, or expanded radially), and changes the appearance of the value indicator in the control to represent that the current value of the first control function is the third value. In some embodiments, the size of the first control remains at the first size, and the value indicator is changed to show the current value of the first control function in accordance with the movement of the second touch input. These features are illustrated in FIGS. 5A9-5A12 (e.g., swipe inputs on control 5014 (and/or controls 5016 and 5018) cause adjustment of the control value (and restoration of control 5014)) and accompanying descriptions, for example. Adjusting the current value of the first control function of the device from the second value to a third value that is different from the second value in response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control performs an operation when a set of conditions has been met without requiring further user input (e.g., automatically adjusting the current value of the first control function). Performing an operation when a set of conditions has been met without requiring further user input controls enhances the operability of the device, which, additionally, reduces power usage and improves battery life of the device by enabling the user to use the device more quickly and efficiently.

In some embodiments, a sequence of one or more press inputs have been detected (6026) on the first input region and the size of the first control is currently displayed with the second size and with the value indicator representing that the current value of the first control function is a fourth value that is distinct from an end value of the first control function. After the sequence of one or more press inputs detected on the first input region and while the first control is displayed with the second size and the value indicator representing the fourth value, the device detects a fourth press input on the first input region. In response to detecting the fourth press input on the first input region: in accordance with a determination that the fourth press input corresponds to a request to change the current value of the first control function to an end value of the first control function: the device generates a first tactile output in conjunction with adjusting the current value of the first control function of the device from the fourth value to the end value of the first control function (and optionally, in conjunction with adjusting the size of the control from the second size to a third size distinct from the second size (e.g., the control is stretched lengthwise, and contracts widthwise, or expanded radially) (e.g., before an end of the fourth press input is detected (e.g., before a reduction of the intensity of the fourth press input is detected)), and in conjunction with changing the appearance of the value indicator in the control to represent that the current value of the first control function is the end value of the first control function, and/or in conjunction with adjusting the size of the control from the third size back to the second size after an end of the fourth press input is detected). In some embodiments, a tactile output is generated each time that a press input is detected attempting to change the value beyond the end value of the control. In some embodiments, the tactile output has a tactile output characteristic with a value (e.g., output magnitude) that is determined based on a characteristic value of the press input (e.g., intensity of the press input, a rate of change in the intensity of the press input, etc.). In some embodiments, the same tactile output is generated in response to the fourth press input on the first input region, when the first control is displayed with the first size, and with the fourth value being the current value. These features are illustrated in FIG. 5A16 (e.g., tactile output 5033 is generated when an end value of the control function is reached in response to press input 5032) and accompanying descriptions, for example. Generating a first tactile output in conjunction with adjusting the current value of the first control function of the device from the fourth value to the end value of the first control function in accordance with a determination that the fourth press input corresponds to a request to change the current value of the first control function to an end value of the first control function provides improved haptic feedback to the user (e.g., haptic feedback indicating that the end value of the first control function has been reached). Providing improved haptic feedback enhances the operability of the device and makes the user-device interface more efficient, which, additionally, reduces power usage and improves battery life of the device by enabling the user to use the device more quickly and efficiently.

In some embodiments, while the first control is displayed (e.g., with the first size or with the second size) and the value indicator represents that the current value of the first control function is the fourth value (e.g., after the fourth press input and after another press input on the first input region or a swipe input on the control to adjust the value of the first control function from the end value back to the fourth value), the device detects (6028) a third touch input on the touch-sensitive surface (e.g., the touch-screen display that displays the control) that is separate from the first input region. In response to detecting the third touch input on the touch-sensitive surface that is separate from the first input region: in accordance with a determination that the third touch input corresponds to a request to change the current value of the first control function to the end value of the first control function: the device generates a second tactile output in conjunction with adjusting the current value of the first control function of the device from the fourth value to the end value of the first control function (and optionally, in conjunction with adjusting the size of the control from the second size to a third size distinct from the second size (e.g., the control is stretched lengthwise, and contracts widthwise, or expanded radially) (e.g., before an end of the third touch input is detected), in conjunction with changing the appearance of the value indicator in the control to represent that the current value of the first control function is the end value of the first control function, and/or in conjunction with adjusting the size of the control from the third size back to the second size after an end of the fourth press input is detected). In some embodiments, a tactile output is generated each time that a swipe input is detected attempting to change the value beyond the end value of the control. In some embodiments, the tactile output has a tactile output characteristic with a value (e.g., output magnitude) that is determined based on a characteristic value of the swipe input (e.g., magnitude of the swipe input, a speed of the swipe input at the time of lift-off of the contact, etc.). These features are illustrated in FIGS. 5A11-5A12 (e.g., tactile output 5028 is generated when an end value of volume control is reached in response to a swipe input on control 5014) and accompanying descriptions, for example. Generating a second tactile output in conjunction with adjusting the current value of the first control function of the device from the fourth value to the end value of the first control function in accordance with a determination that the third touch input corresponds to a request to change the current value of the first control function to the end value of the first control function provides improved haptic feedback to the user (e.g., indicating to the user that the end value of the first control function has been reached). Providing improved haptic feedback enhances the operability of the device and makes the user-device interface more efficient, which, additionally, reduces power usage and improves battery life of the device by enabling the user to use the device more quickly and efficiently.

In some embodiments, a respective tactile output characteristic of the first tactile output has (6030) a first value and the respective tactile output characteristic of the second tactile output has a second value that is different from the first value. For example, the tactile output generated in response to a swipe input on the touch-screen has a distinct frequency, wave pattern, or magnitude from the tactile output generated in response to a press input on the first input region, when both the swipe input and the press input causes the value of the control to reach the same end value or attempt to go beyond the same end value of the first control function. In some embodiments, the first tactile output and the second tactile output is generated by distinct tactile output generators. For example, the first tactile output is generated by a localized tactile output generated located at the first input region, and provides tactile output to the pressing finger to simulate a button press that has reached an end value. The second tactile output is generated by a whole device tactile output generator that provides tactile output to the hand that is holding the device (e.g., as opposed to the finger that provided the swipe or flick input) to simulate the value indicator reaching an end of the slider control. A respective tactile output characteristic of the first tactile output having a first value and the respective tactile output characteristic of the second tactile output having a second value that is different from the first value provides improved haptic feedback to the user (e.g., allowing the user to determine based on the haptic feedback what type of touch input was detected). Providing improved visual feedback enhances the operability of the device and makes the user-device interface more efficient, which, additionally, reduces power usage and improves battery life of the device by enabling the user to use the device more quickly and efficiently.

In some embodiments, a first tactile output characteristic of the first tactile output (e.g., magnitude) has (6032) a predefined fixed value that is independent of a characteristic value of the fourth press input (e.g., intensity), and the first tactile output characteristic of the second tactile output (e.g., magnitude) has variable value that is determined based on a characteristic speed of the third touch input (e.g., movement speed at lift-off). The first tactile output characteristic of the first tactile output having a predefined fixed value that is independent of a characteristic value of the fourth press input and the first tactile output characteristic of the second tactile output having variable value that is determined based on a characteristic speed of the third touch input provides improved haptic feedback to the user (e.g., allowing the user to determine the type of the touch inputs and the characteristic speed of the touch inputs). Providing improved visual feedback enhances the operability of the device and makes the user-device interface more efficient, which, additionally, reduces power usage and improves battery life of the device by enabling the user to use the device more quickly and efficiently.

In some embodiments, while displaying the first control (e.g., with the first size or with the second size) and the value indicator representing the current value of the first control function, the device detects (6034) a fourth touch input on a touch-sensitive surface (e.g., the touch-screen display that displays the control) that is separate from the first input region. In response to detecting the fourth touch input on the touch-sensitive surface that is separate from the first input region: in accordance with a determination the fourth touch input is detected at a location that corresponds to a location of the first control on the display and that the fourth touch input meets control-expansion criteria (e.g., the control expansion criteria include a criterion that is met when an intensity of the fourth touch input exceeds a predetermined intensity threshold (e.g., a light press intensity threshold) without including more than a threshold amount of movement of the contact (e.g., the contact is stationary), or the control expansion criteria includes a criterion that is met when the fourth touch input is kept substantially stationary for a predetermined threshold amount of time (e.g., the fourth touch input is a touch-hold input)): the device displays a control user interface region including the first control (e.g., with a size that is the same or greater than the first size and the second size, and without adjusting the current value of the first control function) and a plurality of controls that are distinct from the first control (e.g., the control user interface region obscures a portion of the user interface outside of the area occupied by the first control, and includes one or more additional controls (e.g., screen brightness controls, ringer status control, wireless connectivity controls, navigation controls, media playback controls, etc.) that are distinct from the first control). In some embodiments, the appearance of the value indicator in the first control to represent that the current value of the first control function is the second value of the first control function, given the changed size of the first control. In some embodiments, the first control is displayed on a full-screen platter that visually obscure other content on the display. In some embodiments, the first control is displayed in a control user interface that includes other controls (e.g., other controls related to the first control, or other controls in a system control user interface). These features are illustrated in FIGS. 5A19-5A20 (e.g., control user interface 5036 is displayed in response to a light press or touch hold input on control 5014) and accompanying descriptions, for example. Displaying a control user interface region including the first control and a plurality of controls that are distinct from the first control in accordance with a determination the fourth touch input is detected at a location that corresponds to a location of the first control on the display and that the fourth touch input meets control-expansion criteria provides improved visual feedback to the user (e.g., allowing the user to view and interact with a control user interface with multiple controls when the fourth touch input is detected at a certain location and meets control-expansion criteria). Providing improved visual feedback enhances the operability of the device and makes the user-device interface more efficient, which, additionally, reduces power usage and improves battery life of the device by enabling the user to use the device more quickly and efficiently.

In some embodiments, in accordance with a determination that the first press input meets the first criteria (e.g., the first press input meets indicator-display criteria), displaying, on the display, the first control (e.g., volume-control indicator) corresponding to the first control function of the device includes (6036): in accordance with a determination that a currently used output device is a first output device among a plurality of output devices (e.g., an internal speaker, a head phone, an external speaker, a remote speaker, wireless earphones, wired earphones, etc.) associated with the electronic device (e.g., the electronic device is outputting audio via a first speaker of a plurality of external speakers), displaying the first control to control an output level of the first output device; and in accordance with a determination that the currently used output device is a second output device among a plurality of output devices (e.g., an internal speaker, a head phone, an external speaker, a remote speaker, wireless earphones, wired earphones, etc.) that is distinct from the first output device (e.g., the electronic device is outputting audio via a second speaker of a plurality of external speakers), displaying the first control to control an output level of the second output device. In some embodiments, the first control is displayed with a respective indicator or identifier that identifies which of the plurality of output devices is currently controlled by the displayed control. The displayed control is optionally given distinct appearances (e.g., with different shapes and colors, and skins) when controlling the different output devices. These features are illustrated in FIGS. 5A3 and 5A27 (e.g., different controls for controlling volume of a speaker and a headphone are displayed in response to press inputs on input region 5006) and accompanying descriptions, for example. Displaying the first control to control an output level of the second output device or displaying the first control to control an output level of the first output device, in accordance with a determination whether the currently used output device is a second output device or a first output device, provides improved visual feedback to the user (e.g., allowing the user to determine the type of the output device currently being used). Providing improved visual feedback enhances the operability of the device and makes the user-device interface more efficient, which, additionally, reduces power usage and improves battery life of the device by enabling the user to use the device more quickly and efficiently.

In some embodiments, the device detects (6038) an input on a second input region (e.g., a toggle input on a physical or solid state toggle switch button) that is separate from the display (and separate from the first input region). In response to detecting the input on the second input region: in accordance with a determination that the input on the second input region meets second criteria (e.g., the input meets control-toggle criteria), the device changes a current mode of a second control corresponding to a second control function of the device from a first mode to a second mode that is distinct from the first mode; and the device displays, on the display, a representation of the second control (e.g., ringer on/off indicator) to represent that the current mode of the second control is the second mode. In some embodiments, the display is off before the input on the second input region is detected, and the display is turned on in response to the input on the second input region and in accordance with the determination that the second criteria are met by the input. In some embodiments, the input on the second input region is detected while a wake screen user interface or a lock screen user interface is shown on the display. In some embodiments, the input on the second input region is detected while a home screen or springboard user interface is shown on the display. In some embodiments, the input on the second input region is detected while a user interface of an application is shown on the display. In some embodiments, the representation of the second control slides down from the top of the display in response to the input on the second input region. These features are illustrated in FIGS. 5A28-5A29 (e.g., ringer being turned off) and 5A32-5A33 (e.g., ringer being turned on) and accompanying descriptions, for example. Displaying a representation of the second control to represent that the current mode of the second control is the second mode in accordance with a determination that the input on the second input region meets second criteria provides improved visual feedback to the user (e.g., allowing the user to determine that the current mode of the second control has been changed). Providing improved visual feedback enhances the operability of the device and makes the user-device interface more efficient, which, additionally, reduces power usage and improves battery life of the device by enabling the user to use the device more quickly and efficiently.

In some embodiments, after displaying the representation of the second control to represent that the current mode of the second control is the second mode (e.g., in response to the input on the second input region) (6040): in accordance with a determination a subsequent input is detected on the second input region or at a location on a touch-sensitive surface (that is separate from the first input region and the second input region) that corresponds to a location of the representation of the second control on the display, within the threshold amount of time from the time when the input on the second input region was detected: the device changes the current mode of the second control from the second mode to the first mode; and the device updates the representation of the second control to represent that the current mode of the second control is the first mode; and in accordance with a determination a subsequent input is not detected on the second input region or at a location on the touch-sensitive surface that corresponds to a location of the representation of the second control on the display, within the threshold amount of time from the time when the input on the second input region was detected: the device ceases to display the representation of the second control (e.g., without changing the current state of the toggle control from the second state to the first state). These features are illustrated in FIGS. 5A28-5A30 and accompanying descriptions, for example. Changing the current mode of the second control from the second mode to the first mode in accordance with a determination that a subsequent input is detected, and ceasing to display the representation of the second control in accordance with a determination that a subsequent input is not detected provides improved visual feedback to the user (e.g., allowing the user to determine whether a subsequent input is detected on the touch display). Providing improved visual feedback enhances the operability of the device and makes the user-device interface more efficient, which, additionally, reduces power usage and improves battery life of the device by enabling the user to use the device more quickly and efficiently.

In some embodiments, after displaying the representation of the second control to represent that the current mode of the toggle control is the second mode (e.g., in response to the input on the second input region): the device reduces (6042) visual prominence of the representation of the second control (e.g., starting to fade out the ringer control indicator) after a second threshold amount of time has elapsed since the time when the input on the second input region was detected, wherein the second threshold amount of time is shorter than the first threshold amount of time. For example, the toggle control starts to fade away, to indicate that the time window for changing the ringer state is almost closed, and the control ceases to be displayed when the first threshold amount of time is reached and that time window is closed. These features are illustrated in FIGS. 5A3-5A6 and accompanying descriptions, for example. Reducing visual prominence of the representation of the second control after a second threshold amount of time has elapsed since the time when the input on the second input region was detected after displaying the representation of the second control to represent that the current mode of the toggle control is the second mode provides improved visual feedback to the user (e.g., indicating to the user that a threshold amount of time has elapsed since the last input). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the input on the second input region and in accordance with the determination that the input on the second input region meets the second criteria (e.g., the second input meets control-toggle criteria), the device displays (6044) an indicator of the current value the first control corresponding to the first control function, concurrently with the representation of the second control corresponding to the second control function. In some embodiments, the indicator of the current value of the control corresponding to the first control function is only displayed if the state of the toggle control is the first state (e.g., the on state), and is not displayed when the state of the toggle control is the second state (e.g., the off state). In some embodiments, the indicator of the current value of the control corresponding to the first control function is displayed irrespective of whether the toggle control is in the first state or the second state. Displaying an indicator of the current value the first control in response to detecting the input on the second input region and in accordance with the determination that the input on the second input region meets the second criteria provides improved visual feedback to the user (e.g., allowing the user to see the current value of the first control after the input on the second input region). Providing improved visual feedback enhances the operability of the device and makes the user-device interface more efficient, which, additionally, reduces power usage and improves battery life of the device by enabling the user to use the device more quickly and efficiently.

In some embodiments, after displaying the representation of the second control to represent that the current mode of the second control is the second mode (e.g., the OFF state) (e.g., in response to the input on the second input region) (6046): the device detects a fifth press input on the first input region (e.g., a button activation input on a physical button or a hard press input on an intensity sensitive element with a characteristic intensity that is above an intensity threshold); and in response to detecting the fifth press input on the first input region: in accordance with a determination that the fifth press input meets the first criteria and that the current mode of the second control is the second mode, the device forgoes displaying, on the display, the first control (e.g., volume-control indicator) corresponding to the first control function of the device. In some embodiments, the indicator of the toggle control corresponding to the second control function is displayed in response to the fifth press input instead, to indicate that the current state of the toggle control is the second state (e.g., the off state). Foregoing displaying the first control in accordance with a determination that the fifth press input meets the first criteria and that the current mode of the second control is the second mode provides improved visual feedback to the user (e.g., allowing the user to determine based on the fact that the first control is not displayed that the second control is the second mode). Providing improved visual feedback enhances the operability of the device and makes the user-device interface more efficient, which, additionally, reduces power usage and improves battery life of the device by enabling the user to use the device more quickly and efficiently.

In some embodiments, the first press input is detected (6048) while the device is in a display-off state, and wherein the first control is displayed on a first version of a wake screen of the device (e.g., a wake screen is a user interface that is displayed when the device transitions from the display-off state to a display-on state). Displaying the first version of the wake screen forgoes displaying at least one user interface object (e.g., current time, basic device status indicators, wallpaper, etc.) shown on a second version of the wake screen that is displayed in response to a request to transition from the display-off state to the display-on state other than a press input on the first input region that meets the first criteria. This is illustrated in FIGS. 5A21-5A25 and accompanying descriptions, for example. Displaying the first version of the wake screen by forgoing displaying at least one user interface object shown on a second version of the wake screen when the first press input is detected while the device is in a display-off state provides improved visual feedback to the user (e.g., allowing the user to view the first control without being distracted by additional controls). Providing improved visual feedback enhances the operability of the device and makes the user-device interface more efficient, which, additionally, reduces power usage and improves battery life of the device by enabling the user to use the device more quickly and efficiently.

It should be understood that the particular order in which the operations in FIGS. 6A-6I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 7000) are also applicable in an analogous manner to method 6000 described above with respect to FIGS. 6A-6I. For example, the contacts, gestures, user interface objects, tactile outputs, audio outputs, intensity thresholds, time thresholds, focus selectors, and animations described above with reference to method 6000 optionally have one or more of the characteristics of the contacts, gestures, user interface objects, tactile outputs, audio outputs, intensity thresholds, time thresholds, focus selectors, and animations described herein with reference to other methods described herein (e.g., method 7000). For brevity, these details are not repeated here.

FIGS. 7A-7C are flow diagrams illustrating a method 7000 of interacting with controls displayed in a control user interface, including a control for turning off the device, in accordance with some embodiments.

Method 7000 relates to providing a power button for turning off the device in a control user interface, along with other device controls, and for using criteria (e.g., with enhanced requirements) for activating the displayed power button to turn off the device) different from the criteria (e.g., criteria for detecting a tap input) for triggering a primary function of other types of controls. Providing a displayed power button in lieu of a physical power button for turning off the device helps to reduce the number of physical off-display input regions (e.g., mechanical, solid state buttons, or other types of intensity-sensitive buttons) that need to be provided on the peripheral sides or back side of the device, thereby reducing manufacturing and maintenance costs of the device hardware. In addition, providing the power button in the control user interface helps to prevent accidental triggering of the power button (e.g., in contrast to physical power buttons present on the casing of the device), reducing user mistakes when interacting with or carrying the device. Furthermore, when the functionality for powering off the device is moved to a displayed control, the limited hardware buttons on the device can be freed up to trigger other more frequently used functions (e.g., control volume, ringer control, or camera control, etc.). These limited hardware buttons can be used to power on the device, when these other frequently used functions are not available (e.g., when the device is turned off). In addition to reducing device cost and complexity (e.g., by reducing the number of hardware buttons required on the device), these features enhance the operability of the device and make the user-device interface more efficient (e.g., by reducing user mistakes when the user interacts with the device), which, additionally, reduces power usage and improves battery life of the device by enabling the user to use the device more quickly and efficiently.

The method 7000 is performed at an electronic device (e.g., device 300, FIG. 3, or portable multifunction device 100, FIGS. 1A and 4A) with a display (e.g., a touch-screen display that is disposed on a front-side of the device), and a first input region (e.g., input region 5004, 5006, 5008, 5010, 5100, 455, 456, or 457) that is separate from the display (e.g., a depressible button, a solid state button, or a touch-sensitive region that is configured to respond to inputs in place of a button) and used to turn on the device when the device is turned off.

In accordance with method 7000, the device detects (7002) a first input that corresponds to a request to display a (predefined) control user interface (e.g., detecting touch-down of a contact on the middle portion of the first input region, and detecting that the contact meets predefined criteria for displaying the control center (e.g., criteria for detecting a press input, a tap-hold input, a double tap input, etc.)). In some embodiments, the display is off before the first input is detected, and the display is turned on in response to the first portion of the first input is detected and in accordance with the determination that the first criteria are met by the first portion of the first input. In some embodiments, the first input is detected while a wake screen user interface or a lock screen user interface is shown on the display. In some embodiments, the first input is detected while a home screen or springboard user interface is shown on the display. In some embodiments, the first input is detected while a user interface of an application is shown on the display. In response to detecting the first input, the device displays (7004) the control user interface, wherein displaying the control user interface includes concurrently displaying in the control user interface: a first control for selecting a value from a plurality of values for an output parameter of the device (e.g., a volume or brightness slider); a second control for switching between different modes of a first function of the device that are available while the device is on (e.g., a Bluetooth, WiFi, flashlight, sleep mode, audio playback, or airplane mode toggle); and a third control that, when activated, initiates a process for turning the device off (e.g., this is a displayed software control that is not available for turning on the device). While displaying the control user interface, the device detects (7006) a second input directed to the control user interface (e.g., including detecting a touch input on a touch-sensitive surface at a location that corresponds to a location on a portion of the control user interface shown the display). In response to detecting the second input (7008): in accordance with a determination that the second input is directed to the first control, the device adjusts a current value for the output parameter based on the second input (e.g., based on a direction and magnitude of the second input); in accordance with a determination that the second input is directed to the second control and meets first input criteria (e.g., the second input is a tap input), the device changes a current mode of the first function (e.g., from a first mode to a second mode that is different from the first mode); in accordance with a determination that the second input is directed to the third control and meets second input criteria (e.g., the second input is a long press or hard press input, such as an input with a characteristic intensity that is above a light press or hard press intensity threshold), the device initiates a process for turning off the device; and in accordance with a determination that the second input is directed to the third control and meets the first input criteria (e.g., is a tap input) but does not meet the second input criteria (e.g., is not a long press or hard press input, such as an input with a characteristic intensity that is above an intensity threshold), the device forgoes initiation of the process for turning off the device. These features are illustrated in FIGS. 5B5-5B6 (e.g., ringer is turned off in response to a tap input on ringer status indicator 5092), FIGS. 5B9-5B10 (e.g., volume is turned down in response to a swipe input on volume control 5014), and FIGS. 5B13-5B19 (e.g., a prompt is displayed in response to a tap input on power button 5106 and a shut-down process is initiated and completed in response to an input on power button 5106 that meets enhanced criteria) an accompanying descriptions, for example. Changing the current mode of the first function, initiating a process for turning off the device, or forgoing initiation of the process for turning off the device in accordance with a determination that the second input is directed to the second control and meets first input criteria, that the second input is directed to the third control and meets second input criteria, or that the second input is directed to the third control and meets the first input criteria but does not meet the second input criteria respectively, reduces the number of inputs needed to perform an operation (e.g., allowing the use to perform three distinct operations from the same user interface based on different input criteria). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the second input (7010): in accordance with a determination that the second input is directed to the first control and meets the second input criteria (e.g., is a long press or hard press input, such as an input with a characteristic intensity that is above an intensity threshold), the device displays an expanded view of the first control for the output parameter of the device (e.g., a volume or brightness slider). This is illustrated in FIGS. 5B11-5B12 (e.g., control 5014 is expanded in response to a press input or a touch-hold input by contact 5114) and accompanying descriptions, for example. Displaying an expanded view of the first control for the output parameter of the device in accordance with a determination that the second input is directed to the first control and meets the second input criteria provides improved visual feedback to the user (e.g., allowing the user to see an expanded view of the first control for the output parameter). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the second input (7012): in accordance with a determination that the second input is directed to the first control and meets the second input criteria (e.g., is a long press or hard press input, such as an input with a characteristic intensity that is above an intensity threshold) and includes movement in a first predefined direction after meeting the second input criteria, the device adjusts the current value for the output parameter based on the second input (e.g., based on a direction and magnitude of the second input) while displaying the expanded view of the first control for the output parameter of the device (e.g., a volume or brightness slider). This is illustrated in FIGS. 5B9-5B10 (e.g., a current value of volume control 5014 is decreased in response to a downward swipe input long volume control 5014) and accompanying descriptions, for example. Adjusting the current value for the output parameter based on the second input while displaying the expanded view of the first control for the output parameter of the device in accordance with the determination that the second input is directed to the first control and meets the second input criteria, reduces the number of inputs needed to perform an operation (e.g., allowing the user to adjust the current value for the output parameter based on the second input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the second input: in accordance with a determination that the second input is directed to the third control and meets the second input criteria (e.g., is a long press or hard press input, such as an input with a characteristic intensity that is above an intensity threshold) and includes movement in a second predefined direction (e.g., the same as the first predefined direction, or perpendicular to the first predefined direction) after meeting the second input criteria, the device executes (7014) the process to turn off the device (e.g., dimming the display during the movement in the second predefined direction and turning off the device completely once the movement meets a first movement threshold). This is illustrated in FIGS. 5B16-5B19 (e.g., a touch-hold input, light press input, or light press and hold input by contact 5118 causes the device to initiate a process to shut down the device) and accompanying descriptions, for example. Executing the process to turn off the device in accordance with the determination that the second input is directed to the third control and meets the second input criteria and includes movement in a second predefined direction after meeting the second input criteria, reduces the number of inputs needed to perform an operation (e.g., allowing the user to shut off the device with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the second input: in accordance with a determination that the second input is directed to the second control and meets the second input criteria (e.g., is a long press or hard press input, such as an input with a characteristic intensity that is above an intensity threshold), the device displays (7016) a control module that includes the second control and one or more controls that are not initially displayed in the control user interface. This is illustrated in FIGS. 5B7-5B8 (e.g., a light press input or a touch-hold input on ringer status indicator 5092 causes the device to display expanded control user interface 5036 that includes multiple related controls (e.g., controls 5040, 5042, 5044, and 5046)). In some embodiments, the control module includes related media playback controls, related network connection controls, related device hardware controls (e.g., for output devices such as displays, peripheral devices, tactile output generators, audio channels, etc.), respectively. Displaying a control module that includes the second control and one or more controls that are not initially displayed in the control user interface in accordance with a determination that the second input is directed to the second control and meets the second input criteria, provides improved visual feedback to the user (e.g., allowing the user to view an expanded control user interface). Providing improved visual feedback enhances the operability of the device and makes the user-device interface more efficient, which, additionally, reduces power usage and improves battery life of the device by enabling the user to use the device more quickly and efficiently.

In some embodiments, the first input that corresponds to a request to display the control user interface includes (7018) a first touch input on a touch-sensitive surface of the electronic device (e.g., a touch-screen display) that corresponds to the display of the device. In some embodiments, the first input is an edge swipe input detected at a side edge of the touch-screen display and including horizontal or vertical movement across the touch-screen display. In some embodiments, the first input is a downward swipe input detected on one or more device status indicators. The fact that the first input corresponds to a request to display the control user interface performs an operation when a set of conditions has been met without requiring further user input (e.g., allowing the user to view and interact with the control user interface in response to the first input). Performing an operation when a set of conditions has been met without requiring further user input controls enhances the operability of the device, which, additionally, reduces power usage and improves battery life of the device by enabling the user to use the device more quickly and efficiently In some embodiments, the first input that corresponds to a request to display the control user interface includes (e.g., 7020) a first press input on a first input region of the electronic device that is separate from the display of the device. In some embodiments, the first press input is a light press input on a middle portion of a side button that is also used to display the volume control (e.g., a middle portion of input regions 5004 and 5006 in FIG. 5A1). In some embodiments, the first press input is a deep press input on the side button that is also used to display the volume control (e.g., either of input regions 5004 and 5006 in FIG. 5A1). In some embodiments, the first press input is a double press on a home button of the device. In some embodiments, the first input region includes either of input regions 5004 and 5006 in FIG. 5A1 and one other input region that is distinct from input regions 5004 and 5006. These features are illustrated in FIGS. 5B22-5B24 (e.g., the device is turned on in response to simultaneous press inputs on input region 5100 and input region 5010, where upper and lower portions of input region 5100 are optionally used to implement input regions 5004 and 5006 in FIG. 5A1). The fact that the first input that corresponds to a request to display the control user interface includes a first press input on a first input region of the electronic device provides improved visual feedback to the user (e.g., allowing the user to view the control user interface in response to a first press input). Providing improved visual feedback enhances the operability of the device and makes the user-device interface more efficient, which, additionally, reduces power usage and improves battery life of the device by enabling the user to use the device more quickly and efficiently.

In some embodiments, before displaying the first input that corresponds to a request to display the control user interface, the device displays (7022) the first control in response to an initial portion of the first input, without displaying the second control and the third control. This is illustrated in FIGS. 5B1-5B4 (e.g., an initial portion of the press input on 5012 causes display of volume control 5014, but not one or more other controls in control user interface 5014 (e.g., a WiFi control (e.g., tap to toggle control on and off, and light press or touch-hold to expand control to show control module including WiFi control and other related network connectivity controls (e.g., Bluetooth control, Airplane mode control, etc.)), an airplane mode control (e.g., tap to toggle control on and off, and light press or touch-hold to expand control to show control module including airplane mode control and other related controls (e.g., WiFi control, Bluetooth control, etc.)), and a flashlight control (e.g., tap to toggle flashlight on and off, and light press or touch-hold to show expanded control module including flashlight control and strobe light control, and light intensity slider control, etc.))) and accompanying descriptions, for example. In some embodiments, if a press input ended without meeting the criteria for detecting a request to display the control user interface, the first control is displayed, and the control user interface as a whole is not displayed. Displaying the first control in response to an initial portion of the first input without displaying the second control and the third control provides improved visual feedback to the user (e.g., allowing the user to view the first control before the control user interface). Providing improved visual feedback enhances the operability of the device and makes the user-device interface more efficient, which, additionally, reduces power usage and improves battery life of the device by enabling the user to use the device more quickly and efficiently.

In some embodiments, after the device is turned off in response to the second input, the device detects (7024) a third input on the first input region that corresponds to a request to turn on the device (e.g., the third input meets the same criteria for detecting a request to display the control user interface if the device was already turned on when the third input is detected, or the third input meets criteria different from the first or second criteria, or the criteria for displaying the control user interface). In response to detecting the third input, the device turns on the electronic device (e.g., displaying a start screen), without displaying the control user interface. In some embodiments, the device does not include a dedicated power button, and the volume button on the side of the device is used as the power button when the device is off, and is used to display volume controls and the control center when the device is on. These features are illustrated in FIGS. 5B22-5B24 (e.g., device is turned on in response to simultaneous press inputs on input region 5100 and 5010, and displays the wake screen user interface 5054) and accompanying descriptions, for example. Turning on the electronic device in response to detecting the third input reduces the number of inputs needed to perform an operation (e.g., allowing the user to turn on the device using the same gesture that is used to display the control user interface). Reducing the number of inputs needed to perform an operation enhances the operability of the device, which, additionally, reduces power usage and improves battery life of the device by enabling the user to use the device more quickly and efficiently.

In some embodiments, after the device is turned off in response to the second input, the device detects (7026) a third input that corresponds to a request to turn on the device, wherein the third input is detected using an input device (e.g., a side volume button) that is distinct from that used to detect the second input. These features are illustrated in FIGS. 5B22-5B24 (e.g., device is turned on in response to simultaneous press inputs on input region 5100 and 5010 and not on the touch-screen) and accompanying descriptions, for example. Detecting a third input that corresponds to a request to turn on the device wherein the third input is detected using an input device that is distinct from that used to detect the second input reduces the number of inputs needed to perform an operation (e.g., allowing the user to turn on the device using a dedicated hardware control). Reducing the number of inputs needed to perform an operation enhances the operability of the device, and makes the user-device interface more efficient, which, additionally, reduces power usage and improves battery life of the device by enabling the user to use the device more quickly and efficiently.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 6000) are also applicable in an analogous manner to method 7000 described above with respect to FIGS. 7A-7C. For example, the contacts, gestures, user interface objects, tactile outputs, audio outputs, intensity thresholds, time thresholds, focus selectors, and animations described above with reference to method 7000 optionally have one or more of the characteristics of the contacts, gestures, user interface objects, tactile outputs, audio outputs, intensity thresholds, time thresholds, focus selectors, and animations described herein with reference to other methods described herein (e.g., method 6000). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display, and a first input region that is separate from the display:
      detecting a first press input on the first input region;
      in response to detecting the first press input on the first input region:
         in accordance with a determination that the first press input meets first criteria, displaying, on the display, a first control corresponding to a first control function of the electronic device, wherein the first control is displayed with a first size and includes a value indicator to represent that a current value of the first control function of the electronic device is a first value, and wherein, while the first control is displayed at the first size, the first control is overlaid on a first portion of a first user interface;
      after displaying the first control with the first size and the value indicator representing the first value of the first control function:
         in accordance with a determination that a subsequent press input has not been detected on the first input region within a threshold time from when the first press input was detected, ceasing to display the first control; and
         in accordance with a determination that a second press input has been detected on the first input region within the threshold time from when the first press input was detected:
            adjusting the current value of the first control function of the electronic device from the first value to a second value that is different from the first value, wherein the second value is selected in accordance with the second press input;
            adjusting a size of the first control from the first size to a second size distinct from the first size, including reducing a first dimension of the first control that is different from a second dimension of the first control, wherein the second dimension of the first control corresponds to a value range of the first control function, and wherein reducing the first dimension of the first control reveals the first portion of the first user interface on the display; and
            changing an appearance of the value indicator in the first control to represent that the current value of the first control function is the second value.

2. The method of claim 1, including:
   in response to detecting the first press input on the first input region:
      in accordance with a determination that the first press input meets the first criteria, displaying, on the display, a second control corresponding to a second control function of the electronic device concurrently with the first control corresponding to the first control function of the electronic device; and
   after displaying the first control and the second control:
      in accordance with a determination that the second press input has been detected on the first input region within the threshold time from when the first press input was detected:
         ceasing to display the second control corresponding to the second control function of the electronic device, while maintaining display of the first control corresponding to the first control function of the electronic device.

3. The method of claim 2, including:
   while displaying the first control and the value indicator corresponding to the first control function, detecting an input on a second input region that is separate from the display; and
   in response to detecting the input on the second input region:
      in accordance with a determination that the input on the second input region corresponds to a request to change a current mode of the second control function from a first mode to a second mode distinct from the first mode:
         ceasing to display the first control and the value indicator corresponding to the first control function; and
         changing an appearance of the second control corresponding to the second control function to indicate that the current mode of the second control function is the second mode.

4. The method of claim 1, wherein displaying the first control corresponding to the first control function includes:
moving the first control onto the display from a first location adjacent to the first input region to a second location that is farther from the first input region than the first location.

5. The method of claim 4, wherein displaying the first control corresponding to the first control function includes:
in accordance with a determination that the electronic device is being held in a first orientation, displaying the first control in a centrally aligned configuration on the display; and
in accordance with a determination that the electronic device is being held in a second orientation, displaying the first control aligned with the first input region, offset from the centrally aligned configuration.

6. The method of claim 1, wherein adjusting the size of the first control from the first size to the second size in accordance with a determination that a second press input has been detected on the first input region within the threshold time from when the first press input was detected, includes:
increasing the second dimension of the first control that corresponds to the value range of the first control function.

7. The method of claim 1, wherein the second press input has been detected on the first input region within the threshold time and the size of the first control is adjusted from the first size to the second size, and wherein the method includes:
while displaying the first control with the second size and the value indicator representing that the current value of the first control function is the second value, detecting a third press input on the first input region; and
in response to detecting the third press input on the first input region:
in accordance with a determination that the third press input corresponds to a request to change the current value of the first control function to an end value of the first control function:
adjusting the current value of the first control function of the electronic device from the second value to the end value of the first control function;
adjusting the size of the first control from the second size to a third size distinct from the second size;
changing the appearance of the value indicator in the first control to represent that the current value of the first control function is the end value of the first control function; and
adjusting the size of the first control from the third size back to the second size after an end of the third press input is detected.

8. The method of claim 7, including:
in response to detecting the third press input on the first input region:
in accordance with a determination that the second value is a first end value of the first control function and the third press input corresponds to a request to change the current value of the first control function beyond the first end value of the first control function:
adjusting the size of the first control from the second size to the third size distinct from the second size;
adjusting the size of the first control from the third size back to the second size after an end of the third press input is detected; and
displaying the value indicator with a corresponding appearance that represents that the current value of the first control function remains unchanged at the first end value of the first control function.

9. The method of claim 1, wherein the second press input has been detected on the first input region within the threshold time and the size of the first control is adjusted from the first size to the second size, and wherein the method includes:
while displaying the first control with the second size and the value indicator representing that the current value of the first control function is the second value, detecting a first touch input on a touch-sensitive surface that is separate from the first input region; and
in response to detecting the first touch input on the touch-sensitive surface that is separate from the first input region:
in accordance with a determination that the first touch input is detected at a location that corresponds to a location of the first control on the display:
adjusting the size of the first control from the second size to the first size, without adjusting the current value of the first control function.

10. The method of claim 9, wherein the second press input has been detected on the first input region within the threshold time and the size of the first control is adjusted from the first size to the second size, and wherein the first touch input has been detected after the second press input, and the size of the first control is adjusted from the second size back to the first size, and wherein the method includes:
while displaying the first control with the first size and the value indicator representing that the current value of the first control function is the second value, detecting a second touch input on the touch-sensitive surface that is separate from the first input region; and
in response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control, adjusting the current value of the first control function of the electronic device from the second value to a third value that is different from the second value, wherein the third value is selected in accordance with the second touch input.

11. The method of claim 1, wherein a sequence of one or more press inputs have been detected on the first input region and the size of the first control is currently displayed with the second size and with the value indicator representing that the current value of the first control function is a fourth value that is distinct from an end value of the first control function, and the method includes:
after the sequence of one or more press inputs detected on the first input region and while the first control is displayed with the second size and the value indicator representing the fourth value, detecting a fourth press input on the first input region; and
in response to detecting the fourth press input on the first input region:

in accordance with a determination that the fourth press input corresponds to a request to change the current value of the first control function to an end value of the first control function:
  generating a first tactile output in conjunction with adjusting the current value of the first control function of the electronic device from the fourth value to the end value of the first control function.

12. The method of claim 11, including:
while the first control is displayed and the value indicator represents that the current value of the first control function is the fourth value, detecting a third touch input on a touch-sensitive surface that is separate from the first input region; and
in response to detecting the third touch input on the touch-sensitive surface that is separate from the first input region:
  in accordance with a determination that the third touch input corresponds to a request to change the current value of the first control function to the end value of the first control function:
    generating a second tactile output in conjunction with adjusting the current value of the first control function of the electronic device from the fourth value to the end value of the first control function.

13. The method of claim 12, wherein a respective tactile output characteristic of the first tactile output has a first value and the respective tactile output characteristic of the second tactile output has a second value that is different from the first value.

14. The method of claim 13, wherein a first tactile output characteristic of the first tactile output has a predefined fixed value that is independent of a characteristic value of the fourth press input, and the first tactile output characteristic of the second tactile output has variable value that is determined based on a characteristic speed of the third touch input.

15. The method of claim 1, including:
while displaying the first control and the value indicator representing the current value of the first control function, detecting a fourth touch input on a touch-sensitive surface that is separate from the first input region; and
in response to detecting the fourth touch input on the touch-sensitive surface that is separate from the first input region:
  in accordance with a determination that the fourth touch input is detected at a location that corresponds to a location of the first control on the display and that the fourth touch input meets control-expansion criteria:
    displaying a control user interface region including the first control and a plurality of controls that are distinct from the first control.

16. The method of claim 1, wherein, in accordance with a determination that the first press input meets the first criteria, displaying, on the display, the first control corresponding to the first control function of the electronic device includes:
in accordance with a determination that a currently used output device is a first output device among a plurality of output devices associated with the electronic device, displaying the first control to control an output level of the first output device; and
in accordance with a determination that the currently used output device is a second output device among a plurality of output devices that is distinct from the first output device, displaying the first control to control an output level of the second output device.

17. The method of claim 1, including:
detecting an input on a second input region that is separate from the display; and
in response to detecting the input on the second input region:
  in accordance with a determination that the input on the second input region meets second criteria,
    changing a current mode of a second control corresponding to a second control function of the electronic device from a first mode to a second mode that is distinct from the first mode; and
    displaying, on the display, a representation of the second control to represent that the current mode of the second control is the second mode.

18. The method of claim 17, including:
after displaying the representation of the second control to represent that the current mode of the second control is the second mode:
  in accordance with a determination that a subsequent input is detected on the second input region or at a location on a touch-sensitive surface that corresponds to a location of the representation of the second control on the display, within the threshold time from when the input on the second input region was detected:
    changing the current mode of the second control from the second mode to the first mode; and
    updating the representation of the second control to represent that the current mode of the second control is the first mode; and
  in accordance with a determination that a subsequent input is not detected on the second input region or at a location on the touch-sensitive surface that corresponds to a location of the representation of the second control on the display, within the threshold time from when the input on the second input region was detected:
    ceasing to display the representation of the second control.

19. The method of claim 18, wherein:
the threshold time is a first threshold amount of time; and
the method includes:
  after displaying the representation of the second control to represent that the current mode of a toggle control is the second mode:
    reducing visual prominence of the representation of the second control after a second threshold amount of time has elapsed since the time when the input on the second input region was detected, wherein the second threshold amount of time is shorter than the first threshold amount of time.

20. The method of claim 17, including:
in response to detecting the input on the second input region and in accordance with the determination that the input on the second input region meets the second criteria, displaying an indicator of the current value of the first control corresponding to the first control function, concurrently with the representation of the second control corresponding to the second control function.

21. The method of claim 17, including:
after displaying the representation of the second control to represent that the current mode of the second control is the second mode:
  detecting a fifth press input on the first input region; and in response to detecting the fifth press input on the first input region:

in accordance with a determination that the fifth press input meets the first criteria and that the current mode of the second control is the second mode, forgoing displaying, on the display, the first control corresponding to the first control function of the electronic device.

22. The method of claim 1, wherein the first press input is detected while the electronic device is in a display-off state and the first control is displayed on a first version of a wake screen of the electronic device, and displaying the first version of the wake screen forgoes displaying at least one user interface object shown on a second version of the wake screen that is displayed in response to a request to transition from the display-off state to a display-on state other than a press input on the first input region that meets the first criteria.

23. An electronic device, comprising:

a display that is disposed on a front-side of the electronic device;

a first input region that is disposed on one or more peripheral-sides of the electronic device adjacent to the front-side of the electronic device;

one or more tactile output generators for generating tactile outputs;

one or more processors;

memory; and one or more programs, wherein the one or more programs are stored in the memory and configured to be executed by the one or more processors, the one or more programs including instructions for performing operations including:

detecting a first press input on the first input region;

in response to detecting the first press input on the first input region:

in accordance with a determination that the first press input meets first criteria, displaying, on the display, a first control corresponding to a first control function of the electronic device, wherein the first control is displayed with a first size and includes a value indicator to represent that a current value of the first control function of the electronic device is a first value, and wherein, while the first control is displayed at the first size, the first control is overlaid on a first portion of a first user interface;

after displaying the first control with the first size and the value indicator representing the first value of the first control function:

in accordance with a determination that a subsequent press input has not been detected on the first input region within a threshold time from when the first press input was detected, ceasing to display the first control; and in accordance with a determination that a second press input has been detected on the first input region within the threshold time from when the first press input was detected:

adjusting the current value of the first control function of the electronic device from the first value to a second value that is different from the first value, wherein the second value is selected in accordance with the second press input;

adjusting a size of the first control from the first size to a second size distinct from the first size, including reducing a first dimension of the first control that is different from a second dimension of the first control, wherein the second dimension of the first control corresponds to a value range of the first control function, and wherein reducing the first dimension of the first control reveals the first portion of the first user interface on the display; and changing an appearance of the value indicator in the first control to represent that the current value of the first control function is the second value.

24. A non-transitory computer readable storage medium storing one or more programs, the one or more programs comprising instructions, which when executed by an electronic device with a display that is disposed on a front-side of the electronic device, a first input region that is disposed on one or more peripheral-sides of the electronic device adjacent to the front-side of the electronic device, and one or more tactile output generators for generating tactile outputs, cause the electronic device to perform operations comprising:

detecting a first press input on the first input region;

in response to detecting the first press input on the first input region:

in accordance with a determination that the first press input meets first criteria, displaying, on the display, a first control corresponding to a first control function of the electronic device, wherein the first control is displayed with a first size and includes a value indicator to represent that a current value of the first control function of the electronic device is a first value, and wherein, while the first control is displayed at the first size, the first control is overlaid on a first portion of a first user interface;

after displaying the first control with the first size and the value indicator representing the first value of the first control function:

in accordance with a determination that a subsequent press input has not been detected on the first input region within a threshold time from when the first press input was detected, ceasing to display the first control; and in accordance with a determination that a second press input has been detected on the first input region within the threshold time from when the first press input was detected:

adjusting the current value of the first control function of the electronic device from the first value to a second value that is different from the first value, wherein the second value is selected in accordance with the second press input;

adjusting a size of the first control from the first size to a second size distinct from the first size, including reducing a first dimension of the first control that is different from a second dimension of the first control, wherein the second dimension of the first control corresponds to a value range of the first control function, and wherein reducing the first dimension of the first control reveals the first portion of the first user interface on the display; and changing an appearance of the value indicator in the first control to represent that the current value of the first control function is the second value.

25. The electronic device of claim 23, wherein the one or more programs include instructions for performing operations including:

in response to detecting the first press input on the first input region:
  in accordance with a determination that the first press input meets the first criteria, displaying, on the display, a second control corresponding to a second control function of the electronic device concurrently with the first control corresponding to the first control function of the electronic device; and
after displaying the first control and the second control:
  in accordance with a determination that the second press input has been detected on the first input region within the threshold time from when the first press input was detected:
    ceasing to display the second control corresponding to the second control function of the electronic device, while maintaining display of the first control corresponding to the first control function of the electronic device.

26. The electronic device of claim 25, wherein the one or more programs include instructions for performing operations including:
  while displaying the first control and the value indicator corresponding to the first control function, detecting an input on a second input region that is separate from the display; and
  in response to detecting the input on the second input region:
    in accordance with a determination that the input on the second input region corresponds to a request to change a current mode of the second control function from a first mode to a second mode distinct from the first mode:
      ceasing to display the first control and the value indicator corresponding to the first control function; and
      changing an appearance of the second control corresponding to the second control function to indicate that the current mode of the second control function is the second mode.

27. The electronic device of claim 23, wherein displaying the first control corresponding to the first control function includes: moving the first control onto the display from a first location adjacent to the first input region to a second location that is farther from the first input region than the first location.

28. The electronic device of claim 27, wherein displaying the first control corresponding to the first control function includes:
  in accordance with a determination that the electronic device is being held in a first orientation, displaying the first control in a centrally aligned configuration on the display; and
  in accordance with a determination that the electronic device is being held in a second orientation, displaying the first control aligned with the first input region, offset from the centrally aligned configuration.

29. The electronic device of claim 23, wherein adjusting the size of the first control from the first size to the second size in accordance with a determination that a second press input has been detected on the first input region within the threshold time from when the first press input was detected, includes:
  increasing the second dimension of the first control that corresponds to the value range of the first control function.

30. The electronic device of claim 23, wherein the second press input has been detected on the first input region within the threshold time and the size of the first control is adjusted from the first size to the second size, and wherein the one or more programs include instructions for performing operations including:
  while displaying the first control with the second size and the value indicator representing that the current value of the first control function is the second value, detecting a third press input on the first input region; and
  in response to detecting the third press input on the first input region:
    in accordance with a determination that the third press input corresponds to a request to change the current value of the first control function to an end value of the first control function:
      adjusting the current value of the first control function of the electronic device from the second value to the end value of the first control function;
      adjusting the size of the first control from the second size to a third size distinct from the second size;
      changing the appearance of the value indicator in the first control to represent that the current value of the first control function is the end value of the first control function; and
      adjusting the size of the first control from the third size back to the second size after an end of the third press input is detected.

31. The electronic device of claim 30, wherein the one or more programs include instructions for performing operations including:
  in response to detecting the third press input on the first input region:
    in accordance with a determination that the second value is a first end value of the first control function and the third press input corresponds to a request to change the current value of the first control function beyond the first end value of the first control function:
      adjusting the size of the first control from the second size to the third size distinct from the second size;
      adjusting the size of the first control from the third size back to the second size after an end of the third press input is detected; and
      displaying the value indicator with a corresponding appearance that represents that the current value of the first control function remains unchanged at the first end value of the first control function.

32. The electronic device of claim 23, wherein the second press input has been detected on the first input region within the threshold time and the size of the first control is adjusted from the first size to the second size, and wherein the one or more programs include instructions for performing operations including:
  while displaying the first control with the second size and the value indicator representing that the current value of the first control function is the second value, detecting a first touch input on a touch-sensitive surface that is separate from the first input region; and
  in response to detecting the first touch input on the touch-sensitive surface that is separate from the first input region:
    in accordance with a determination that the first touch input is detected at a location that corresponds to a location of the first control on the display:
      adjusting the size of the first control from the second size to the first size, without adjusting the current value of the first control function.

33. The electronic device of claim 32, wherein the second press input has been detected on the first input region within the threshold time and the size of the first control is adjusted from the first size to the second size, and wherein the first touch input has been detected after the second press input, and the size of the first control is adjusted from the second size back to the first size, and wherein the one or more programs include instructions for performing operations including:

while displaying the first control with the first size and the value indicator representing that the current value of the first control function is the second value, detecting a second touch input on the touch-sensitive surface that is separate from the first input region; and in response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control, adjusting the current value of the first control function of the electronic device from the second value to a third value that is different from the second value, wherein the third value is selected in accordance with the second touch input.

34. The electronic device of claim 23, wherein a sequence of one or more press inputs have been detected on the first input region and the size of the first control is currently displayed with the second size and with the value indicator representing that the current value of the first control function is a fourth value that is distinct from an end value of the first control function, and the one or more programs include instructions for performing operations including:

after the sequence of one or more press inputs detected on the first input region and while the first control is displayed with the second size and the value indicator representing the fourth value, detecting a fourth press input on the first input region; and in response to detecting the fourth press input on the first input region:

in accordance with a determination that the fourth press input corresponds to a request to change the current value of the first control function to an end value of the first control function:

generating a first tactile output in conjunction with adjusting the current value of the first control function of the electronic device from the fourth value to the end value of the first control function.

35. The electronic device of claim 34, wherein the one or more programs include instructions for performing operations including:

while the first control is displayed and the value indicator represents that the current value of the first control function is the fourth value, detecting a third touch input on a touch- sensitive surface that is separate from the first input region; and in response to detecting the third touch input on the touch-sensitive surface that is separate from the first input region:

in accordance with a determination that the third touch input corresponds to a request to change the current value of the first control function to the end value of the first control function:

generating a second tactile output in conjunction with adjusting the current value of the first control function of the electronic device from the fourth value to the end value of the first control function.

36. The electronic device of claim 35, wherein a respective tactile output characteristic of the first tactile output has a first value and the respective tactile output characteristic of the second tactile output has a second value that is different from the first value.

37. The electronic device of claim 36, wherein a first tactile output characteristic of the first tactile output has a predefined fixed value that is independent of a characteristic value of the fourth press input, and the first tactile output characteristic of the second tactile output has variable value that is determined based on a characteristic speed of the third touch input.

38. The electronic device of claim 23, wherein the one or more programs include instructions for performing operations including:

while displaying the first control and the value indicator representing the current value of the first control function, detecting a fourth touch input on a touch-sensitive surface that is separate from the first input region; and in response to detecting the fourth touch input on the touch-sensitive surface that is separate from the first input region:

in accordance with a determination that the fourth touch input is detected at a location that corresponds to a location of the first control on the display and that the fourth touch input meets control-expansion criteria:

displaying a control user interface region including the first control and a plurality of controls that are distinct from the first control.

39. The electronic device of claim 23, wherein, in accordance with a determination that the first press input meets the first criteria, displaying, on the display, the first control corresponding to the first control function of the electronic device includes:

in accordance with a determination that a currently used output device is a first output device among a plurality of output devices associated with the electronic device, displaying the first control to control an output level of the first output device; and in accordance with a determination that the currently used output device is a second output device among a plurality of output devices that is distinct from the first output device, displaying the first control to control an output level of the second output device.

40. The electronic device of claim 23, wherein the one or more programs include instructions for performing operations including:

detecting an input on a second input region that is separate from the display; and in response to detecting the input on the second input region:

in accordance with a determination that the input on the second input region meets second criteria, changing a current mode of a second control corresponding to a second control function of the electronic device from a first mode to a second mode that is distinct from the first mode; and displaying, on the display, a representation of the second control to represent that the current mode of the second control is the second mode.

41. The electronic device of claim 40, wherein the one or more programs include instructions for performing operations including:

after displaying the representation of the second control to represent that the current mode of the second control is the second mode:

in accordance with a determination that a subsequent input is detected on the second input region or at a location on a touch-sensitive surface that corresponds to a location of the representation of the second control on the display, within the threshold time from when the input on the second input region was detected:
changing the current mode of the second control from the second mode to the first mode; and
updating the representation of the second control to represent that the current mode of the second control is the first mode; and
in accordance with a determination that a subsequent input is not detected on the second input region or at a location on the touch-sensitive surface that corresponds to a location of the representation of the second control on the display, within the threshold time from when the input on the second input region was detected:
ceasing to display the representation of the second control.

42. The electronic device of claim 41, wherein:
the threshold time is a first threshold amount of time; and
the one or more programs include instructions for performing operations including:
after displaying the representation of the second control to represent that the current mode of a toggle control is the second mode:
reducing visual prominence of the representation of the second control after a second threshold amount of time has elapsed since the time when the input on the second input region was detected, wherein the second threshold amount of time is shorter than the first threshold amount of time.

43. The electronic device of claim 40, wherein the one or more programs include instructions for performing operations including:
in response to detecting the input on the second input region and in accordance with the determination that the input on the second input region meets the second criteria, displaying an indicator of the current value of the first control corresponding to the first control function, concurrently with the representation of the second control corresponding to the second control function.

44. The electronic device of claim 40, wherein the one or more programs include instructions for performing operations including:
after displaying the representation of the second control to represent that the current mode of the second control is the second mode:
detecting a fifth press input on the first input region; and
in response to detecting the fifth press input on the first input region:
in accordance with a determination that the fifth press input meets the first criteria and that the current mode of the second control is the second mode, forgoing displaying, on the display, the first control corresponding to the first control function of the electronic device.

45. The electronic device of claim 23, wherein the first press input is detected while the electronic device is in a display-off state and the first control is displayed on a first version of a wake screen of the electronic device, and displaying the first version of the wake screen forgoes displaying at least one user interface object shown on a second version of the wake screen that is displayed in response to a request to transition from the display-off state to a display-on state other than a press input on the first input region that meets the first criteria.

46. The non-transitory computer readable storage medium of claim 24, wherein the one or more programs include instructions, which when executed by the electronic device, cause the electronic device to perform operations including:
in response to detecting the first press input on the first input region:
in accordance with a determination that the first press input meets the first criteria, displaying, on the display, a second control corresponding to a second control function of the electronic device concurrently with the first control corresponding to the first control function of the electronic device; and
after displaying the first control and the second control:
in accordance with a determination that the second press input has been detected on the first input region within the threshold time from when the first press input was detected:
ceasing to display the second control corresponding to the second control function of the electronic device, while maintaining display of the first control corresponding to the first control function of the electronic device.

47. The non-transitory computer readable storage medium of claim 46, wherein the one or more programs include instructions, which when executed by the electronic device, cause the electronic device to perform operations including:
while displaying the first control and the value indicator corresponding to the first control function, detecting an input on a second input region that is separate from the display; and
in response to detecting the input on the second input region:
in accordance with a determination that the input on the second input region corresponds to a request to change a current mode of the second control function from a first mode to a second mode distinct from the first mode:
ceasing to display the first control and the value indicator corresponding to the first control function; and
changing an appearance of the second control corresponding to the second control function to indicate that the current mode of the second control function is the second mode.

48. The non-transitory computer readable storage medium of claim 24, wherein displaying the first control corresponding to the first control function includes:
moving the first control onto the display from a first location adjacent to the first input region to a second location that is farther from the first input region than the first location.

49. The non-transitory computer readable storage medium of claim 48, wherein displaying the first control corresponding to the first control function includes:
in accordance with a determination that the electronic device is being held in a first orientation, displaying the first control in a centrally aligned configuration on the display; and
in accordance with a determination that the electronic device is being held in a second orientation, displaying the first control aligned with the first input region, offset from the centrally aligned configuration.

50. The non-transitory computer readable storage medium of claim 24, wherein adjusting the size of the first control from the first size to the second size in accordance with a determination that a second press input has been detected on the first input region within the threshold time from when the first press input was detected, includes:
increasing the second dimension of the first control that corresponds to the value range of the first control function.

51. The non-transitory computer readable storage medium of claim 24, wherein the second press input has been detected on the first input region within the threshold time and the size of the first control is adjusted from the first size to the second size, and wherein the one or more programs include instructions, which when executed by the electronic device, cause the electronic device to perform operations including:
while displaying the first control with the second size and the value indicator representing that the current value of the first control function is the second value, detecting a third press input on the first input region; and
in response to detecting the third press input on the first input region:
in accordance with a determination that the third press input corresponds to a request to change the current value of the first control function to an end value of the first control function:
adjusting the current value of the first control function of the electronic device from the second value to the end value of the first control function;
adjusting the size of the first control from the second size to a third size distinct from the second size;
changing the appearance of the value indicator in the first control to represent that the current value of the first control function is the end value of the first control function; and
adjusting the size of the first control from the third size back to the second size after an end of the third press input is detected.

52. The non-transitory computer readable storage medium of claim 51, wherein the one or more programs include instructions, which when executed by the electronic device, cause the electronic device to perform operations including:
in response to detecting the third press input on the first input region:
in accordance with a determination that the second value is a first end value of the first control function and the third press input corresponds to a request to change the current value of the first control function beyond the first end value of the first control function:
adjusting the size of the first control from the second size to the third size distinct from the second size;
adjusting the size of the first control from the third size back to the second size after an end of the third press input is detected; and
displaying the value indicator with a corresponding appearance that represents that the current value of the first control function remains unchanged at the first end value of the first control function.

53. The non-transitory computer readable storage medium of claim 24, wherein the second press input has been detected on the first input region within the threshold time and the size of the first control is adjusted from the first size to the second size, and wherein the one or more programs include instructions, which when executed by the electronic device, cause the electronic device to perform operations including:
while displaying the first control with the second size and the value indicator representing that the current value of the first control function is the second value, detecting a first touch input on a touch-sensitive surface that is separate from the first input region; and
in response to detecting the first touch input on the touch-sensitive surface that is separate from the first input region:
in accordance with a determination that the first touch input is detected at a location that corresponds to a location of the first control on the display:
adjusting the size of the first control from the second size to the first size, without adjusting the current value of the first control function.

54. The non-transitory computer-readable storage medium of claim 53, wherein the second press input has been detected on the first input region within the threshold time and the size of the first control is adjusted from the first size to the second size, and wherein the first touch input has been detected after the second press input, and the size of the first control is adjusted from the second size back to the first size, and wherein the one or more programs include instructions, which when executed by the electronic device, cause the electronic device to perform operations including:
while displaying the first control with the first size and the value indicator representing that the current value of the first control function is the second value, detecting a second touch input on the touch-sensitive surface that is separate from the first input region; and
in response to detecting the second touch input and in accordance with a determination that the second touch input is detected at a location on the touch-sensitive surface that corresponds to a location of the first control on the display and includes more than a threshold amount of movement in a direction that corresponds to a predefined direction on the first control, adjusting the current value of the first control function of the electronic device from the second value to a third value that is different from the second value, wherein the third value is selected in accordance with the second touch input.

55. The non-transitory computer readable storage medium of claim 24, wherein a sequence of one or more press inputs have been detected on the first input region and the size of the first control is currently displayed with the second size and with the value indicator representing that the current value of the first control function is a fourth value that is distinct from an end value of the first control function, and wherein the one or more programs include instructions, which when executed by the electronic device, cause the electronic device to perform operations including:
after the sequence of one or more press inputs detected on the first input region and while the first control is displayed with the second size and the value indicator representing the fourth value, detecting a fourth press input on the first input region; and
in response to detecting the fourth press input on the first input region:
in accordance with a determination that the fourth press input corresponds to a request to change the current value of the first control function to an end value of the first control function:
generating a first tactile output in conjunction with adjusting the current value of the first control function of the electronic device from the fourth value to the end value of the first control function.

56. The non-transitory computer readable storage medium of claim 55, wherein the one or more programs include instructions, which when executed by the electronic device, cause the electronic device to perform operations including:

while the first control is displayed and the value indicator represents that the current value of the first control function is the fourth value, detecting a third touch input on a touch-sensitive surface that is separate from the first input region; and in response to detecting the third touch input on the touch-sensitive surface that is separate from the first input region:

in accordance with a determination that the third touch input corresponds to a request to change the current value of the first control function to the end value of the first control function:

generating a second tactile output in conjunction with adjusting the current value of the first control function of the electronic device from the fourth value to the end value of the first control function.

57. The non-transitory computer readable storage medium of claim 56, wherein a respective tactile output characteristic of the first tactile output has a first value and the respective tactile output characteristic of the second tactile output has a second value that is different from the first value.

58. The non-transitory computer readable storage medium of claim 57, wherein a first tactile output characteristic of the first tactile output has a predefined fixed value that is independent of a characteristic value of the fourth press input, and the first tactile output characteristic of the second tactile output has variable value that is determined based on a characteristic speed of the third touch input.

59. The non-transitory computer readable storage medium of claim 24, wherein the one or more programs include instructions, which when executed by the electronic device, cause the electronic device to perform operations including:

while displaying the first control and the value indicator representing the current value of the first control function, detecting a fourth touch input on a touch-sensitive surface that is separate from the first input region; and in response to detecting the fourth touch input on the touch-sensitive surface that is separate from the first input region:

in accordance with a determination that the fourth touch input is detected at a location that corresponds to a location of the first control on the display and that the fourth touch input meets control-expansion criteria:

displaying a control user interface region including the first control and a plurality of controls that are distinct from the first control.

60. The non-transitory computer readable storage medium of claim 24, wherein, in accordance with a determination that the first press input meets the first criteria, displaying, on the display, the first control corresponding to the first control function of the electronic device includes:

in accordance with a determination that a currently used output device is a first output device among a plurality of output devices associated with the electronic device, displaying the first control to control an output level of the first output device; and in accordance with a determination that the currently used output device is a second output device among a plurality of output devices that is distinct from the first output device, displaying the first control to control an output level of the second output device.

61. The non-transitory computer readable storage medium of claim 24, wherein the one or more programs include instructions, which when executed by the electronic device, cause the electronic device to perform operations including:

detecting an input on a second input region that is separate from the display; and in response to detecting the input on the second input region:

in accordance with a determination that the input on the second input region meets second criteria, changing a current mode of a second control corresponding to a second control function of the electronic device from a first mode to a second mode that is distinct from the first mode; and displaying, on the display, a representation of the second control to represent that the current mode of the second control is the second mode.

62. The non-transitory computer readable storage medium of claim 61, wherein the one or more programs include instructions, which when executed by the electronic device, cause the electronic device to perform operations including:

after displaying the representation of the second control to represent that the current mode of the second control is the second mode:

in accordance with a determination that a subsequent input is detected on the second input region or at a location on a touch-sensitive surface that corresponds to a location of the representation of the second control on the display, within the threshold time from when the input on the second input region was detected:

changing the current mode of the second control from the second mode to the first mode; and updating the representation of the second control to represent that the current mode of the second control is the first mode; and in accordance with a determination that a subsequent input is not detected on the second input region or at a location on the touch-sensitive surface that corresponds to a location of the representation of the second control on the display, within the threshold time from when the input on the second input region was detected:

ceasing to display the representation of the second control.

63. The non-transitory computer readable storage medium of claim 62, wherein:

the threshold time is a first threshold amount of time; and the one or more programs include instructions, which when executed by the electronic device, cause the electronic device to perform operations including:

after displaying the representation of the second control to represent that the current mode of a toggle control is the second mode:

reducing visual prominence of the representation of the second control after a second threshold amount of time has elapsed since the time when the input on the second input region was detected, wherein the second threshold amount of time is shorter than the first threshold amount of time.

64. The non-transitory computer readable storage medium of claim 61, wherein the one or more programs include instructions, which when executed by the electronic device, cause the electronic device to perform operations including:

in response to detecting the input on the second input region and in accordance with the determination that the input on the second input region meets the second criteria, displaying an indicator of the current value of the first control corresponding to the first control function, concurrently with the representation of the second control corresponding to the second control function.

65. The non-transitory computer readable storage medium of claim 61, wherein the one or more programs include instructions, which when executed by the electronic device, cause the electronic device to perform operations including:
    after displaying the representation of the second control to represent that the current mode of the second control is the second mode:
    detecting a fifth press input on the first input region; and
    in response to detecting the fifth press input on the first input region:
        in accordance with a determination that the fifth press input meets the first criteria and that the current mode of the second control is the second mode, forgoing displaying, on the display, the first control corresponding to the first control function of the electronic device.

66. The non-transitory computer readable storage medium of claim 24, wherein the first press input is detected while the electronic device is in a display-off state and the first control is displayed on a first version of a wake screen of the electronic device, and displaying the first version of the wake screen forgoes displaying at least one user interface object shown on a second version of the wake screen that is displayed in response to a request to transition from the display-off state to a display-on state other than a press input on the first input region that meets the first criteria.

\* \* \* \* \*